United States Patent [19]
Dai et al.

[11] Patent Number: 5,452,239
[45] Date of Patent: Sep. 19, 1995

[54] METHOD OF REMOVING GATED CLOCKS FROM THE CLOCK NETS OF A NETLIST FOR TIMING SENSITIVE IMPLEMENTATION OF THE NETLIST IN A HARDWARE EMULATION SYSTEM

[75] Inventors: Wei-Jin Dai, Cupertino; Louis Galbiati, III, Mountain View; Joseph Varghese, Sunnyvale; Dam V. Bui, Milpitas; Stephen P. Sample, Mountain View, all of Calif.

[73] Assignee: Quickturn Design Systems, Inc., Mountain View, Calif.

[21] Appl. No.: 844

[22] Filed: Feb. 26, 1993

Related U.S. Application Data

[63] Continuation-in-part of Ser. No. 13,025, Jan. 29, 1993, abandoned.

[51] Int. Cl.⁶ .................. G06G 7/48; G06F 17/00
[52] U.S. Cl. .................. 364/578; 364/580; 371/222
[58] Field of Search .................. 364/578–580, 364/232.3, 927.81; 371/16.2, 22.1, 22.2, 23, 27; 340/825.22, 825.06, 825.88, 825.89, 825.83, 825.84; 307/465, 468, 219, 303; 357/45; 395/500; 365/201; 370/13, 14, 17

[56] References Cited

U.S. PATENT DOCUMENTS

| | | | |
|---|---|---|---|
| 4,306,286 | 12/1981 | Cocke et al. | 364/200 |
| 4,578,761 | 3/1986 | Gray | 364/481 |
| 4,656,580 | 4/1987 | Hitchcock, Sr. et al. | 364/200 |
| 5,109,353 | 4/1992 | Sample et al. | 364/578 |

*Primary Examiner*—Ellis B. Ramirez
*Assistant Examiner*—Craig Steven Miller
*Attorney, Agent, or Firm*—Lyon & Lyon

[57] ABSTRACT

An emulation system and method that reduces or eliminates the number of timing errors such as hold time violations when implementing a netlist description of an integrated circuit. The emulation system comprises a plurality of reprogrammable logic circuits and a plurality of reprogrammable interconnect circuits. The netlist description is optimized to reduce the number of timing violations by removing the occurences of gated clocks from the netlist, partitioning the netlist description by taking into account the occurence of timing violations and ensuring that retain state nets are implemented properly.

2 Claims, 78 Drawing Sheets

CONTROL AND DATA FLOW DIAGRAM

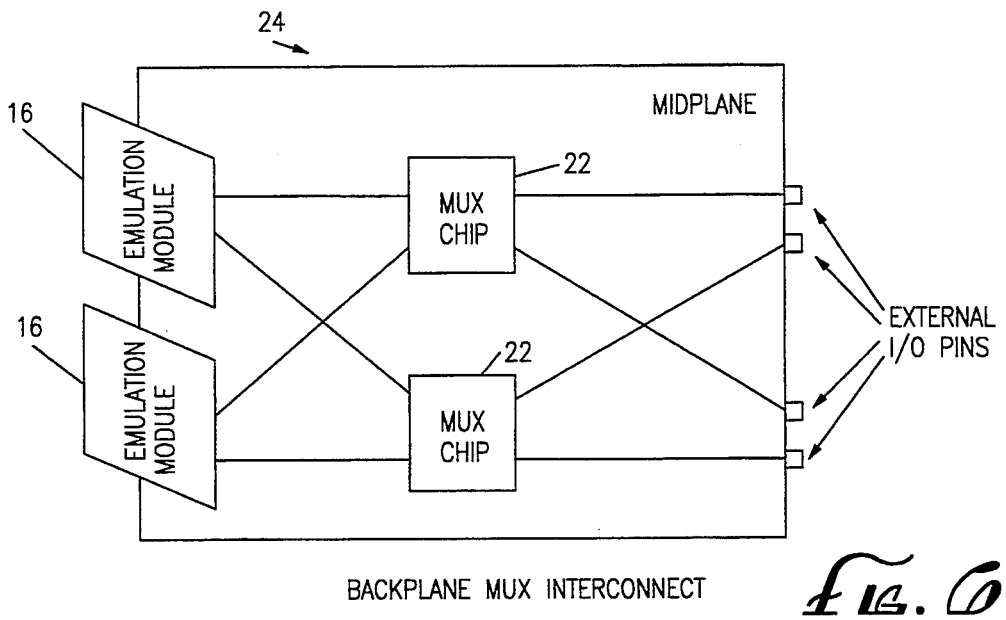
BACKPLANE MUX INTERCONNECT
FIG. 6
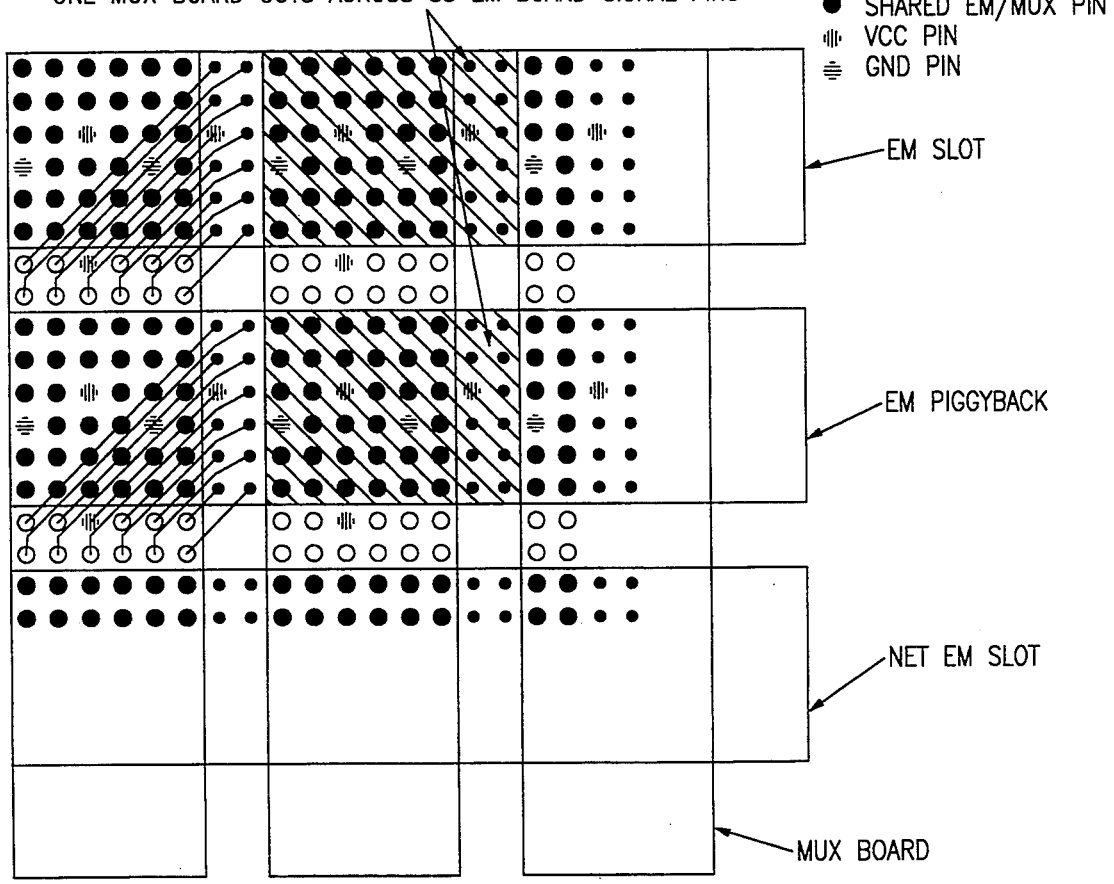
FIG. 7   MIDPLANE CONNECTING
ONE MUX BOARD CUTS ACROSS 88 EM BOARD SIGNAL PINS

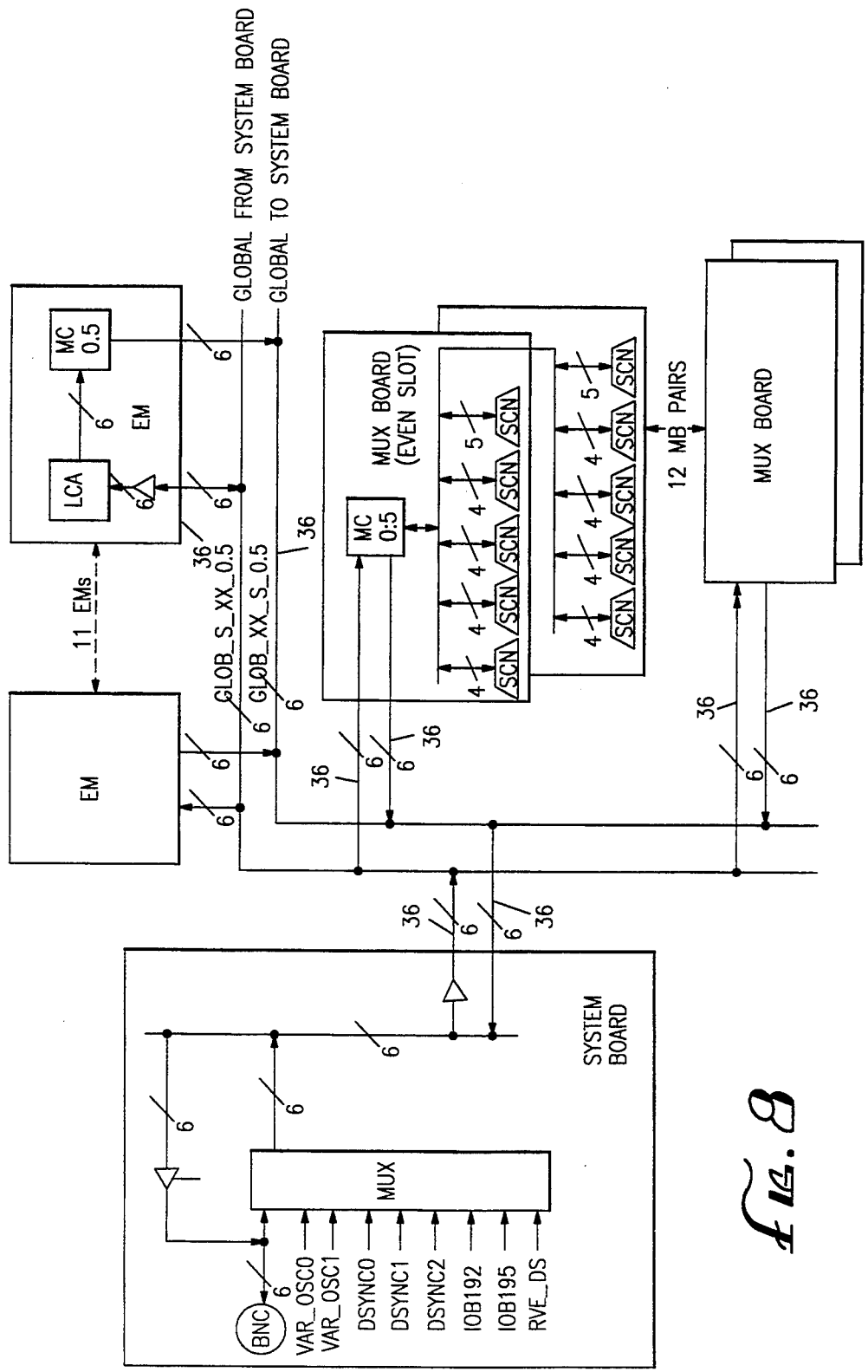

FUNCTIONAL BLOCK DIAGRAM

TIMING IN CONFIGURATION PROCESS

CONFIGURATION DATABASE INTERACTIONS

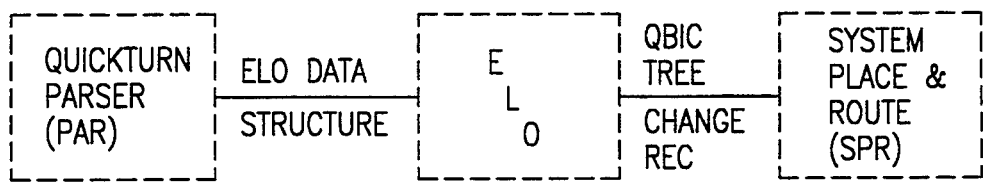
SYSTEM CONFIGURATION FLOW
*Fig. 15*A
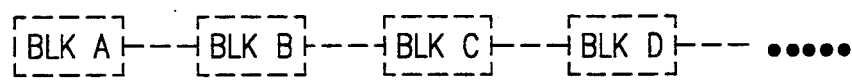
ELO STRUCTURE
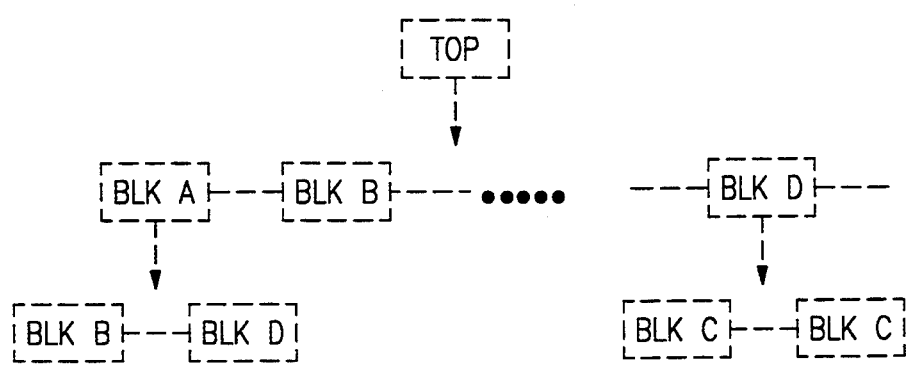
QBIC TREE
*Fig. 15*B

SIMPLE CLOCK TREE

PARSER INTERFACE

STEPS IN AND-tree OPTIMIZATION

| UNOPTIMIZED | OPTIMIZED |
|---|---|
BUFFER BLASTING
*fig. 19*A
DOUBLE-INVERTER BLASTING
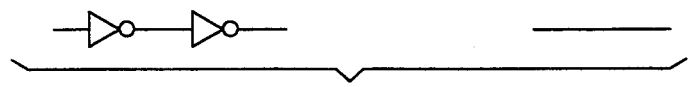
*fig. 19*B
BUBBLE PUSHING
*fig. 19*C
CLB CLOCK INVERSION
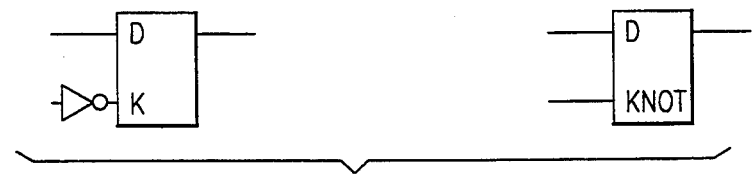
*fig. 19*D
ELIMINATING UNUSED LOGIC
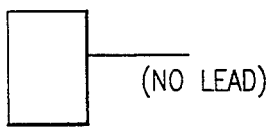  *fig. 19*E GROUND SPLITTING
*fig. 19*F
AND(1,X) = X
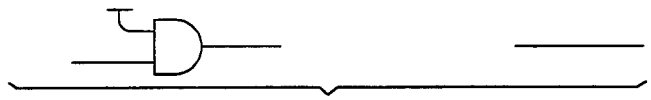
*fig. 19*G
PULLUP BUS
AND(0,X) = X
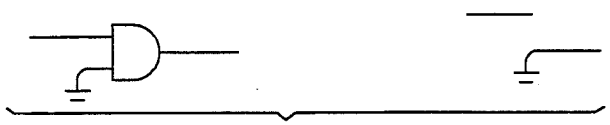
*fig. 19*H
PULLDOWN BUS
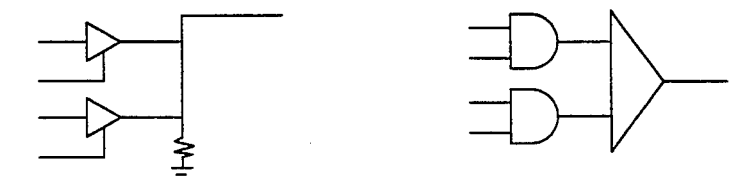
*fig. 19*I
RETAIN-STATE BUS
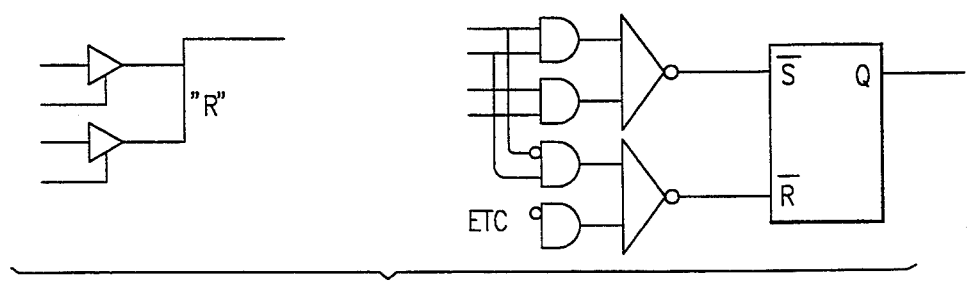
*fig. 19*J
AUTOMATIC DELAY INSERTION
*fig. 19*K LOW SKEW CLOCK SPLITTING
fig. 19L
COMMON SUBEXPRESSION ELIMINATION
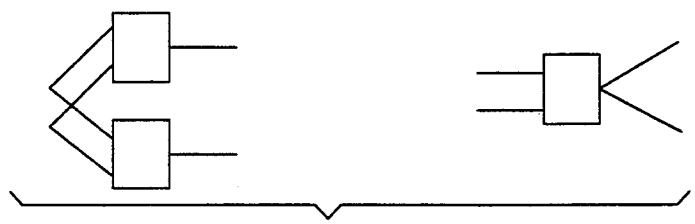
fig. 19M
LOGIC DUPLICATION
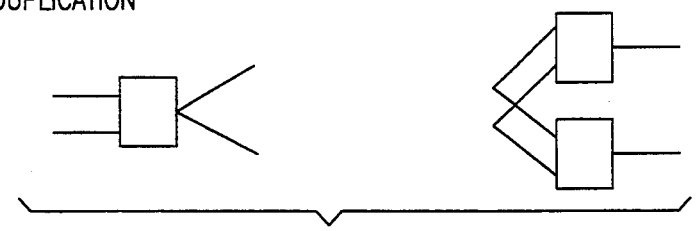
AND EXPANSION    fig. 19N
AND COLLAPSING    fig. 19O
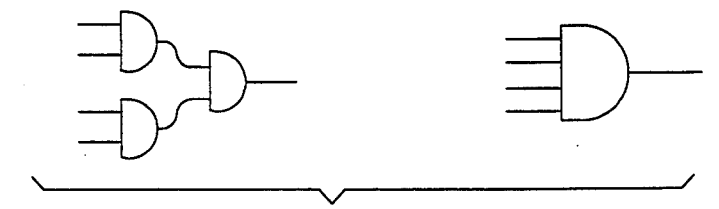
OR DEMORGANIZATION    fig. 19P
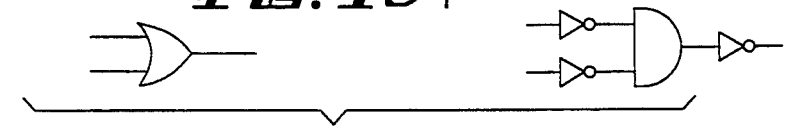
fig. 19Q

WIRE AND GENERATION

WIRE AND REMOVAL

REMOVAL GATED CLOCK

BIDIRECTIONAL UMBILICAL (SINGLE DRIVER)

BIDIRECTIONAL UMBILICAL (MULTIPLE DRIVERS)

CLOCK DRIVER CIRCUITRY

ACROSS NETWORKED HETEROGENOUS WORKSTATIONS

TIMING ANALYSIS SUB-SYSTEM PROCESS ARCHITECTURE

THE FILE DIRECTORY STRUCTURE FOR THE TIMING SUBSYSTEM

PHYSICAL HIERARCHY

FUNCTION GENERATOR
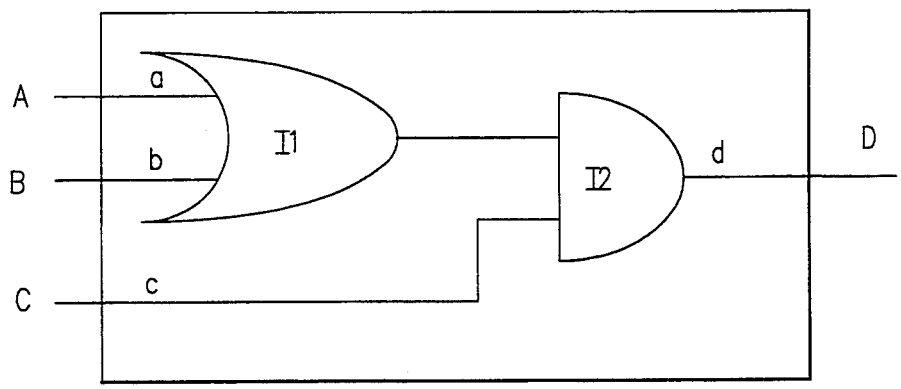
APR DELAY BACK ANNOTATION
*fig.* 23B
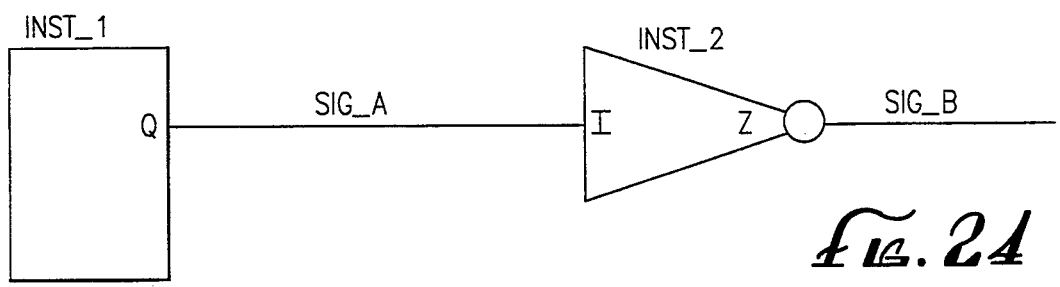
*fig.* 24
ON-CHIP ROUTINE DELAY BACK ANNOTATION
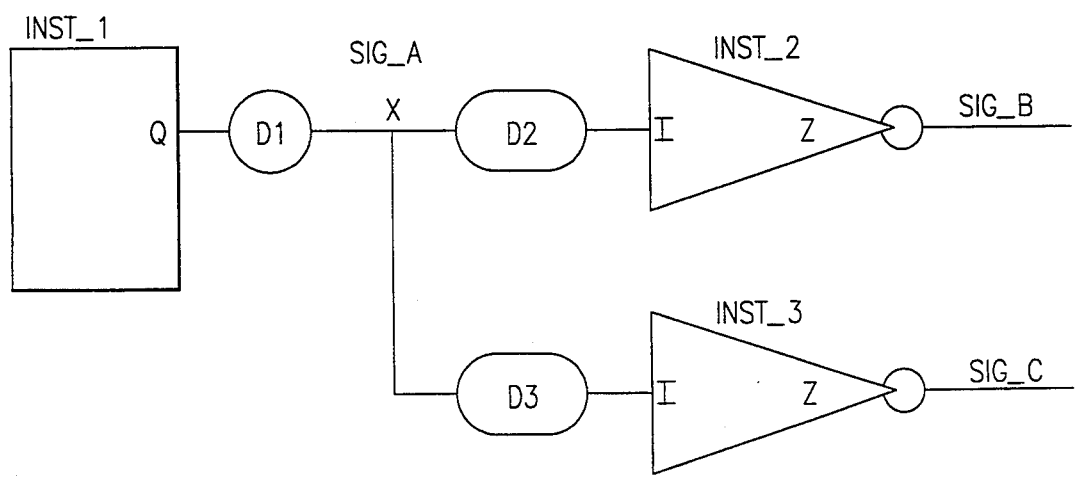
( D ) - ROUTING DELAYS IN THE PHYSICAL IMPLEMENTATION.
*fig.* 25
MISSING RE-CONVERGENCE POINT EXAMPLE

CONTROL FLOW — TIMING ANALYSIS ON A PARTITION

SETUP MARGINS DEPENDENT ONLY CLOCK SPEED CALCULATIONS.

THE FLOW OF THE DELAY INSERTION MODULE

TOP-LEVEL ARCHITECTURE OF MODULE CONFIGURATION

THE PROCESS STRUCTURE OF MODULE CONFIGURATION

HARDWARE UNDER TIMING ANALYSIS
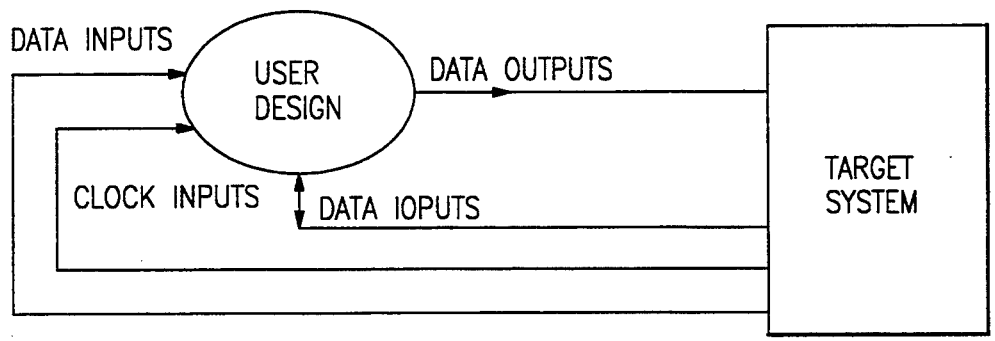
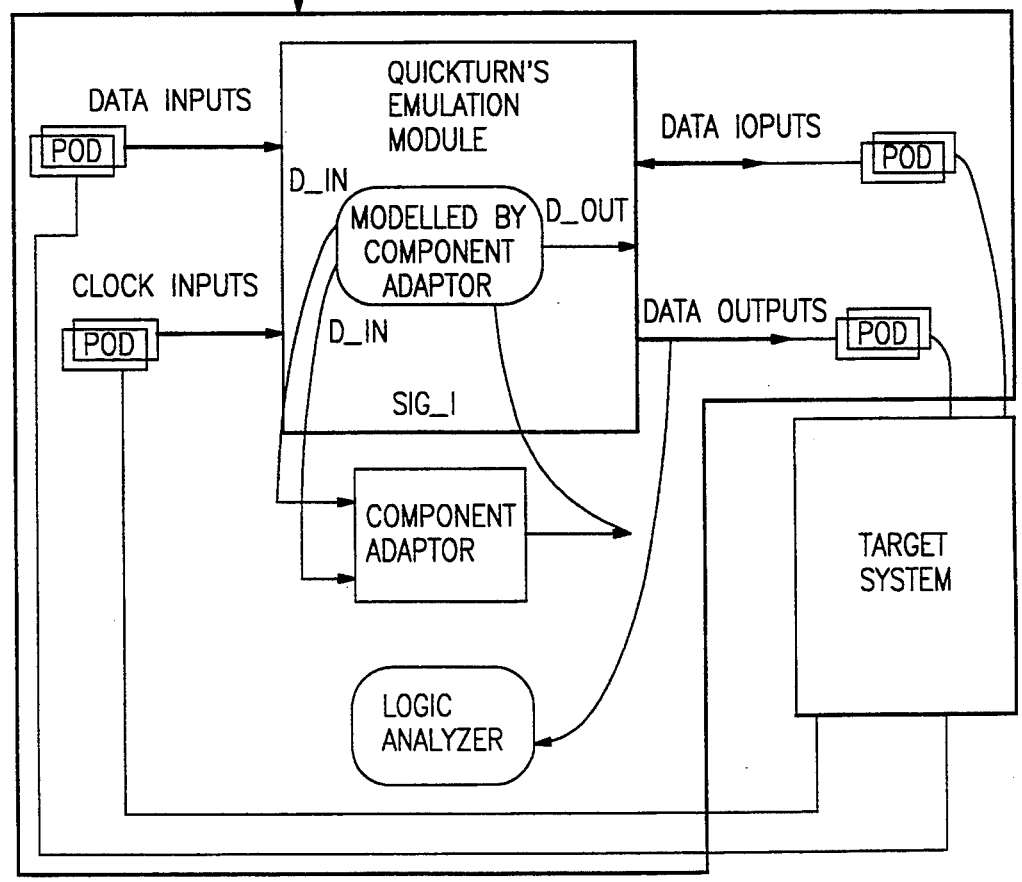
EXTERNAL CONNECTIONS AND CONSIDERATIONS IN TIMING ANALYSIS
FIG. 38

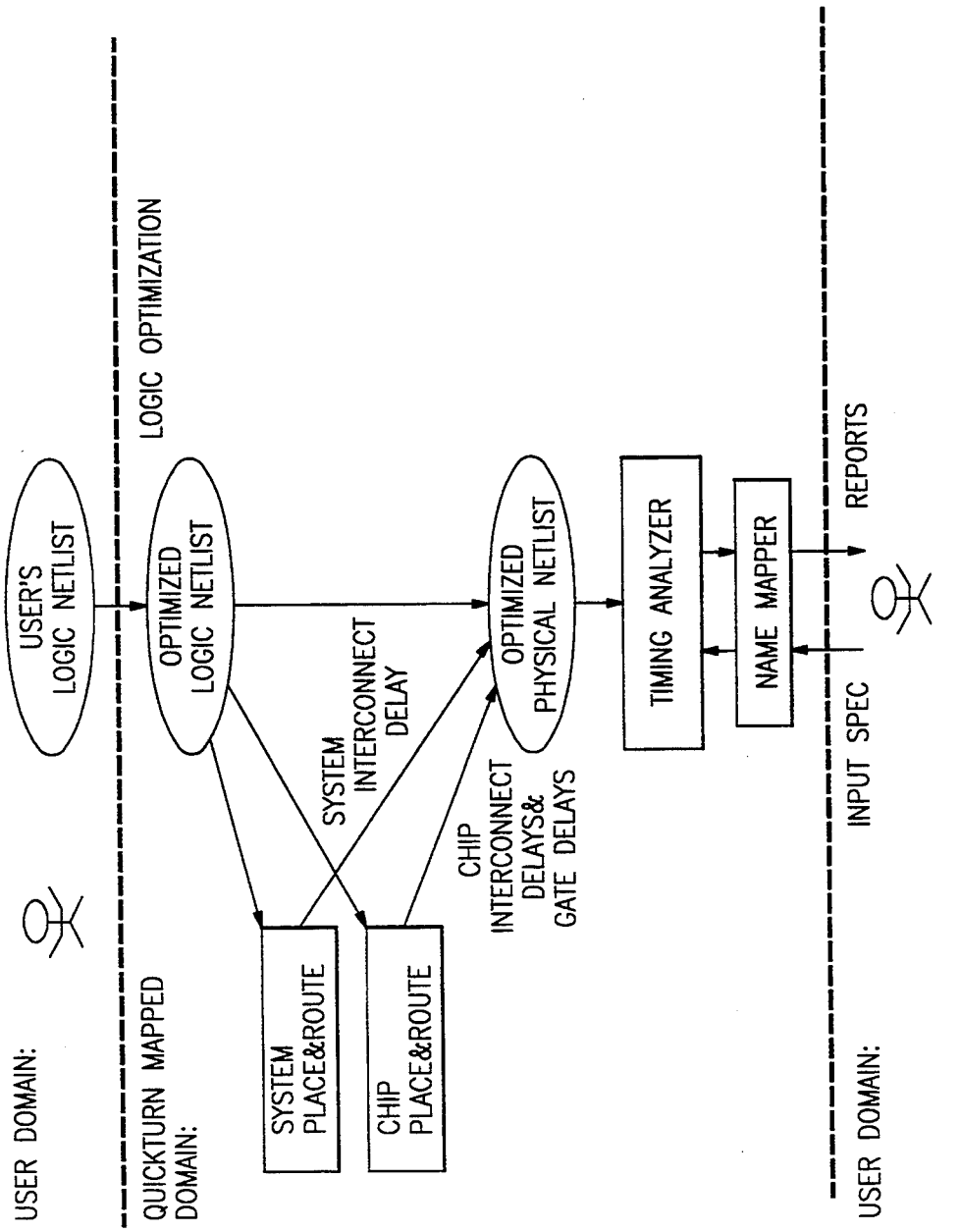

SYSTEM INTERCONNECT TIMING MODELLING

POD TIMING MODELLING

COMPONENT ADAPTER TIMING MODELLING

CASE 1 – STORAGE-TO-STORAGE FROM EMULATION HARDWARE TO COMPONENT ADAPTER

CASE 2 – DATA PATH IN COMPONENT ADAPTER

HIERARCHY OF EXTERNAL TIMING INFORMATION

INPUT/OUTPUT VERIFICATION

WHERE THE DELAYS FOR:
BUFFER: MIN 3NS, MAX 6NS
AND GATE: MIN 5NS, MAX 7NS
FF(CLK->Q): MIN 2NS, MAX 5NS

AN EXAMPLE OF EXTERNAL INPUT SIGNALS

CALCULATING EXTERNAL SETUP AND HOLD TIME

NET EXCLUSION EXAMPLES - PATH ELIMINATION

NET EXCLUSION EXAMPLE – FEEDBACK LOOP BREAKING

A NET GROUPING EXAMPLE

ZERO CYCLE SETUP PATH

MULTI-CYCLE SETUP PATH

A CIRCUIT WITH A GATED LOCK

TRANSFORMED CIRCUIT

FLIPFLOP WITH CLOCK ENABLE

GATED-CLOCK OPTIMIZATION

A. ORIGINAL CIRCUIT

B. TRANSFORMED CIRCUIT

ORIGINAL CIRCUIT

TRANSFORMED CIRCUIT

EXAMPLE OF CLOCK-GATING LOGIC

A. ORIGINAL CIRCUIT

B. TRANSFORMED CIRCUIT (NON-EQUIVALENT)

ORIGINAL CIRCUIT:

TRANSFORMED CIRCUIT:

EXAMPLE OF CLOCK-GENERATION LOGIC

A. ORIGINAL CIRCUIT
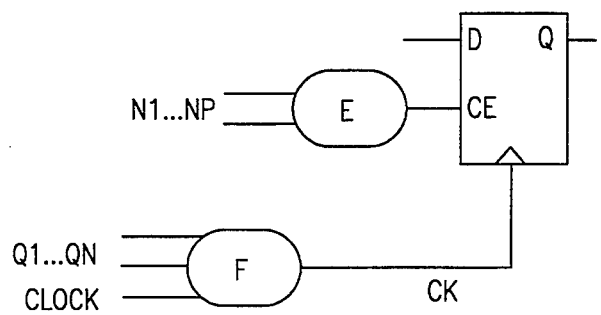
*fig.57*A
B. NOMALIZED CIRCUIT
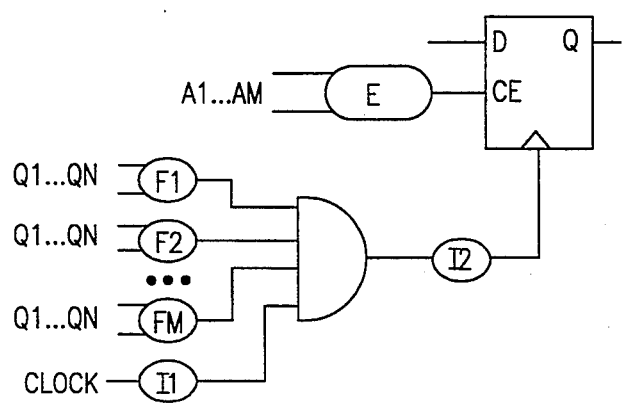
*fig.57*B
C. TRANSFORMED CIRCUIT
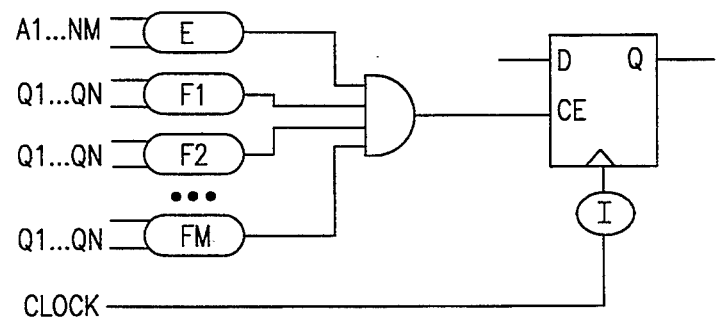
*fig.57*C
GATED CLOCK TRANSFORMATION

THE GATED-CLOCK CIRCUIT

ORIGINAL CIRCUIT

THE ORIGINAL DESIGN:

THE TRANSFORMED DESIGN:

TRANSFERRING CLOCK PATH LOGIC TO CLOCK ENABLE

FUNCTIONALLY EQUIVALENT TRANSFORMATION EXAMPLE

FUNCTIONALLY NON-EQUIVALENT TRANSFORMATION EXAMPLE

ANDED MULTIPLE CLOCKS

MUXED MULTIPLE CLOCKS

SIMPLE CASE OF USING DATA AS CLOCK

GENERAL CASE OF USING DATA AS CLOCK

A GENERAL FORM OF CLOCK PATH

THE ORIGINAL DESIGN:
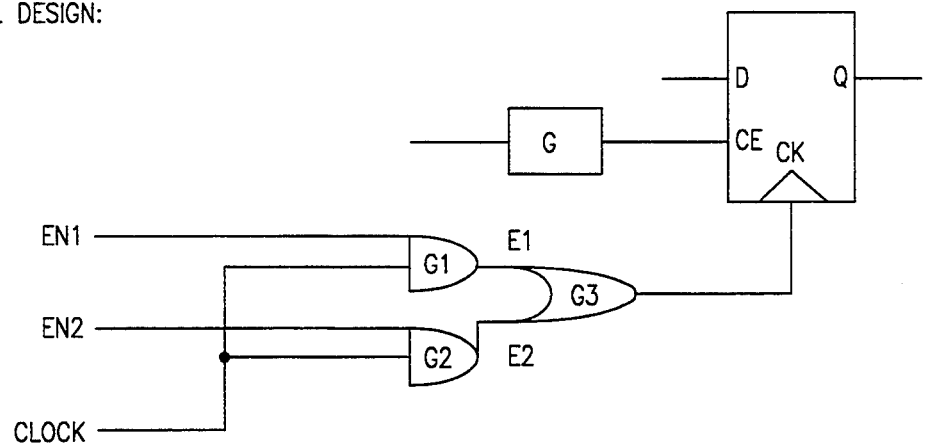
THE TRANSFORMED DESIGN:
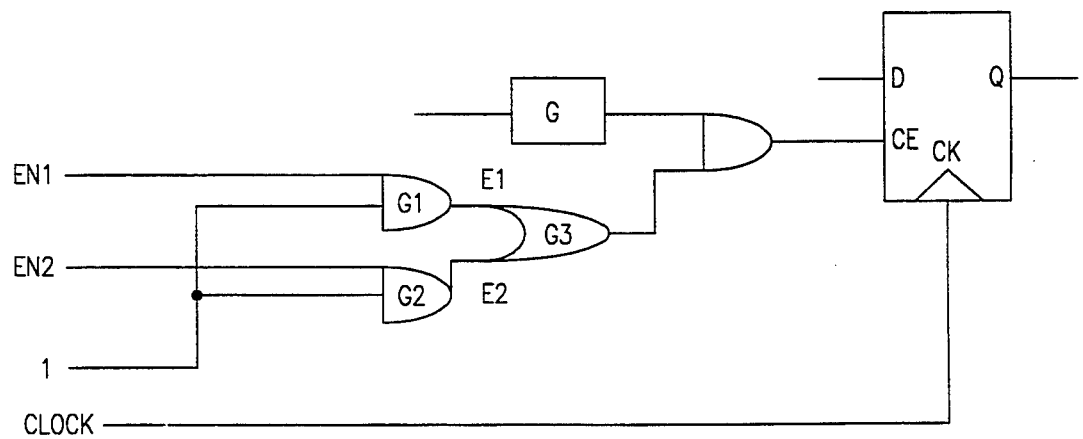
PERFORMING LOGIC TRANSFORMATION
*FIG. 70*

EXAMPLE 1 OF SYMBOLIC SIMULATION

EXAMPLE 2 OF SYMBOLIC SIMULATION

CONTROL AND DATA FLOW DIAGRAM

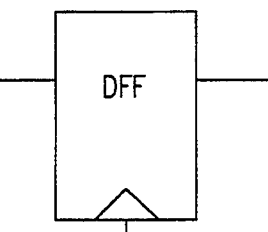
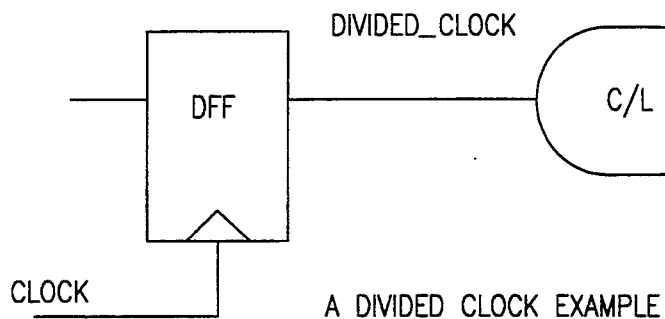
fig. 74
A DIVIDED CLOCK EXAMPLE
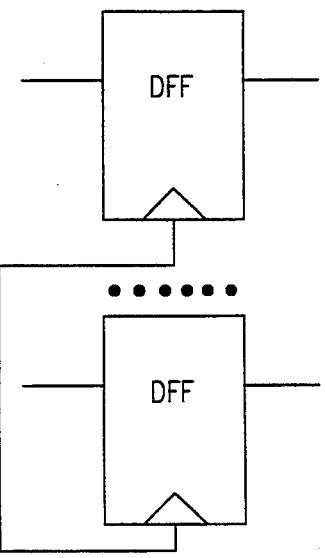
fig. 75
CASE 1: GENERATING NEW CLOCKS
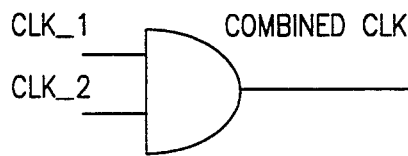
CASE 2: SELECTING CLOCKS
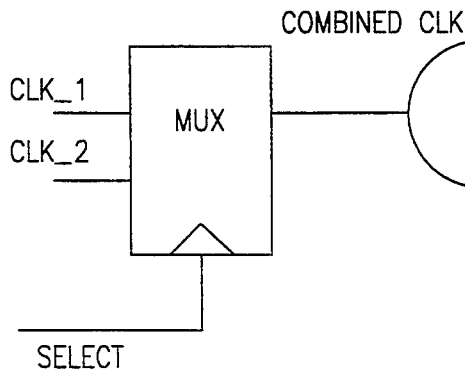
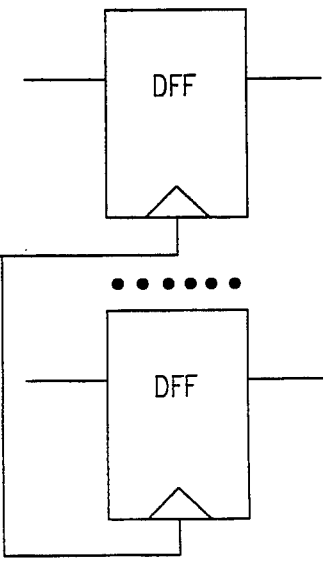
EXAMPLE OF COMBINED CLOCKS THE ORIGINAL DESIGN:
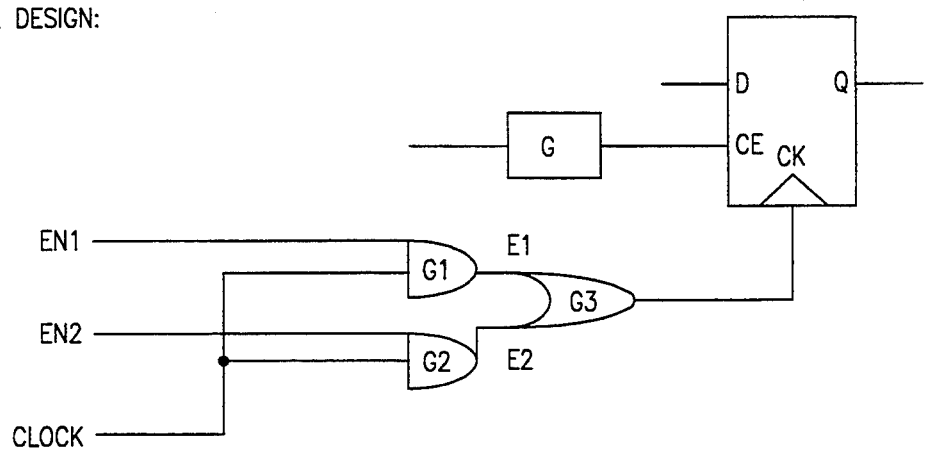
THE TRANSFORMED DESIGN:
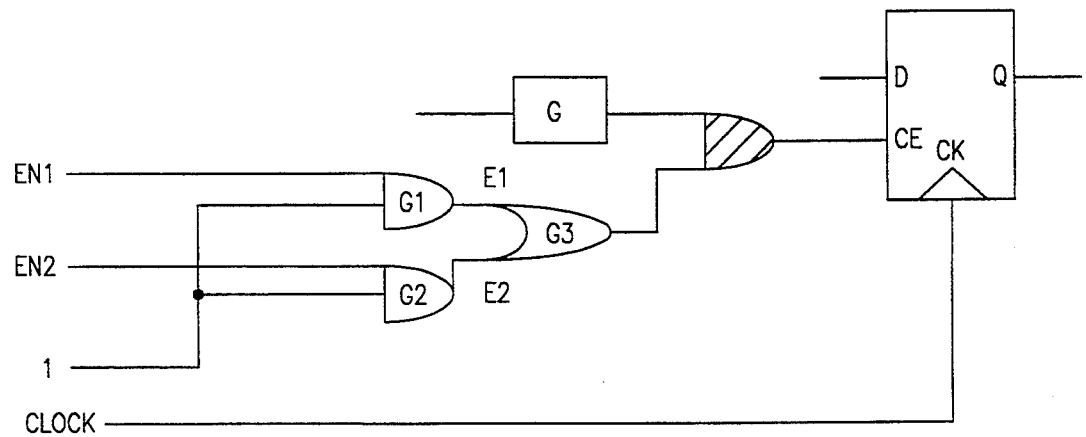
PERFORMING LOGIC TRANSFORMATION
FIG. 76

BEFORE GATED CLOCK REMOVE:
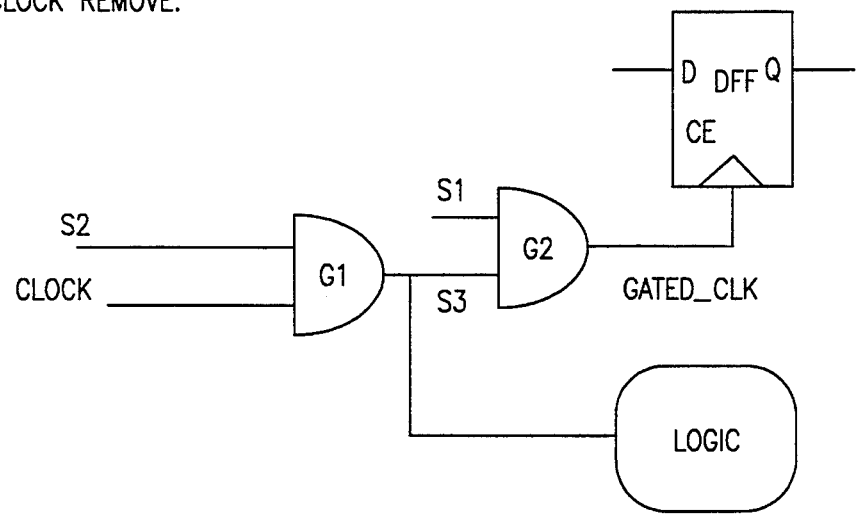
AFTER GATED CLOCK REMOVE AND
CLOCK NET ADJUSTMENTS
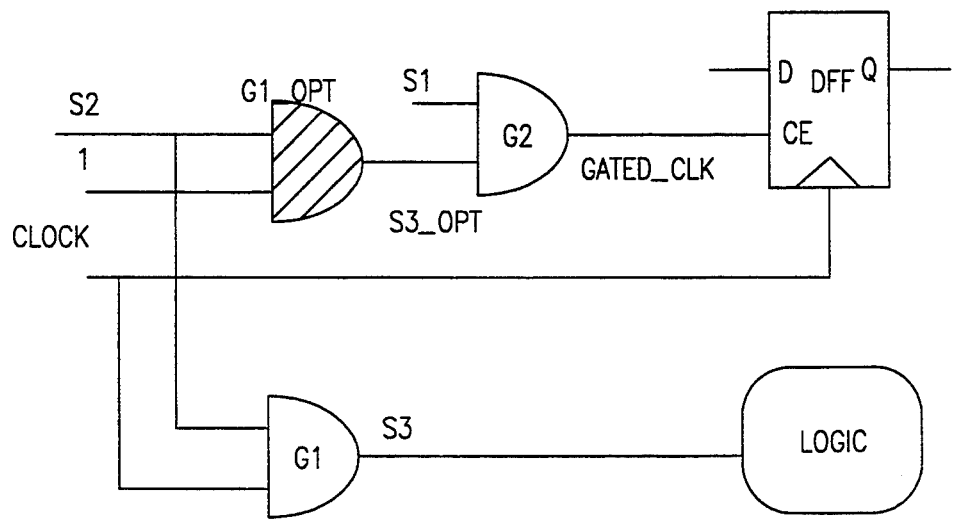
AN EXAMPLE OF CLOCK NET ADJUSTMENTS
*FIG. 77*

AN EXAMPLE OF CIRCUIT NETWORK

PARTITIONS BASED ON CONES

CONE OF INFLUENCE FOR A FLIP-FLOP INPUT

BEFORE PATH-BASED CLUSTERING: PATH LENGTH = 3

AFTER PATH-BASED CLUSTERING: PATH LENGTH = 2

STEPS IN FIRST LEVEL CLUSTERING

E1.5 PROCESS, COMMUNICATIONS, CONTROL, AND DATA

A. SCAVANGER CONTROL AND FEEDBACK TO QBS.
    THE DIRECT COMMUNICATION TO/FROM QBS WITH SCAVANGER WILL BE NAMED PIPES. THESE CAN BE FOUND AND OPENED BY THE QBS PROCESS ONCE THE SCAVANGER PROCESS IS RUNNING.
    DIRECT COMMUNICATION WILL BE LIMITED TO QBS HANDING OFF CHIP NAMES AS THEY BECOME AVAILABLE, OR A CONTROL FILE.
    FEEDBACK. MAYBE THERE SHOULD NOT BE ANY DIRECT FEEDBACK FOR SIMPLICITY. SCAVANGER CAN WRITE STATUS TO A FILE. STATUS MAY BE ERRORS, I'M-ALIVE, AND CHIP COMPLETION/DISCONNECTS

B. SCAVANGER DISK IO.
    EXPECTED INPUTS:   NETLIST, CONSTRAINTS, AND POSSIBLY CONTROL
    OTHER INPUTS:   SIDE FILES TO DEFINE PACKAGE, AND ARCHITECTURE, SPEED INFORMATION
    OUTPUTS:   PHYSICAL DATABASE, BACK-ANNOTATION FILE(S) FOR DELAYS, CHIP PIN SWAPS.STATUS.

C. QBS DISK IO
    WILL POLL INFORMATION IN THE CHIPS DIRECTORY TO GAIN ADDITIONAL STATUS, AND TO EVALUATE RESULTS AS THEY BECOME AVAILABLE (IF NECESSARY).

D. PARENT/SCAVANGER COMM.
    LEVERAGE EXISTING SPLATTER COMMUNICATION BETWEEN APRSERV/QBS BY MIMICING CODE RIGHT DOWN TO THE ASV AND Q3A ENTRY POINTS. SCAVANGER WILL ASSUME THE ROLE OF QBS WHILE COMMUNICATING WITH THE CHIP SERVERS.

E. MONITOR/SCAVANGER COMM.
    SAME AS D ABOVE.

F. PARENT/MONITOR COMMUNICATION.
    SAME AS D ABOVE. LEVERAGE THIS CODE COMPLETELY.

G. MONITOR/ENGINE COMM.
    THE ENGINE PROCESS IS A NEW PROCESS THAT IS EXEC'ED BY THE MONITOR PROCESS. IT WILL HANDLE A COMPLETE PLACE AND ROUTE TASK AND THEN EXIT.(EXIT IS STILL TBD).

H. LICENSE MANAGER CONTROL.
    THE SOLUTION HERE IS TBD.

FIG. 88

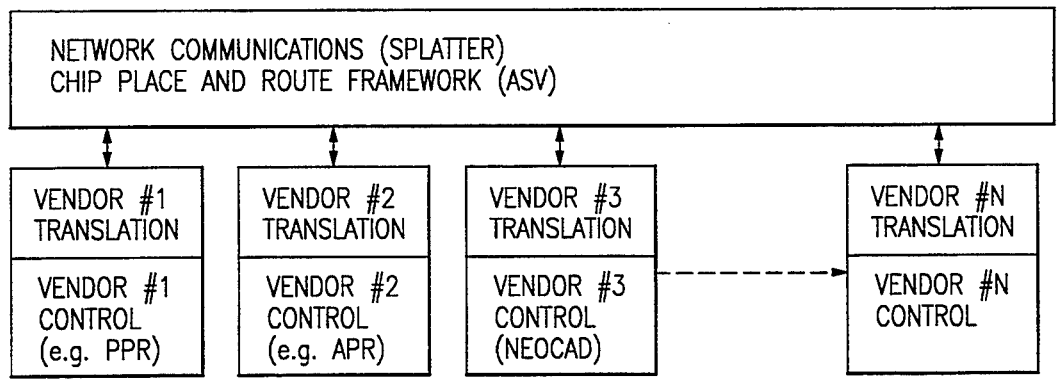
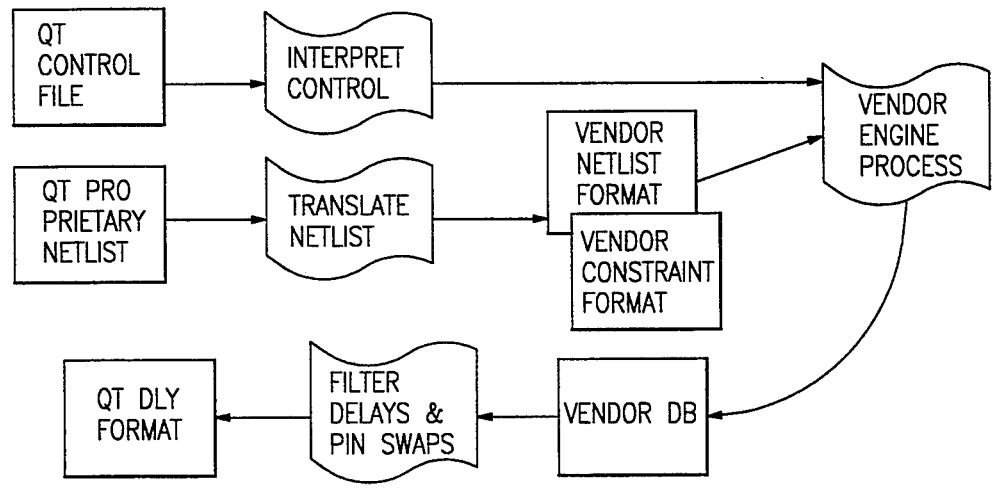
FIG. 90

METHOD OF REMOVING GATED CLOCKS FROM THE CLOCK NETS OF A NETLIST FOR TIMING SENSITIVE IMPLEMENTATION OF THE NETLIST IN A HARDWARE EMULATION SYSTEM

This application is a continuation-in-part of application Ser. No. 08/013,025, filed Jan. 29, 1993, now abandoned, and entitled "IMPROVED CIRCUIT EMULATION SYSTEM AND METHOD."

BACKGROUND OF THE INVENTION

The field of the present invention is computer assisted design (CAD) systems and methods, and more particularly, circuit emulation systems and methods.

Recently, much attention in the computer assisted design (CAD) field, has been directed to the implementation of digital circuit emulation systems and methods. Exemplary emulation systems are disclosed in U.S. Pat. No. 5,109,353, entitled "Apparatus for Emulation of Electronic Hardware System" issued Apr. 28, 1992 to Sample et. al., and U.S. Pat. No. 5,036,473, entitled "Method of Using Electronically Reconfigurable Logic Circuits" issued Jul. 30, 1991 to Butts et al., which patents are hereby incorporated by reference.

In short, the above identified patents disclose systems and methods which utilize field programmable gate array integrated circuits to emulate digital circuit or system designs. Since their initial introduction to the circuit design and verification system market in late 1988, emulation systems have enjoyed substantial commercial success.

However, as the field of emulation has developed, it has been recognized that the presence of hold time violations in a configured circuit or system can pose an impediment to efficient circuit emulation. Accordingly, it is believed that a system and method capable of minimizing hold time violations in a configured circuit or system design would be highly desirable to those in the CAD field.

SUMMARY OF THE INVENTION

The present invention is directed to a system and method for minimizing hold time violations in a configured circuit or system. To this end, the present invention utilizes a mux (or partial cross bar) architecture and a plurality of specialized software modules to minimize hold time violations which may result upon circuit configuration. Exemplary software routines include logic optimization to clean clock trees and provide support for automatic hold time violation correction, timing driven configuration or partitioning, and automatic delay insertion to compensate for hold time violations identified through timing analysis.

Accordingly, it is an object of the present invention to provide an improved system and method for addressing and eliminating hold time violations in a configured circuit or system.

BRIEF DESCRIPTION OF THE DRAWINGS

FIG. 6 is an illustration of a backplane mux interconnect.

FIG. 7 is an illustration of the connectivity architecture between a mux board and an emulation board of a system in accordance with the present invention.

FIG. 8 is an illustration of low skew signal distribution in accordance with the present invention.

FIG. 15(a) is an illustration of system configuration flow.

FIG. 15(b) is an illustration of a QBIC tree.

FIG. 23(b) illustrates delay back annotation after chip level place and route.

FIG. 24 illustrates on-chip routine delay back annotation.

FIG. 25 provides an example of missing reconvergence.

FIG. 38 is an illustration of external connections and considerations in timing analysis.

FIG. 39(a) illustrates netlist transformation during optimization.

FIGS. 57(a)–(c) provide an example of gated clock transformation.

FIG. 70 illustrates logic transformation.

FIG. 74 is an example of a divided clock.

FIG. 75 provides two examples of combined clocks.

FIG. 76 provides an example of functionally equivalent transformation.

FIG. 77 provides an example of a clock net adjustment.

FIG. 88 provides a summary of process, communications, control, and data functions in the chip place and route module.

FIG. 90 illustrates data flow within a vendor chip place and route service.

DETAILED DESCRIPTION

1.0 Hardware Architecture

Figure 1:
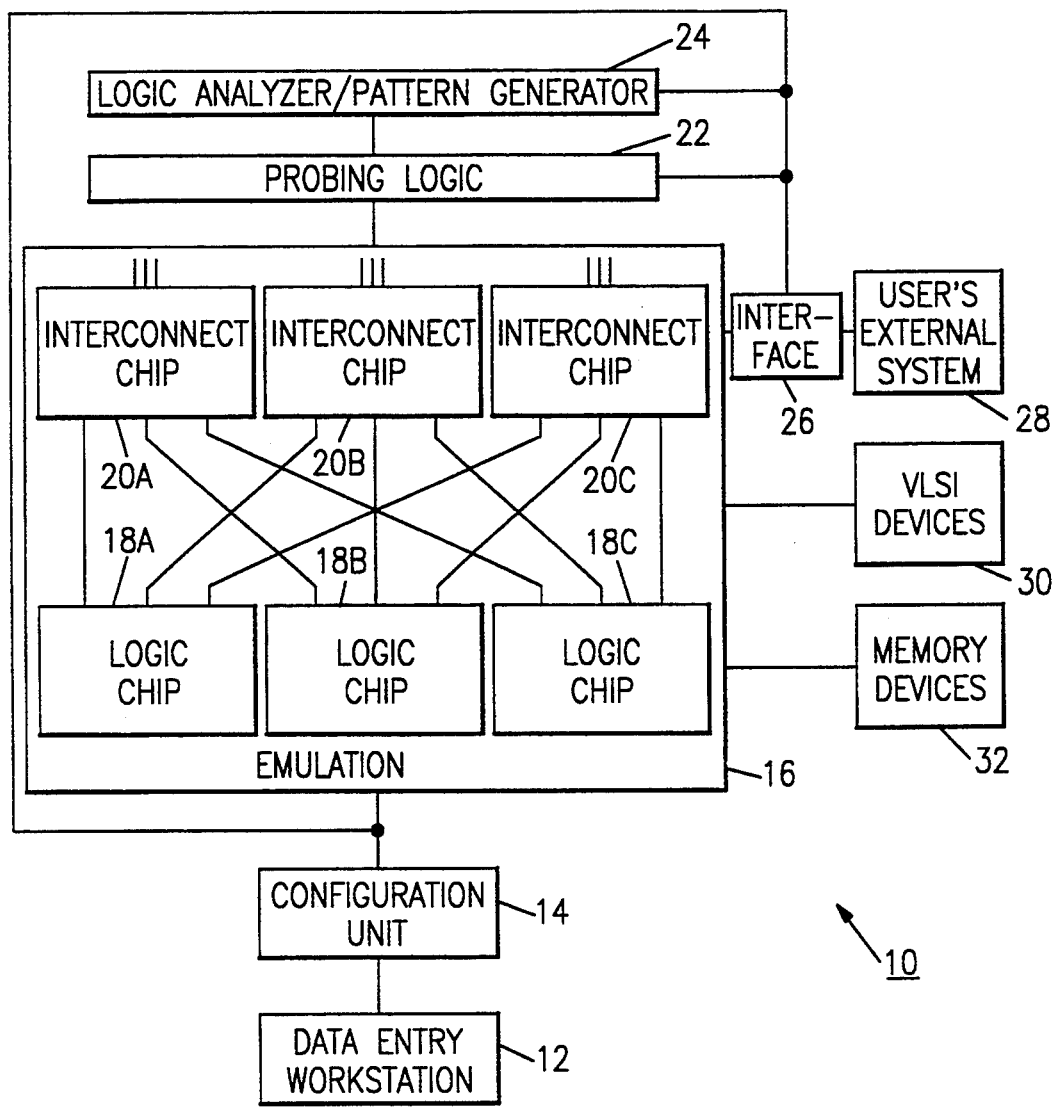
FIG. 1 is a block diagram of an emulation system in accordance with the present invention.

Referring first to FIG. 1, an emulation system 10 in accordance with the present invention comprises a data entry workstation 12, at which a user enters information describing an electronic circuit or system which it is desired to emulate. Configuration information created by the data entry work station 12 is passed to a configuration unit 14. Configuration unit 14 contains the circuitry necessary to accomplish the programming of the programmable gate arrays (discussed more fully below) which are contained within an emulation module 16.

Emulation module 16 includes a plurality of logic chips 18(a)–18(c) and a plurality of interconnect chips 20(a)–20(c) arranged in an array. For illustrative purposes only, emulation module 16 of FIG. 1 is shown having three logic chips 18(a) 18b and 18c and three interconnect chips 20a 20b and 20c. The emulation module will be discussed in more detail in section 1.3 below. Those of ordinary skill in the art will readily recognize that the array size depicted in FIG. 1 is for illustration only and that, in an actual embodiment, the size of emulation module 16 is limited only by simple design choice.

Data entry work station 12 may be a presently-available work station such as those manufactured by Daisy, Mentor, and Valid Logic. Data entry workstation 12 generates a description of the electronic circuit or system, e.g., a gate level netlist, from data input by a user in a manner well known in the art. Using several software programs, the operation of which will be described in detail in section 2 below, data entry workstation 12 produces a set of files necessary to program the interconnections and logic functions within each of the programmable gate array chips in emulation module 16, probing logic section 22, logic analyzer/pattern generator 24 and interface 26, which provides the connection to the user's external system 28 which is to work in conjunction with the emulated circuit. Configuration unit 14 then configures the system using the files produced by data entry workstation 12.

Emulation array 16 includes provisions for connections to external VLSI devices 30 and external memory devices 32, which may thus be included in the circuit emulation performed by system 10.

The primary function of the logic chips 18(a)–(c) is to implement a large combination of logic circuit elements and is limited only by the available pin count and the integration capacity of the chips. Those of ordinary skill in the art will recognize that a large number of presently-available logic circuit kernels will function satisfactorily in the architecture of the present invention. In a presently preferred embodiment, logic chips 18(a)–c may be integrated circuits available from Xilinx of San Jose, Calif., (part Nos. XC3090, XC4005, and XC4013 are exemplary).

The primary function of interconnect chips 20(a)–(c) (which may be referred to herein also as mux chips of QT mux chips) is to provide connectivity between logic circuits in the logic modules 18(a)–c as well as to provide connectivity to signals originating outside of emulation array 16, such as signals originating in the user's external system 28, as well as external VLSI devices 30 and external memory devices 32 which may be part of the emulated design or may be included in the user's system which includes the emulated design. Each interconnect chip 20 acts as a crosspoint switch where each pin can be defined as either an input or an output, and each input can be connected to any output or group of outputs. The Xilinx XC3090 provides an interconnect capability which is satisfactory for the present invention. However, it is presently preferred to use a custom designed interconnect chip having 168 input/output pins. Interconnect chips of this type are currently obtained from National Semiconductor Corporation of Santa Clara, Calif. Further, in a presently preferred embodiment, each interconnect chip 20 is connected by one or more conductors to each logic chip 18 and also has additional connections to external signals. The functionality of and interaction between logic chips 18(a)–(c) and interconnect chips 20a–c may be more easily seen with reference to FIG. 2.

Figure 2:
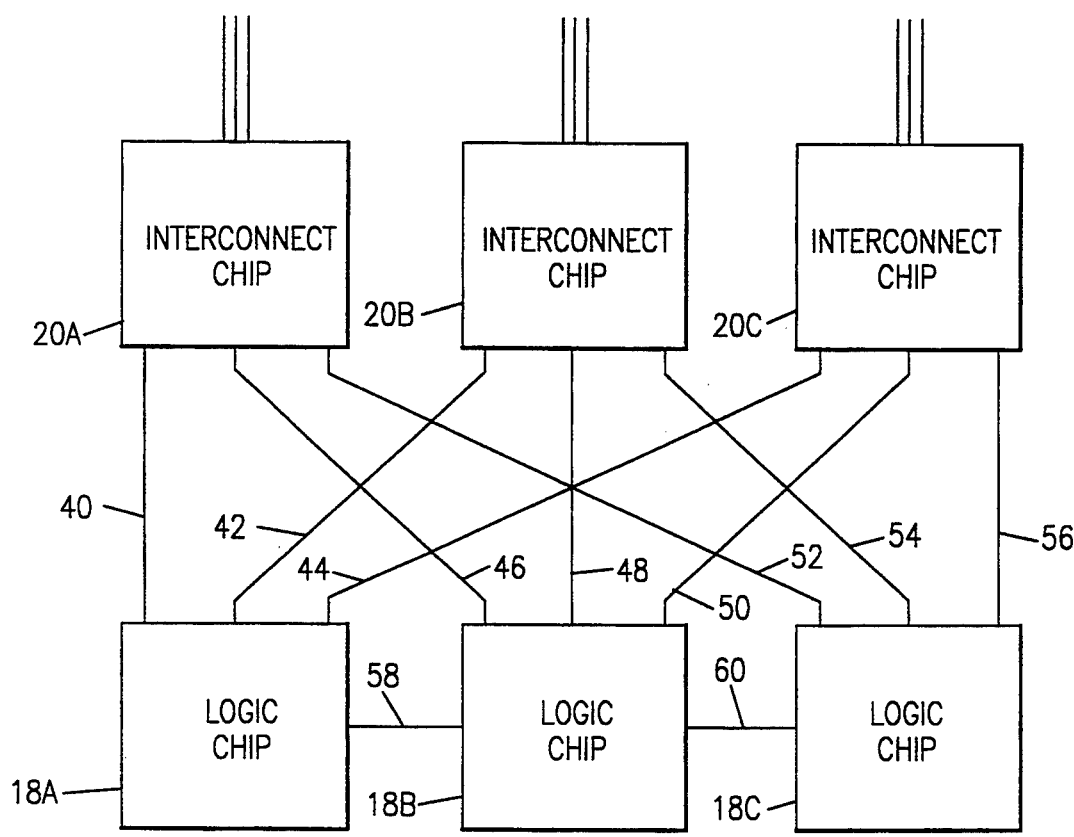
FIG. 2 is a block diagram showing an illustrative example of the architecture of the emulation array utilized in accordance with the present invention.

Referring now to FIG. 2, the emulation module 16 of the present invention is presented in somewhat more detail. In a presently preferred architecture, a number of logic chips, 18(a)–(c) are connected to a number of interconnect chips 20(a)–(c), so that each logic chip makes one or more connections to each interconnect chip.

More specifically, logic chip 18(a) is shown connected to interconnect chip 20(a) by connections 40, to interconnect chip 20(b) by connections 42, and to interconnect chip 20(c) by connections 44. Similarly, logic chip 18(b) is shown connected to interconnect chip 20(a) by connections 46, to interconnect chip 20(b) by connections 48, and to interconnect chip 20(c) by connections 50. Logic chip 18(c) is shown connected to interconnect chip 20(a) by connections 52, to interconnect chip 20(b) by connections 54, and to interconnect chip 20(c) by connections 56.

In an alternate embodiment, which is also shown in FIG. 2, the logic chip 18(a)–(c) may also have local interconnects; that is, each logic chip may have one or more of its pins connected to the pins of adjacent logic chips. This feature of the invention is illustrated by connections 58 and 60. While the use of an architecture including local interconnects is within the scope of the present invention, it may render certain designs placement sensitive.

In yet another embodiment, the logic and interconnect functionality may be implemented on a single chip. This implementation, however, has the disadvantage that fewer I/O pins are available to connect to logic within the chip. Thus, less effective partitioning results.

The number of conductors used to connect each logic chip 18 with each interconnect chip 20 may vary in any individual emulation system constructed in accordance with the present invention, and those of ordinary skill in the art will thus recognize that conductors 40–60 are symbolic and each may include one or more individual conductors. As an example of a determination of how many conductors to use in a given implementation of the present invention, let the number of logic chips needed to attain the desired capacity equal N. Let the number of pins available on each interconnect chip equal P. Let the number of signals from each interconnect chip which must connect to external devices, including other emulation arrays, equal S. Then, the number of conductors C used to connect each logic chip 18 with each interconnect chip 20 may be determined by use of the formula $C=(P-S)/N$. Those of ordinary skill in the art will readily be able to devise other schemes for determining the number of conductors to use to connect between chips as dictated by the particular design.

By using the architecture of the present invention, any logic chip 18 may be connected to any other logic chip 18 with only a single pass through an interconnect chip 20. The chip-to-chip delay is therefore both short and consistent throughout an emulated design. A frequent requirement for clock distribution is star routing, in which one signal connects to many logic chips. Implementation of such routing is simple and straightforward using the architecture of the present invention, and provides a uniform clock delay since one interconnect chip 20 connects to all logic chips 18. By using the architecture of the present invention, those of ordinary skill in the art will recognize that an emulated design will run faster and have better timing characteristics than it would in architectures requiring multiple chip crossings to make connections.

Figure 3:
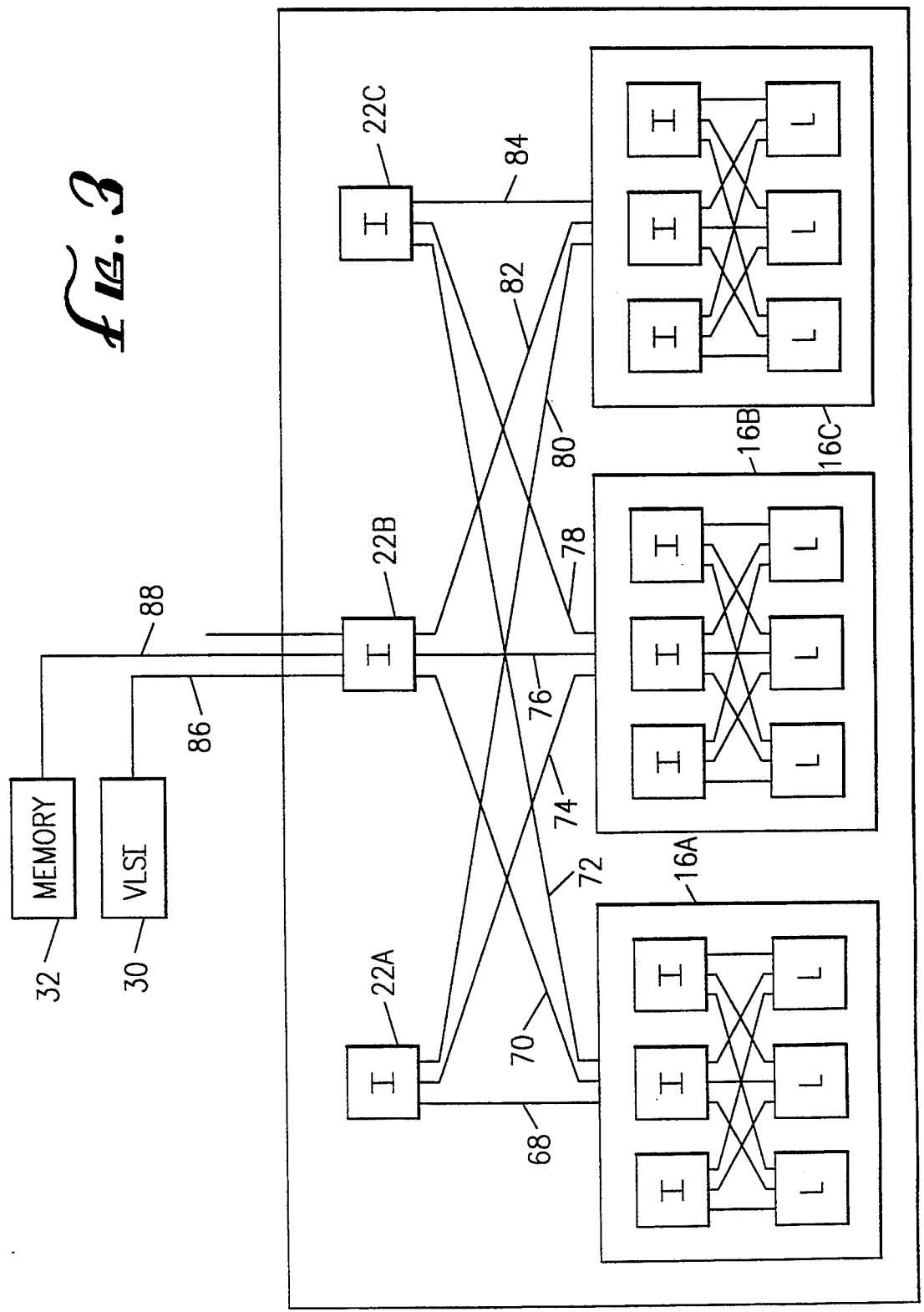
FIG. 3 is a block diagram illustrating the hierarchical nature of an emulation system in accordance with the present invention, and showing an architecture having two levels, one of a level as depicted in FIG. 2, and a second, higher level.

Referring now to FIG. 3, a plurality of emulation modules 16a–c according to the present invention are connected together through interconnect chips 22(a)–(c). More specifically, emulation module 16a is interconnected to interconnect chips 22(a)–(c) via connections 68, 70, and 72, respectively. Emulation module 16b is interconnected to interconnect chips 22(a)–(c) via connections 74, 76, and 78, respectively. Emulation module 16c is interconnected to interconnect chips 22(a)–(c) via connections 80, 82, and 84, respectively.

In addition, external VLSI devices 30 and external memory 32 may be connected to the circuit through one or more interconnect chips 22(a)–22(c) via connections 86 and 88, respectively.

On the next hierarchical level, a single circuit board as just described may be thought of as a single logic chip, and a plurality of such circuit boards may be connected to one another by a plurality of interconnect chips to form an emulation array system. Similarly, individual emulation systems may be thought of as individual logic chips 18 and may be connected together by use of interconnect chips.

By considering the architecture of FIG. 2 to be a single logic module (whether implemented as an integrated circuit or as a printed circuit board containing more than one integrated circuit) those of ordinary skill in the art will appreciate how the architecture of the present invention may be extended to the system level, thus allowing the construction of systems with arbitrary gate capacity. At each stage, Rent's rule, which is well known to those skilled in the art, is used to predict the number of external connections needed based upon the total amount of logic being implemented. The chip, board, and system boundaries do not necessarily match the architectural boundaries in the present invention. For example, it is possible to have two hierarchical levels within a single printed circuit board. This is not usually desirable, however, because the limited interconnect at each architectural boundary will constrain the placement of logic to be emulated. Fewer architectural boundaries will result in fewer constraints and a larger effective overall gate capacity.

1.1 Programmable Logic and Interconnect

Turning now also to FIGS. 4–7, the emulation system 10 of the present invention utilizes a multiplexed (mux) interconnect architecture, wherein the chips comprising the emulation modules 16 are divided into two types: logic chips 18 and mux or interconnect chips 20. The logic chips 18 contain logic and generally do not provide any through routing. The mux chips 20 generally do not implement any logic; they generally implement routing. Thus, the circuit board traces may be multiplexed (switched) among many logic chips 18.

Each logic chip pin (other than control pins) is wired to a mux chip 20 on the same emulation module 16 shown in FIG. 1. Each mux chip pin (other than control pins) is wired to a logic chip 18 or an external I/O. Each emulation module external I/O pin is also wired to a mux chip 20. (The special purpose I/O pins, control, programming, J-tag, etc., are handled separately). Each mux chip 20 has at least one connection to each logic chip 18 on the same emulation module 16. Thus, a signal can be routed from one logic chip 18 to any other logic chip 18 or to an external by passing through only one mux chip 20.

As shown in FIGS. 3 and 6, the backplane of the system 10 also uses a mux architecture. In general each backplane mux chip 22 has several connections to each emulation module 16 and several connections to external pins. A signal is routed from one emulation module 16 to any other emulation module 16 or to an external I/O pin in just one hop. This scheme assumes that pods and component adapters allow arbitrary pin assignment, otherwise system routing becomes difficult. To ensure routability, no backplane mux chip 22 will have more connections to any one pod or component adapter mux chip than it does to any emulation module 16.

1.2 Control

The hardware components of an emulation system 10 in accordance with the present invention are controlled through a a serial bus referred to as the PBUS (described below). The PBUS is routed through the backplane 24, providing access to all emulation modules 16, pods, component adapters, and a logic analyzer. The PBUS is tranformed into a standard VME BUS (not described) which is then connected to the workstation bus through a Bit 3 adapter available from Bit 3 Corporation of Minneapolis, Minn. Logically it is mapped into the workstation memory.

1.3 Emulation Module

Figure 5:
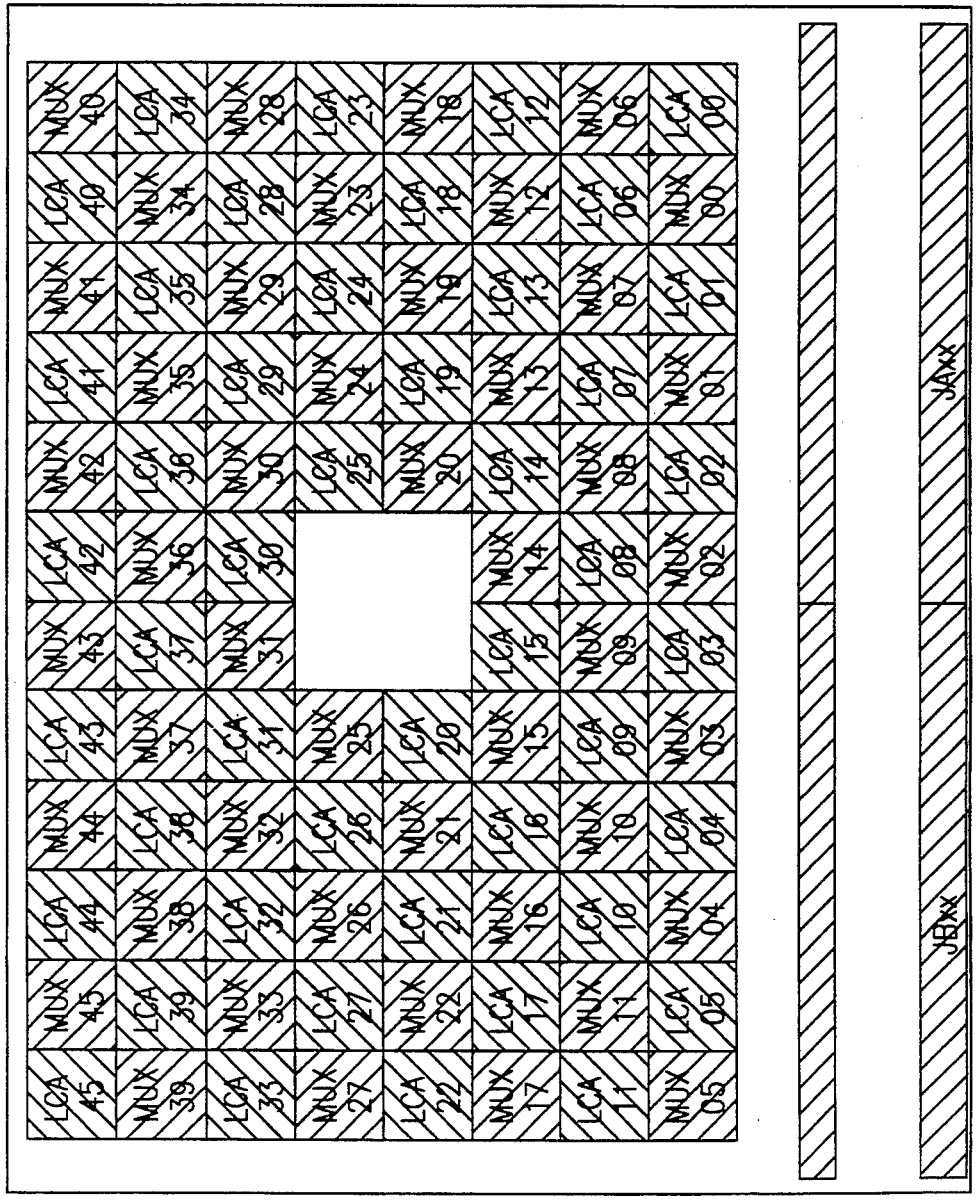
FIG. 5 is an illustration of the lay-out of LCA or logic chips and mux chips (also commonly referred to as interconnect chips) on an emulation board of an emulation system in accordance with the present invention.

Referring now to FIG. 5, in a preferred form the emulation module 16 of the present invention contains logic chips 18 and multiplexer chips 20 along with other logic. Preferred specifications are:

| Capacity | 30,000 gates |
| --- | --- |
| I/O Pins | 1,368 |
| Logic Chips | 46 |
| Multiplexed Chips | 46 |

The multiplexer chips 20 and logic chips 18 are surface mounted to the top of the emulation module board. The logic chips 18 alternate with multiplexer chips 20 as shown in FIG. 5. The layout shown is presently preferred for board routing.

Emulation modules 16 are approximately 18.5"×22". This is considered to be the largest size which fits current assembly equipment. External I/O is achieved through two high density 600 pin connectors on the front edge of the board. The connectors have 6 rows of pins on 0.1"×0.1" centers and are approximately 9" long. Four connectors give a total available pinout of 2400 pins which is sufficient for power, ground, a VME bus, a programming bus, and the I/O signals. The connectors mate to the midplane as shown in FIGS. 6 and 7. There are no pod connectors on the emulation module 16. Pods connect to the multiplexed backplanes instead.

Other circuitry on the emulation module includes:

Programming Bus—A serial programming bus is used to transfer data inside the system, and each emulation module contains an interface. The programming bus also includes a JTAG test port.

Test and Configuration Circuitry—Circuitry is provided so that all logic chips and all multiplexed chips can run both system interconnect and internal tests through the JTAG port.

Clock Buffering Circuitry—Six low-skew clocks are provided. The clocks go to all logic chips in the system and also to the component adaptor and pod connectors.

Special circuitry is provided to generate and buffer the clocks so that skew between boards and chips is kept to a minimum.

1.3.1 Emulation Board Specification

1.3.1.1 Number of Emulation Boards per System

In the preferred form, the minimum number of emulation boards which are utilized in the emulation system 10 of the present invention is one, representing 30K gates. The maximum number is 11, representing 330K gates.

1.3.1.2 Capacity

Also in the preferred form, each emulation board 16 has a capacity of 30K gates. This number is based on a total of 46 LCAs on each emulation board, with an average capacity of 652 gates per LCA.

Due to symmetry and connectivity constraints, it is preferred that the emulation board 16 supports only 1,368 I/O pins on the backplane 24.

Each mux board 26 (see FIG. 7) has 88 connections to any given emulation board 16. In the preferred form, sixteen mux boards 26 are utilized per system. Note that in the preferred form sixteen mux boards 26 are always utilized for 30K emulation boards, no matter how many emulation boards are used in the system. This is a consequence of the midplane architecture (discussed more fully below).

1.3.1.3 Connectivity

1.3.1.3.1 Logic Connectivity

Referring again to FIG. 4, the LCA or logic chip 18 connectivity is designed for symmetry. This means that a design file for one LCA or logic chip 18 can be moved to any other LCA in the entire system, without totally reconfiguring the LCA. This greatly simplifies the placement software, because once a design has been partitioned into emulation boards 16, the placement no longer matters. Symmetry is achieved when the number of mux chips 20, connections per mux chip 20, and clock lines are all balanced to make all LCAs 18 look the same. Symmetry is also affected by the number of I/O pins on the LCA 18 and the QT mux chip 20.

In one preferred form, the system 10 of the present invention uses LCAs in 208 pin PQFP packages, with 144 I/O pins. It also uses QT mux chips in 208 pin PQFP packages with 168 I/O pins. The largest symmetry point which fits on the current emulation board form factor requires 46 LCAs 18 and 46 QT mux chips 20. Each LCA 18 has three connections to each QT mux chip 20. The remaining six LCA I/O pins are used for low skew signals. Those skilled in the art will recognize, however, that the number of LCA 18 and mux chips 20 and the number of connections between them is purely a design choice. A symmetric connectivity is not essential to the system, although it is desirable.

1.3.1.3.2 QT Mux Chip Connectivity

Figure 4:
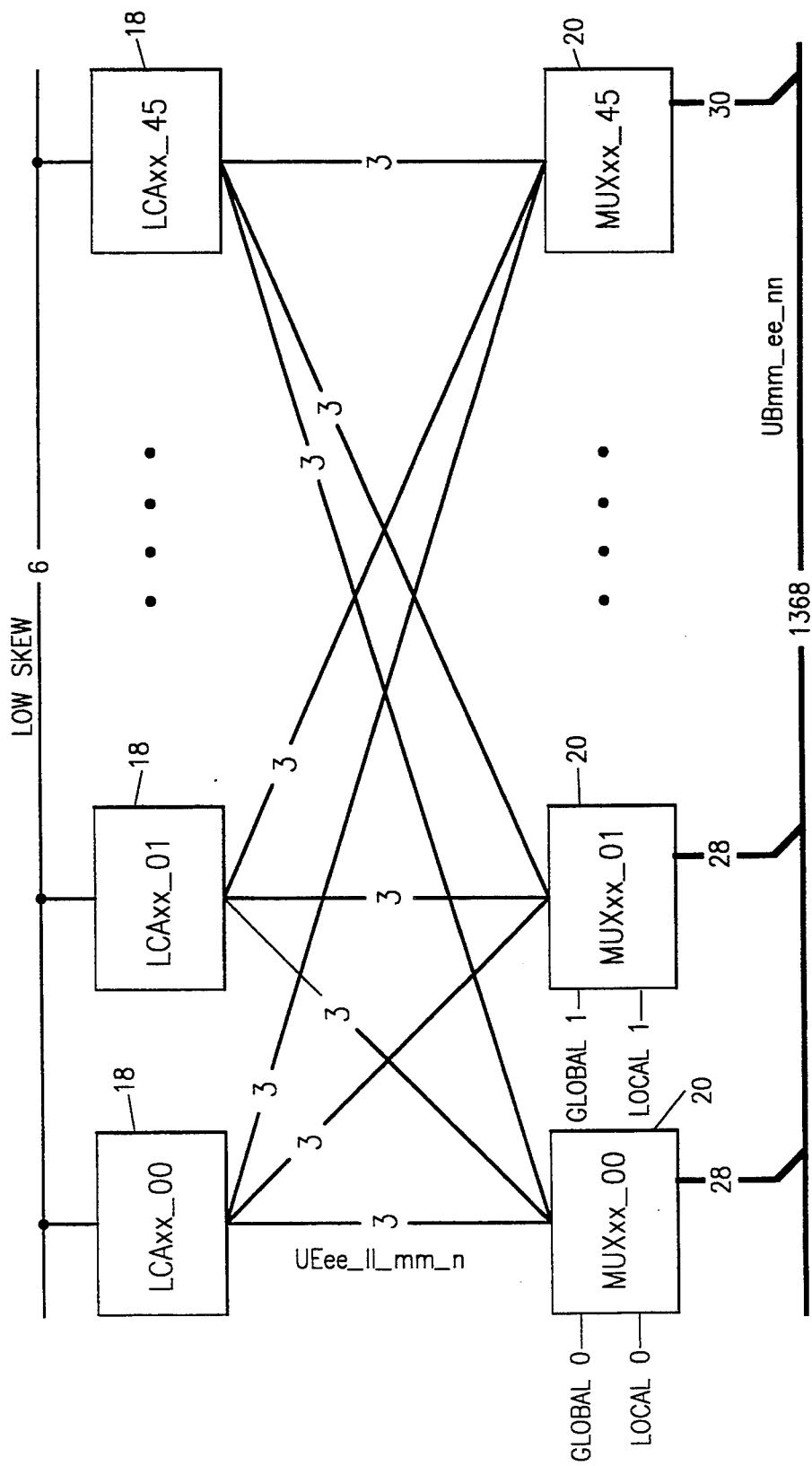
FIG. 4 is an illustration of chip connectivity on the emulation board of an emulation system in accordance with the present invention.

The QT mux chip connectivity is not symmetric. As shown in FIG. 4, QT mux chps MUXxx00 through MUXxx_05 are special in that they have two pins devoted to the global and local signals. This places some constraints on the router software, but the constraints are not serious.

As mentioned in the previous section, each mux chip 20 has three connections to each logic chip 18. The remaining 28 or 30 mux chip I/O pins are used for backplane I/O nets to the mux boards. Accordingly, the 40 regular and six special QT mux chips 20 represent 1,368 total connections to the mux boards.

1.3.1.3.3 T3 Connectivity

Turning now also to FIG. 7, in one preferred form, the system 10 of the present invention utilizes a midplane architecture, which removes QT mux chips 20 from the backplane and moves them to mux boards. In order to reduce connector costs, and to simplify backplane routing requirements, the emulation boards and mux boards share many of the same physical pins on the backplane. The resulting connectivity is unusual, and affected by such things as connector pitch, number of connector rows and columns, and connector spacing. After selecting the 600 pin AMP TBC connectors, and using 0.8 spacing to reduce the enclosure, the pattern shown in FIG. 7, labeled "Midplane Connectivity" is achieved.

At each emulation board/mux board intersection, there are 96 pins. The emulation board uses an 12:1 interleave pattern for power/ground pins. This requires 8 pins from each intersection, leaving a total of 88 user I/O pins between any emulation board and any other mux board. Again, 1,368 I/O nets per emulation board, at 88 pins per mux board, requires a minimum of sixteen mux boards per system.

1.3.1.4 Signals

1.3.1.4.1 PBus IF

Referring now to FIG. 1, the PBUS 30, which is discussed more fully below, is used to program and monitor all the LCAs and QT mux chips in the system, and to configure the low skew nets. The emulation board supports 44 PBUS signals which are described more fully in section 1.4.1 below.

The interface to the PBUS is presently implemented using three Xilinx XC 3090 LCAs. This logic receives the PBUS data stream, and supplies two data streams to the emulation board: the LCA bit stream, and the JTAG bit stream. For efficiency, this logic should be the same design used on the mux board.

1.3.1.4.2 Clock Distribution

Six dedicated clock nets are provided in the system hardware. Any design signals may be assigned to these dedicated clock nets. Signals on a clock net will be distributed with low skew throughout the system. This allows designs using less than six clocks to be implemented without fear of introducing hold-time violations.

Figure 9:
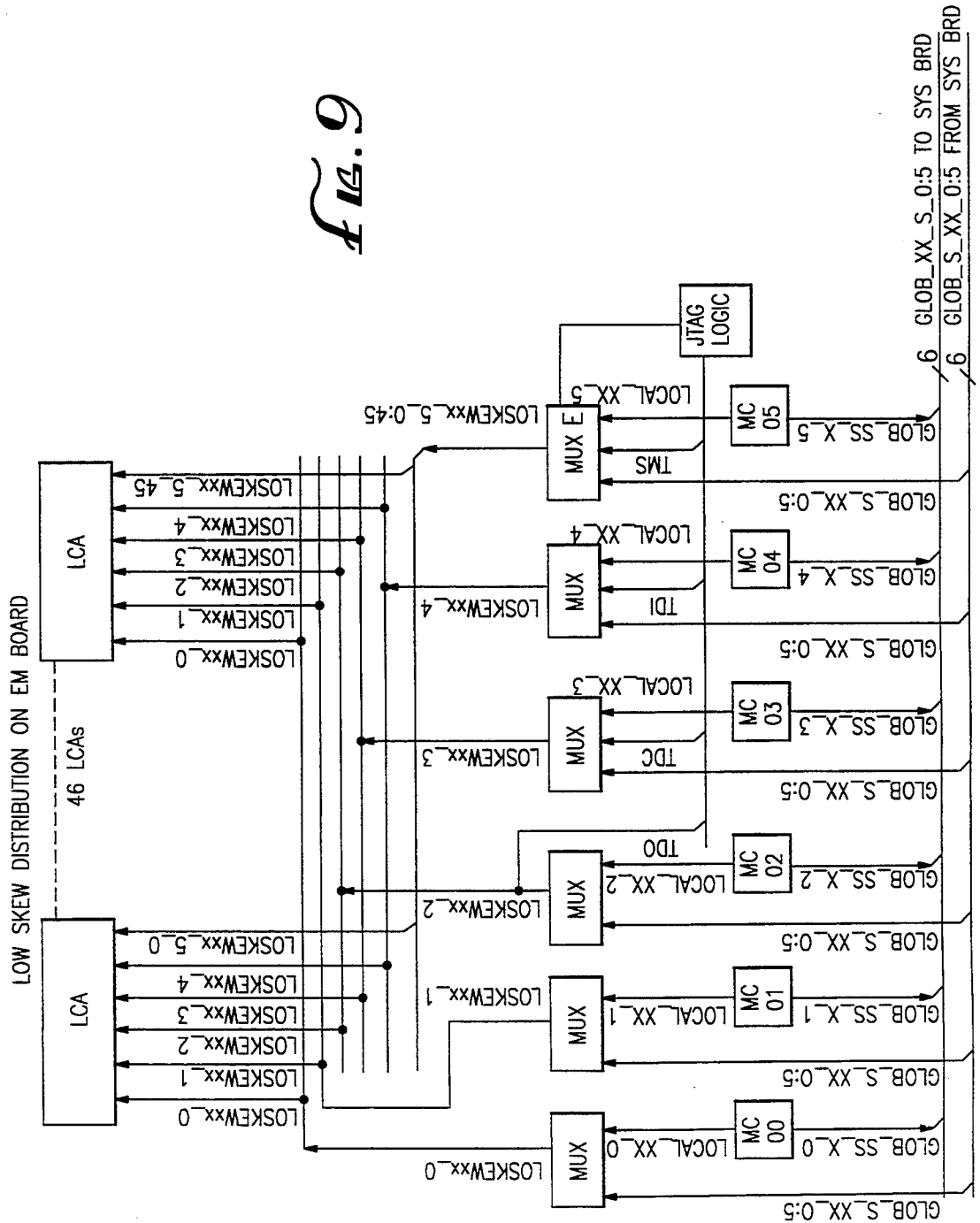
FIG. 9 is an illustration of low skew signal distribution on an emulation board of a system in accordance with the present invention.
Figure 10:
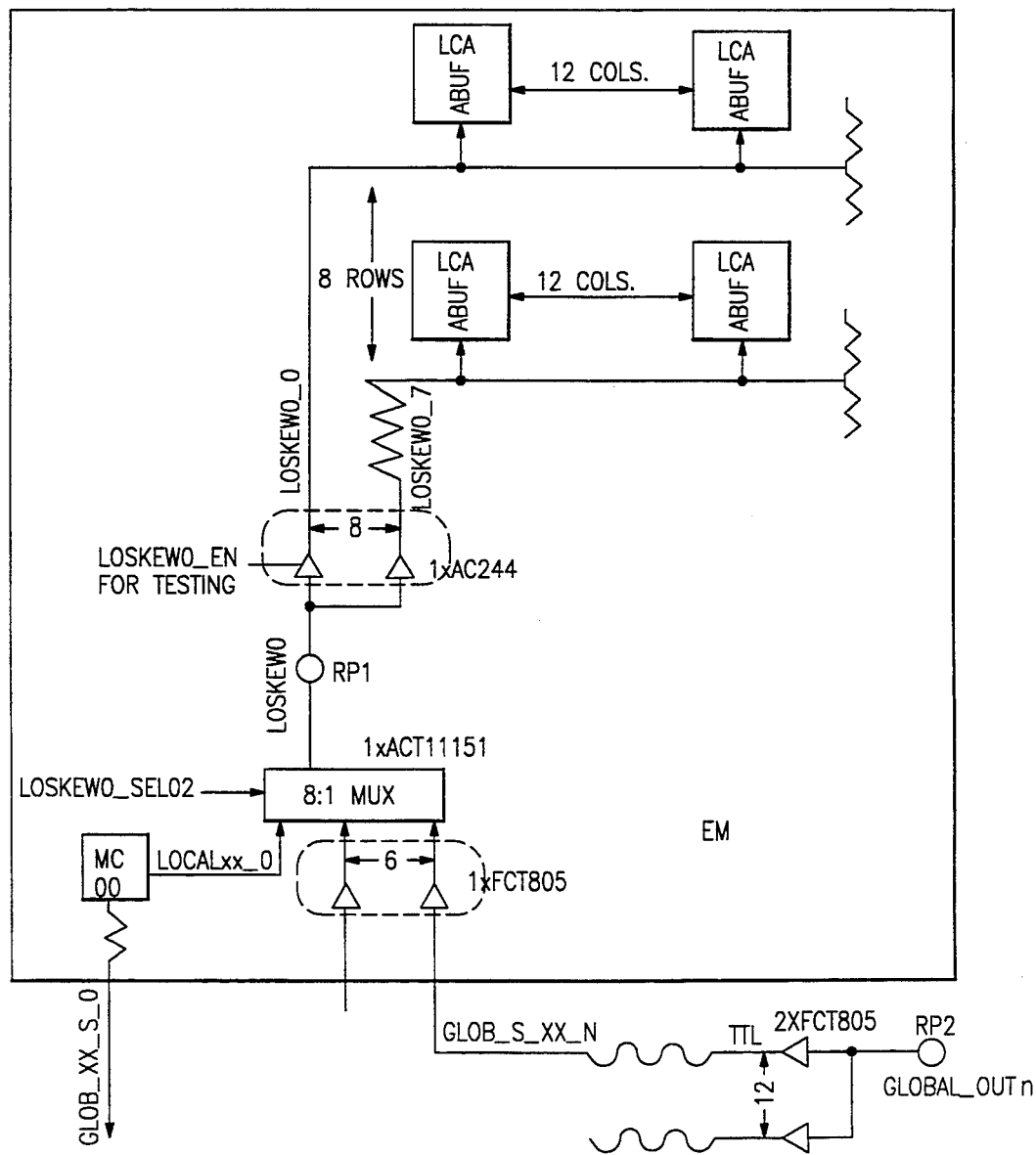
FIG. 10 is a detailed illustration of emulation module low skew distribution circuitry showing how low skew signals are buffered.
Figure 11:
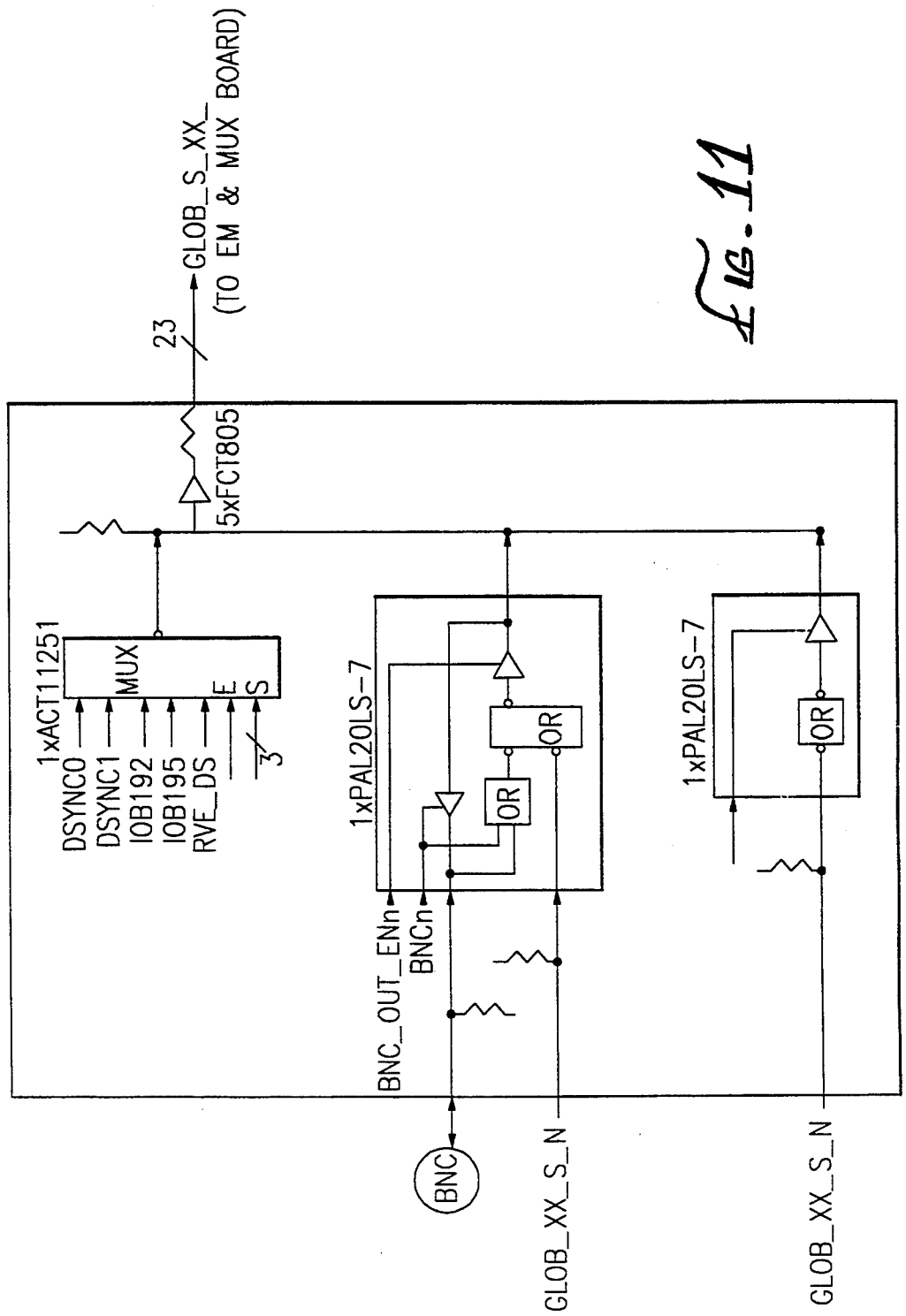
FIG. 11 is an illustration of system board low skew clock distribution circuitry.

The clock distribution network is shown in FIGS. 8 and 9. Referring to FIG. 8, clocks are routed to the system board on the nets GLOB_xx_S_0:5. Clocks may be driven onto these nets from the emulation boards or the mux boards through the mux chips labelled MC 0:5. There are actually six separate nets routed from each emulation and mux board to the system board, rather than a common bus as shown on the drawing. Each set of backplane nets is designed to have the same length to minimize skew.

On the system boards, the clock nets go through a multiplexer and then are driven back to all the emulation and mux boards through nets GLOB_S_xx_0:5. As described above, there is actually a separate set of six nets for each emulation and mux board to minimize skew. Other sources to the system board multiplexer are:

- variable clock oscillator which provides clock signals to the emulated design if it is not being driven by an external clock.
- IOB192, IOB195 which are clocks provided by the internal pattern generator.
- RVE_DS which is a clock provided by the RVE circuitry described later.

Six BNC connectors are also provided on the system board which may be used to source or output signals to/from the clock nets.

1.3.1.4.3 Emulation Board Clock Distribution

FIG. 9 shows how clocks are distributed on the emulation board. Clocks may be input either from the backplane through the GLOB_S_xx_0:5 signals or provided locally from the LOCALxx_0:5 signals. The upper four emulation board clock signals are multiplexed with JTAG signals TDO, TCK, TDI and TMS. The JTAG signals are used during testing of the FPGAs and board interconnect. A multiplexer is used to drive the LOSKEWxx_0:5 signals which go to the 46 LCAs 18 on the emulation board 16. There are actually additional buffers not shown in FIG. 9 to obtain sufficient current for driving all 46 LCAs.

1.4 System Board

The main functions of the system board are:
(a) to provide I/O interface to a 160 channel logic analyzer;
(b) to provide I/O interface to the RVE;
(c) to hold PBUS master controller interface logic; and
(d) to hold the clock selection logic.

The porting of 160 channel logic analyzer from conventional systems is done by depopulating all unnecessary parts from the control board of those systems (for example, the RPM emulation system manufactured by Quickturn Systems of Mountain View, Calif.) converting the control board into a VME slave board and mounting it on the system board, with the required I/O and signal interfaces routed through this board. Similarly, RVE is embedded in the present system 10 by mounting the control board of RVE directly on the system board, with all necessary control signals and vector channel signals routed through the system board. The RVE is a commercial product which may be purchased from Quickturn Systems of Mountain View, Calif., and is used when running the emulation system with test vectors.

The host workstation 12 communicates with emulation board 10 through a bus extender card available from Bit-3 Corporation of Minneapolis, Minn. This drives a VME bus which again is converted into an internal bus called PBUS. This PBUS is then used to program all devices and set various control registers of all boards in the system. The logic to convert the 32 bit parallel VME bus data to serial PBUS data, latches to hold the PBUS address lines static while the bus performs some functions etc. will all reside in the system board.

This board supports the Global lines routing scheme where the multiplexing of different sources of clocks (from/to Pods, BNCs, EMs, are handled. Also, there are a total of 12 BNC connectors on the board—two of which are from the 160 Channel LA/PG, another four from the RVE and the other six are for bringing in/out external clocks to system and routing them into the clock multiplexers.

1.4.1 PBUS Specification

This section describes the functionality of the system programming bus or PBUS. The PBUS is used for communication between the host or system board and emulation modules, mux boards and pods. Its primary functions are programming, readback and testing of LCAs 18 and mux chips 20. It may also be used for programming and reading back other registers in the system.

The PBUS consists of a set of parallel address and control lines along with a set of serial data lines. Four different serial formats are supported; Register format for reading and writing board registers, LCA format for programming and reading back LCAs, JTAG-MUX format for programming and testing mux chips and for testing system interconnect and JTAG-LCA format for testing LCA to mux chip interconnect. The PBUS is synchronous with no ready or acknowledge line. The bus master is assumed to know what the acceptable data rate is for each slave device.

The PBUS is a single master bus. There is no facility for switching the bus master. The system board located in slot 38 will automatically become the bus master. Other system boards will be PBUS slaves. Physically, the PBUS is split into two halves to keep the length and loading reasonable. One half goes to connectors in the mux board side of the cardcage and the other half goes to connectors in the emulation module side of the cardcage.

Address Signals

The address portion of the PBUS contains 16 address signals SB_xx_PA0:15 which select an individual board and chip for programming, readback or testing. SB_xx_PA0 is the least significant bit. The address field is partitioned as shown:

| | | |
|---|---|---|
| SB_xx_PA00:07 | Device Address | -Selects an individual chip on a board |
| SB_xx_PA08:13 | Board Address | -Selects an individual board in the system |
| SB_xx_PA14:15 | Address Type | -Selects one of 4 operating/ programming address spaces |

Address Type

The two address type bits are used to set up control lines on the boards for the proper data format. They also allow register, LCA and mux addresses to be overlapped. Address type must not be changed in the middle of a program, readback or JTAG operation. Address Type is one of the following:

| SB_xx_PA15:14 | Addr Type | Description |
|---|---|---|
| 00 | REGISTER | Register read/write & active emulation |
| 01 | JTAG_LCA | JTAG mode for LCAs |
| 10 | JTAG_MUX | JTAG mode for Mux chips |
| 11 | LCA | LCA program/readback |

Register address—Used when reading or writing control registers on boards attached to the PBUS. Also used when the system is emulating the user design. Note that some registers on the VME to PBUS interface logic are attached directly to the VME bus, rather than to the PBUS.

LCA address—Used to program or readback LCAs. An LCA address may not be given when the user design is emulating because the DIN pin on LCAs is also used as a global clock and is switched to the data-in function whenever an LCA address is selected. Once an LCA address is selected and programming or readback is started, the address must not be changed until the program or readback operation is complete. Otherwise, the program or readback operation will not complete correctly and there is a possibility of the part being damaged due to a bad bitstream.

JTAG_MUX address—Used when communicating to mux chips through the JTAG protocol.

JTAG_MUX addresses may be used while the user design is emulating. This is necessary to determine the source and pin number of I/O conflict interrupts. Mux chip addresses should only be changed when the mux chips are in the TEST-LOGIC-RESET or RUN-TEST-IDLE states. TMS is either held constant or forced high for unselected mux chips.

JTAG LCA address—Used when communicating to LCAs through the JTAG protocol. The low-skew clock lines are redefined to be JTAG control lines. LCAs 18 must be programmed with a JTAG bitstream before selecting this address type and erased afterwards to avoid conflicts on the low-skew lines. The low-skew clock register must be reinitialized before the user's design will run. LCA chip addresses should only be changed when the LCA chips are in the TEST-LOGIC-RESET or RUN-TEST-IDLE states. PTMS is either held constant or forced high for unselected chips.

Board Address

The top bit of the board address field will be used to select between mux board connectors and emulation module connectors in the system. This is only an addressing difference; it does not imply anything about the board type. The emulation module connector will accept several different types of boards.

| | |
|---|---|
| SB_xx_PA13=0 | Mux board, Pod, CA or IM (Board address 00–23) |
| SB_xx_PA13=1 | Emulation module, System board, Inst board or GWB (Board Address 32–43) |

Device Address

The device address field is used to select a particular LCA 18, mux chip 20 or register. It may be further subdivided on some boards. On mux boards, part of the device field is used to select different I/O connectors.

Boards may have hard-programmed LCAs as well as user-programmed devices. For example, the emulation module 16 will use several LCAs for the PBUS interface and programming address decoder. These devices may have diagnostic readback addresses which should be located at the top of the device address space.

Global Addressing

Global addressing can be used for parallel programming all LCAs or all mux chips in a system or on a board. It is also possible to test all mux chips on a board or in the system in parallel. Global addressing does not support specific board types. For example, it is possible to program all mux chips in the system or all mux chips on mux board 5 but not all mux chips on all mux boards or all LCAs in pods.

One global device address is supported by all boards in the system:
FFH All devices
PA14,15 determine whether LCAs or mux chips are accessed with a global address. On I/O connectors, only 4 bits of the device address appear on the connector. The global device address becomes:
FH All devices
One global board address is also supported:
3FH All boards
Specific address decoding for the most common board types is described in more detail below:

| Emulation Module Addressing | | |
|---|---|---|
| SB_EM_PA0:7 | | Device address |
| | 00H-2DH | LCAs or mux chips |
| | FCH-FEH | Hard-programmed LCA readback |
| | FFH | All LCAs or mux chips |
| Mux Board, Pod, Component Adaptor or IM Addressing | | |
| SB_MX_PA0:7 | | Device Address |
| | 00H-08H | Mux chips on mux board |
| | 0FH | All mux chips on mux board |
| | 10H-1EH | Chips on pod, component adaptor or IM in connector 0 |
| | 1FH | All chips on pod. component adaptor or IM in connector 0 |
| | 20H-2EH | Chips on pod, component adaptor or IM in connector 1 |
| | 2FH | All chips on pod, component adaptor or IM in connector 1 |
| | 30H-3EH | Chips on pod, component adaptor or IM in connector 2 |
| | 3FH | All chips on pod, component adaptor or IM in connector 2 |
| | 40H-4EH | Chips on pod, component adaptor or IM in connector 3 |
| | 4FH | All chips on pod, component adaptor or IM in connector 3 |
| | 50H-5EH | Chips on pod, component adaptor or IM in connector 4 |
| | 5FH | All chips on pod, component adaptor or IM in connector 4 |
| | FCH | Hard programmed LCA readback |
| | FFH | All chips on pods and mux board |

If more than 15 address locations are required on a pod, component adaptor or IM, indirect addressing will be used as on the current IM module.

| | |
|---|---|
| Slot ID Signals SB_yy_ID0:5 | Slot identification signals which are hard-wired on the backplace |

The slot ID signals are compared to the board address portion of the PA address to determine if a particular board has been selected. Slot ID signals are connected to ground or left unconnected on the backplane to uniquely identify a board slot. The slot ID signals will have pullups on each board.

Mux boards will have slot identifications of 00H to 17H (0–23 decimal) and emulation modules will have slot IDs of 20H to 2BH (32 to 43 decimals). The master system board must reside in slot 26H (38 decimal). This is the board that drives the PBUS.

SB_xx_ID5 is a 1 for boards on the emulation module side of the cardcage and a 0 for boards on the mux side of the cardcage.

| Name | JTAG | LCA | Req | Type | Control Signals |
|---|---|---|---|---|---|
| SB_xx_PTCK | TCK | CCLK | TCK | 1 | Programming clock signal |
| SB_xx_PTDI | TDI | DIN | TDI | 1 | Data input for programming and testing |
| SB_xx_PTDO | TDO | M1 | TDO | T | Data output for testing or readback |
| SB_xx_PTMS | TMS | LCARST- | WR- | 1 | Mode selection for JTAG. Reset for LCA program/ readback. Write signal for register read/write |
| SB_xx_PINT- | INT- | N/A | N/A | OC | Low if device(s) have an error |
| SB_xx_PRST- | RST- | RST- | RST- | 1 | Reset signal for the board |
| SB_XX_SYNC- | SYNC- | STROBE- | SYNC- | 1 | Synchronization signal for registers. Program/ readback strobe for LCAs |
| SB_XX_SP0:2 | N/C | N/C | N/C | N/A | Spare signals bussed on the backplane but not used |

Signal type is defined with respect to the emulation and mux boards. I is an input to the board, T is a tristate output and OC is an open-collector output with a pullup on the backplane. Some of the controls signals have different functions when JTAG or LCA addresses are selected.

SB_xx_PTCK—Provides clock signal to all LCAs and mux chips. PTDI, PTMS and PSYNC— are valid before the rising edge of PTCK and PTDO and PINT— change after the falling edge. Address is changed only when PTCK is in the high state. PTCK is decoded on each board into separate clocks for mux chips, LCAs and LCAs in JTAG mode and goes to all devices of a given type. This is like the CPU board today but unlike the current emulation module. On power-up, all LCA chips will program together. The PBUS interface will automatically load array LCAs with a blank bitstream file known as "empty.bit" during the bootup process. I/O connectors have individually decoded PTCKs and are not loaded with empty.bit during the bootup process. This allows the system to recover gracefully if pods or CA cards are removed and replaced while an emulation is in progress. PTCK will stop in the high state when the host CPU is fetching new data or when no operations are in progress. Excess clocks after programming or readback is complete are ignored by registers, LCAs and mux chips.

SB_xx_PTDI—Provides data to all LCAs, mux chips and registers. PTDI is sampled on the rising edge of TCK. PTDI is not decoded. It is connected to all chips in the system. On LCAs, the DIN pin is also used as a global clock input. The global clock must be switched off before programming to allow data to be sent to the LCA.

When generating a strobe for LCA program or readback, the PTDI signal is used to select between the Done/Program pin (program LCA) and the M0 pin (readback LCA). A 0 level means program and a 1 level means readback. The same encoding scheme is used in the current pod.

SB_xx_PTDO—Readback or test data from mux chips, LCAs and registers. Only the selected board drives the PTDO signal on the backplane. PTDI may not be driven from more than one board at a time.

SB_xx_PTMS—Model select signal in JTAG mode for the JTAG logic in mux chips or LCAs. PTMS is sampled on the rising edge of PTCK. PTMS is decoded so that it only goes to the device(s) selected. For unselected devices, it either remains high or remains in the last selected state depending on a bit in the board control register. When doing JTAG testing, it is necessary to write data to some chips and have them remain in the EXTERNAL-TEST state while reading data from other chips. This is done by placing unselected chips in the RUN-TEST-IDLE state with PTMS low. Many mux chips may be operated in parallel by selecting one of the global addresses and placing the appropriate 1/0 pattern on the TMS signal. This technique can be used to do an internal test on all mux chips in the system in parallel.

When an LCA program/readback address is selected, the PTMS signal becomes an active-low global LCA reset. It is used to reset LCAs before reprogramming or before starting emulation. This reset will not affect the configuration of LCAs.

When a register address is selected, the PTMS signal becomes the active-low write enable signal. If PTMS is low, register contents will be changed to reflect the data input on TDI. If PTMS is high, register contents will be read out but not changed. Register contents may change one bit at a time or all together depending on the particular register. Unmodified register bits will not toggle during the writing process, however.

SB_xx_PINT—PINT—is an open-collector signal which is low if mux chips or pods have detected an over-current error or have failed to program. Interrupts in existing pods are rest by giving a reset probate (PTMS=0) while in the LCA address space. Mux chip interrupts are reset by reading the data register using a SAMPLE-PRELOAD instruction. Mux chip interrupts may be disabled by a bit in the programming bitstream. The PINT— line is connected to all chips on boards or I/O connectors. The specific mux chip(s) causing an interrupt may be determined by reading the JTAG instruction registers. The source of an I/O interrupt may be determined by reading the board interrupt status.

SB_xx_PRST—PRST— is a reset for all boards attached to the PBUS. It operates similar to the VME bus reset signal and a VME reset will also cause a PBUS reset. PRST— causes all hard-programmed LCAs to reprogram and all interface logic to reset. It has the same effect as power-cycling the interface logic. It is not the same as the user design reset which is done by placing a 0 on PTMS while giving an LCA address.

SB_xx_PSYNC—PSYNC— is an active-low synchronization signal for register reads and writes. It pulses low to reset the bit counters before data is shifted in or out of the register. For LCA programming and readback, PSYNC— is used to generate the D/P or M0 strobes. The PTDI signal determines whether a D/P (program) or M0 (readback) strobe is generated. In JTAG mode, the PSYNC— signal is used to clear the TDO comparison latch before starting a mux chip internal test.

Figure 83:
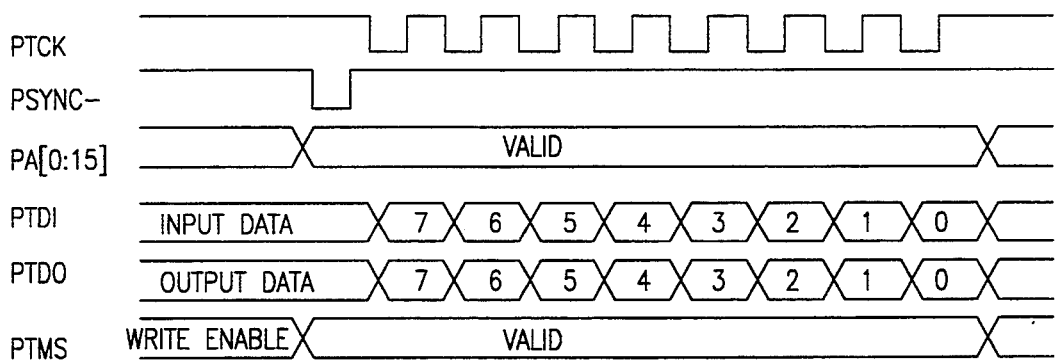
FIG. 83 illustrates a register read-write cycle.
Figure 84:
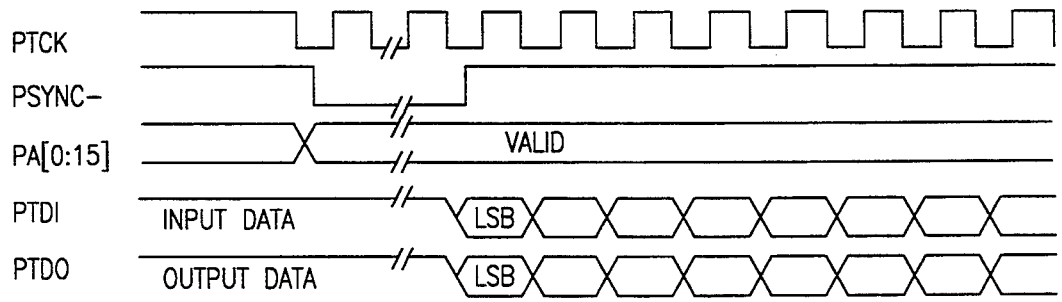
FIG. 84 illustrates a LCA program/readback.
Figure 85:
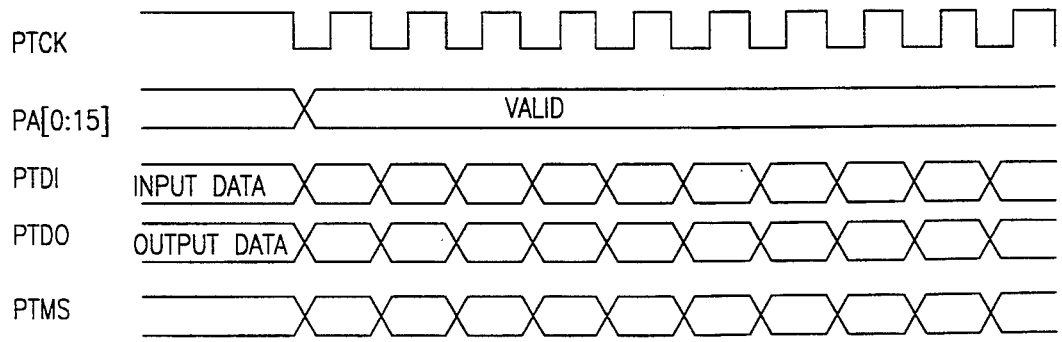
FIG. 85 illustrates JTAG format for inputting and outputting data.

Typical PBUS Waveforms are Illustrated in FIGS. 83-85

An example of an 8 bit register read/write operation is shown in FIG. 83. The PSYNC- signal clears an internal bit counter. The counter increments until it reaches 8 then it stops. Further clocks have no effect. TDI data is sampled by the rising edge of PTCK and TDO data changes on the falling edge. The TMS signal is used as a write enable.

As shown in FIG. 84, LCA program and readback have similar waveforms. The PSYNC— pulse is wider and there are more clocks but the timing is the same. Input data is sampled on the rising edge of PTCK and output data changes on the falling edge of PTCK.

JTAG format, again, has similar timing as shown in FIG. 100. PTDI and PTMS change after the falling edge of PTCK and are sampled by the rising edge. PTDO changes after the falling edge of PTCK.

Low-Skew or Global Clock Signals

Also part of the PBUS are the low-skew clock signals going to and coming from the system board. There are 12 of these signals on each EM slot:

| | |
|---|---|
| GLOB_S_xx_0:5 | Globals from system board |
| GLOB_xx_S_0:5 | Globals to system board |

The function of the global signals is discussed in the Global Signals section above.

| PBUS Signal Summary | |
|---|---|
| SB_xx_PA0:15 | Address signals |
| SB_yy_ID0:5 | Slot identification signal |
| SB_XX_PTCK SB_xx_PSYNC- SB_xx_PTDI SB_xx_PINT- SB_xx_PTDO SB_xx_PRST- SB_xx_PTMS | Control signals |
| SB_xx_SP0:2 | Spare signals for future use |
| GLOB_X_xx_0:5 | Global clock signals |
| GLOB_xx_S_0:5 | Connection to Existing Pods and Interconnect Module |

1.5 Mux Board 1.5.1 Basic Function

Figure 93:
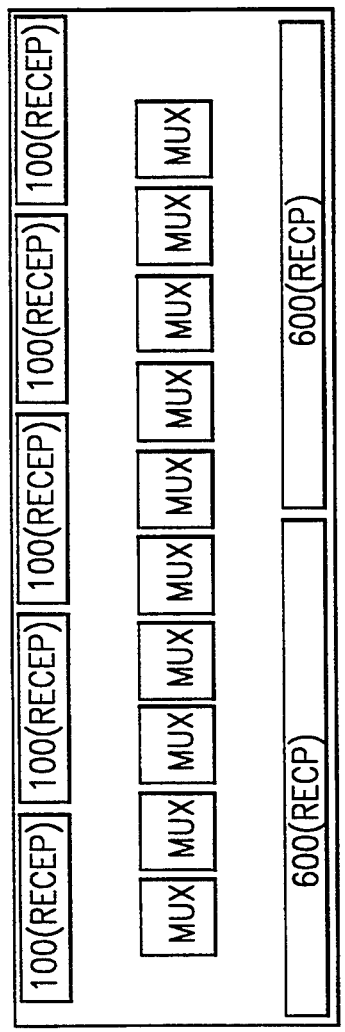
FIG. 93 is an illustration of the layout of the system MUX board.

Turning now to FIG. 93, in one preferred form, the mux board is a PC board that is long and narrow, with five system I/O connectors on one edge. The mux board plugs into the system backplane 24. The mux board has ten QT mux ICs mounted thereon. Each QT mux IC has 168 programmable I/O, and is able to switch any incoming signal onto any other outgoing signal (either back to some other emulation module 16 or to the outside world). The programming of the mux ICs is done through the backplane PBUS from the system board, and the VMEbus is not used on this board. Sixteen of these mux boards are vertically plugged into the backplane, with the emulation modules (EMs) plugged in horizontally on the other side in a "tic-tactoe" fashion (as shown in FIG. 7), with common pins directly connected in intersecting areas.

1.5.2 Number of Mux Boards per System

As set forth above, in one preferred form, a minimum of sixteen mux boards are plugged into each backplane connector slot (on the mux side of the backplane, not the emulation module side). A maximum of 24 can be plugged into the backplane, and the system emulation capacity can be expanded to a theoretical limit of around 500,000 gates (as per Rent's rule).

1.5.3 Programming the Mux Board Mux ICs

The mux ICs are configured through the PBUS entering the mux board from the backplane 24, as per the addressing scheme given in the discussion of the PBUS in section 1.4.2 above.

Emulation boards and the system board are connected together through a switching midplane. The switching midplane is more fully disclosed in co-pending U.S. patent application Ser. No. 07/896,068, filed Jun. 8, 1992, and entitled "SWITCHING MIDPLANE AND INTERCONNECTION SYSTEM FOR INTERCONNECTING LARGE NUMBERS OF SIGNALS". The switching midplane includes a midplane printed circuit board with connectors on one side for the emulation modules and system board and connectors on the other side for the mux boards. The connectors are oriented at right angles to each other such that each mux board connects to the system board and all the emulation modules. This is illustrated in FIG. 7. The combination of the midplane circuit board and mux boards comprises the switching midplane. The switching midplane allows signals to be routed from any emulation module to another emulation module, the system board, or an I/O connector with only one pass through a mux chip.

1.9 Multiplexer Chip (Mux Chip)

1.9.1 Functional Description

Figure 12:
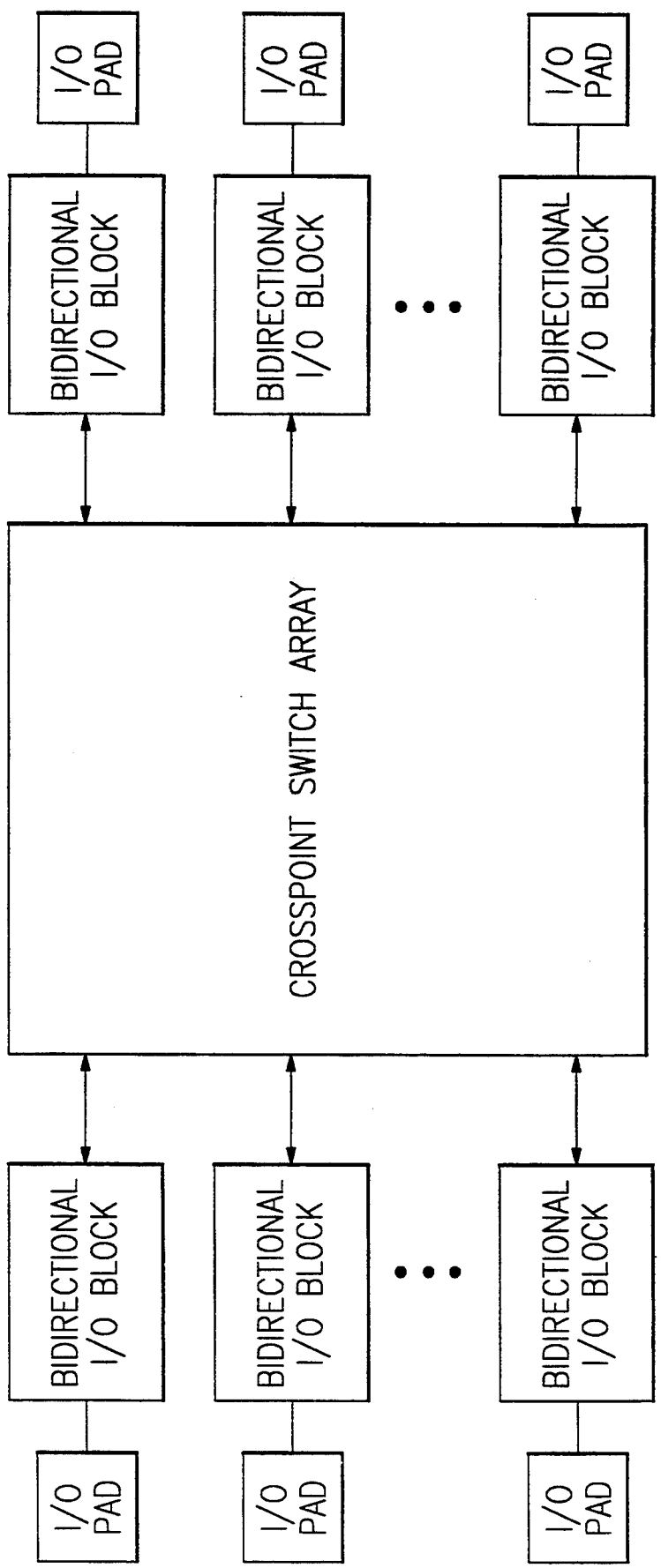
FIG. 12 is an illustration of a functional block diagram of a mux chip in accordance with the present invention.

Turning now to FIG. 12, the multiplexer chip 20 has a large number of bidirectional I/O pins. Any pin can be defined as an input, output, or bidirectional. The chip acts like a large crosspoint switch. Any input can be connected to any output or any group of outputs. It is possible for one input to drive up to half of the other pins on the chip. I/O pins and connection patterns are defined by loading a serial configuration pattern into static RAM inside the chip.

The chip is statically non-blocking. For any pattern of inputs and outputs, there is a configuration pattern which will make the desired connections. Internally, the chip is a large crosspoint switch where each configuration bit causes a connection between an input pin and an output pin.

The multiplexer chip 20 may also serve as a wired and bus extender. In this case, multiple inputs are tied together through a pulldown bus which is then routed to an output pin. Multiplexer chips may be arranged in a hierarchy to propagate buses throughout the system 10.

In the presently preferred system, mux chips are used in 3 distinct places, each of which has slightly different characteristics.

1. On the Emulation Board 16: Mux chips 20 have a number of connections to each logic chip 18 and a number of additional connections to the backplane connector. All connections are static. There are no bidirectional or tristate signals. CMOS input levels are used for all pins. A single input may fan out to approximately 46 outputs. It is possible for all pins to switch simultaneously, at least in a localized area of the chip. Outputs drive one CMOS input and may have up to 3 feet of trace with a typical impedance of 50-75 Ohms.

2. On the Mux Boards 24: Approximately 117 pins connect to other mux chips 20 on emulation modules 16 and 42 pins connect to external component adaptors or pods. Five I/O connectors are available on each mux board, each of which provides 76 I/O signals as well as a subset of the PBUS for programming and testing external devices. Other mux chip pins connect between mux chips or are used to source clock nets as described earlier. CMOS input levels are used for all pins.

3. On Component Adaptors: 76 Pins connect to the system through the I/O connector. 76 additional pins are available for connection to a user design. These pins can be used in various ways. Up to 38 of them can be bidirectional with separate enables or more if enables can be shared. Up to 76 pins can be static inputs or outputs.

1.9.2 JTAG Logic

The mux chip includes a JTAG port which is used for testing and configuration. The JTAG port follows the IEEE 1149.1 specification. There are 4 JTAG pins with the following functions:

TCK—Clock input used for shifting data and changing the JTAG mode. In the mux chip, TCK also provides a clock for the error detection logic and is expected to run continuously while the design is emulating. TDI and TMS are sampled on the rising edge of TCK and TDO changes on the falling edge. TCK is common to all chips in the system.

TMS—Test mode select pin which is toggled up and down along with TCK to change the current test mode. TMS is left at a 1 in the default or reset state. TMS is decoded to select one mux chip in the system.

TDI—TDI is the data input for configuration and test data. TDI is common to all chips in the system.

TDO—TDO is the data output for test data. It is also used to output configuration data to the next chip when chips are daisy-chained together. TDO is a tristate output. Only the chip actively shifting data drives TDO.

The JTAG logic is composed of an instruction register and a series of data registers. The instruction register has 4 bits and selects the test or configuration mode. The following codes are used:

0—EXTEST
1—INTEST
2—SAMPLE PRELOAD
4—SERIAL PROGRAM
5—PARALLEL PROGRAM
F—BYPASS

When read back, the instruction register contains program and I/O error status bits.

| Bit | | |
|---|---|---|
| | 3 | DONE - Part has been programmed successfully. |
| | 2 | IOERR - An overcurrent error has been detected. |
| | 1 | 0 |
| | 0 | 1 |

The serial and parallel configuration modes are described in detail in the configuration section. The bypass register is a 1 bit register which is selected by default when none of the other modes are active. The bypass register is used to reduce test time when daisy-chaining many chips together. The external and internal test modes are described below.

1.9.3 Configuration

Configuration is done through the JTAG pins. The serial programming mode is selected by writing the appropriate address to the JTAG instruction register when the part is placed in the SHIFT DR state and the programming data is shifted in. Outputs will be tristated as soon as the part is placed in the SHIFT DR state and will remain tristated until programming is complete. The open collector DONE output will be pulled low at power up and as long as the part is not programmed. When reprogramming, DONE will go low before the outputs are tristated and remain low until programming is complete and the outputs are enabled again.

If anything is wrong with the data format or with the CRC checks, the chip will not program, outputs will remain tristated and DONE will remain low. Programming will be aborted if the JTAG logic is changed out of the SHIFT DR state at any time during programming. A new programming cycle will be started when the JTAG state is moved back to SHIFT DR with the serial program mode selected. Software can tell if programming succeeded by reading back the instruction register.

At power-up, the chip will come up in the unprogrammed state with all outputs and internal drivers tristated and the JTAG logic in the Test-Logic-Reset state. A status bit is available in the instruction register which allows the CPU to determine that the part has not been programmed.

The part can also be programmed in a non-JTAG environment by pulling the PGM/pin low then clocking configuration data in on TDI along with a clock on TCK. In this mode, the mux chip may be booted from a Xilinx 3000 or 4000 series part and placed in a daisy-chain with other mux chips or Xilinx parts.

1.9.4 %Serial Programming

A serial configuration pattern is used to load the mux chip. The format is similar to that used for a Xilinx 4000 series chip and is compatible in the sense that Xilinx 3000 or 4000 chips and mux chips may be daisy-chained together and loaded using a Xilinx chip as the master. The configuration pattern is composed of a header followed by a series of data frames. Each data frame starts with a 0 followed by 168 data bits followed by 4 bits of CRC check. The chip requires 256 data frames.

1.9.5 Parallel Programming

A parallel programming mode is also supported to make chip testing possible. The parallel programming mode allows the part to be completely programmed in approximately 300 clocks instead of 43,000 clocks for the serial mode. In the parallel programming mode, a complete frame minus the start bit and the CRC check bits is placed on all the I/O pins at the same time. There is no start or stop sequence. The part is placed in the parallel programming mode by writing to the JTAG instruction register then moving to the SHIFT DR state. The TDI pin is held low until the last frame is entered then set high. If TDI is set high before configuration is complete or the JTAG logic is moved out of the SHIFT DR state, configuration will be aborted. With each clock, a new frame of data is written. The order of data frames is reversed in this mode.

1.9.6 I/O Buffers

I/O pins have either 2 or 3 connections to the switching matrix. These are the input, output and output enable. Each output or output enable may be connected to any input or any combination of inputs. Any number of outputs may be connected to one input. This provides a fanout capability which is useful for distributing clocks. Outputs and output enables may also be configured to be a constant 1 or 0. If no input connections are programmed, the output or output enable will be a constant 1. If the cell in a diagonal location is programmed it will cause the output or output enable to be a constant 0. This cell would normally connect a pin back to itself which is not a useful function.

Each I/O pin may be defined at configuration time as an input, output, bidirectional, open collector or open emitter by setting the I/O register and the output and output enable appropriately.

1.9.7 I/O Characteristics

Well-defined I/O characteristics are important in the multiplexed chip to make system design easier and reduce the number of system level components. A board in the system 10 will have approximately 8,000 wires which may have lengths from a few inches to many feet. Reflections, crosstalk and ground bounce must be tightly controlled but there is no room to add extra termination resistors or discrete buffers. Since there is no fixed signal definition, there may be many signals switching at once and clock and data signals may be intermixed.

Normal outputs drive a PC board and/or cable with 50-75 Ohm impedance connected to exactly one CMOS input pin. There is no requirement for large amounts of DC current since normal outputs only drive CMOS inputs on other chips.

I/O pins are individually selectable for CMOS or TTL input levels. Outputs are always CMOS levels. CMOS mode is intended for pins that must communicate with standard CMOS or logic such as Xilinx chips or AC parts. TTL mode is for external I/O on component adaptors or buffer pods. Only CMOS input levels are needed on configuration and test pins.

Outputs are able to withstand a short circuit of unlimited duration so the part is tolerant of programming errors in the system and shorts in the plug hardware. This is achieved by incorporating error detection logic into the I/O buffer. A slow error clock is provided. If the output is trying to drive low and is above 0.8 V or is trying to drive high and is below 2 V continuously for a time equal to the slow error time period, the error detection logic will be triggered and the strong driver on the pin will be turned off. A parallel weak driver will remain enabled so the pin will recover when the short has been removed. The strong driver will only be turned off on the pin(s) which have experienced an I/O protection error. Drivers on other pins will remain enabled.

When an I/O error has been detected, the IOERR/- line will go low. The user may use this signal to trigger an oscilloscope or logic analyzer. Software can determine which pin caused an I/O error by reading back the data register in the external test mode. Reading back the register will clear the error status and reset the error detection logic. The IOEER status bit can also be polled in the instruction register.

2.0 Software Architecture

2.1 Overview

2.1.1 General Configuration Flow

Figure 13:
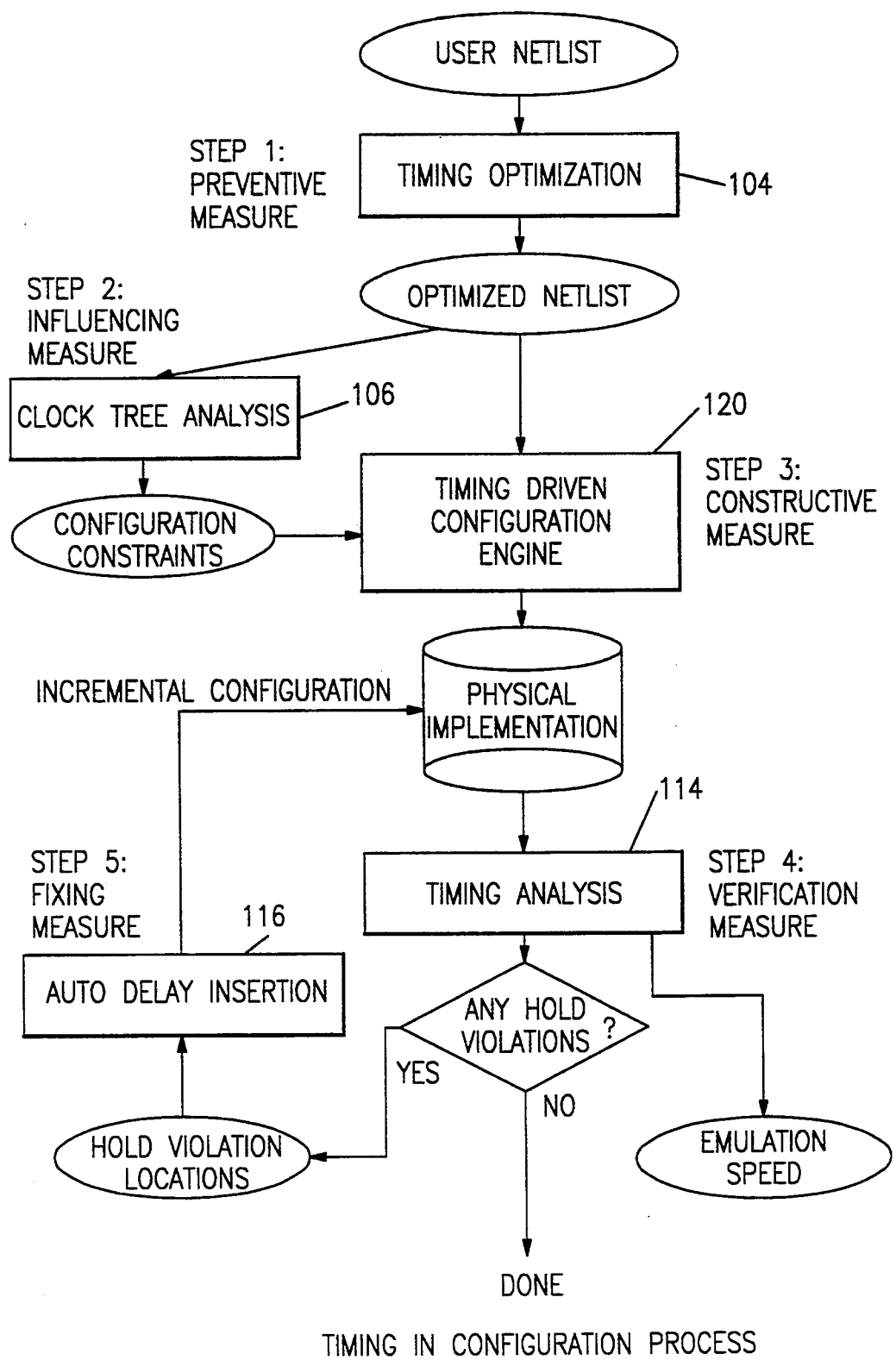
FIG. 13 illustrates timing analysis in a configuration process in accordance with the present invention.
Figure 14:
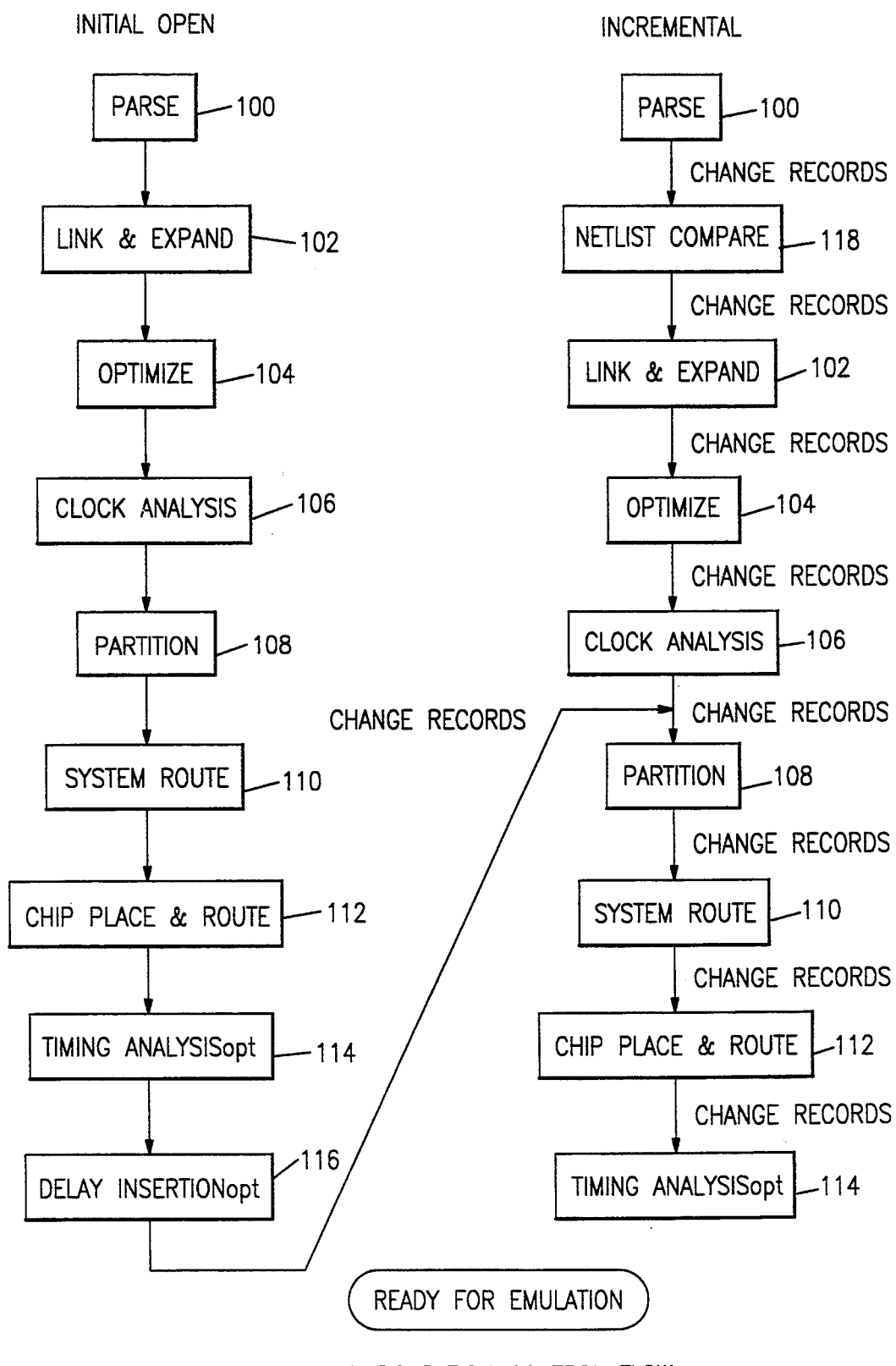
FIG. 14 illustrates configuration flow in accordance with the present invention.
Figure 15:
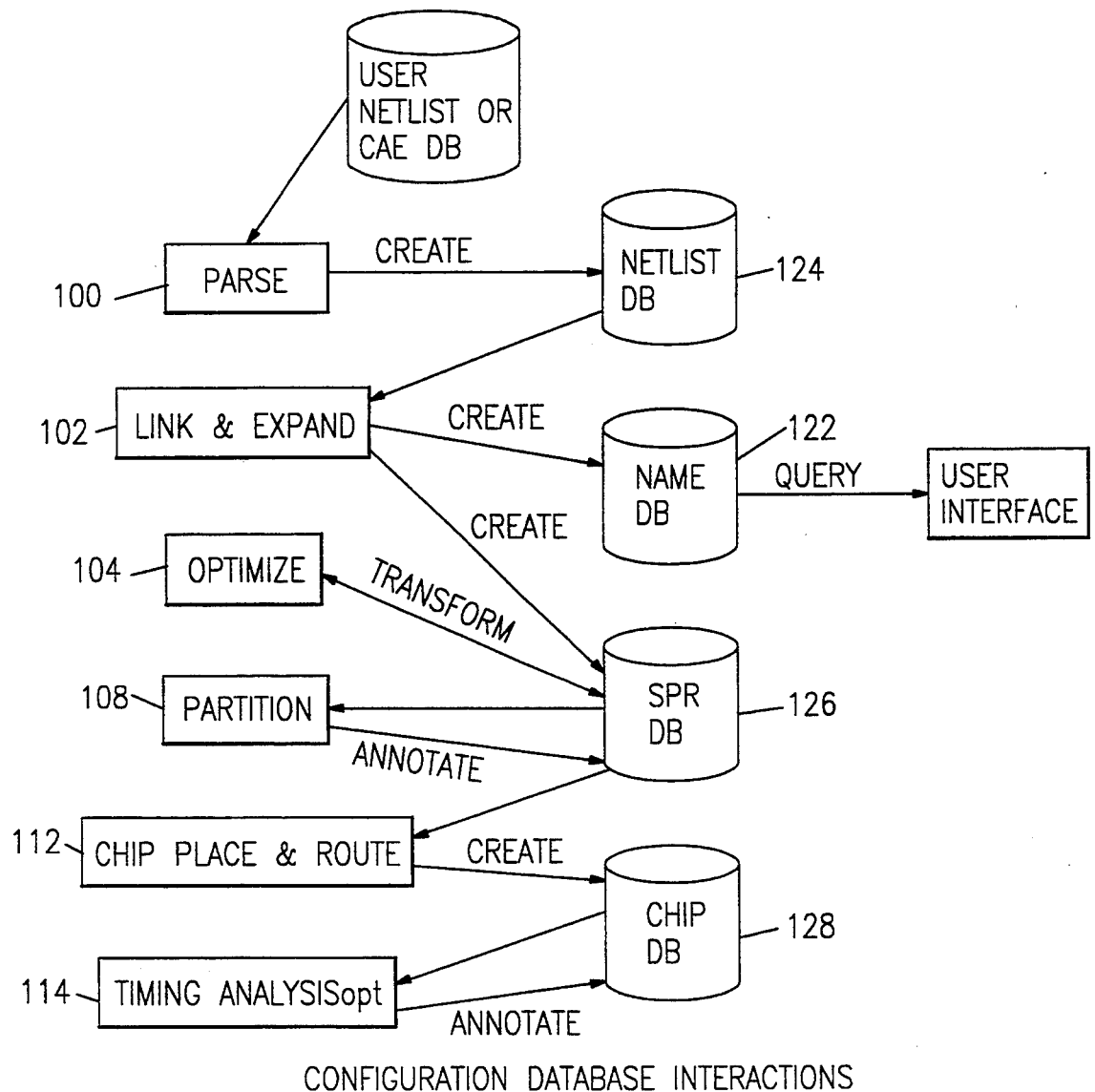
FIG. 15 illustrates configuration database interactions in accordance with the present invention.
Figure 16:
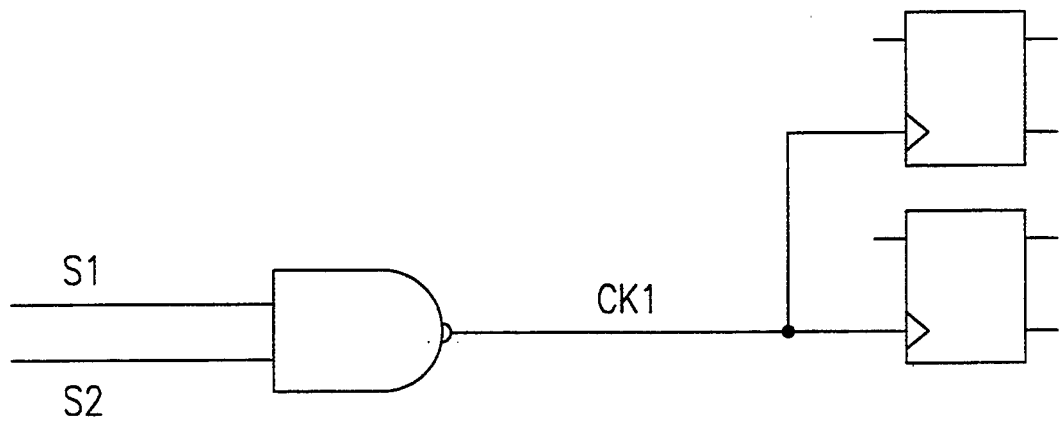
FIG. 16 illustrates a simple clock tree.
Figure 17:
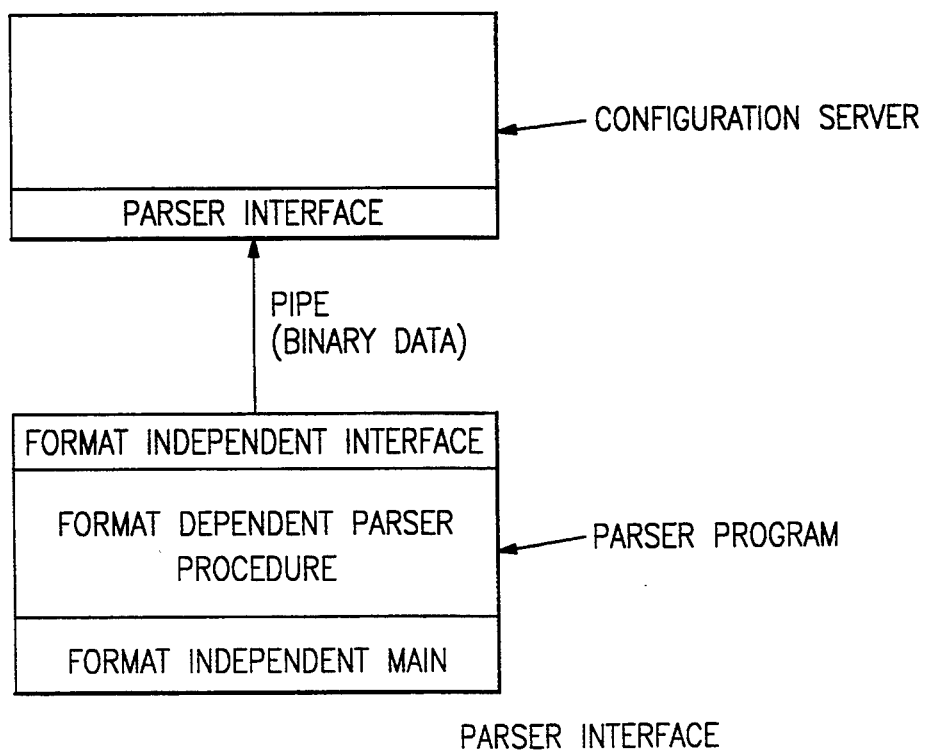
FIG. 17 illustrates the parser and configuration server interface.

The flow of the configuration process is illustrated in FIGS. 13-15. Turning first to FIGS. 13-14, which provide an illustration of the relationship between and among the various modules comprising the configuration system, the parser 100 reads the user's netlists and interfaces with the downstream part of the configuration system through a public procedural interface. The link and expand module 102 links the netlist with the component libraries and then flattens the design description.

The optimizer 104 transforms the logic for better implementation in the system hardware. In general it handles all transformations more complex than simple library element replacement. Its goals are improved clocking (mainly through blasting of inverters, removing buffers in the clock path and transforming gated clock logic to datapath logic), improved capacity, and implementation of structures (such as tri-state signals or bus retainers) that cannot be implemented well, or at all, with library elements.

There are two parts to the optimizer module 104: a framework for handling differences between the user's netlist and the implemented logic, and a set of transformations. The difference handling framework provides utilities for applying logic transformations and for mapping between the user's signals and gates and the implemented signals and gates. This is used both in interpreting directions from the user (e.g. TA net exclusion or incremental changes), and in returning reports to the user.

The clock analysis module 106 (or clock tree analyzer) finds clock trees and decides how the nets on the clock tree should be implemented. Large nets are placed on low-skew hardware, the smaller clock nets are routed on the regular interconnect but are given higher priority in the system partitioner 108 and in the chip placer and router 112.

The partition module 108 partitions the logic into emulation modules and logic (Xilinx) chips. The user can influence this. He can specify that certain of his blocks be kept together on an emulation module or logic chip. Even without any such directives, the partitioner may try to use or preserve the user's netlist partitioning, both to speed up partitioning and to reduce the extent of incremental changes.

The system router 110 assigns system level nets to specific multiplexed chips. The effect of this is to assign nets to specific chip pins. The chip place and route module can swap chip pins that connect to the same mux chip.

The chip place and route module (CPR) 112 produces bit streams and delay data at an individual chip level.

The timing analysis module 114 finds hold time violations, the maximum emulation speed, and path delays. Timing analysis is hierarchical. First, a chip level timing analysis is performed. Then splice the chip level results are spliced together to produce a design level analysis. This increases the speed of the timing analysis (TA) by splattering it across the network. It also speeds up timing analysis of incremental changes because only the chips that have changed are re-analyzed.

The delay insertion module 116 fixes hold violations through insertion of delay elements.

It may be noted that the partition module 108, the system router 110, and the chip place and route module 112 are comprised within the Timing Driven Configuration Engine 120 shown in FIG. 13.

2.1.2 Configuration Database

The configuration database contains all the data produced by the configuration system. Some of the configuration database, the part describing the input netlist, is used by both the configuration system and the user interface. Most of it will only be used by the configuration system.

Access requirements are different for different parts of the database. The system partitioner iterates through its data thousands or hundreds of thousands of times to perform its task. Access to individual elements must be very fast, on the order of a few machine instructions, but relatively long open times to the system partition part of the database can be tolerated.

The user interface accesses the configuration database to validate names entered by the user and to translate names between internal and external formats. Interactive access times are needed to individual objects—hundreds of milliseconds per access, but all of the names are generally not accessed during one session. However fast open times are preferred.

The chip level placement and timing data has access requirements between these two extremes. This data is accessed on a per chip basis. All the chip level place and route data or all the timing data for one chip is accumulated and shipped off to the chip place and route module 112 or the timing analysis module 114.

When netlist changes are detected, the netlist comparison module 118 accesses stored descriptions of the user's original blocks. These are accessed by blocks. A mapping from this hierarchical description to the flattened system configuration database is maintained.

As shown in FIG. 15, the configuration database may be organized in three or four sections: name 122, netlist 124, system place and route 126, and chip 128. (The name and netlist sections may be combined).

The name database 122 stores the user's netlist. It assigns short internal ID's for signal and pin instances. It supports searching on signal and pin names and mapping between user names and internal ID's.

The netlist database 124 is implemented as a random access database. The netlist database 124 describes the user's hierarchical netlist and the mapping to the flattened netlist. It is accessed by block during incremental netlist comparison.

The system place and route database 126 describes the flattened netlist and which chip or chips will hold each of the elements in the netlist. It is read entirely into virtual memory when it is opened. Thereafter access is directly from virtual memory. To minimize the swap space and swapping required, the system place and route database 126 is made as small as possible. It contains no more than is necessary for system partitioning and routing, and references to the other sections of the configuration database.

The chip database 128 describes the detailed configuration and timing of each chip. It contains bitstreams and enough other data to allow incremental changes. It is randomly accessed by chip place and route module 112 and by the timing analysis module 114. It supports access to all the place and route module or all the timing data for one chip with one call. It is mid-way between the netlist and system place and route databases in organization and performance.

2.1.3 Timing Driven Configuration

A problem inherent in emulation is that delays do not scale from the user's target technology to the emulation. This is particularly true for routing delays. A net that has only a few nanoseconds delay in the target technology may have anywhere from 0 to about 150 ns. delay in the emulation system 10. The average emulated path has more routing delay than gate delay. The worst paths have much more routing delay than gate delay. A path that is emulated in one logic chip will be quite fast; one that jumps from chip to chip or, worse, board to board will be quite slow. The variation in routing delay between different paths is quite high, even if the paths have the same amount of logic. The opposite is true in most target technologies.

This may create problems with the timing characteristics of the emulation. The emulation will often have quite different timing problems than the target technology. Hold violations occur because of skew in a clock tree. Set-up violations occur because one of the datapaths has a large amount of delay, generally routing delay.

Timing problems are created primarily in the system partitioner 106 and in the chip level place and route system 112 and, once created, timing problems can be difficult to solve.

It should be noted, however, that when the mux architecture of the present invention is utilized, the system router 110 does not affect timing unless it is allowed to split a source onto two or more chip pins. All chip to chip routes have the same delay and all board to board routes have the same delay (except for variations between individual mux chips). Because it is preferred that each configuration work with any emulation module, worst case mux chip timings are assumed. If the system router splits a source onto two or more chip pins then the system level router will increase the skew on the net.

The configuration software of the present invention is directed to avoid hold violations. The optimizer 104 removes buffers and inverters from the clock tree (and all other paths) and transforms gated clock logic from a clock path and adds it to a datapath when possible. The clock tree analyzer 106 extracts and analyzes the clock tree before partitioning. It decides which clock nets to route on low skew hardware and directs the system partitioner 106 and chip place and route module 112 to reduce delays on the rest of the clock nets. If the system level router 110 is allowed to split source pins it will be told not to do so on the clock tree. This eliminates hold violations unless the design has a very complicated clock tree.

When a clock tree is complex, hold violations are eliminated through delay insertion. Delay is generally inserted after the initial configuration. For example, when the timing analyzer 114 finds hold violations, it estimates their magnitude, and delay elements are inserted incrementally.

Emulation speed is improved by reducing system level interconnect delay on the critical paths. This is achieved by using timing driven partitioning algorithms. One of the ways to cause the partitioner 106 to prevent a certain net from being cut is to give that net a higher weight. However, if this mechanism is used on too many nets, the effect on the quality of the partition may become unpredictable or it may become ineffective altogether. Also, for timing purposes, it is the path that is important, not the net itself. Timing driven partitioning attempts to find the critical paths and uses cone based partitioning and path based clustering algorithms to reduce the delays on critical paths.

In addition, timing driven partitioning generates delay budgets to FPGA chip level placement and routing along the critical path portion of the datapaths. By doing this, delays on the critical path can be further reduced.

2.1.4 Incremental Configuration Mode

The goal of incremental mode is to quickly change the configuration in response to small changes in the input. It must also preserve the timing of the emulation as much as possible.

When a change is detected a set of change records are generated. A change record is of the form "delete object" or "add object". Change records are generated by the user interface when a probe or pod is changed, or by the parser 100 when the netlist is changed. The set is then moved through the modules of the configuration system. As the set moves through the system the change records are transformed, both in quantity and type. Initially the change records refer to logical objects in the input netlist. When they get to chip level place and route they refer to specific gates and nets in particular chips.

Incremental configuration uses one module not used in the initial configuration, a netlist comparison module 118. When the parser 100 detects massive changes to a block or netlist file it simply issues a delete record for the whole netlist block or file and issues add records for the objects in the new version. The netlist comparison module 118 is then called to compare the old and new versions. It performs a graph comparison, ignoring all signal and instance names inside the changed object. The netlist comparison procedure generates change records with a finer granularity.

For incremental to work efficiently, it is preferred that copies of the input be stored for comparison. Further, each module should retain the mapping between its input and output so that it can translate delete records properly.

2.2 Detailed Description of Software Architecture

2.2.1 Parser

The parser module 100 is of conventional design and its function is believed to be well-known in the art. For this reason, the function of the parser module 100 will be described only generally.

As shown in FIG. 15, the parser 100 accesses the user netlist and the CAE database (which comprises a number of vendor libraries) and generates a netlist connectivity database 124. The netlist connectivity database 124 comprises a representation of the circuit design to be emulated in hierarchical form (i.e. repeated subportions of a circuit to be emulated are described only once, but may be referenced as many times as necessary). In essence, the parser 100 transforms a "human-readable" description of the circuit to be emulated into a "machine-readable" circuit representation.

2.2.2 Link and Expand Module

2.2.2.1 Introduction

The purpose of the component library linker is to assist the netlist parser in linking undefined components in the netlist to their actual definition which had been stored in a linkable vendor-specific component library.

2.2.2.3 Overview of Linker Operations

The linker 102 is invoked by the parser 100 at the end of the parsing phase to fill in all undefined netlist components definitions. For each of a undefined netlist component the linker is given the component name and the list of component pins. It is assumed that all the undefined components can be located inside the IC vendor-specific component library which is being used to implement the particular netlist design. The linker gives an error message when undefined components cannot be located in the component library.

The linker currently has to provide in-memory NTL to the link and expand module 102 data structure conversion since component libraries generally use NTL data structure and the parser uses the link and expand module 102 data structure.

A hard-coded list of Xilinx primitives is used by the linker to avoid expanding lowest level components.

2.2.2.3 Netlist Expansion

Netlist expansion and tree construction software is the front end of the system internal configurer (QBIC). It is treated here as a separate piece of software, although the software is linked in as part of QBIC. The netlist expansion software is named ELO which stands for Expand, Link and Optimize. However, the software currently does not perform linking and optimization.

There are two main functions which are provided by ELO: construction of a tree from run time ELO data structure built by the parser 100 and incremental change to the tree. Throughout this document the tree will be called QBIC tree.

FIG. 15(a) shows the system box configuration flow. The parser 100 parses the user's netlist and creates a run time ELO data structure. The link and expand module 102 expands the data structure and constructs the QBIC tree which is used by the system place and route module 110. During the incremental configuration stage, the parser 100 generates the link and expand module 102 structure for the modified portion of the design, and the link and expand module 102 updates the QBIC tree and generates a list of changes for the system router 110.

2.2.2.4 ELO Data Structure and QBIC Tree

The link and expand module 102 receives from the parser 100 a list of block definitions (ELO block record). A block record may describe a primitive or a high level component. It has a list of external pins, a list of internal components, and a list of nets describing how the internal components and the external pins are connected. A block record is independent of other block records; that is, a block record contains the complete information describing itself. This list of block records is used to form the QBIC tree.

The QBIC tree is a fully initiated netlist tree where each block reference in the netlist is replaced by a node; that is, every block has one copy in the tree for each initiation in the netlist. The QBIC tree is the primary data structure for the system place and route module 110, CLB mapping system (CMS), and others. The leaves of the tree must be CLB mappable.

The component list and the netlist within an ELO block record are sorted into alphabetical order in order to ensure efficient comparison during incremental change detection. The pin list for an ELO block is not sorted currently, but it may be preferred to sort the list in the future.

ELO data structure and QBIC tree are glop-dumped together since ELO data structure and QBIC tree are linked together.

2.2.2.5 Expand and Form QBIC Tree

Expansion is a simple, recursive process: for a given component, find a netlist description for the component's contents. If there is such a description, add the description to the tree, then recursively descend into the components which were added. The principal work done is (a) pin resolution—matching up the net connected to a pin on the outside of a component with the net connected to the corresponding pin on the inside; and (b) addition of contents (nets and components). This correlates loosely to a macro expansion, where pin resolution is analogous to argument substitution.

For the sake of clean implementation, ELO divides this into two modules. The traversal module, which finds the internal descriptions and does the recursive scan of components, relies on the handler module to build the tree. The handler module provides an abstract interface so that the traversal module has limited knowledge of the tree being built. Each time the traversal module encounters a component, it calls a routine to add the component to the tree, and each time it gets a list of nets, it must be added to the tree. Then, if the current component has netlist contents, the traversal module does pin mapping (setting special correspondence pointers to allow a net in the netlist to figure out what it connects to outside the component) and calls itself recursively.

Umbilicals and hard-cards are treated in a special way, so that the system place and route module 110 can handle them earlier in the partitioning process. The link and expand module 102 currently constructs special lists to umbilicals and hard-cards in such a way that QBIC tree is not disturbed; disturbing the tree would cause a good deal of difficulty in incremental update.

2.2.2.6 Incremental Change

Incremental change detection is done by a piece-by-piece comparison of the changed data versus the original tree. The changed block definitions are compared against all of their initiations in the tree. The link and expand module 102 patches directly to the tree and supplies QBIC with a list of changes made.

For each of the changed pieces, all instances of that piece are compared against the new description. Each component name, and the name and net of each pin on each component are compared. Any difference is recorded in the change list, and the changes performed on the old tree is reflected only within the fields "owned" by the link and expand module 102; other fields are left intact for QBIC. If a pin connection is changed, the new connection must be propagated downward through the tree. This system is also able to handle an addition or deletion of a subtree.

In a topologically sorted list, .ELO keeps track of all the block types that are used..82 The list is ordered according to the maximum depth at which a type appears in QBIC tree. Traversing this list, ELO safely visits each node to update before any of its children.

2.2.2.7 Error Detection

Many design errors are checked by the parser 100. However, there are some errors that the parser does not check at this time. They are: (1) nets with multiple source pins; (2) power/ground nets with source pins; (3) nets that are both power and ground; and (4) multiple tristate buffers driving an external signal. For this reason, the link and expand module 102 checks all the leaves which must be CLB mappable.

2.2.2.8 Performance Estimates

Memory usage for this system is roughly linear, at 0.6 megabyte per kGate for tree construction, and 0.6 mb per Kgate of changed clocks for incremental change. (For purposes of this estimate, a gate is not a "gate-equivalent", but is a leaf in the tree before CLB conversion. Thus, about one CLB for each four-five gates is expected after conversion. A flip-flop is considered a gate, as is any AND/OR/XOR gate which does not have more inputs than can enter a single CLB.) The performance estimate includes only QBIC tree, excluding the expand the data structure.

The run time complexity is nonlinear: for SPARC design, which has an 8 Kgate (2000 CLB), it comes out to be roughly 85 seconds of Sun 3/60 CPU time for tree construction.

2.2.2.9 Additional Discussion

Some incremental changes are very expensive. If the external definition of a block is changed (that is, pin name changes and deletion/addition of pins), the subtree of the block in QBIC tree is completely deleted and recreated.

From QBC that controls the configuration flow in QBIC, the link and expand module 102 receives the list of probe signals. Using the list, the link and expand module 102 marks those signals, and CLB mapping subsystem (CMS) ensures those signals are not embedded in CLBs.

The link and expand module 102 also marks all the bidirectional signals for system place and route system place and route handles those signals specially.

2.2.3 Optimizer

2.2.3.1 Summary Description

During full configuration, the logic optimization module 104 OPT takes a netlist produced by the expand and link module 102, and produces an optimized netlist to be given to the system partitioner 108.

During incremental configuration, the optimization module 104 takes change records for the unoptimized netlist, and produces change records for the optimized netlist.

The optimization module 104 provides utilities for translating net grouping and exclusion and path delay query requests from the original netlist to the optimized netlist and for translating timing analysis reports from the optimized netlist to the original netlist.

Most optimizations can be applied to the netlist independent of any results from downstream software such as partitioning 108 or timing analysis 114. But there are exceptions to this rule: AND-tree optimization and logic duplication should be done as part of partitioning, and automatic hold violation correction requires timing analysis results. The optimization module 104 has a special mode in which it reads a file of commands generated by downstream software. The commands specify modifications of the current optimized netlist. After reading the file, the optimization module 104 modifies the netlist and generates a list of change records. The list of change records can then be processed by the downstream software.

2.2.3.2 Benefits of Logic Optimization

The benefits of logic optimization, in order of importance, are as follows.

1. Clean clock trees. Logic optimization will remove all unnecessary buffers and inverters from clock trees, increasing the chance of an entire clock tree fitting on a single low-skew clock wire, and reducing clock skew even when there are more clock trees than low-skew wires. Optimization also reduces clock skew increases system speed and reduces hold violations. Reducing hold violations increases the likelihood that automatic delay insertion will converge.

2. Automatic Hold Violation Correction. The logic optimization subsystem provides support for automatic hold violation correction.

3. Increasing capacity. Some optimizations (such as Bubble Pushing and AND-tree optimization) increase capacity by reducing the number of system-level wires needed. Some optimizations (such as eliminating unused logic) increase capacity by increasing the amount of logic which can be placed in a chip.

4. More flexibility in modeling. Logic optimization increases the variety of constructs which can be supported in user netlists. For example, the retain-state bus optimization allows a user to specify a retain-state bus simply by attaching a "retain state" property to a net with tristate drivers.

5. Cleaner Code. The logic optimization subsystem provides a uniform framework for allowing a physically implemented netlist to differ from the user's netlist. For example, logic optimization includes low-skew clock splitting, where a special "beefy buffer" is inserted in a low-skew clock net, splitting in into two sets.

2.2.3.3 How Optimization Fits Into the Overall Control Flow

The optimization software module 104 is written assuming the simplest possible control flow:
Optimization (on entire flat netlist)
Partition netlist into board-size pieces
Partition each board into chip-size pieces (splattered)
etc.

This scheme has the virtue of simplicity. But some weaknesses should be considered: (1) it requires optimization data structures in virtual memory for the entire flat netlist at once; (2) optimization may be unacceptably slow; (3) the optimizer does not preserve user hierarchy, so partitioning must be done without any hints provided by user hierarchy. Having optimization data structures for the entire netlist in memory is risky, since size estimates indicate that the optimization data structures for a 300 K gate netlist will barely fit on a 128 MByte machine (at best a 3X or 6X safety factor depending on the implementation method, which might degrade to 2X, 1X or less).

An alternative control flow is the following:
Global optimization (clean clock tree, and possibly tristate optimization);
Partition netlist into board-size pieces;
Optimization of board-size pieces (splattered);
Partition into chip-size pieces (splattered);

This scheme splatters most of optimization, saving time and some memory space.

The disadvantages of this scheme are (1) it is more complex; (2) some of the capacity-increasing effect of optimization is lost, since partitioning is done prior to optimization; (3) when a tristate wire spans multiple partitions, a complex fix-up in the system-level wiring may be required; and (4) incremental changes in globally optimized structures may be difficult to support.

A third scheme is as follows:
Design is split into separate file by user;
Parse and expand, generating a top netlist, and a sub-netlist for each user file;
Tile the subnetlists into board-size pieces;
Optimize and partition each board-size piece;
Global optimization (low-skew clocks, tristate busses);
APR each piece.

An important objective of this scheme is to support "modular compile": configuration produces a chip set for each board-size piece; when the user changes a file, only the chip set for that file's board needs to be processed.

Presently, the first scheme with optimization before partitioning is preferred.

2.2.3.4 Feedback from Downstream Software

Most optimizations can be applied to the netlist independent of any results from downstream software such as Partitioning or Timing Analysis. But there are exceptions to this rule: AND-tree optimization and logic duplication must be done as part of partitioning, and automatic hold violation correction requires timing analysis results. The optimization module 104 has special modes in which it reads a file of commands generated by downstream software. The commands specify modifications of the current optimized netlist. After reading the file, the optimization module 104 modifies the netlist and generates a list of change records. The list of change records can then be processed by the downstream software.

Instead of using files for communication from downstream software to the optimization module 104, in-memory lists could be used. The advantage of using files is that it allows the downstream software to be in a different process from the optimization module 104.

2.2.3.4.1 Automatic Hold Violation Correction

Whenever a configuration is done, if the user has enabled automatic hold violation correction, the timing analyzer is run and a file of (instance name, delay) pairs for hold-violation correction is generated. If corrections are needed, the optimization module 104 is then called in a special delay insertion mode. In this mode, the optimization module 104 reads the file and makes the requested changes in the current optimized netlist.

Then the netlist is incrementally reconfigured. The process continues until no more corrections are needed.

When called in delay insertion mode, the optimization module 104 expects a file named autodelay in the qtd directory containing entries of the form:

block_name number_of_delays where block name is the instance name of a D latch or D flip-flop in the optimized netlist, and number_of_delays is the number of qt_delay blocks to be inserted in front of the D input of the latch or flip-flop. The optimization module 104 reads the file, modifies the netlist (treating the changes as further optimizations), builds a list of change records, and returns. At this point the downstream software can be called in the normal way for an incremental configuration.

2.2.3.4.2 AND-tree Optimization

Figure 18:
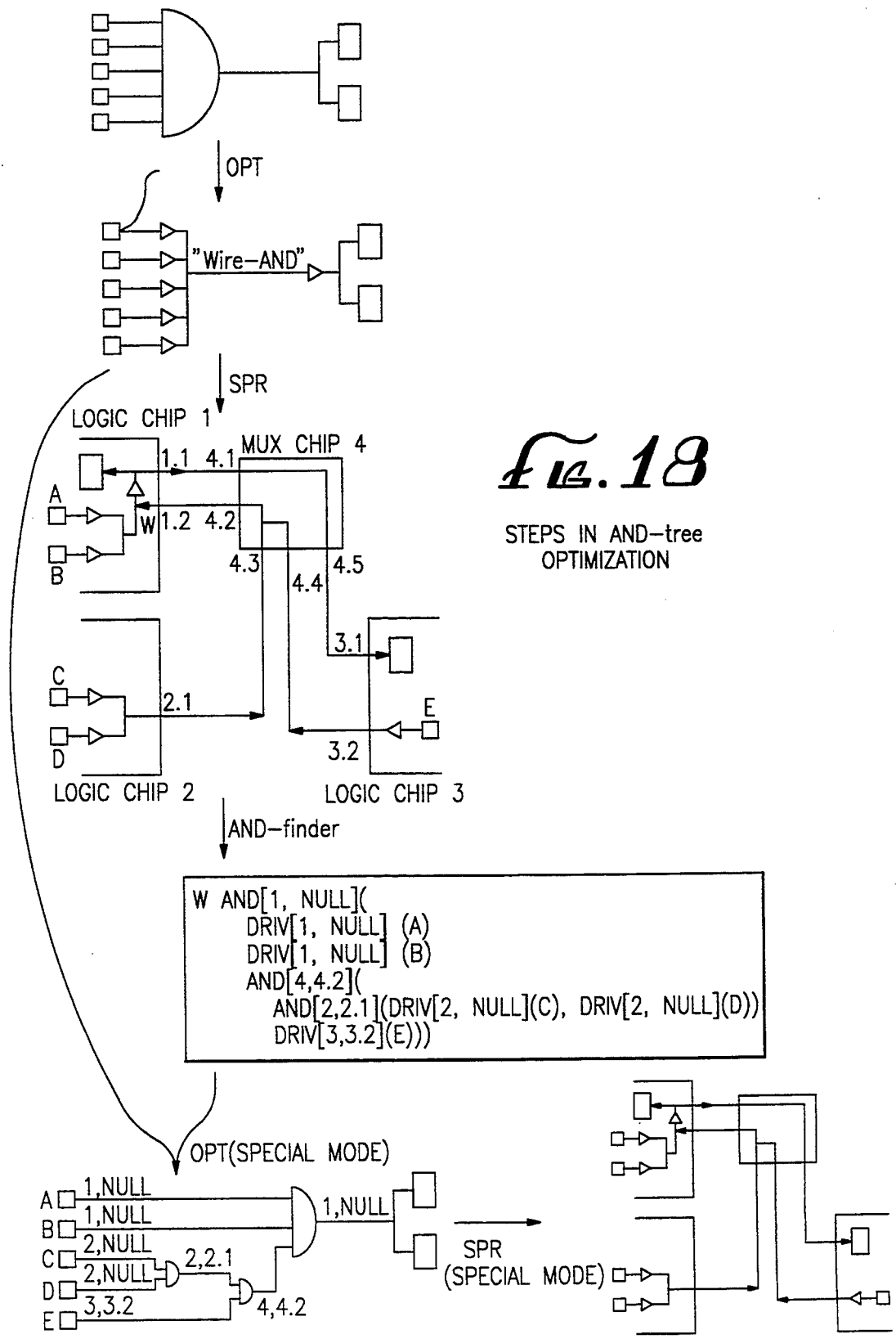
FIG. 18 illustrates a plurality of steps in AND-tree optimization.

As shown in FIG. 18, AND-Tree optimization is performed by collapsing any AND-trees into single large AND gates, and replacing each AND-gate by a structure consisting of a (non-blastable) buffer for each input, a net with a "Wire-AND" property, and an output buffer. System partitioning and routing is then done. After routing, an "AND-finder" routine analyzes the router's data structures and produces a file named and-tree in the qtd directory containing entries of the form net expr where net is the instance name of a Wire-AND net, and expr is an expression describing the AND-tree which should replace the net and its input and output buffers. The expression is built according to the grammar.

```
expr =
    DRIV[c,cp muxlist](b)
    AND[c,cp muxlist](exprlist)
exprlist =
    expr
    expr, exprlist
muxlist =
    (empty)
    c,cp
``` where each b is the instance name of a block driving the original AND, each c is the name of a (logic or mux) chip, and each cp is the name of a (logic or mux) chippin. DRIV[c,cp](b) describes block b on chip c whose output is connected to chip pin cp (possibly null). AND[c,cp](exprlist) describes an AND gate on logic chip c whose output is connected to chip pin cp (possibly null), and whose drivers are described by exprlist. A non-empty muxlist is used when the output of a driver block or AND gate is fed through one or more mux chips (without further ANDing) to another logic chip.

After AND-finder has produced the file just described, the optimization module 104 is called in a special Wire-AND-removal mode. When called in this mode, optimization module 104 reads the file and removes the Wire-AND net and the input and output buffers, replacing them with an AND-tree. It treats these changes as further optimizations in the netlist. It annotates each AND block, and each block that was driving the original AND, with the appropriate list of values [c, cp, . . . ]. It builds a list of change records for the netlist changes it has made and returns.

Next, the system place and route module 112 is called in wire-AND-removal mode. When called in this mode, the system place and route module 112 takes the list of change records, reads the c,cp, . . . ]attributes describing the placement of each block and the routing of its output net, and fills in the appropriate fields in the netlist data structures.

At this point the normal flow of full configuration can resume. APR would be called as in an ordinary full configuration.

The motivation for this complex control flow (optimization to system place and route to special-optimization to special-system place and route to APR) is as follows.

After the system place and route module 112 has routed the wire-AND net, the wire-AND net in the netlist is replaced by an ordinary AND-tree.+ But only the optimization module 104 is allowed to make netlist modifications.

After special-optimization has modified the netlist, the place-and-route data fields of the newly created netlist are updated. But only the system place and route module 112 is allowed to update these fields.

2.2.3.5 Inputs and Outputs for Optimization

2.2.3.5.1 Full Configuration

During full configuration, the input data for the optimization module 104 consists of netlist data, including connectivity, block types, block and net pathnames, net weights and net low-skewness.

information about user-defined-clusters (if any).

The netlist data can be represented using the following data types and attributes.

The idea of "relationship" is as follows:

A many-to-one relationship from type T1 to type T2 is written T1>T2. Such a relationship assigns to a given T1 object at most one T2 object, The operations normally needed are (1) given a T1 object, find its T2 object (if any), (2) given a T2 object, visit each of its T1 objects. If these are the operations needed, then a reasonable implementation is to have each T1 object have a pointer to its T2 object, and have each T2 object have a pointer to its first T1 object, with a thread in the T1 objects linking the T1 objects of a given T2 object in a list (perhaps a circular list).

Other implementations are possible, depending on the operations needed. If only one of the two operations mentioned above are needed, one can delete either the T1>T2 pointer or the T2>T1 pointer and the thread linking the T1 objects. One can

```
netlist
net
      string pathname
      int weight
      boolean lowskewness
block
      string pathname
blocktype
      string name
pin
pindata
      string name
      (input, output, bidi) direction
``` and the following relationships
  block→netlist
  block→blocktype
  net→netlist
  pin→block
  pin→net
  pin→pindata sometimes save space by using a variable-length array for the T1 objects associated with a given T2 object. (This allows the thread pointers in the T1 objects to be eliminated). If one needs to rapidly get from a T2 object to its T1 object of a given name, one can replace the pointer from a T2 object to its first T1 object by a pointer to a hash table containing pointers to T1 objects. In this case, instead of having a thread linking all the T1 objects of a given T2 object, we have a thread linking the T1 objects of a given bucket.

A one-to-one relationship from type T1 to type T2 is written T1<T2. Such a relationship consists of a set of (T1 object, T2 object) pairs in which no T1 or T2 object occurs more than once. The operations normally needed are (1) given a T1 object, find its T2 object (if any), and (2) vice-versa. A simple implementation is to have each T1 object have a pointer to its T2 object and vice-versa.

A many-to-many relationship from type T1 to type T2 is written T1–T2. Such a relationship consists of an arbitrary set of (T1 object, T2 object) pairs. The operations normally needed are: given a T1 object, find all the corresponding T2 objects, and vice-versa. A many-to-many relationship can be implemented by defining a third type T3 with many-to-one relationship T3>T1 and T3>T2. A T3 object for each (T1 object, T2 object) pair in the relationship is provided.

Probes, pod pins, and hardcard pins are represented using one-pin blocks similar to the umbilical blocks and hardcard-pin blocks in the current software. The block type distinguishes between probe blocks, umbilical blocks, and hardcard-pin blocks. The pindata for the one pin determines whether the pin is input, output or bidirectional.

The user may specify that particular subsets of the blocks in the original netlist be kept on one board, or on one chip. This data can be represented using the following additional types top
   board
   chip and relationships board→top
   chip→board
   block→chip There is a "dummy" board used as a header for the user-specified chips which are not part of any user-specified board. This makes it possible to traverse all the chips by traversing all the chips of all the boards. On each board there is a "dummy" chip used as a header for the blocks which are not assigned to any user-specified chip.

The output from the optimization module 104 consists of an optimized netlist with nearly the same attributes as in the original netlist. The only differences are (1) instead of a pathname, a block or net has a non-user-meaningful name, (2) if a "debug" environment variable is set, each block or net also has a meaningful name which relates it to the original netlist, (3) each net has a boolean "is Wire AND" attribute, and (4) each block may have a list of string attributes [c,cp, . . . ] used to communicate place and route information from the optimization module 104 to the system place and route module 110 during wire-AND removal as described earlier.

information about user-defined-cluster (if any). There is a user-specified board or chip for each user-specified board or chip associated with the original netlist (including dummy ones). The blocks of the optimized netlist are assigned to user-defined boards or chips when it is clear what the best assignment is; for a block where the best assignment is not clear, the block is assigned to a dummy chip.

A PDQ pin mapping relationship pin→pin mapping each pin in the original netlist to its corresponding pin (if any) in the optimized netlist. This relationship is used in the forward direction for PDQ query translation. If logic optimization is implemented using optimization areas then this relationship is also used in the reverse direction for timing analysis report translation. If the pieces-of-paper implementation of logic optimization is used, then it is possible to do a better job of timing analysis report translation than can be done by this pin mapping. In this case, the optimization module 104 provides a routine which takes a path (sequence of pin names) in the optimized netlist, and produces a path in the original netlist.

A net mapping relationship net-net mapping each net in the original netlist to its corresponding nets in the optimized netlist. This relationship is used in the forward direction for translating Net Grouping and Exclusion requests.

2.2.3.5.2 Incremental Configuration

In the presently preferred system software, incremental expansion and linking takes a list of changed elo— blocks, and completely updates the QBIC tree, removing from it any blocks, nets, and pins which are no longer needed, and adding to it any new blocks, nets, and pins which are needed. (The only part of tree updating not done by the expand and link module 102 is to update the thread by which the pins of a net are reached from the net; this updating is done by the system place and route module 110.) The removed records are not freed, and most of their fields are left intact. For example, a deleted pin still points to its net and its block, a deleted block still has its bin x, y and z coordinates, etc. As it is updating the QBIC tree, incremental expansion and linking builds a list of change records (add and delete) containing pointers to the objects which have been added to or deleted from the tree. After the expand and link module 102 finishes updating the tree, the list of change records is given to increment the system place and route module 112.

The change records are of the following types:

Add disconnected block (not connected to any net)
Delete disconnected block
Add disconnected net (containing no pins)
Delete disconnected net
Add pin to net (a pin is regarded as permanently connected to its block)
Delete pin from net
Add probe
Delete probe The ordering of the list of change records passed from the expand and link module 102 to the system place and route module 110 is considered insignificant. The system place and route module 110 processes all deletions first, then all additions.

During incremental configuration, both the interaction between the link and expand module 102 and the optimization module 104 and the interaction between the optimization module 104 and the system place and route module 110 follows the approach set forth below:

The expand and link module 102 updates the original netlist, leaving disconnected objects with their fields intact, and building a list of change records with pointers to the added or deleted objects (blocks, nets, or pins—probes no longer need special change records).

The optimization module 104 updates the optimized netlist, leaving disconnected objects with their fields intact, and building a list of change records to the added or deleted objects. In addition to updating the netlist, needs to update the auxiliary information (user-defined clusters, pin mapping, etc.).

For both lists of change records the order will be considered insignificant.

2.2.3.6 Rules of Optimization

2.2.3.6.1 Modeling of Tri-State Nets (Tri-State Optimation)

Figure 19R:
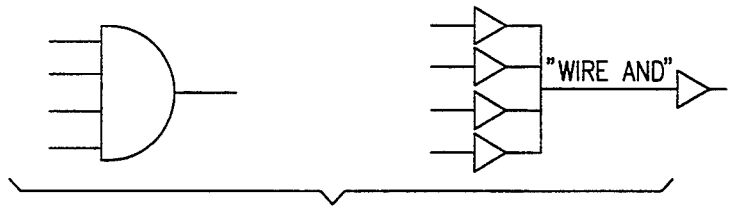
FIGS. 19(a)-(v) illustrate a plurality of rules utilized by the optimization module in accordance with the present invention.
Figure 19S:
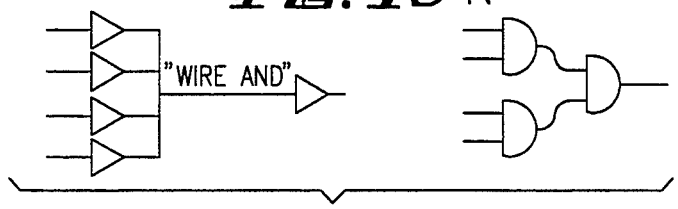
Figure 19T:
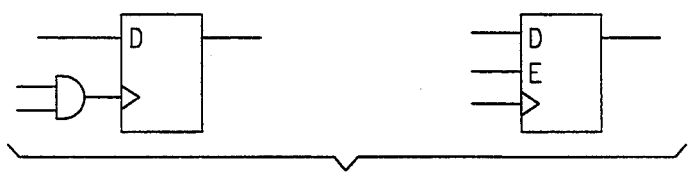
Figure 19U:
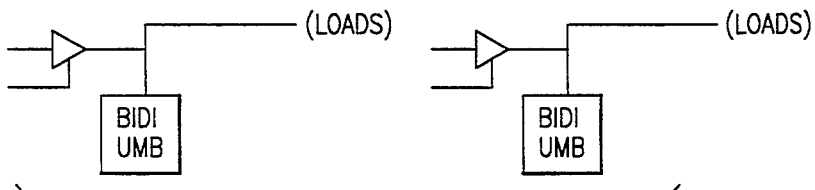
Figure 19V:
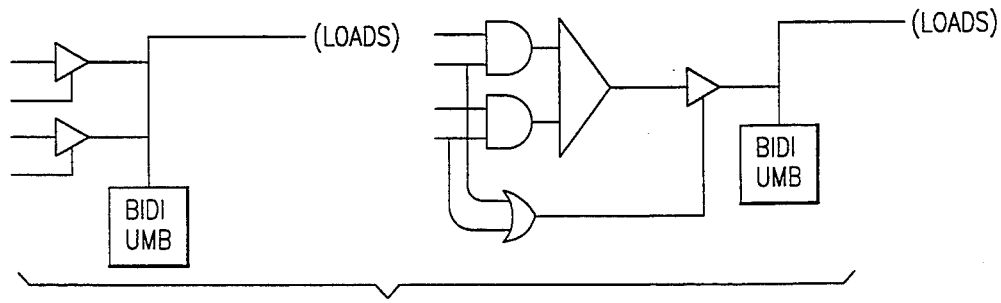

The rules are shown graphically in FIGS. 19(a)–(v). The rest of this section discusses the individual rules.

The simplest class of nets—nets contained within a single emulation system are implemented in logic as a sum-of-products. The use of logic to implement tri-states supports unlimited drivers on a single net. The original approach, which used the Xilinx internal tri-state capability, limited the number of tri-states on a single net to 17.

In FIGS. 19(a)–19(v) the logic on the right is equivalent to the tri-state net on the left. The tri-state net on the left is understood to be high unless it is actively driven low by one of the drivers. The above implementation works as follows:

The NOR gate generates a 0 if one of the tri-state drivers would have driven a 0, otherwise it generates a 1.

This logic implementation of tri-state nets eliminates the possibility of net contention damaging the drivers.

Figure 34:
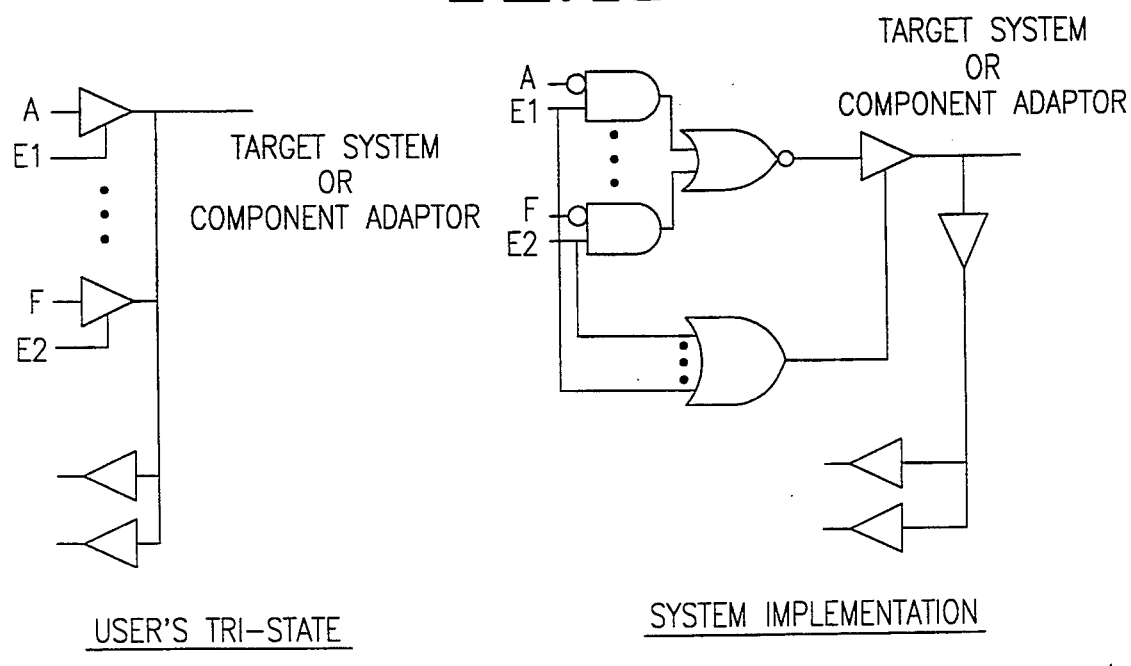
FIG. 34 is a second example of a user's tristate net and a functionally equivalent system implementation.

2.2.12.2 Implementing a Tri-State Net with Bidirectional Connections to Target System or Component Adapter As shown in FIG. 34, a greater level of complexity is introduced by a tri-state net with a bi-directional connection to the target system or a component adapter. This type of net is implemented as logic just like the previous one. Some additional logic has been added to ensure that the target system is driven by the system 10 only when appropriate and to allow the target system to drive the system 10.

The added logic prevents the output flow driving the target system when none of the corresponding tri-states are driving. A buffer is inserted between the target system and any internal loads. Single tri-state drivers are implemented directly as tri-states within the system.

2.2.12.3 Implementing a "Retain State" Tri-State Net

Figure 35:
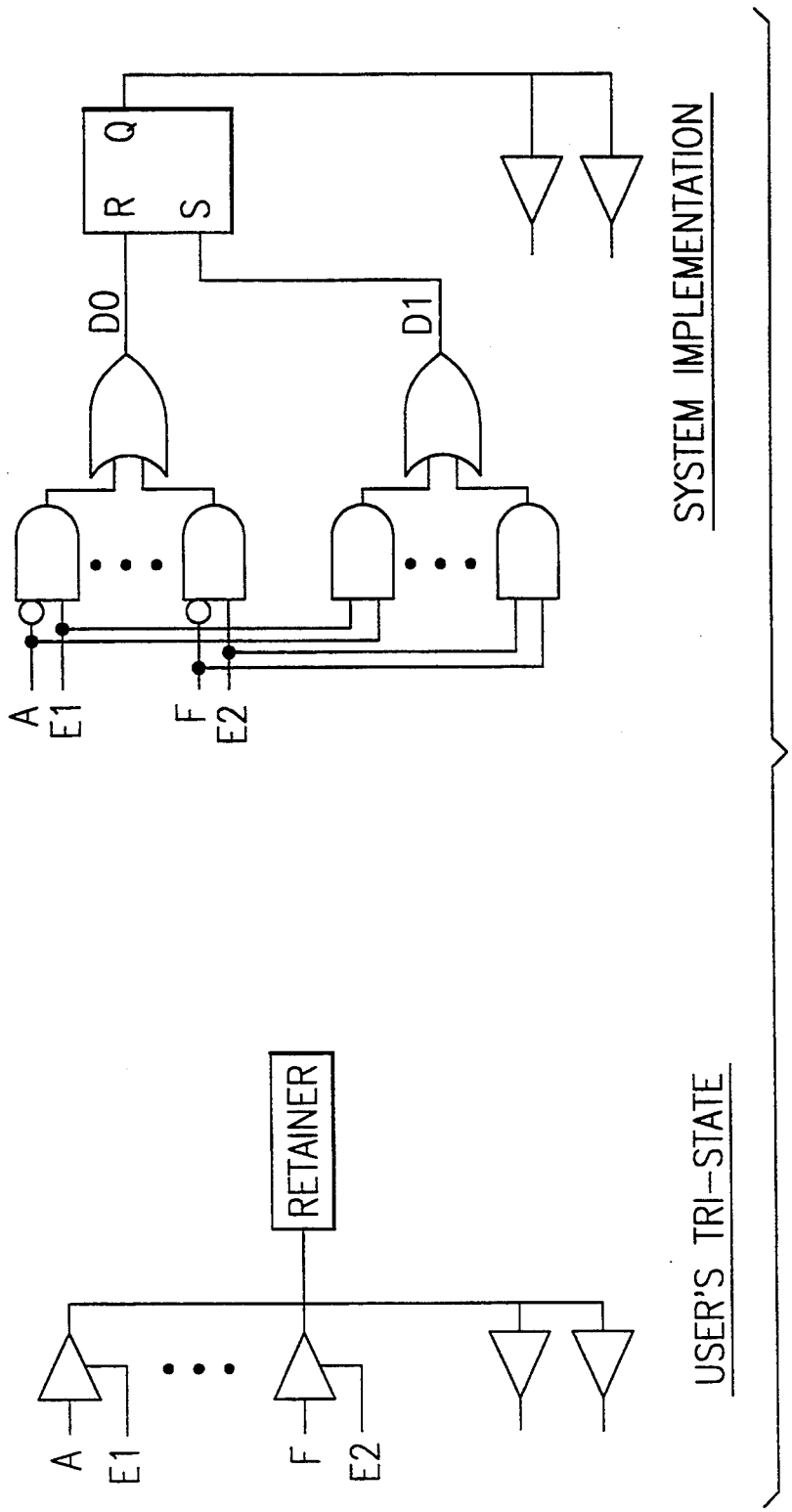
FIG. 35 is a third example of a user's tristate net and a functionally equivalent system implementation.

Turning to FIG. 35, a "Retain State" net holds the last value when all drivers are disabled. Any newly enabled driver overrides the net with the new value.

This implementation uses an RS latch to retain the last state when the net is not driven. This configuration works as follows:

1. The upper sum-of-products logic generates a "somebody is driving a 0" signal which is labeled d0. The d0 signal resets the RS latch if any of the drivers were actively driving a 0.
2. The lower sum-of-products logic generates a "somebody is driving a 1" signal which is labeled d1. The d1 signal sets the RS latch if any of the drivers were actively driving a 1.
3. If none of the drivers is actively driving the net, the latch retains the last state.

This represents an advantage over conventional systems which required that all retain state nets connect to an interconnect module and that timing information be manually specified.

Figure 36:
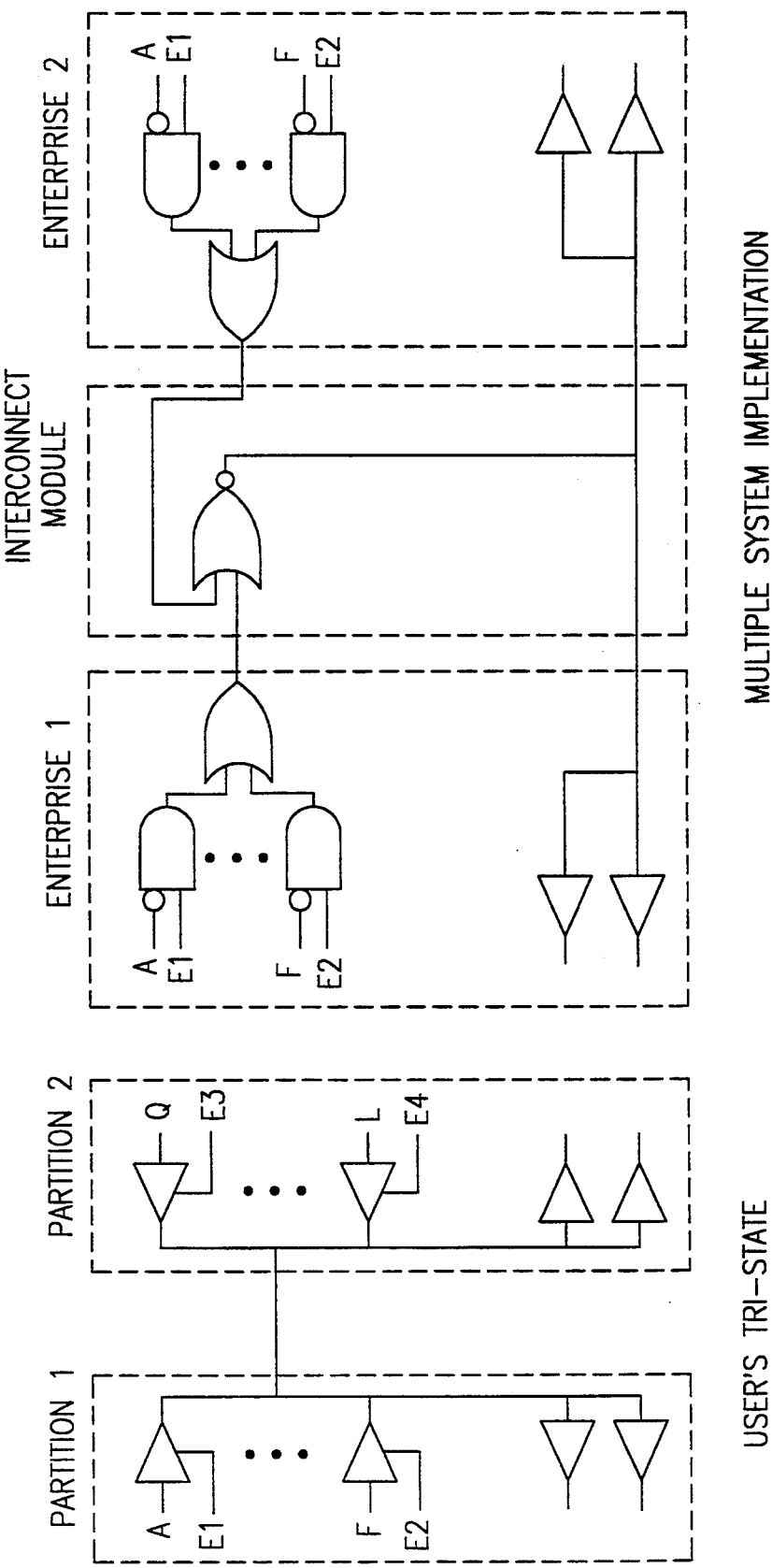
FIG. 36 is a fourth example of a user's tristate net and a functionally equivalent system implementation.

2.2.12.4 Implementing a Tri-State Net that is Routed Through Multiple Systems A greater level of complexity is introduced when a tri-state net runs through multiple systems. If the inter-system net is only tristate, it is implemented as shown in FIG. 36 and described below:

The inter-system tristate net is constructed by:
1. Sum-of-product logic in each system that generates a single "somebody is driving a 0" signal.
2. Each system that contains a segment of this net sends its "somebody is driving a 0" signal to a central interconnect module.
3. A NOR gate in the interconnect module generates a 0 if a segment within any system is driving a 0, otherwise it generates a 1.
4. Any system containing a segment of the net may also have loads on the net. The interconnect module distributes the output to loads in any system.

Figure 37:
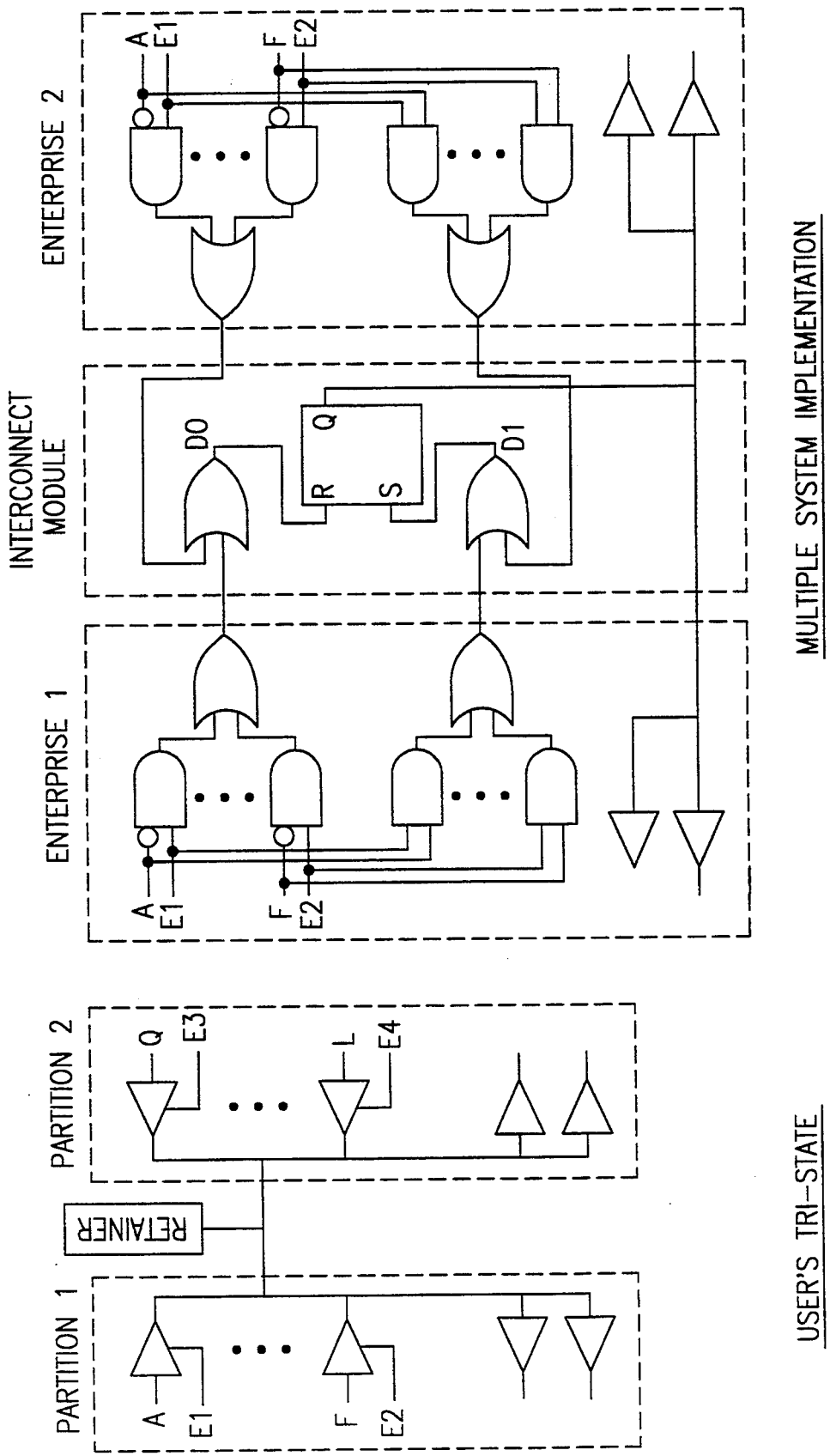
FIG. 37 is a fifth example of a user's tristate net and a functionally equivalent system implementation.

2.2.10.5 Implementing a "Retain State" Net that is Routed Through Multiple Systems The "retain state" net that passes through multiple systems is the most complex tri-state net configuration. It is handled as shown in FIG. 37.

The retain state net that passes through multiple systems is implemented by combining previous implementation techniques. The intersystem retain state net is implemented as follows:

1. Each system the net passes through generates "somebody is driving a 0" and "somebody is driving a 1" signals, d0 and d1 respectively.
2. Each system that the net passes through sends its do and d1 signals to the interconnect module.
3. All d0 signals are ORed in the IM. The output of the OR gate is connected to the reset. The reset input will be activated if the net segment in any input of an RS latch. The system is being actively driven low, forcing the latch output low.
4. All d1 signals are ORed in the IM. The output of the OR gate is connected to the set input of an RS latch. The set input will be activated if the net segment in any system is being actively driven high, forcing the latch output high.
5. If there is no net segment being driven to a 0 or a 1, the RS latch holds on to the previous net state.
6. The IM distributes the output of the latch to any system that contains loads for the net.

2.2.3.6.1 Buffer Blasting

As shown in FIG. 19(a), whenever a buffer (QTX3090BUF) occurs, it can be removed, merging the input and output nets. The main benefit of this is in clock-tree cleaning. By merging nets both nets are allowed to use the same low-skew clock line. Outside of clock tress, there is probably little benefit in this rule, since buffers will usually be absorbed into combinational logic.

2.2.3.6.2 Double-inverter Blasting

As shown in FIG. 19(b), whenever two inverters are connected in series by a two-pin set, the inverters and the connecting net can be removed, merging the input and output nets. The main benefit is in clock-tree cleaning.

2.2.3.6.3 Bubble Pushing

As shown in FIG. 19(c), whenever an inverter drives multiple loads, the inverter can be deleted, putting instead an inverter in front of each load.

Bubble pushing has two main benefits.

Bubble pushing helps clean clock trees by moving all the inverters to the leaves so that they can be deleted by double-inverter blasting or absorbed into CLBs by CLB clock inversion.

In general, bubble pushing helps save system-level routing. If a signal X and its complement are both needed on two different chips, then by routing only X to each chip and complementing locally, we save a system-level net.

Pushing an inverter can have a positive, zero or negative cost in terms of CLB usage, depending on whether the inverter can be absorbed into other combinational logic before or after the pushing operation. On the average, the CLB cost is pected to be positive but small.

2.2.3.6.4 CLB Clock Inversion

As shown in FIG. 19(d), when an inverter drives the clock input of a flip-flop or preconfigured CLB, the inverter can be removed and the "inverted" attribute of the clock pin toggled. The benefit of this is that the inverter is in the same CLB as the flip-flop. Avoiding an inter-CLB net reduces clock skew.

2.2.3.6.5 Eliminating Unused Logic

Turning to FIG. 19(e), this optimization increases capacity by increasing the amount of logic that can be put on a chip.

Xilinx Tech Mapper already eliminates unused logic. However, this gives little benefit in capacity, because the partitioner does not know in advance how much logic will be eliminated on a chip, and so it must pessimistically assume that no logic will be eliminated. (But note that if in a particular design style or library there are consistently a large number of small pieces of unused logic, then the unused logic will tend to be evenly spread across chips and the user can effectively take advantage of unused logic elimination by increasing the CLB usage parameter.)

2.2.3.6.6 Ground (or Power) Splitting

As shown in FIG. 19(f), if a net is connected to ground or power and drives more than one load, it can be split so that a separate ground or power net drives each load. This will save system wires if the loads end up on different chips. If the loads end up on the same chip, then it can be left to Tech Mapper to combine the nets back together to save CLB's, if that is appropriate.

And (1,x)=x (similar rule for Or).
And (0,x)=0 (similar rule for Or).

2.2.3.6.7 Pulldown Bus (similar rule for Pullup Bus).

FIGS. 19(g) and 19(h) illustrate pulldown bus and pullup bus conversion. This rule replaces a pulldown bus by an OR-of-ANDs structure. Used in conjunction with the OR Demorganization and AND expansion rules described below, this rule allows very efficient implementation of tristate busses.

2.2.3.6.8 Retain-State Bus

Transformation of a retain-state bus is illustrated in FIG. 19(j).

2.2.3.6.9 Automatic Delay Insertion

As shown in FIG. 19(k), the optimization modeule 104 is able to read a file of (instance, pathname, delay) pairs and insert delays at the appropriate places in the flat optimized netlist.

2.2.3.6.10 Low Skew Clock Splitting

Low skew clock splattering is shown in FIG. 19(l). This optimization splits a low skew clock net into two nets separated by a special "beefy buffer". The beefy buffer is physically on the backplane, not on a logic chip. system place and route will need to know the special status of this beefy buffer so that it does not attempt to place it in a logic chip.

2.2.3.6.11 Common Subexpression Elimination

Common subexpression elimination, as shown in FIG. 19(m), increases capacity.

2.2.3.6.12 Logic Duplication

As shown in FIG. 19(n), logic duplication is the opposite of common subexpression elimination. It can sometimes reduce the amount of system level routing needed. For example, a particular signal may be needed in several chips. If the inputs to the logic generating the signal are already available in each chip, the logic can be repeated in each chip and the system level wire removed.

This optimization can only be done during or after partitioning. To do this optimization a feedback mechanism from the downstream software is needed.

2.2.3.6.13 AND Expansion

As shown in FIG. 19(o), if the gates driving two inputs of a four-input AND gate are on one chip, and the gates driving another two inputs are on another chip, AND the first two inputs in the first chip, and AND the second two inputs in the second chip, and AND the resulting signals in a mux chip. However the decision to break the four-input AND this way can only be made during or after partitioning. To do this optimization we will need a feedback mechanism from the downstream software.

One method for implementing AND expansion is for OPT initially to turn AND gates into Wire-AND structures. Then after system partitioning and routing, a postprocessor can analyze the implementation of the Wire AND and send feedback to OPT turning the Wire AND into a normal AND tree. This is the reason for the Wire AND rules given below.

An alternative method is to simply have system partitioning and routing break AND gates into trees, and feedback the breakup. With this approach, we do not need the Wire AND rules.

2.2.3.6.13 AND Collapsing

As shown in FIG. 19(p), if a user builds an AND tree AND(AND (A,B),(AND(D,C)) but the drivers of A,C end up on one chip and those of B,D end up on another chip, it is preferred to rearrange the tree to AND-(AND(A,C),AND(B,D)). A simple way of doing this is to collapse every AND tree into a single large AND, and then use AND expansion as described earlier.

AND collapsing and the tristate bus optimizations (pullup, pulldown and retain-state) require AND and OR primitives with arbitrary numbers of inputs.

2.2.3.6.15 OR Demorganization

As shown in FIG. 19(q), we can use the AND capability in the mux chip to implement OR, by using Demorgan's Law to implement OR using AND and inverters. Likewise, it is desirable to split NAND into AND and INV, and split NOR into OR and INV.

2.2.3.6.16 Wire AND Generation

See the discussion of AND-expansion above and FIG. 19(r).

2.2.3.6.17 Wire AND Removal

See the discussion of AND-expansion above and FIG. 19(s).

2.2.3.6.18 Remove Gated Clock

As shown in FIG. 19(t), when the clock input of a flip-flop is fed by the AND of a clock signal and a gating signal which is known not to change while the clock is high, the flip-flop and AND can be replaced by a flip-flop with an "enable", with the gating signal fed to the enable and the clock signal fed to the clock. For designs where gated clocks are used extensively, this optimization reduces timing problems by allowing all clocks to be on low-skew wires.

It is likely that many of the designs which benefit from Datasync would benefit from gated clock removal. The advantage of gated clock removal over Datasync is that gated clock removal has no speed penalty.

The danger with gated clock removal is that the user may tell us that the enable signal has the required timing property even though it really does not.

It is possible to use the timing analyzer to check the assumption that the gating signal never changes while the clock is high. The check is done "after-the-fact": gated clocks are removed, configuration is done, and finally the validity of the gated clock removal is checked. To make sure the gating signal only changes while the clock is low, a setup requirement is established for enable vs. clock rising edge, requiring the enable transition to be before the clock rising edge, and a hold requirement for enable vs. clock falling edge, requiring the enable transition to be after the clock falling edge.

2.2.3.6.19 Bidirectional Umbilical (Single Driver)

As shown in FIG. 19(u), when a user's design has an umbilical tristate bus with no pullup or pulldown, we need to use the tristate IOB of a mux chip. If there is only one tristate driver on the net, we use the rule shown in the Figure. If there are multiple tristate drivers on the net, there is a problem described below. Umbilical nets are not allowed to be retained state busses.

2.2.3.6.20 Bidirectional Umbilical (Multiple Drivers)

As shown in FIG. 19(v), when a user's design has an umbilical tristate bus with no pullup or pulldown and multiple drivers, we can use this rule. However, the resulting circuit has a disadvantage that it can produce glitches. If a tristate buffer is driving a 1, and then its enable turns off, the output from the system may temporarily drive a 0 before it stops driving. If the bus in the user's target system has a retainer, it will retain the wrong value.

2.2.3.7 Gated-Clock Optimization in FPGA Technology Mapping

2.2.3.7.1 Introduction

A number of research efforts in the area of synthesis for table-lookup FPGAs have focused on achieving better capacity and faster operating speeds. However, the problem of obtaining timing-correct mapping (free of hold-time violations) of a design to an FPGA has received less attention.

Gated clocks are a major source of clock skew and hold-time violations in circuit designs. It is even more so when designs are mapped to FPGAs by automatic tools, because of the longer routing delays and unpredictable timing in FPGAs.

Flip-flops with clock enables provide an alternative to gated clocks for avoiding hold-time violations. This section describes an algorithm that analyzes arbitrary clock-path logic and transforms gated clocks to clock-enable logic if the transformation preserves functional equivalence. The algorithm uses an event-driven simulation technique to determine whether a candidate gated clock can be replaced.

One application of this approach is in computer-aided prototyping, which automatically maps designs into multiple FPGAs.

2.2.3.7.2 Concept

Designs containing gated clocks are not well-suited for FPGA implementation because each flip-flop in the design is clocked by a different gated-clock signal and the large clock skews due to FPGA routing can cause hold-time violations. The clock-enable scheme is better suited for FPGAs because many flip-flops can be clocked by a single clock signal; FPGAs usually have low-skew clock nets for distributing these clock signals.

Figure 54A:
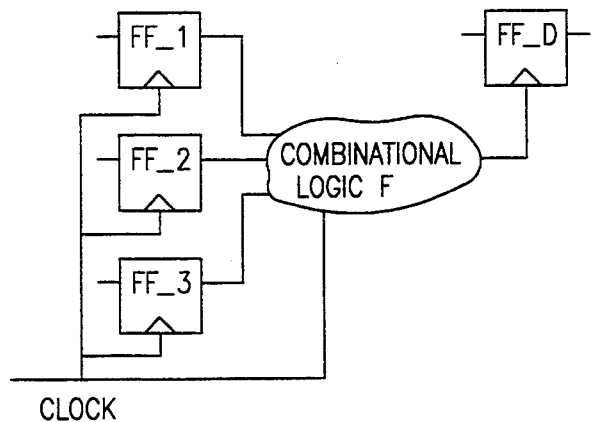
FIGS. 54(a)–(c) illustrate gating clock optimization.
Figure 54B:
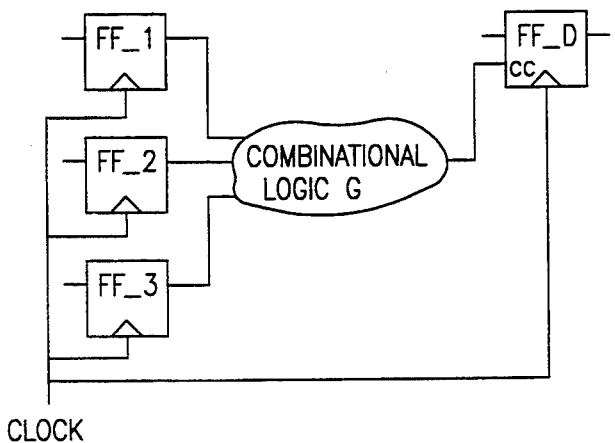
Figure 54C:
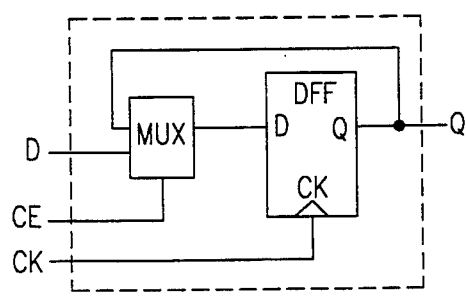

The general form of the transformation applied to each gated clock is shown in FIGS. 54(a)–54(c). A functional-equivalence-preserving transformation of the form shown in FIG. 54(a) might not always exist. However, it will exist if the clock path logic CK=F(CLOCK, q1 ... qn) is clock-gating logic, not clock-generation logic. By this we mean that the logic F and the timing of the signals CLOCK, q1 ... qn are such that the transitions of the output clock CK are caused by transitions of the input clock CLOCK, and never by transitions of the gating signals q1, ... qn. The only function of clock-gating logic is to transmit, or not transmit, the transitions of the input clock according to the current values of the gating signals.

FIGS. 55(a)–55(e) and 56(a)–56(c) show examples of clock gating logic and clock generation logic, respectively.

Figure 55A:
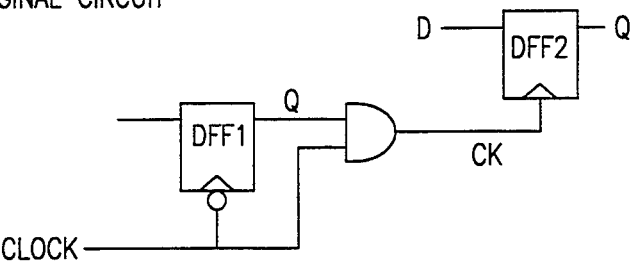
FIGS. 55(a)–(e) provide an example of clock gating logic.
Figure 55B:
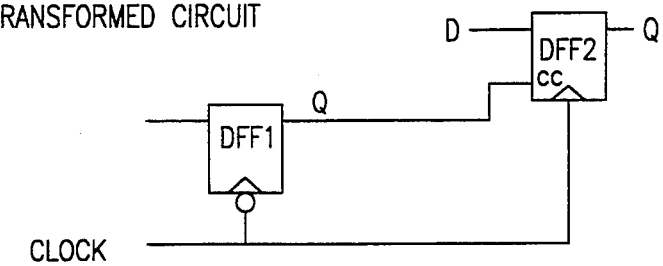
Figure 55C:
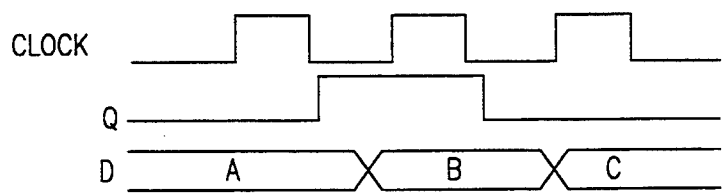
Figure 55D:
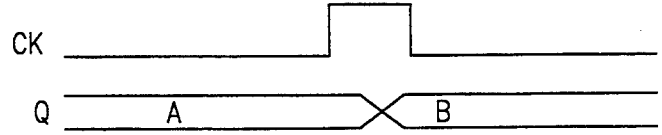
Figure 55E:

In FIGS. 55(a) and 55(c), signal q changes in response to a falling edge of CLOCK. Therefore, q changes only when CLOCK is 0, and the AND gate never transmits a transition of q. The circuit can be transformed to the one in FIG. 55(b) preserving functional equivalence.

Figure 56A:
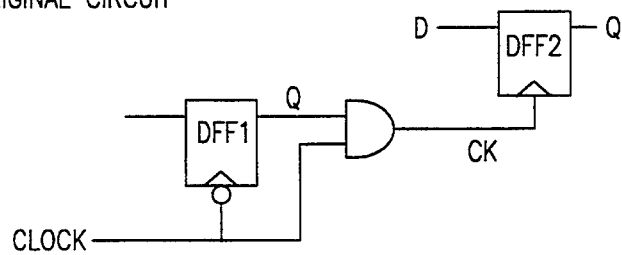
FIGS. 56(a)–(e) provide an example of clock generation logic.
Figure 56B:
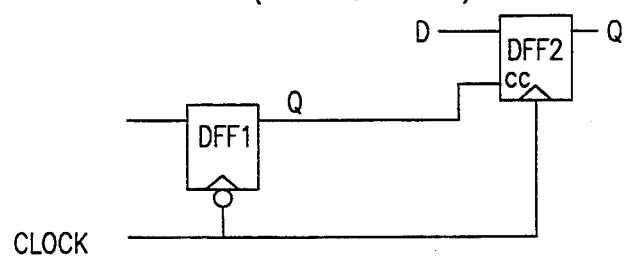
Figure 56C:
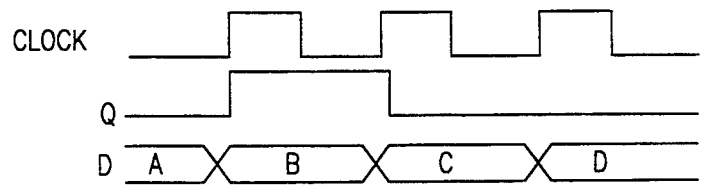
Figure 56D:
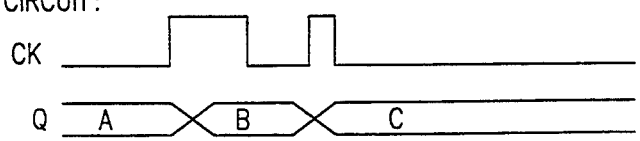
Figure 56E:
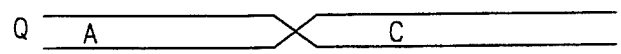
Figure 58:
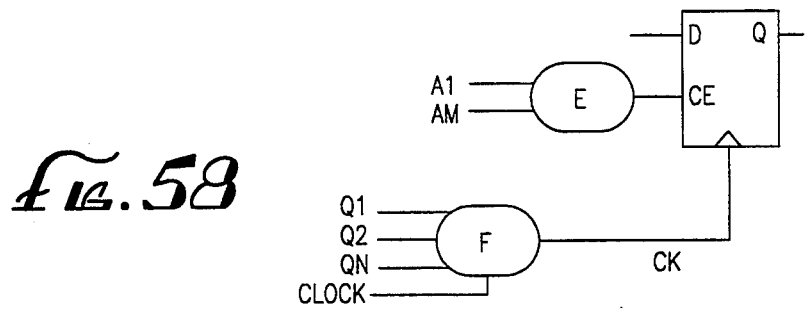
FIG. 58 illustrates a gated clock circuit.

In FIGS. 56(a) and 56(c), signal q changes in response to a rising edge of CLOCK. Thus, q changes when CLOCK is HIGH, and changes in CLOCK can propagate through the AND gate causing changes in CK. If the circuit is transformed to the one in FIG. 56(b), then functional equivalence is not preserved. In the transformed circuit, transitions in q do not propagate to the flip-flop's clock input. An input for which the two circuits behave differently is shown in FIGS. 56(d) and 56(e).

FIGS. 57(a)–57(c) show the general form of gated-clock transformation in more detail. The original circuit, shown in FIG. 57(a), has a flip-flop whose clock input CK is generated by combinational logic F from a clock signal CLOCK and other signals q1, ... qn that are direct outputs of flip-flops.

Gated-clock transformation is considered only if, after converting OR (+) functions to AND (*), $$A+B=NOT(NOT(A) * NOT(B)) \quad (1)$$

removing double negations, $$NOT(NOT(A))=A \quad (2)$$

and combining AND functions, $$AND(AND(A,B)),C)=AND(A,B,C) \quad (3)$$

the circuit has the normalized form shown in FIG. 57(b). In the figure, E, f1, f2 ... are arbitrary combinational logic functions, and each of I1, I2 is either an inversion or the identify function.

FIG. 57(c) shows the result of gated-clock transformation. In the transformed circuit, E, f1, f2, ... are the same functions as in the original; I is an inversion or the identity function depending on whether the number of inversions in I1, I2 was odd or even. The transformed circuit is functionally equivalent to the normalized circuit provided that in the normalized circuit, the timing of the signals is such that the output of each function fj changes only when the output of I1 is 0, and this 0 has already reached the AND gate. This will be the case, if for each function fj:

1. the inputs of fj are driven by flip-flops that transition only on the rising edge of CLOCK if I1 is an inverter, or only on the falling edge if I1 is the identity function; and 2. In the normalized circuit, a transition of CLOCK is propagated to the AND gate more rapidly through I1 than through the fastest path to the AND gate through a flip-flop and an fj.

Given conditions (1) and (2), the equivalence of the normalized and transformed circuits is proved as follows. For both circuits it is assumed that the clock frequency is low enough that successive transitions of CLOCK do not interact with each other. In the normalized circuit, a transition of CLOCK will propagate to CK if and only if at the time of the transition, all the fj are 1. In the transformed circuit, all transitions of CLOCK propagate to CK, but transitions of the flip-flop are only enabled if all the fj are 1. In the normalized circuit, whenever an fj changes value, the signal is ANDed with 0 so the transition is not propagate to CK. In the transformed circuit, transitions of fj are not propagate to CK because there is not path. Thus, the flip-flop in the transformed circuit changes state in response to exactly those transitions of CLOCK for which the flip-flop in the normalized circuit changes state.

2.2.3.7.3 Algorithms

The algorithm that optimizes the gated-clock logic consists of two main parts; transformation condition checking and gated-clock transformation.

2.2.3.7.3.1 Transformation Condition Checking

Transformation condition checking determines whether the logic in the clock path is used as clock-gating logic or clock-generation logic. The transformation condition checker is implemented using an event-driven simulation technique. The simulation technique is chosen due to it robustness in handling arbitrary design styles and its efficiency in performing simulation for designs up to one million gates. In addition, the simulation states and the truth tables can be extended to detect other exception conditions under which the transformation is avoided.

In a preferred formulation, four simulation states and three truth tables for the primitive logic operations are defined. The four states are: state_0, state_1, state_P, and state_C. State_0 is logic level LOW and state_1 is logic level HIGH. State_P is the previous stable state. State_C is the changing state to either change to state_0 or state_1.

TABLE 1

NOT Truth Table

| Not | |
|---|---|
| 0 | 1 |
| 1 | 0 |
| C | C |
| P | P |

TABLE 2

AND Truth Table

| AND | 0 | 1 | C | P |
|---|---|---|---|---|
| 0 | 0 | 0 | 0 | 0 |
| 1 | 0 | 1 | C | P |
| C | 0 | C | C | C |
| P | 0 | P | C | P |

TABLE 3

OR Truth Table

| OR | 0 | 1 | C | P |
|---|---|---|---|---|
| 0 | 0 | 1 | C | P |
| 1 | 1 | 1 | 1 | 1 |
| C | C | 1 | C | C |
| P | P | 1 | C | P |

The transformation condition check algorithm is given below. The inputs to the algorithm are a netlist and a set U of nets within the netlist called the user-designated clock nets. The output of the algorithm is a set S of nets within the netlist called clock sources, and a set of boolean flags (Fk(EQ.1)). For each flip-flop $F_k$ in the netlist, for each source clock $C_1$, the flag (Fk(EQ.1) is TRUE if the algorithm has verified that any transition which reaches the clock pin of $F_k$ must have reached the clock pin via a path from $C_1$ to the clock pin through only combinational logic, and not via a path from a primary input to the clock pin not going through $C_1$, nor via a path from $C_1$ which goes through a flip-flop before reaching the clock pin. If the flag (Fk(EQ.1) is TRUE, then the transformation (described in Section 3.2) of flip-flop $F_k$, with net $C_1$ as CLOCK, preserves functional equivalence. The set S of clock source nets for a design is calculated as the union of three sets; U, the user-designated clocks given as input to the algorithm; D the divided clocks; and C, the combined clocks. The set D of divided clocks is obtained by starting with the set of flip-flop and latch clock inputs which cannot be reached by tracing forward through combinational logic from any user-designated clock, and tracing backwards to flip-flop and latch output nets. The set C of combined clocks is then obtained as the set of output nets of all blocks having two different inputs which can both be reached by tracing forward from clocks in U or D.

For each source clock $C_1$, the transformation condition check of all flip-flops with respect to $C_1$ is performed as follows. "Propagate" means to propagate values through combinational logic according to the truth tables given above, except that values are not propagated through clock source nets.

1. For each flip-flop Fk in the design, initialize to TRUE the flag Fk(EQ.i) representing transformability with clock $C_1$.
2. Initialize all the nets in the design to state__P.
3. Apply state__1 to $C_1$ and propagate.
4. Determine, in this state, the flip-flops whose clock pins can be reached via paths either from primary inputs not going through $C_1$, or along paths going from $C_1$ through flip-flops. This is done by applying state__C to primary inputs other than $C_1$, and to outputs of flip-flops which have triggered, and propagating, repeatedly until no further flip-flops are triggered and a stable condition is reached. Flip-flop whose clock pins can be reached by such paths will have state__C on their clock inputs at the end of this step.
5. For each flip-flop $F_k$ having state__C on the clock input, set the flag Fk(EQ.i) to FALSE.
6. Repeat steps (2-5), this time applying state__0 to $C_1$ in step 3.

The algorithm for computing the flags Fk(EQ.i) once the set S of clock sources is known, is given formally as follows:

Let
$C_1$ be clock source I (in set S)
$N_j$ be Net J
$F_k$ be flip-flop K
$I_m$ be primary input m
$F_k(Q)$ be the state of the Q output pin of $F_k$
$F_k(CK)$ be the state of the CK pin of $F_k$
$F_k(EDGE)$ be the clock edge that triggers $F_k$
T be rising edge or falling edge transitions
$F_k(EQ.I)$ be a flag indicating whether flip-flop K is transformable with clock $C_1$.

```
Compute_Transformation_Condition_Flags begin
    for I = 1 to num_dk
        for K = 1 to num_ff
            Fk(EQ.i) = TRUE
        end for;
        for each T in (rising edge, falling edge)
            for j = 1 to num_nets
                Nj = state_P
            end for;
            Ci = (1 if T is rising edge; 0 if T is falling edge);
            propagate;
            for M = 1 to num_inputs
                if Lm is not the same net as Ci then
                    Lm = state_C;
            end for:
            repeat
                for K = 1 to num_ff
                    if Fk(CK) = Fk(EDGE)
                        or Fk(CK) = state_C then
                        Fk(Q) = state_C;
                    end if;
                end for;
                propagate;
            until stable condition is reached;
            for K = 1 to num_ff
                if Fk(CK) = state_C than
                    Fk(EQ.1) = FALSE
                end if;
            end for;
        end for;
    end for;
and.
```

The transformation Condition Check algorithm is given in flowchart form in flowcharts A,B,C, and D. The algorithm can be extended to allow latches in the clock gating logic to be handled. This is achieved by replacing Flowchart D by Flowchart E.

2.2.3.7.3.2 Gated-Clock Transformation

After transformation condition checking, certain flip-flops have been identified as transformable with a given clock. For each such flip-flop, it is first determined whether the clock-path logic can be written in the normal form described earlier. If it can, then the gated-clock logic is transformed.

In FIG. 57(a), assuming the original logic equations on CK and CE pins are as follows, where q1, ... qn are either constant signals or direct outputs of flip-flops and E and F are combinational logic functions.

$$CK = F(CLOCK, q1, q2, \ldots qn) \qquad (4)$$

$$CE = H(a1, a2, \ldots, an) \qquad (5)$$

It is preferred to rewrite F to the following normal form by converting OR functions to AND, removing double negations, and combining AND functions;

$$F(CLOCK,q1,q2, \ldots qn) = I2(CLOCK),f1(q1,q2, \ldots qn),f2(q1,q2, \ldots qn) * \ldots *fm(q1,q2, \ldots qn)) \qquad (6)$$

The normalized circuit is shown in FIG. 57(b). Each of I1, I2 is either the identity function or the inversion function. If F can be written this way, then the following enable function F and clock-inversion function I are defined:

$$F(q1,q2, \ldots qn) = f1(q1,q2, \ldots qn)*f2(q1,q2, \ldots qn) * \ldots *fm(q1,q2, \ldots qn) \qquad (7)$$

$$I(CLOCK) = I2(I1(CLOCK)) \qquad (8)$$

The transformed logic equations on the CK and CE pins are then $$CK = I(CLOCK) \qquad (9)$$

$$CE = F(q1, \ldots qn) * E(a1, a2, \ldots ak) \qquad (10)$$

The transformed circuit is shown in FIG. 57(c). Given the flexibility in FPGAs, the triggering edge of the flip-flop is programmed according to the I function. Thus, the flip-flop is supplied with a clear clock.

2.2.3.7.3.3 An Example

Figure 59:
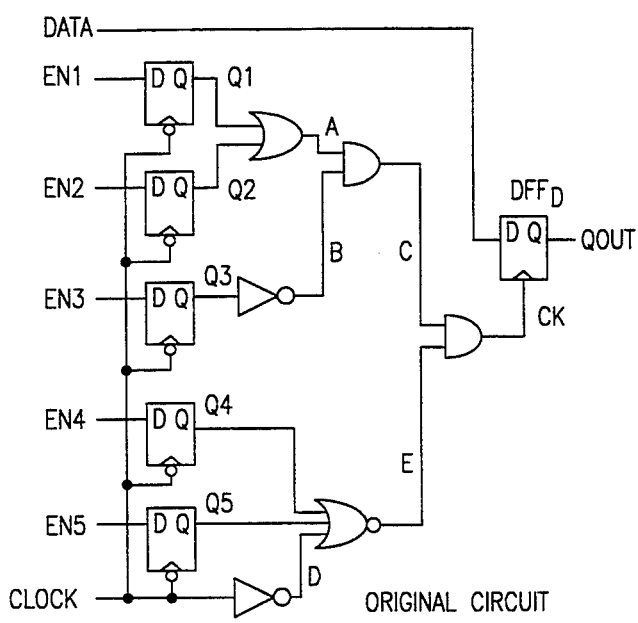
FIG. 59 is an example of a circuit which may be subject to gated clock transformation.

In this section, transformation condition checking and logic transformation are applied to the example in FIG. 59. In this example circuit, there is one clock, CLOCK. Gated-clock transformation is applied to the flip-flop labeled $DFF_d$.

2.2.3.7.3.4 Transformation Condition Checking

Initially it is assumed that the given flip-flop is transformable; that is Fd(EQ, CLOCK)=TRUE. Each clock transition is simulated to see whether the changes can propagate to the flip-flop's clock pin through the gating logic; if so it is determined that the flip-flop cannot be transformed; that is, set Fd(EQ, CLOCK)=FALSE.

For clock rising edge:
Initialize the circuit; initialize all the nets to
state_I
CLOCK, data, en1, en2, en3, en4, en5, q1, q2, q3, q4, q5,
a, b, c, d, e, CK=state_P
Apply rising edge to CLOCK and propagate:
CLOCK=state_I
data, en1, en2, en3, en4, en5, q1, q2, q3, q4, q5, a, b, c, d, e, CK=state_P
Determine whether in this state, any changes can reach the CK pin through the gating logic. This is done by propagating state_C from primary inputs and from outputs of flip-flops which have triggered, until no further flip-flops are triggered and a stable condition is reached.
CLOCK=state_I
data, en1, en2, en3, en4, en5, =state_C
q1, q2, q3, q4, q5, a, b, c, d, e, CK=state_P
Because CK is not in state_C, $F_d$(EQ, CLOCK) remains TRUE
For clock falling edge:
Re-initialize the circuit; initialize all the nets to state_P
CLOCK, data, en1, en2, en3, en4, en5, q1, q2, q3, q4, q5,
a, b, c, d, e, CK=state_P
Apply falling edge to CLOCK, and propagate.
CLOCK=state_0, d=state_1, e=state_0, CK=state_0.
data, en1 en2, en3, en4, en5, q1, q2, q3, q4, q5, a, b, c, =state_P
Determine whether in this state, changes can reach CK through the gating logic
CLOCK=state_0, d=state_1, e=state_0, CK=state_0, data,
en1, en2, en3, en4, en5, q1, q2, q3, q4, q5, a, b, c, =state_C
Because CK is not in state_C $F_d$(EQ, CLOCK) remains TRUE.

2.2.3.7.3.4 Gated-Clock Transformation

The following equations define DFFd(CK) and DFFd(CE) in the original design.

$$DFFd(CK) = ((q^1+q^2)*q3) * NOT(q^4+q^5+CLOCK) \quad (11)$$

$$DFFd(CE) = 1 \quad (12)$$

After logic transformation (described in section 3.2), the equations for DFFd(CK) and DFFd(CE) are $$DFFd(CK) = CLOCK \quad (13)$$

$$DFFd(CE) = ((q^1+q^2) * q^3) * (q^{4*} q^5) \quad (14)$$

Figure 60:
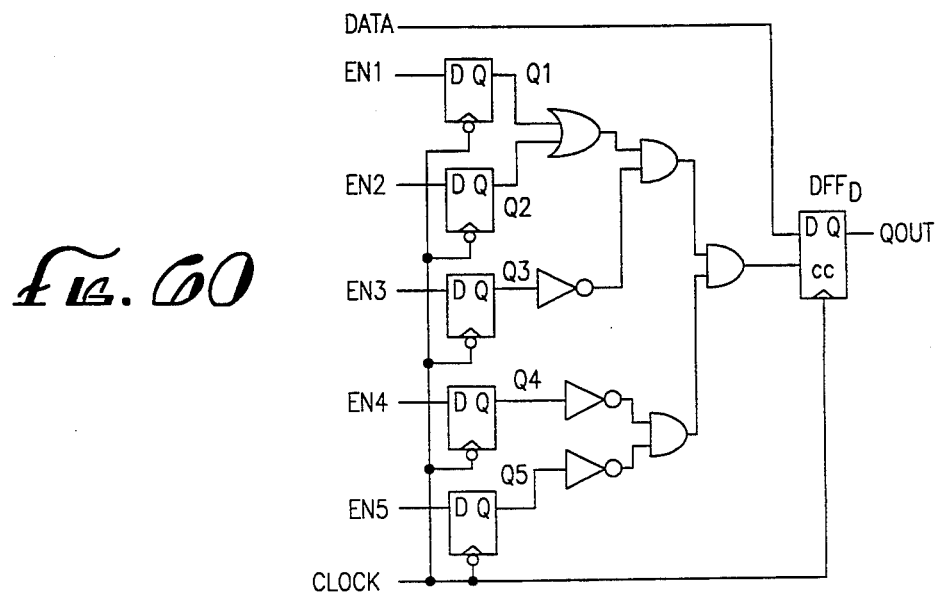
FIG. 60 illustrates a circuit which results upon the optimization of the circuit described illustrated in FIG. 74.
Figure 61A:
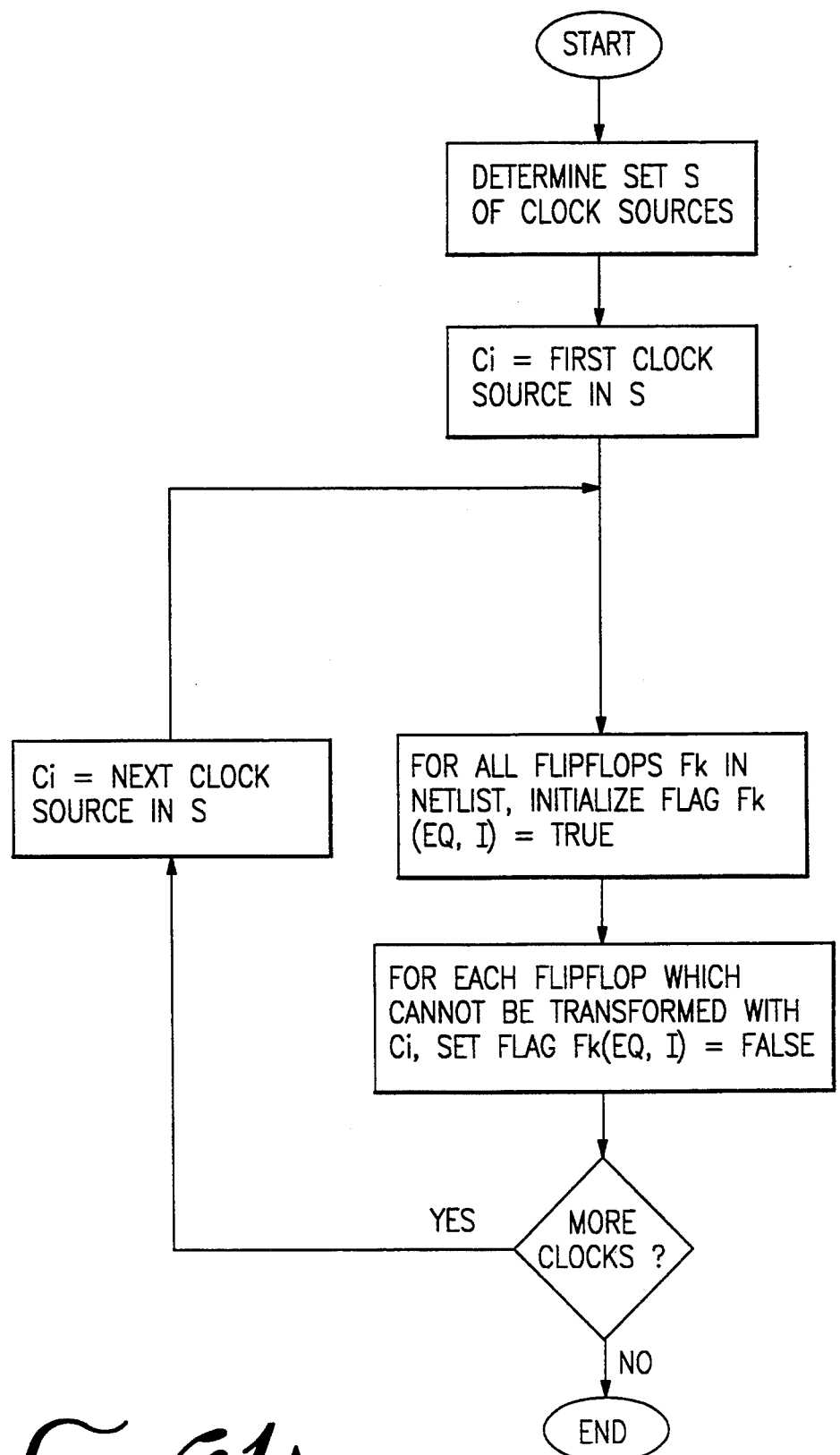
FIGS. 61(a)–(e) illustrate the flow of a transformation condition check algorithm in accordance with the present invention, FIGS. 62(a) and (b) provide an illustration of the transfer of clock path logic to clock enable.
Figure 61B:
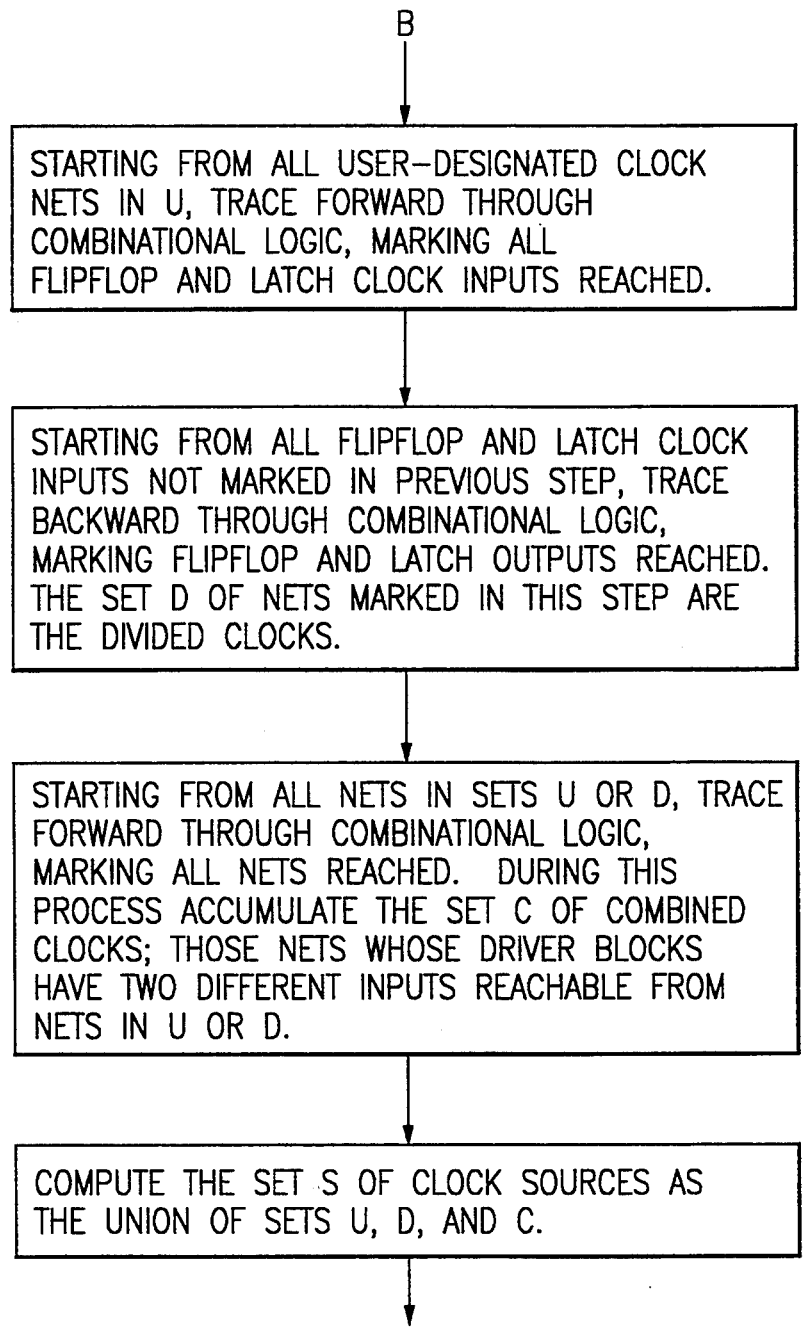
Figure 61C:
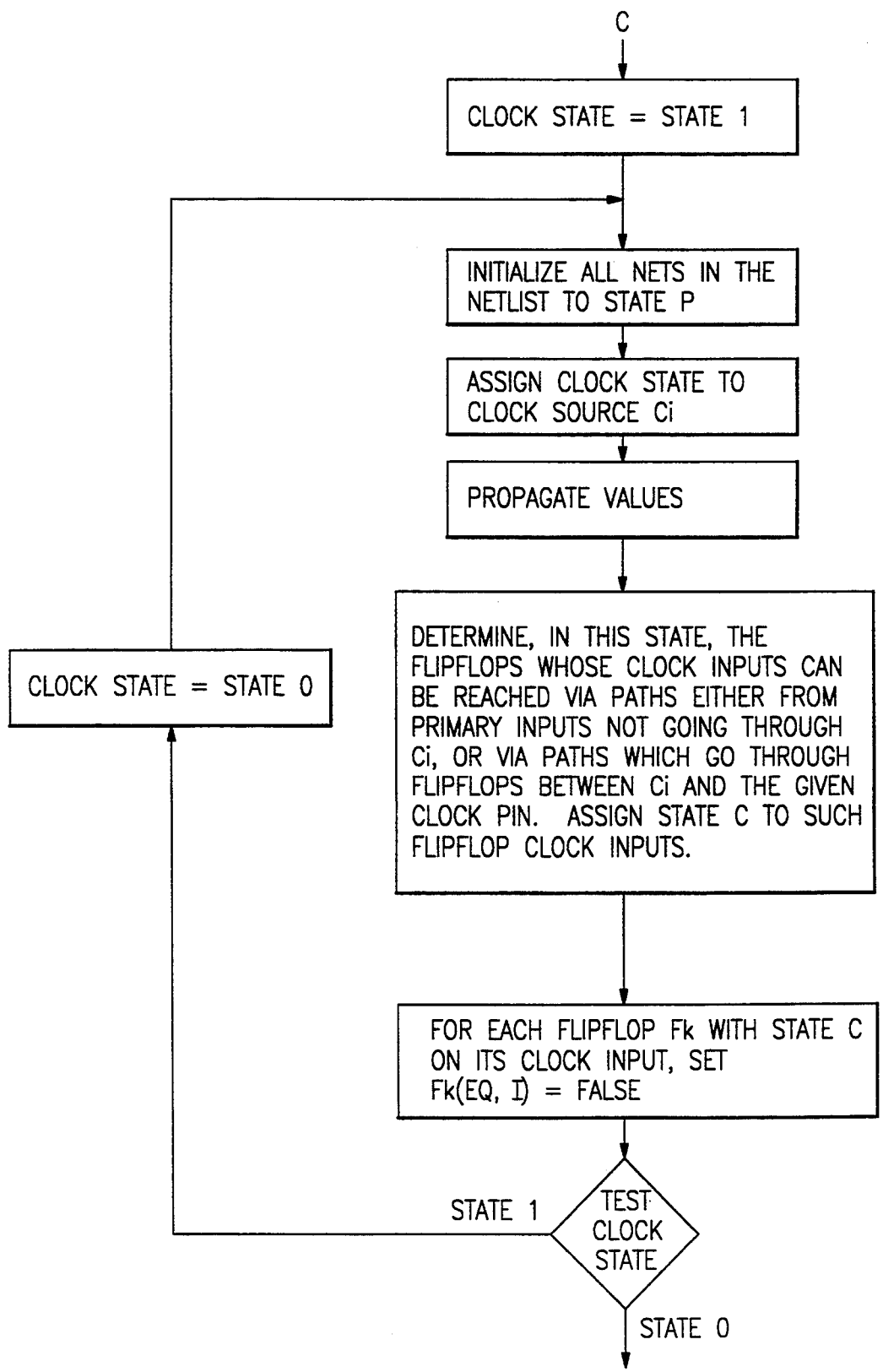
Figure 61D:
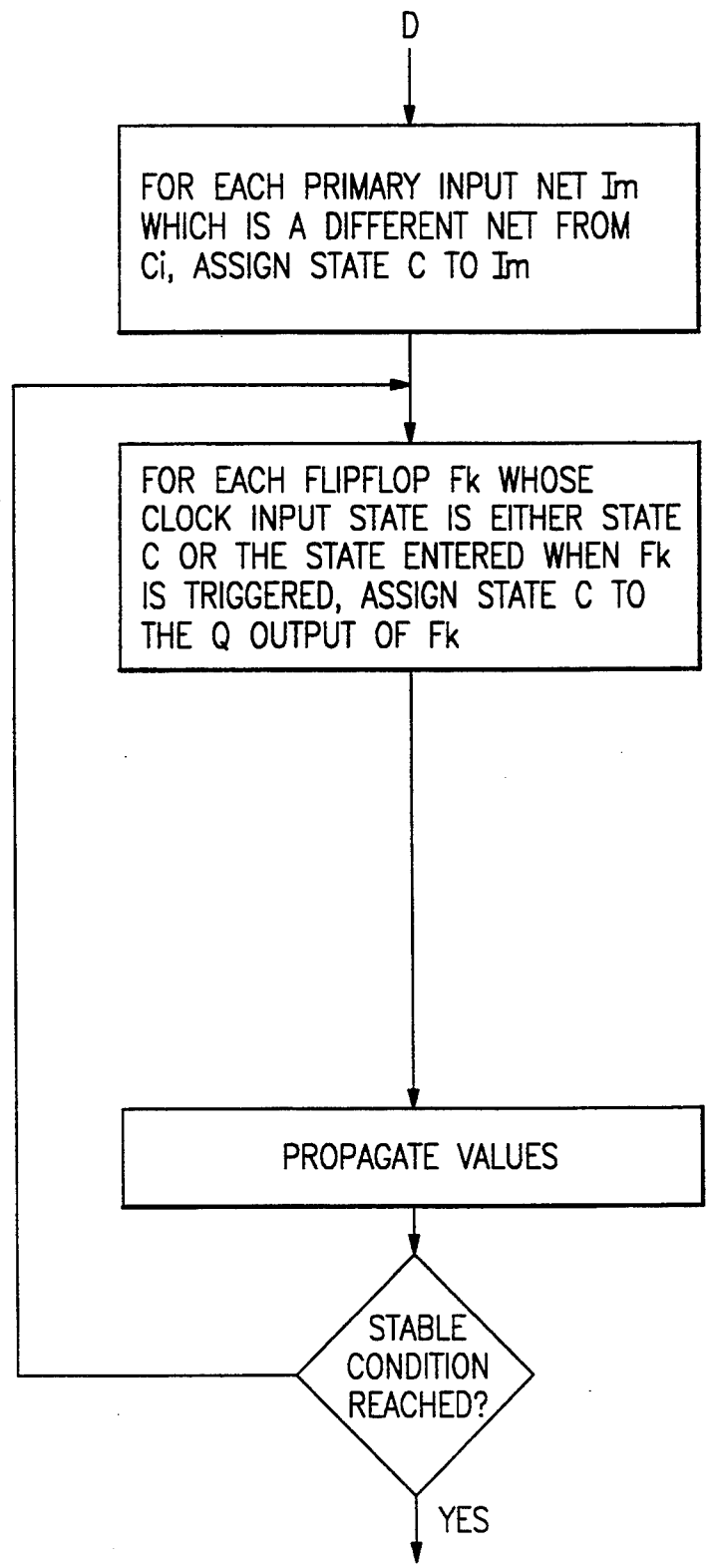
Figure 61E:
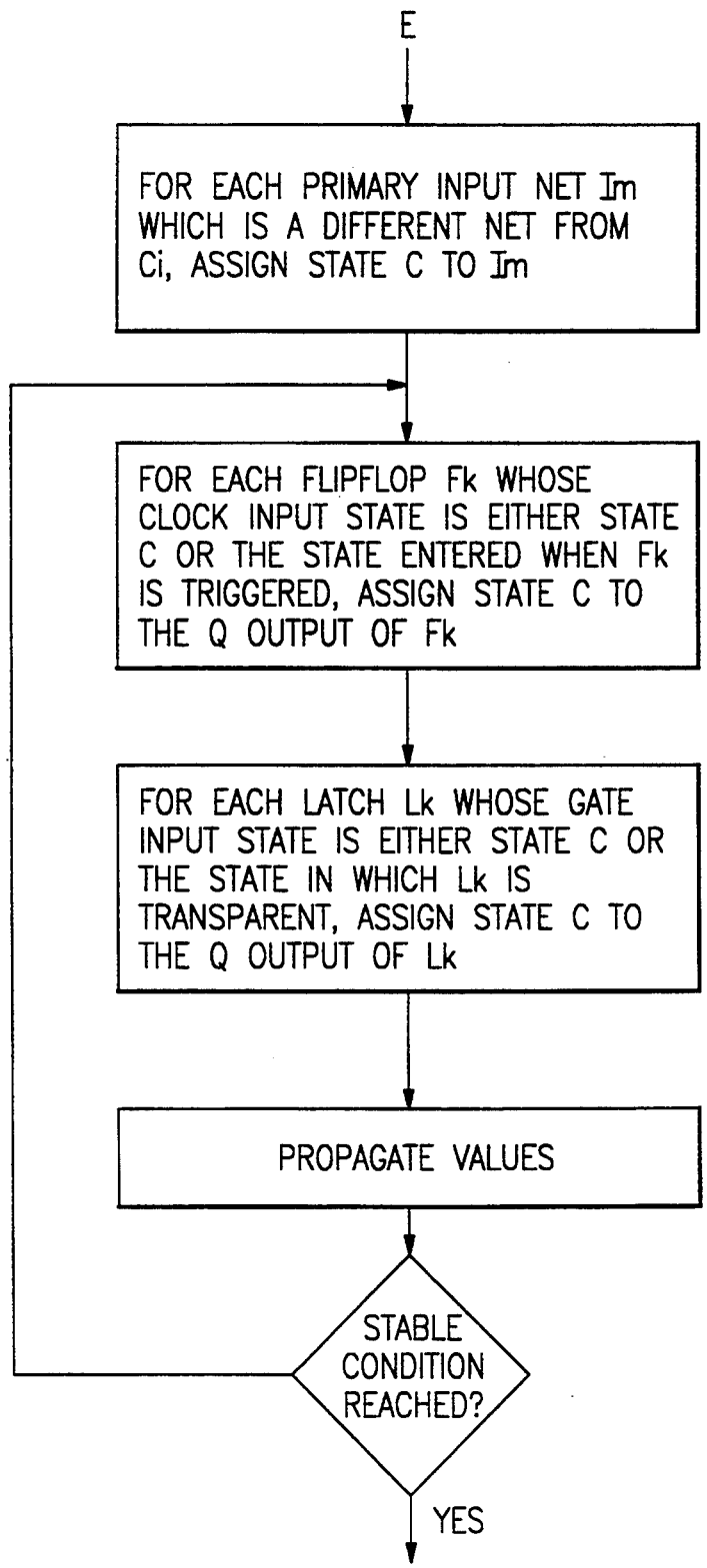
Figure 62A:
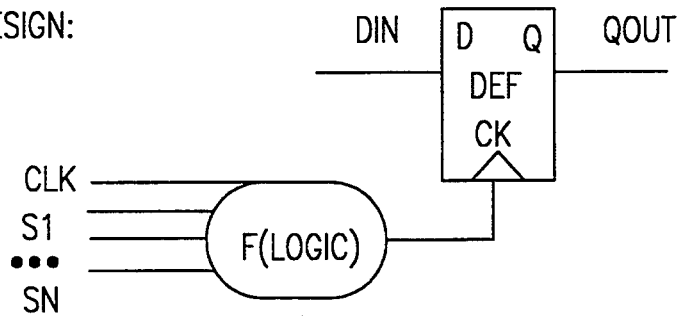
Figure 62B:
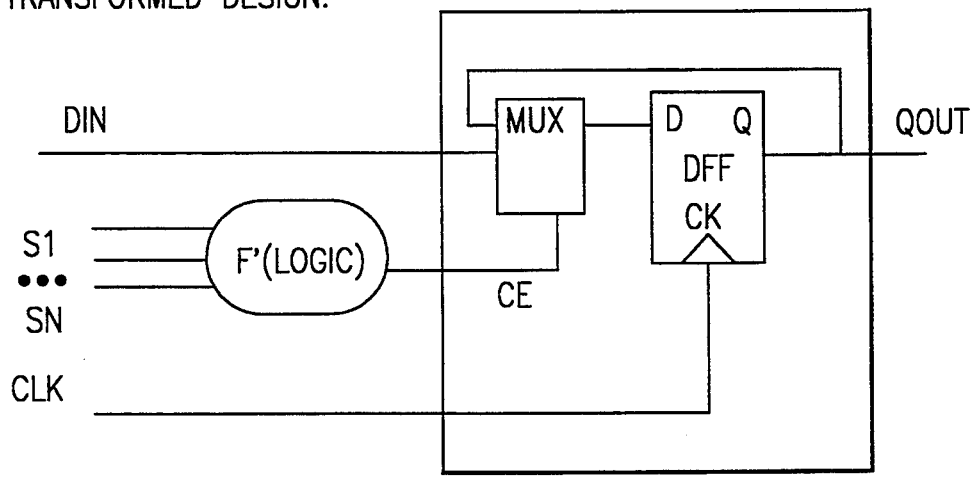
Figure 63:
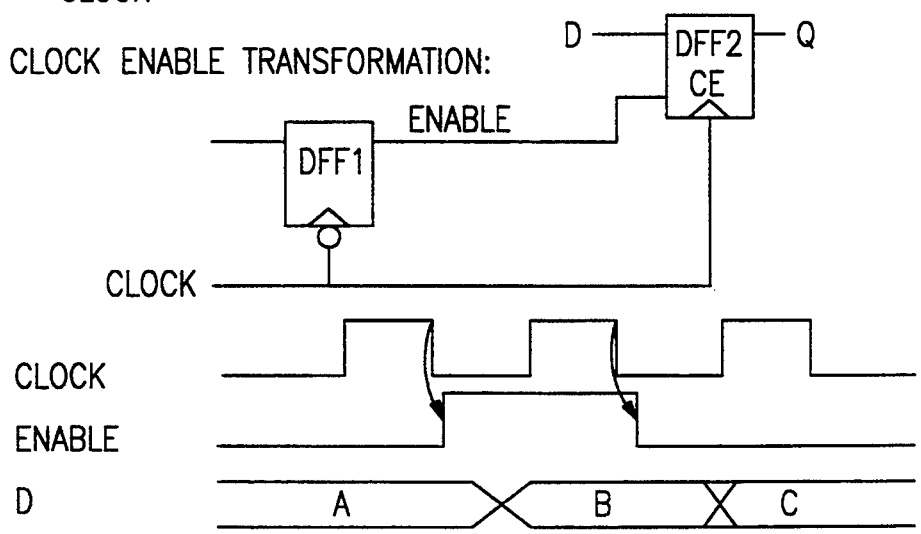
FIG. 63 provides an illustration of the equivalence and function between a clock gating implementation and a clock enable transformation.
Figure 64:
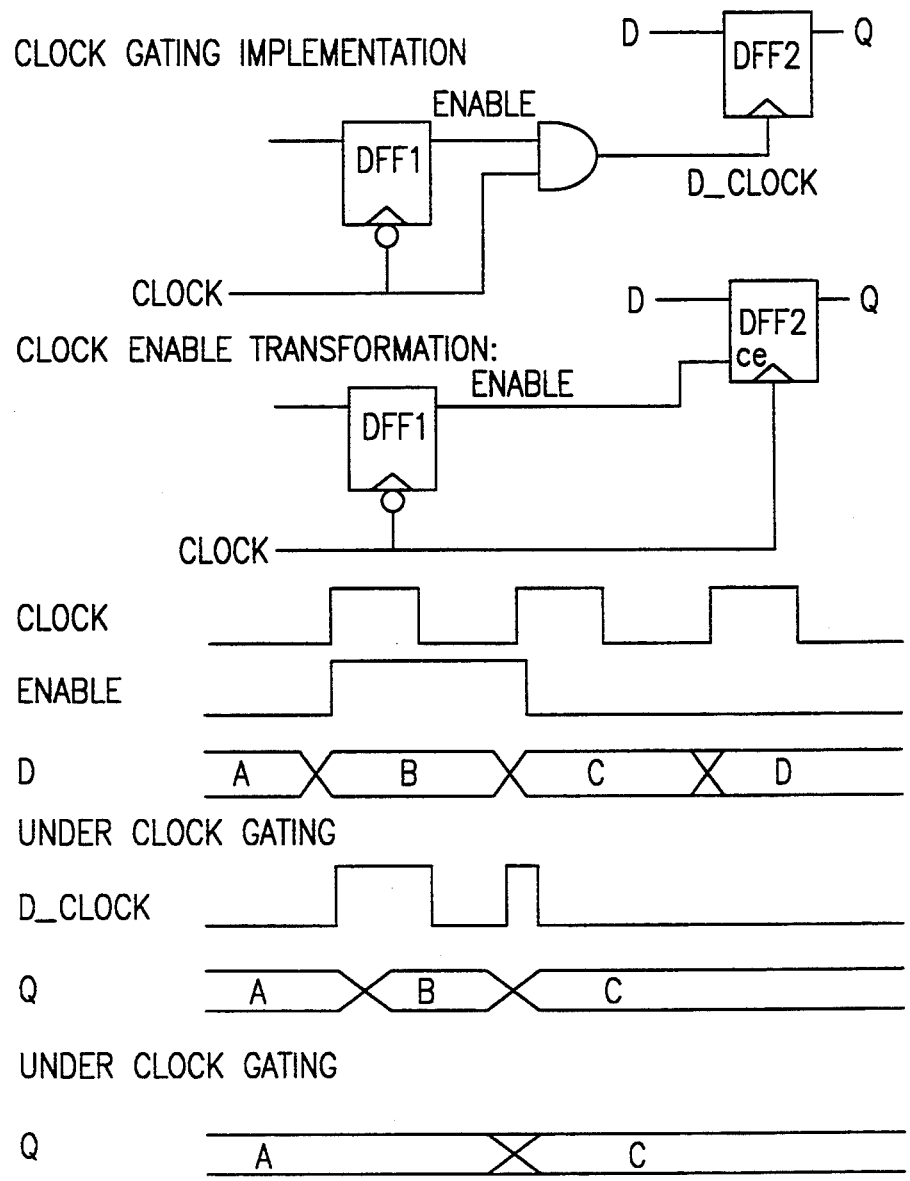
FIG. 64 provides an example of a functionally nonequivalent transformation.
Figure 65:
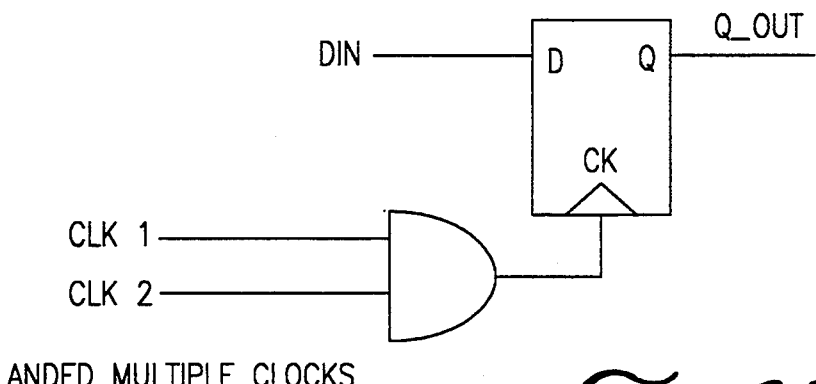
FIG. 65 provides an example of ANDed multiple clocks.
Figure 66:
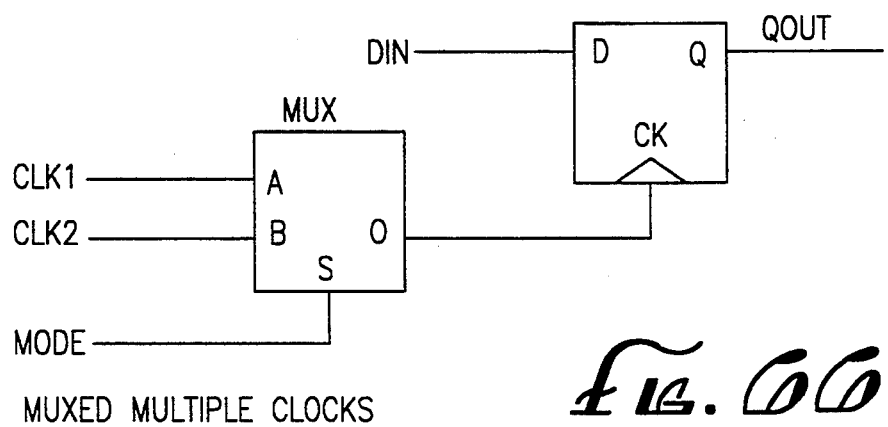
FIG. 66 provides an example of muxed multiple clocks.
Figure 67:
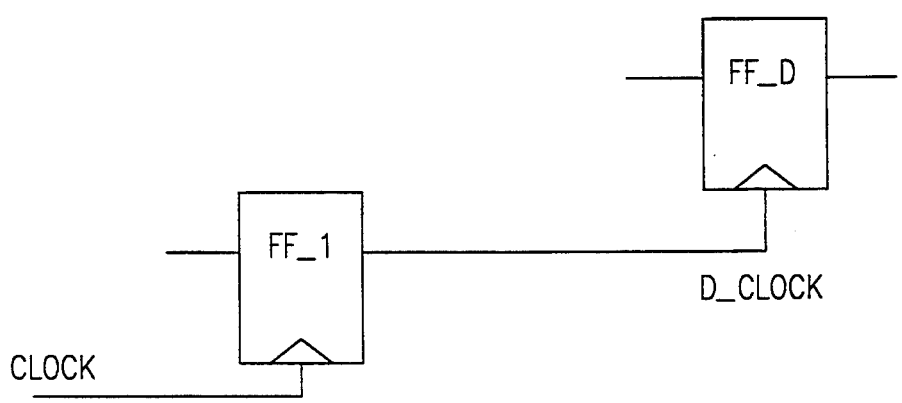
FIG. 67 illustrates a simple case of using data as a clock.
Figure 68:
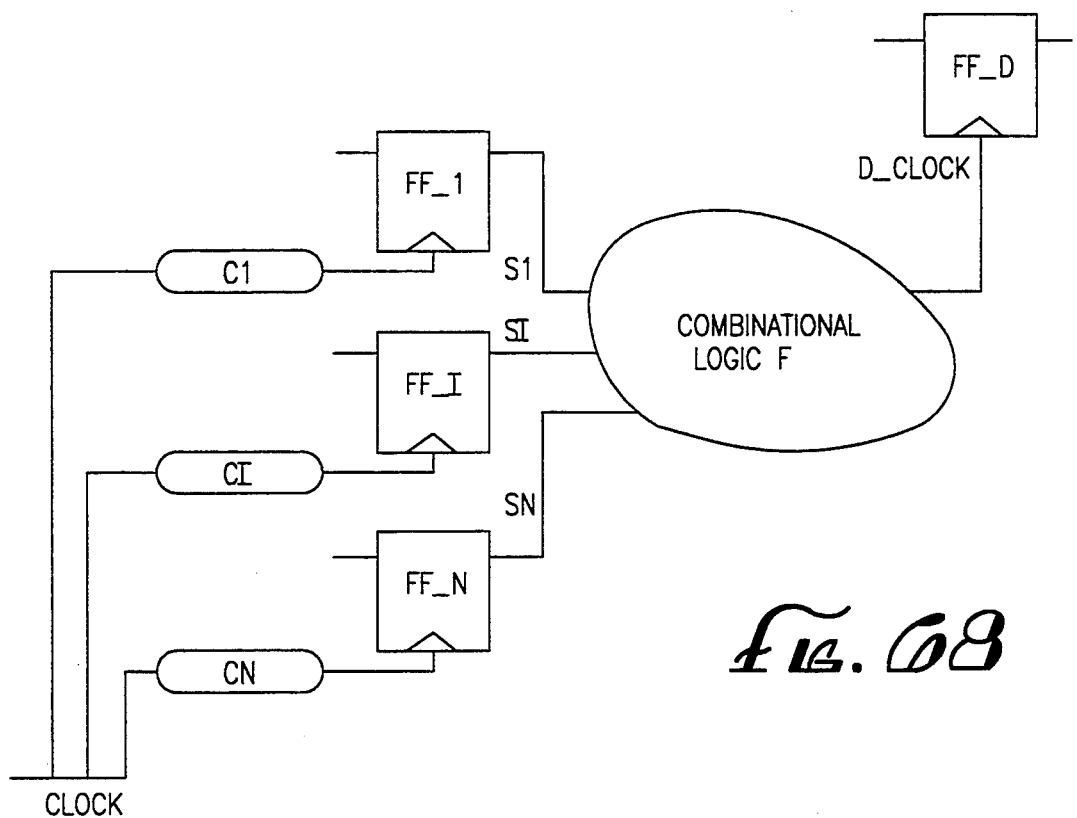
FIG. 68 illustrates a general case of using data as a clock.
Figure 69:
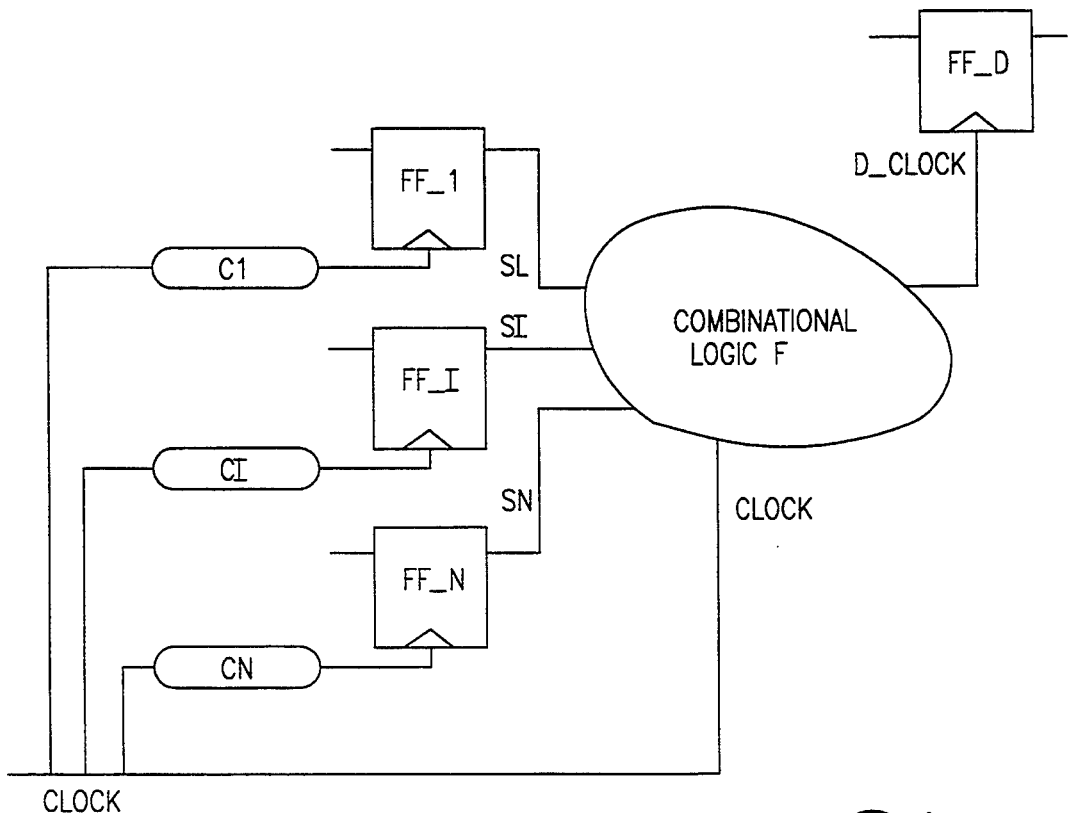
FIG. 69 illustrates the general form of a clock path.
Figure 71:
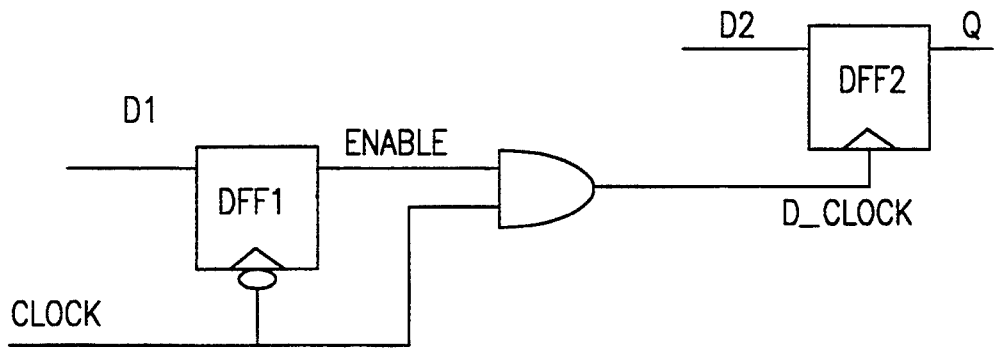
FIG. 71 is a first example of symbolic simulation.
Figure 72:
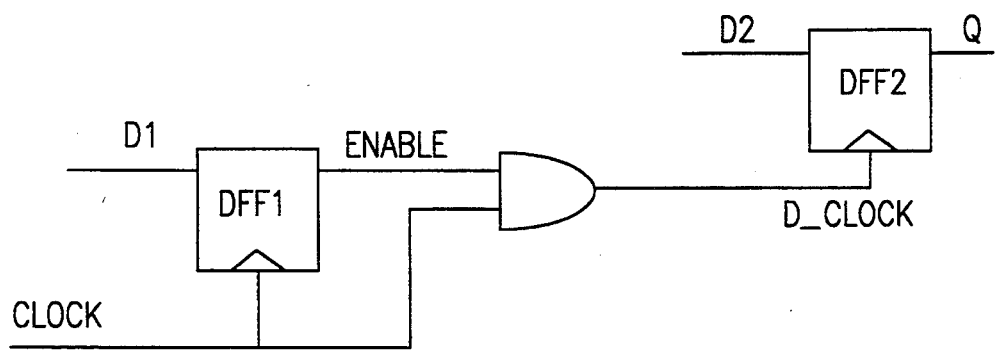
FIG. 72 is second example of symbolic simulation.

The optimized circuit is shown in FIG. 60. As the result of this optimization, the gated-clock logic is transformed to clock-enable logic while maintaining functional equivalence.

2.2.3.7.3.5 Results

The gated-clock optimization algorithms described above have been implemented and tested in industrial benchmarks. Table 4 shows statistics for five of the designs. Each time a gated clock site is transformed, a potential source of clock skew and hold violations is eliminated.

TABLE 4

| | | Benchmark Results | | |
| design | Size (gates) | Gated-clock ales | gated-clock transformed | optimization time |
| --- | --- | --- | --- | --- |
| 1 | 7K | 176 | 88% | 4 seconds |
| 2 | 11K | 328 | 92% | 17 seconds |
| 3 | 13K | 478 | 99% | 34 seconds |
| 4 | 32K | 1388 | 53% | 145 seconds |
| 5 | 43K | 2852 | 62% | 47 seconds |

The ring edge of the flip-flop is programmed according to the I function. Thus, the flip-flop is supplied with a clear clock.

2.2.3 Algorithms

2.2.3.1 Optimization Entry In The Main Optimization Loop

Turning now to FIGS. 61(a)-61(e), gated clock removal optimization entry in the main optimization loop proceeds as follows:

```
begin
    if (Gated_Clock_OPT_On) then begin
        OPT_gated_clock_remove ( );
    end;
end.
```

2.2.3.2 Optimization Outline

OPT_gated_clock_remove()
input flat netlist;
input clock net set;
begin
OPT_Clock_Analysis();
    OPT_Create_Gate_Clock_Remove_Optarea();
    OPT_Identify_Clock_Sources();
    OPT_Design_Analysis();
    OPT Gated Clock Remove();
    OPT_Clock_Net_Adjustments();
end./*Gated Clock Removal Optimization In Full Configuration*/

2.2.3.3 Clock Analysis

Figure 73:
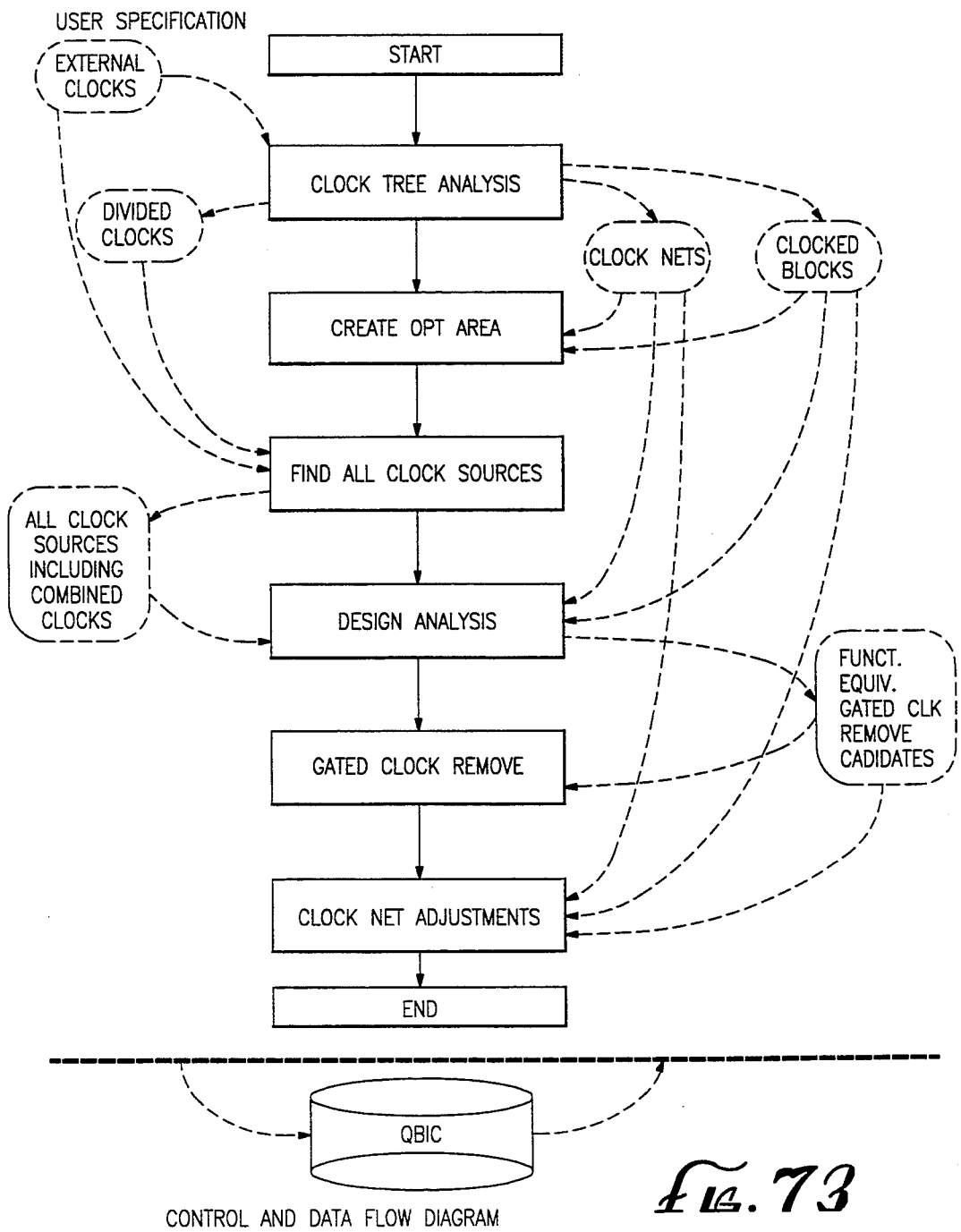
FIG. 73 is an illustration of the control and data flow of a gated clock removal.

Referring now also to FIG. 73, the clock tree analysis module 106 is used to identify the clock nets in the design. A clock net is defined to be a net which is on one or more clock paths. This optimization optimizes on the clock tree logic. The objective is to reduce the clock tree by applying the functional equivalent transformation of clock path logic to clock enable.

2.2.3.4 Creating Optimization Area

One aspect of integrating into the optimization frame work is to define optimization area. The optimization area is defined to be the area that covers all the necessary blocks, pins and nets for a particular optimization. If a block is involved in multiple optimizations, optimization areas may be merged. Also, optimization areas may be merged in some special cases.

The optimization frame work is originally developed for local optimizations. The gated clock remove optimization has global optimization property. The optimization area defined for gated clock remove is the clock tree plus some clock enable logic. The similarity between the optimization area in gated clock remove and other optimizations is that the optimization includes all the blocks, pins and nets necessary to perform the gated clock remove optimization. The difference is that the optimization area is determined based on the entire design, rather than a local portion of the design in which some optimizations could be applied. During the incremental configuration, both clock analysis and design analysis are performed on the entire design.

2.2.3.5 Identify Source Clocks

The source clock is defined to be an unique clock signal in the design, and each unique clock signal has a corresponding source clock signal. All the clock paths in the design start with a source clock. Each clocked block (flip-flop or latch) at most belongs to one clock path.

A source clock is assigned to one of the following types of clock nets:
1. External clocks
2. Divided clocks
3. Combined clocks.

The external clocks are the external clock signals applied to the design. The divided clocks are the clock signals that are generated by the flip-flops within the design as show the FIG. 74. The combined clocks are mainly generated from applying boolean functions to multiple clocks. FIG. 75 lists the two most common cases. The external clocks specified by the user. The divided clocks are identified by the clock tree analysis module. Each source clock is assigned a clock ID. The combined clocks are determined by traversing the clock tree for each of the already defined source clocks and marking the clock nets with the clock ID along the way. Any time multiple source clocks going through a clock net, this clock net is added to the source clock list and a new id is assigned to that clock net. This process continues until all the source clocks, including newly defined ones, are traversed.

2.2.3.6 Design Analysis

The purpose of the design analysis step is to identify the sites where the gated clock logic can be transferred to a datapath.

2.2.3.7 Functional Equivalent Transformations

A simple gated clock remove transformation is shown in FIG. 76. The transformation is accomplished in the following steps:
1. Transfer the logic connected to the clock pin to clock enable pin of the block. If the clock enable logic already exists, create an 2-input AND-gate. The output pin of the AND-gate is connected to the clock enable pin and the two inputs of the AND-gate are connected to the signal connected to the clock enable and the signal connected to the clock pin before the transformation.
2. Connect the source clock signal to the clock pin of the block.
3. Disconnect the source clock signal and put an identity boolean constant in the place of the clock signals or a no connect (NC). The value of the boolean identify constants depends on the logic gate that fanin the signal (i.e. logic-1 for AND-gate and logic-0 for OR-gate).
4. Perform clock signal adjustments if necessary. The details of clock signal adjustments are discussed in the next section.

An example of clock net adjustments after gated clock transformation is shown in FIG. 77. The clock net adjustments step determines if any of the clock nets along the clock path need to be re-generated. If necessary, the clock signals are re-generated by duplicating blocks along the clock path.

For each gated clock remove transformation site, the conditions where the signals on the clock path need to be re-generated are as the following:
1. There exists a branch on the clock path from the clock pin of transformation site to the source clock and if the branch is going into at least one datapath.
OR,
2. The branch only goes into the clock pin of flip-flop or latches and the gated clocks on at least one of them can not be transformed.
OR,
3. Any of the nets along the clock path is probed.

If any of the above conditions exist, then the clock signal at the branch point need to be re-generated. The re-generation mechanism is to duplicate the logics on the clock path from the branch point to the source clock as shown in FIG. 77.

In the above example, assume the block labeled "LOGIC" goes into some datapath, then signal 83 need to be re-generated after the transformation. To re-generate 83, we duplicated the block(s) from 83 to the source of the clock, Clock are duplicated. In this case, only block G1 need to be duplicated. The duplicated block is labelled G1_OPT and the signal is labelled s3_opt. The inputs to G1_OPT are the same as G1 except in the place of clock input, it has an boolean constant or a no connect.

2.2.3.8 Data Structures

2.2.3.8.1 Auxiliary Net Record

The auxiliary net record is used through out the gated clock remove optimization. It is created after the clock tree analysis step. The record is attached to the aux field of QBIC net record. The structure is freed in the end of the gated clock optimization.

```
typedef struct OPT_CLK_NET_RECORD {
int flags;      /*flags used in this optimization */
qbc_net_ptr source_clock_net; /*the source clock net pointer */
int source_clock_id;   /* the source clock net id */
int cur_val;   /* current value used in simulation */
int prev_val   /* previous value used in simulation */
} opt_clk_net_rec, *opt_clk_net_ptr;
Flag fields:
1. CLOCK_NET . . . marks a clock net.
```

-continued

2. MERGED_CLOCK_NET ... marks a merged clock net.
3. DIVIDED_CLOCK_NET ... marks a divided clock net.
4. SOURCE_CLOCK_NET ... marks a source clock net.
5. HAS_A_NON_CLK_BRANCH ... indicates that this clock net has a datapath branch or a probe attached to.
6. ALREADY ADJUSTED ... indicates that this clock net has already been adjusted. This flag is used in the last step of the gated clock optimization.

2.2.3.8.2 Auxiliary Block Record

Similar to the auxiliary net record, auxiliary block record is used throughout the gated clock remove optimization. It is created early on in the process and is freed in the end of this optimization.

```
typedef struct OPT_CLK_BLOCK_RECORD
    int flags;   /*flags used in the optimization   */
    nt clock_id;  /**/
    int iterations; /*iteration number used in simulation*/
insimulation*/
}opt_clk_block_rec,*opt_clk_block_ptr;
Flag fields:
                                            simulation*/
1. BLOCK_SCHEDULED ... used in design analysis.
2. GATED_CLOCK_TRANS_SITE ... used in
performing gated clock remove transformation.
```

2.2.3.8.3. Clocked Block List

The clocked block list is only used during the design analysis, the symbolic simulation, step. It is a single linked list of SIM_CLOCKED_BLOCK_RECORD. Each record represents a clocked device in the netlist that the optimization is performed.

The list is created based on the information from the clock tree analysis. It is created at the beginning of the design analysis step and freed upon the completion for the design analysis The record is defined as follows:

```
typedef struct SIM_CLOCKED_BLOCK_RECORD {
short flags;                                        /*the flag fields */
qbc_net_ptr clock_net;       /*the net
                             that the clock pin is connected to */
qbc_block_ptr clocked_block;                /*the corresponding
                                             qbic block pointer */
int block_type;        /*the type of block(i.e.flip-flop, latches) */
int primitive_id;      /*internally assigned primitive identifier.*/
int clock_phase;                            /*the active clock phase*/
int tran_0to1;         /*the value at the clock pin when a 0→1or*/
int tran_1to0;                              /* an 1→0 transition.*;
}sim_clocked_block_rec, *sim_clocked_block_ptr;
```

2.2.3.9 Internal Interfaces

2.2.3.9.1. Interface with Clock Tree Analyzer

The clock tree analyzer generates the following information:
1. Mark all the clock nets
2. Mark all the clocked devices.
3. Determine if there is any gated clocks in the design.
4. Identify clock dividers.
5. Identify clock loops.

2.2.3.10 Interface with Optimization Frame Work

2.2.3.10.1 The Optimization Netlist

This optimization is applied on the flat leaf level optimized netlist.

2.2.3.10.2 Optimization Area

The gated clock remove optimization area consists the blocks on the clock tree, including the clocked blocks (flip-flops and latches) and the blocks directly connected to the clock enable of a flip-flop or a latch.

2.2.3.10.3 In Full Configuration

At the beginning of the optimization, the clock tree analysis is performed on the leaf level optimized netlist. The clock tree analysis routine is invoked by the optimizer after any optimization is applied to the netlist.

In the optimization loop, the OPT_gated_clock__remove() is invoked. This is the main entry for the gated clock remove optimization. The netlist passed into the optimization routine is the full user netlist in this case.

2.2.3.10.4 In Incremental Configuration

The gated clock remove optimization in incremental configuration is similar to in the full configuration. The only difference is that the clock tree analysis and the optimization area adjustments are performed at the beginning of the optimization before each individual optimization rule is applied. The clock tree analysis is performed on the leaf level incrementally changed optimized netlist.

After net-pin link is set for the changed blocks and pins, the clock analysis routine is invoked by the optimization framework. AS the result of that analysis, the clock tree optimization area may be modified due to the incremental change.

During incremental configuration, if there is need to apply gated clock remove optimization (i.e. clock nets are changed etc.), the rest of the steps are applied. The design analysis is applied to the entire incrementally modified netlist.

2.2.3.11 Interface with Other Optimization Operations

The gated clock removal optimization is performed after other optimizations. The reason for this is that if other optimi-zations clean up a particular branch of the clock tree, the gated clock remove optimization is not necessary for that branch.

2.2.3.12 Services Used

Optimization frame work support
QBIC database accesses
Aux field in QBIC block and net record Clock tree analysis clocked block list is only used during the design

2.2.3.13 Architecture—Control/Data Flow

The gated remove optimization is one of the optimizations in the optimization frame work. This optimization is invoked from the optimization main loop. The optimization is performed after netlist parsing and before the system partitioning.

The gated clock remove optimization comprises several major components which are shown in FIG. 73. FIG. 73 shows the control flow and data flow between the components. The algorithms of each component are described more fully below. The major data structures are also defined more fully below.

2.2.4 Clock Analysis Module

2.2.4.1 Clock Tree Analysis

2.2.4.1.1 Design Connectivity

The clock tree analysis is based on the optimized logic netlist produced by the logic optimization module 104. The results of the clock tree analysis are mapped into the user netlist (i.e. signal names and paths).

2.2.4.1.2 External Clocks

An user specifies the external clocks. In the report, a clock tree is generated for each of the specified clock.

2.2.4.1.3 Clock Tree Analyzer

Given the clocks, the Clock Tree Analyzer 106 traverses the connectivity of the design database to:

1. identify all the derived clock nets and the type of components which they pass through; and
2. compute the direct and total number of flip-flops that source each derived clock net.

Based on that information, the clock tree analyzer 106 generates recommended low skew net assignments and clock net weighting assignments. The clock tree information is saved in a report for an user to view for diagnosis purposes.

The clock tree analyzer handles the following special constructs:

Muxed clocks;
Multiple clocks enter into a flip-flop (or latch);
Loops in clock paths; and
Clock dividers.

Each of these situations are reported in the clock tree report. The muxed clocks and multiple clocks entering into a flip-flop are one capability handled by the clock tree analyzer 106. Other capabilities include 1) detecting loops in clock paths and reporting them, 2) detecting the clock dividers and listing them in the report.

2.2.4.1.4 Clock Tree Report

The clock tree report is generated for an user to study the clock tree logic to improve the timing of the configuration. The information contained in the clock tree report includes: the instances that the special circuit constructs (listed above) detected and the clock tree for each of the specified clocks. The signal names and instance names reported in the report are all in terms of user's netlist.

2.2.4.1.5 Low Skew Net Assignments

For a given number (N) of available low skew nets in the system, the top N clock nets which have the most number of flip-flops sourcing them are assigned to the low skew nets. The clock tree analyzer writes out the low skew net assignments in an ASCII file in a format such that the file may be directly loaded into the system.

2.2.4.1.6 Clock Net Weighting

For the rest of the clock nets, a net weighting is assigned to each of the clock nets. Similar to the low skew net assignments, clock net weighting is written into an ASCII file in the ASCII input format. The file may be directly loaded into the system or modified by an user.

The clock net weighting is defaulted to a value equal to 3. The net weighting ranges from 0–100, 100 being the highest net weight.

The clock net weight is determined by the number of direct or indirect loads of clock devices on the net. The specific algorithm used is set forth below:

for a given net N, let us assume the load of net is L, then:
if (L$\leq$3_ then
Net_Weight (N)=3;
else if (3<L$\leq$99) then
Net_Weight (N)=L;
else
Net_Weight (N)=100;
end.

2.2.4.1.7 Divided Clocks

Figure 20:
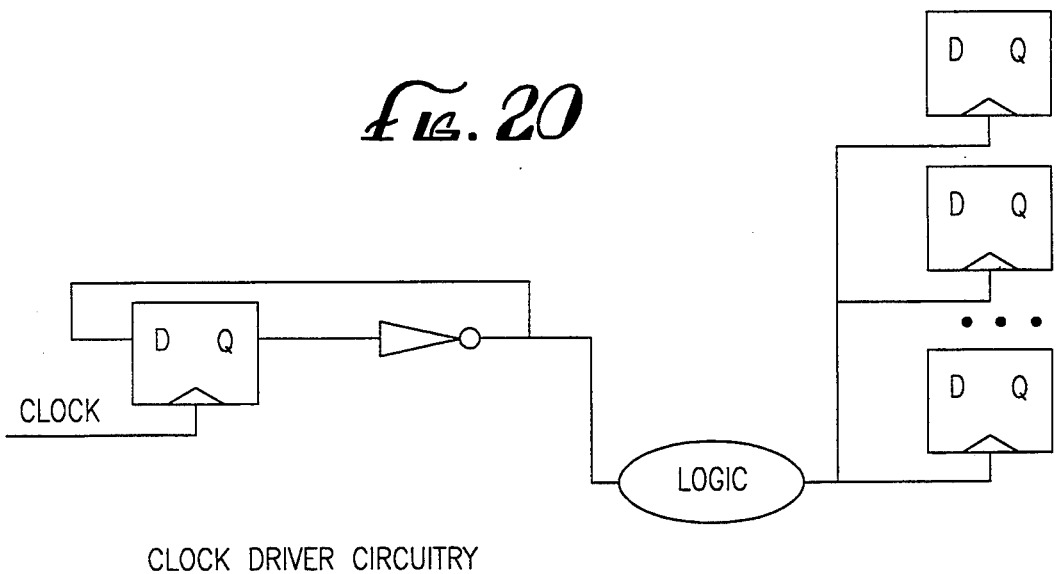
FIG. 20 is an illustration of clock divider circuitry.
Figure 21:
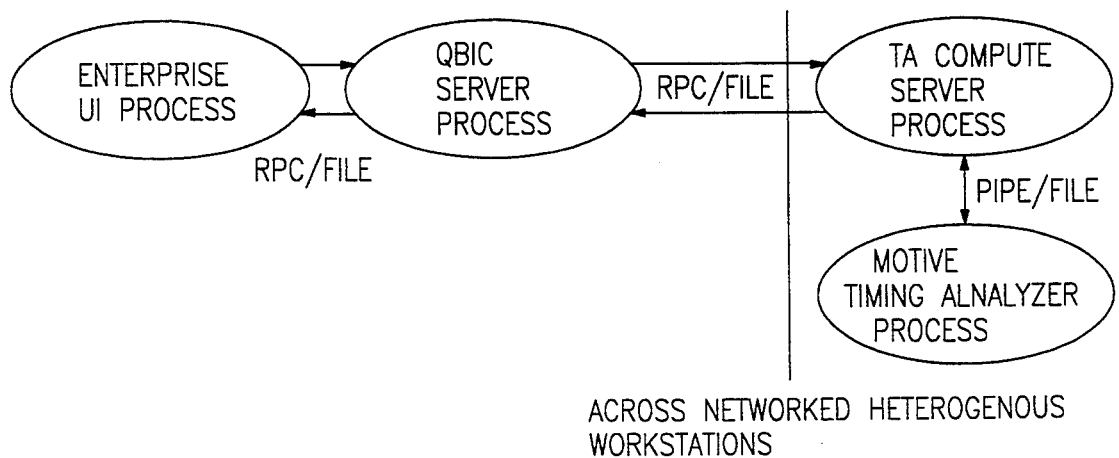
FIG. 21 is an illustration of timing analysis process architecture in a system in accordance with the present invention.

The clock tree analyzer 106 detects simple clock dividers similar to the one shown in FIG. 20. The detected clock dividers are reported in the clock tree report.

2.2.5 Partitioner Module

2.2.5.1 Goals

Emulation speed improvement is the main focus of the partitions module 108 of the present invention.

2.2.5.2 Approaches

The major contributors of delay in a datapath are:

1. system interconnect delays (i.e. chip-mux-chip delays);
2. routing delays on FPGA;
3. CLB delays on FPGA; and
4. Pod, MEM and CA to internal logic delays.

The majority of the delay on critical paths is spent in system interconnect delay. The system interconnect delay is introduced as the result of chip-to-chip cuts in a datapath. For real size designs (multiple boards), the system interconnect delay is estimated to be about 70% of the entire path delay on critical paths.

A presently preferred method for minimizing chip-to-chip cuts in critical paths is to utilize timing driven partition algorithms in the system partitioner module 108. Specifically, an influence cone based partitioning algorithm and a datapath oriented clustering algorithm are preferrably utilized by the system partitioner 108.

The initial clustering step has significant influence in emulation speed (i.e. whether or not the logic on the same path is clustered), yet does not impact capacity that much because the size of the first level of clusters is relatively small. This provides an opportunity to improve emulation speed without sacrificing emulation capacity.

2.2.5.3 Algorithms

The timing driven partition algorithm introduces the timing information in the system partition process. The partitioner optimizes timing while finding the best clusters for capacity.

A first part of this algorithm takes a timing constructive approach in the first clustering stage. This algorithm performs initial partition based on an influence cone and then performs clustering along the datapaths.

Figure 78:
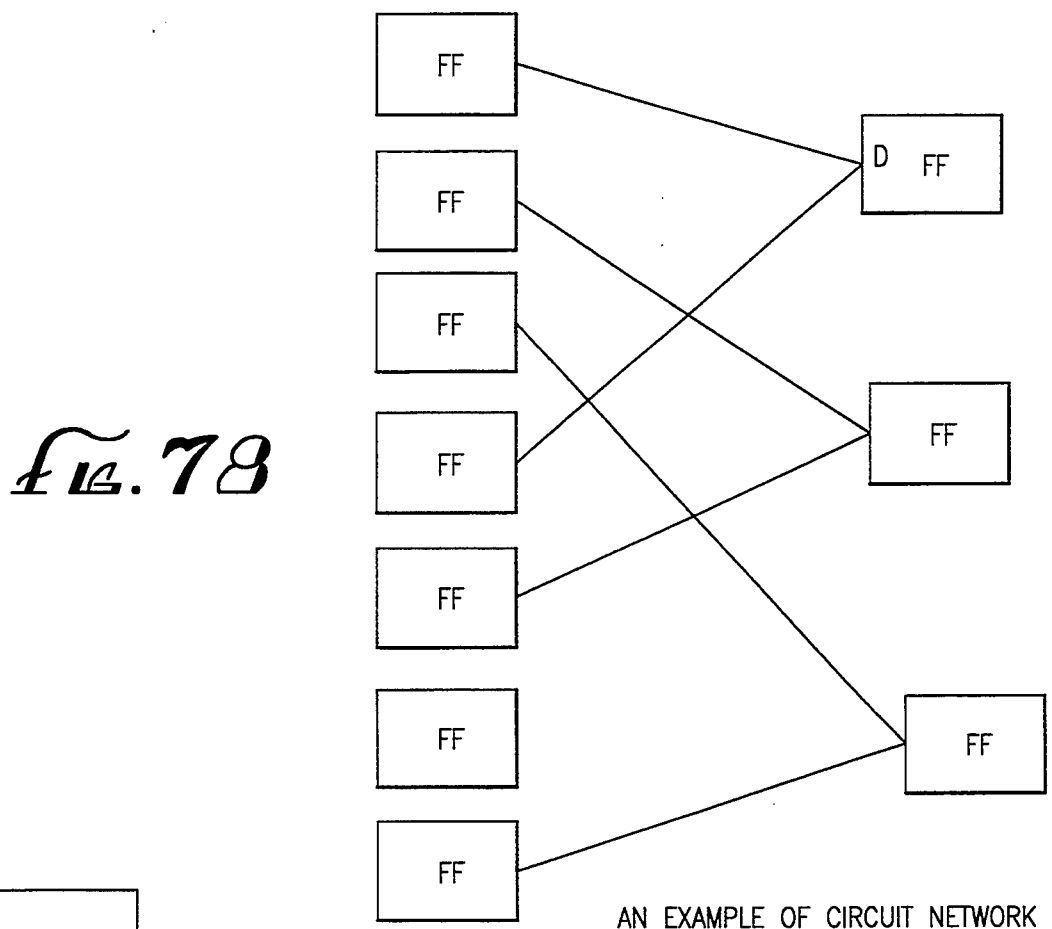
FIG. 78 provides an example of a typical circuit network.
Figure 79:
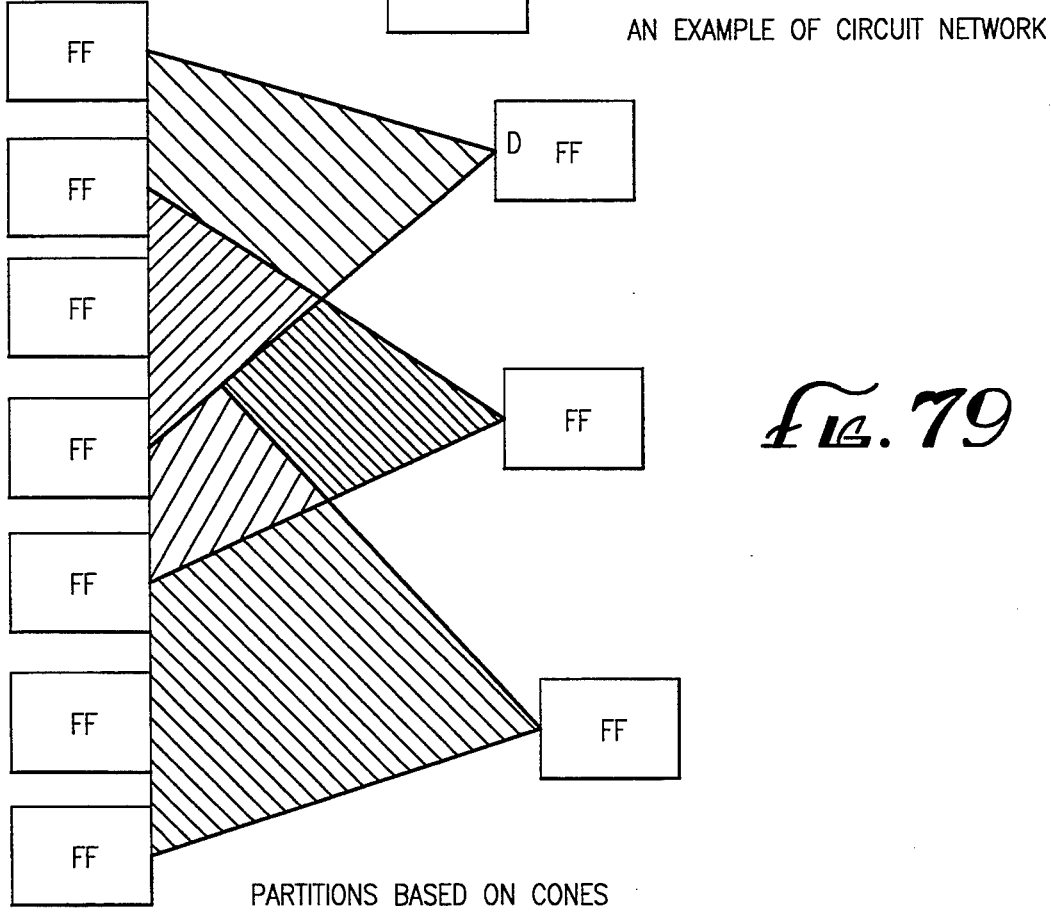
FIG. 79 provides an illustration of cone based partitioning.

FIG. 78 shows a typical circuit network and FIG. 79 illustrates the cone based partition strategy.

Improving Emulation Speed

The timing driven partition algorithm clusters logic on the critical paths first. The critical path is defined to be the longest path (from D pin of a FF backwards trace to Q pin of another FF) in the design. At system level, the path length is defined to be the number of cluster to cluster cuts in the design. Before the clustering takes place, each block is in its own cluster. Each cluster to cluster cut is a potential chip to chip cut in the final implementation since all of the logic in one cluster will be mapped into one LCA.

Path length is reduced by merging clusters on the critical paths. For example, assuming a critical path in the design has path length 7 (seven cluster to cluster cuts); by merging two clusters on that path, the critical path length is reduced to six (6). The decision of which two clusters to merge is evaluated by calculating gains of all possible merges in the path. The best gain merging is selected. The gain calculation is based on a number of functions, including whether or not the clusters are mergable, pin to gate ratio in the merged cluster, the gate count in the merged cluster, and pin reductions in the final merged cluster.

The path oriented clustering process iteratively (reducing path length by one at a time) reduces the critical path length until either the timing objective is reached or there is at least one critical path in the design the length of which cannot be reduced.

2.2.5.3.1 Partition Outline

Figure 80:
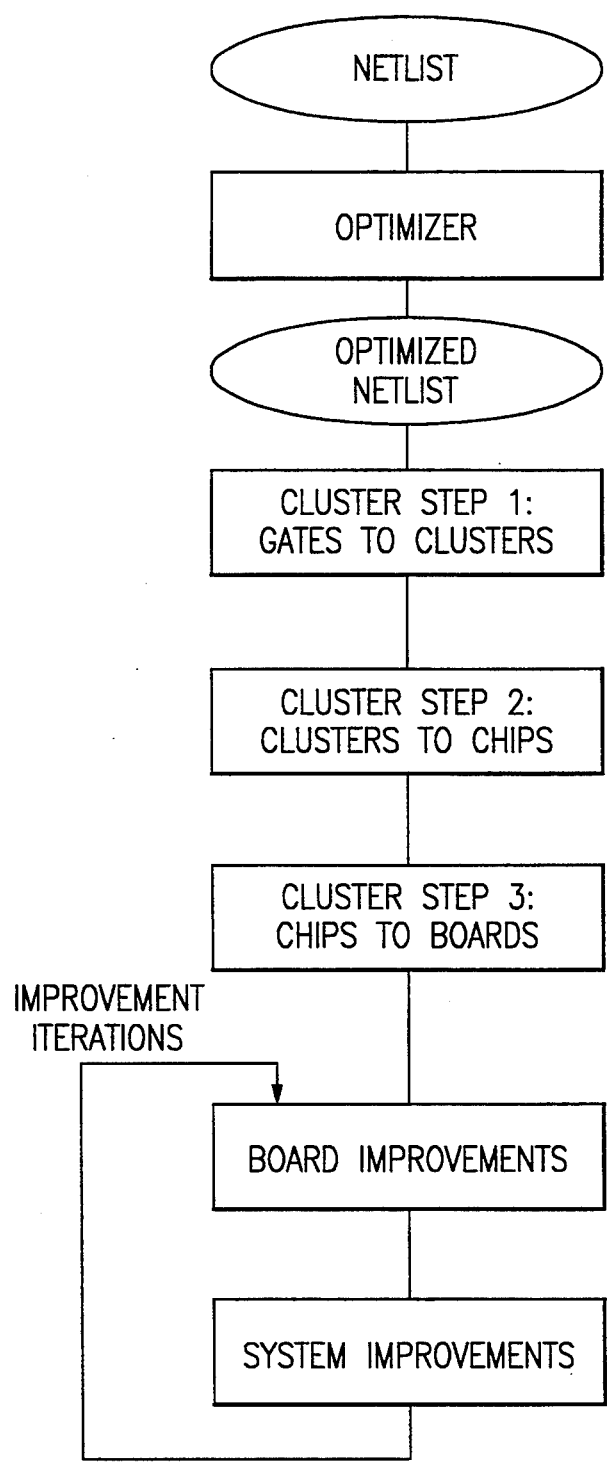
FIG. 80 comprises an outline of a partitioning algorithm in accordance with the present invention.
Figure 81A:
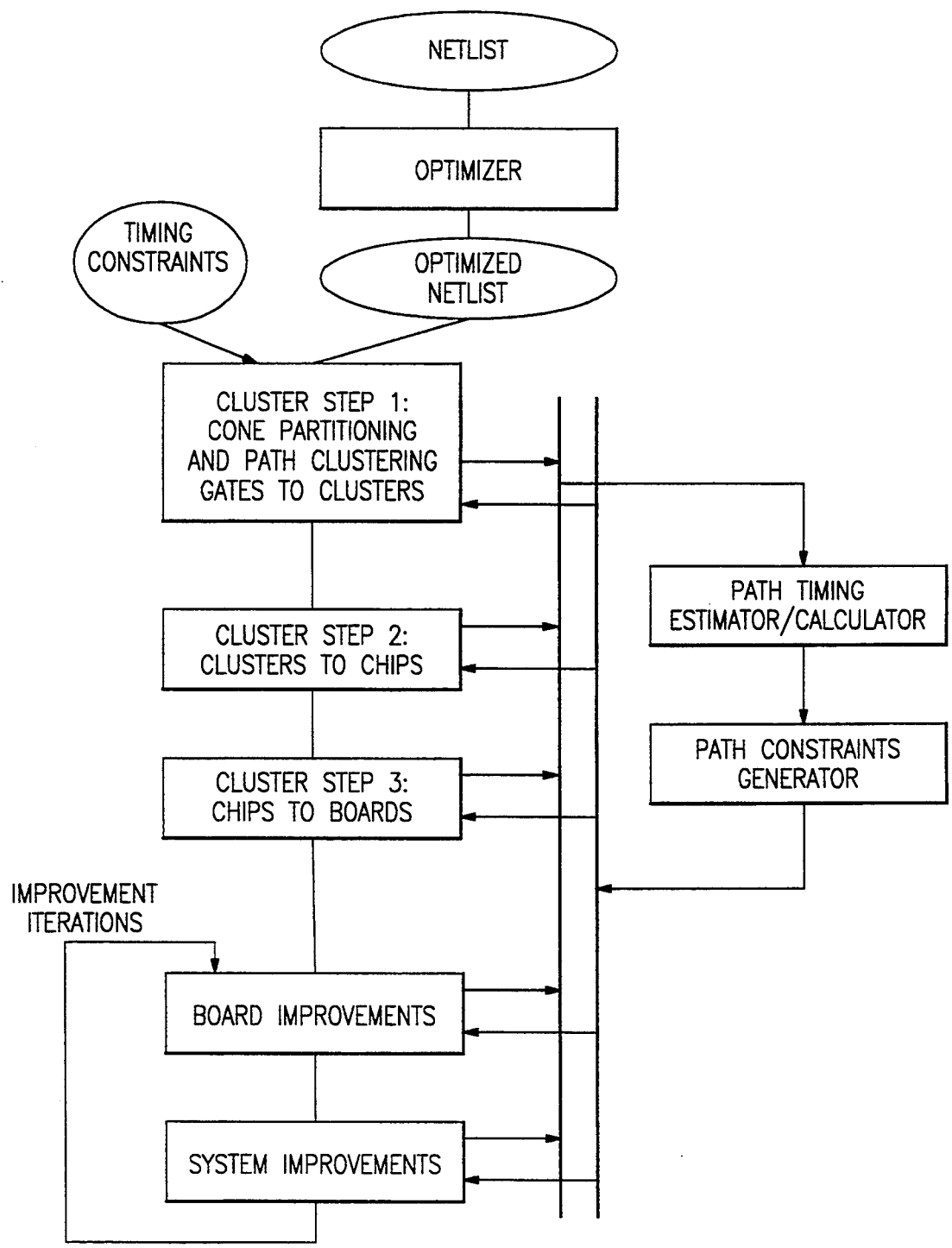
FIG. 81(a) provides an outline of a proposed partitioning algorithm.
Figure 81B:
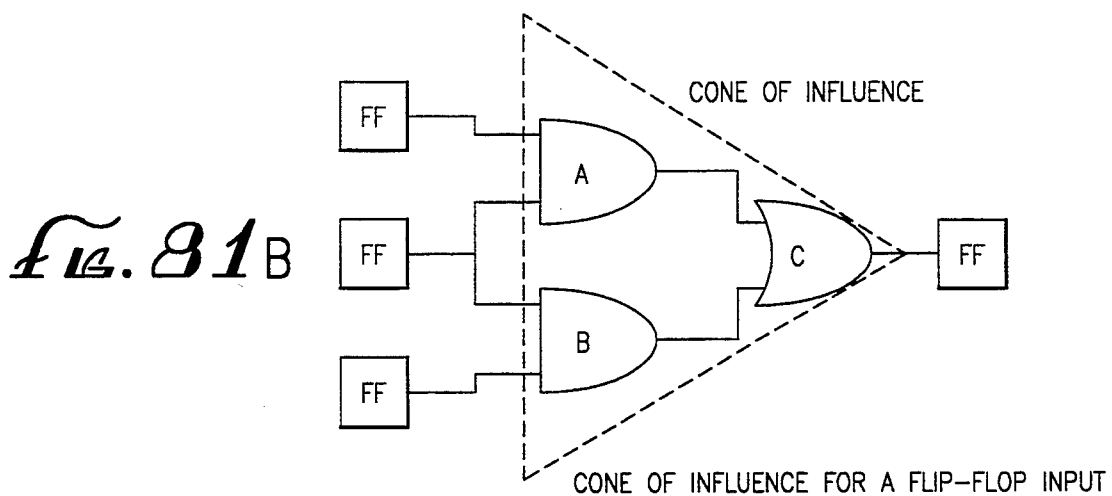
FIG. 81(b) illustrates a cone of influence for a flip-flop input.
Figure 81C:
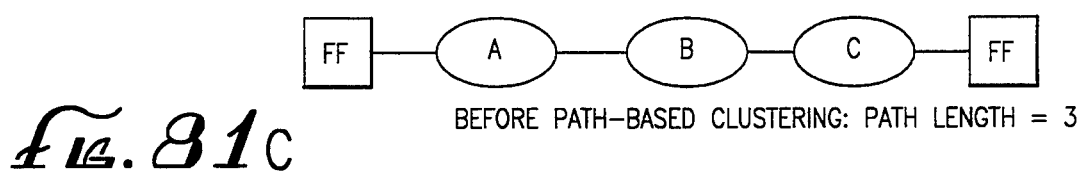
FIGS. 81(c) and (d) illustrate path length reduction through clustering.
Figure 81D:
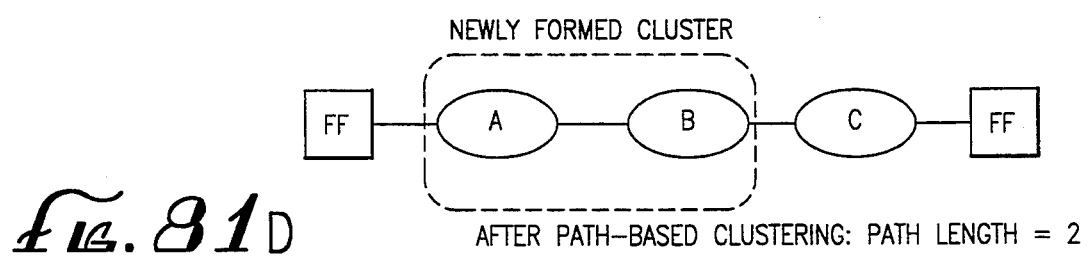
Figure 82:
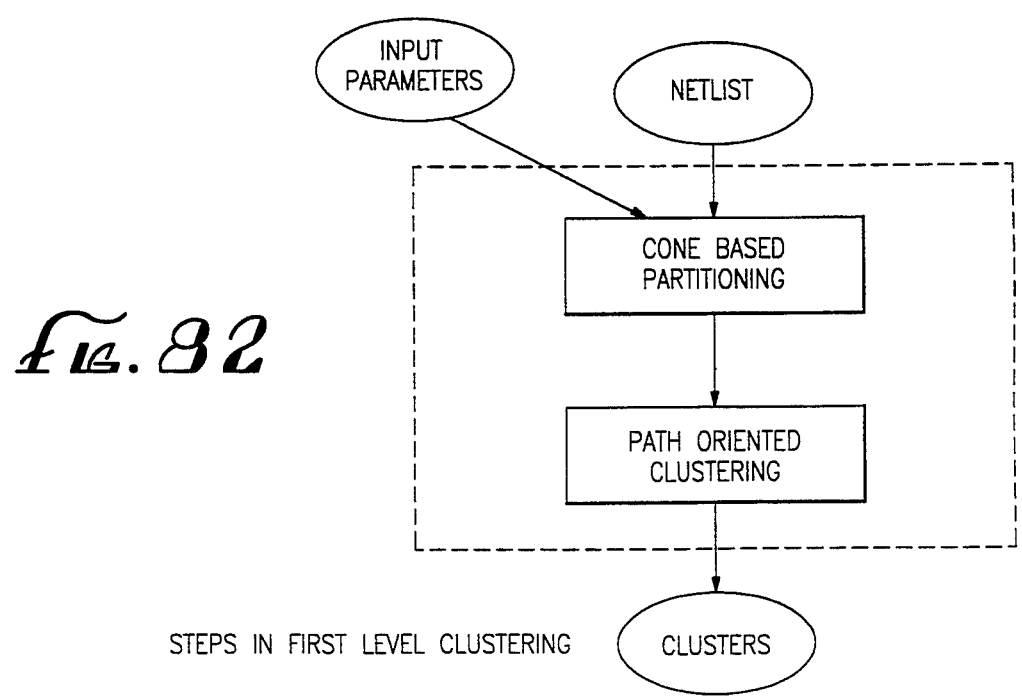
FIG. 82 illustrates the steps utilized in a first level clustering option.

FIGS. 80–81 describe the partitioning steps which occur during design implementation.

2.2.5.3.2 Cone Based Partitioning And Path Oriented Clustering Algorithm

In order to reduce the critical path in a design, it is necessary to look at the logic that falls between sequential elements within the design. Signals have to propagate as fast as possible from the output of one flip-flop through combinational logic to the input of the next flip-flop in the path. Accordingly, the logic in a design is divided up into combinational logic and sequential logic. Further, the combinational logic is divided into cones. Every flip-flop input, as well as every design output, defines a cone. To find the cone corresponding to a flip-flop input, for example, the system traces back starting from the flip-flop input and going through combinational logic until it hits a flip-flop output or a design input. All of the combinational logic encountered in this traversal is in the cone corresponding to the starting flip-flop input. See FIG. 81(b) for an example.

Obviously, the situation is not always going to be this straightforward. If, for example, the output of gate A also went, directly or indirectly, to the input of another flip-flop, then A would be in the cone of influence for two different flip-flop inputs. In general, there is a certain amount of overlap between cones corresponding to different starting points (flip-flop inputs or design outputs). After all the cones have been identified, the next step in cone partitioning is to take those blocks that are in more than one cone and form separate clusters for them. After moving out the logic in overlapping cones, the system is left with a set of clusters—some corresponding to the original cones and the others corresponding to the overlap between cones. At this stage, if there are any clusters that are too large to fit in a single chip because of their gate requirements or their pin requirements, then these large clusters get broken up until they are small enough to fit into a chip.

2.2.5.3.2.1 Input Parameters

Timing related parameters:

The targeted emulation speed. This parameter is translated to the maximum number of chip-to-chip cuts allowed in the critical paths. Given this parameter, the partitioner tries to meet the target speed if possible.

Physically related parameters:
gate count of LCA;
pin count of LCA (for partition purpose);
cluster gate counts; and
cluster pin counts.

2.2.5.3.2.2 Terminology

Let
$I_i$ be input i
$O_o$ be output O
$N_n$ be net n
$S_s$ be sequential block s
$C_c$ be combinational block c
$B_b$ be block b
Num Of inputs be the number of primary inputs in the design
Num _Of_Outputs be the number of primary outputs in the design
Num _Of_Nets be the number of nets in the design
Num _Of_Sequential_Blocks be the number of flip-flops or latches in the design
Num _Of_Comb_Blocks be the number of combinational blocks in the design
Num_Of_Blocks be the number of blocks (sequential and combinational) blocks in the designs
Num _Of_Pins ($B_i$) be the number of pins on Block $B_i$
Num _Of_Input_Pins ($B_i$) be the number of input pins on Block $B_i$
Num _Of_Output_Pins ($B_i$) be the number of output pins on Block $B_i$
Max_Cluster_Pin_Count be the max pin count allowed in a cluster
Max_Cluster_Gate_Count be the max gate count allowed in a cluster
Cluster_Pin_Count-Incremental be the pin count incremental used in clustering step
Cluster_Gate_Count-Incremental be the gate count incremental used in clustering step
Max Usable LCA Pin countMax Usable LCA Pin_Count be the max pin count allowed in a cluster
Max_Usable_LCA_Gate_Count be the max gate count allowed in a cluster
influence_cone
Path_Length be the number of cluster-to-cluster cuts in a path
Path_Length_From_Source($N_i$) be the number of cluster-to-cluster cuts from source net (i.e. the Q-pin of a flip-flop) the Ni Path_Length_To_Dest($N_i$) be the number of cluster-to-cluster cuts from Ni to the destination (i.e. the D-pin of a flip-flop)

Max_Path_Length be the starting path length in the path length reduction clustering step Max_Path_Length be the terminating path length in the path length reduction clustering step Pin ($B_i$,p) be the p-th pin of block i

2.2.5.3.2.3 Cone Based Partitioning, Algorithm

```
Cone_Based_Partition (DESIGN)
begin
    for (i = 1 to Num_Of_Sequential_Blocks) do
        for (p = 1 to num_of_input_pin(S_i)) do
            pin = Pin (S_i, P);
            Net = Net (pin);
            Travers_influence_Cone(net, Initial Traversing);
        end for;
    end for;
    for (i=1 to Num_of_Sequential_Blocks) do
        for (p=1 to num_of_input_pin (S_i)) do
            pin = Pin (S_i, P);
            Net = Net (pin);
            Travers_Influence_Cone (net,Cone_Partition);
        end for;
    end for;
    for (each cluster in Overlapped_Cluster_Set) do
        Partition_Overlapped_Cluster (cluster);
    end for:
    for (each cluster in Cluster_Set) do
        if (Pin_Count(cluster) >
                Max_Cluster_Pin_Count
            && (Gate_Count (cluster)>
                Max_Cluster _Gate_Count) then
                Partition_Oversized_Cluster (cluster);
        end if;
    end for;
    for (blocks that are not in any cone) do
        Partition_No_Load_Blocks (blocks);
    end for:
end.
Traver_Influence_Cone(net,operation)
begin
    recursive backsearch until either a storage
    elements is reached or primary input is reached.
    if (operation == Initial_Traversing) then
        keep a count on block record to count how many
cones that this block is in;
    else if (operation == Cone_Partition) then {
        if (block is only in one cone) then
            add the block to the corresponding cluster;
        else
            add the block to the overlapped cluster;
        end if;
    end if;
end;
Partition_overlapped_Cluster(Cluster(cluster)
begin
    for(i = 1 to Num_Of_Out_Pin (cluster))do
        net = Net (pin);
        pin_weight (i) is a function of Fanout (net)
            and the depth of a cone starting from that net.
    end for;
end;
Partition_oversized_Cluster (cluster)
begin
    further partition the cluster by extract sub-cones
    or just simply break the cluster into leaf level
    blocks.
end;
```

2.2.5.3.2.4 Path Oriented Clustering

At the end of cone partitioning, the combinational logic will have been grouped into clusters ranging in size from a single block to clusters as large as a single chip. The goal of path-based clustering is to further group these clusters into larger clusters is such a way that the number of clusters in any path between flip-flops is reduced if that path is a critical path in the design. See FIGS. 81(b)-(d).

Obviously, it is preferrable to ensure that none of the newly-created clusters is too large to fit on a single chip. Accordingly, it is tempting to attempt a path compression algorithm where the longest (and hence most likely to become critical) path is selected and compressed as much as possible before moving on to the next longest path and so on. However, the problem here is that when a path stops being a critical path, another one may become critical and may not be compressible because of the actions taken in compressing the first one. For this reason, the presently preferred approach is to compress paths uniformly so as to ensure that there is no one path that is much longer than the others. Thus, at each step in the algorithm, the longest path is located and an attempt is made to compress it by one hop. If that does not work, then the path is labelled an incompressible critical path and the algorithm terminates. After the algorithm has terminated, the longest path in the design can be determined, and the expected emulation speed may be calculated. This estimate will not be as accurate as the one that can be obtained after actual partitioning.

```
Gradual_Path_Length_Reduction_Clustering (DESIGN)
begin
    for (path_length = Max_Path_Length:
        path_Length>=_Min_Path_Length &&No_Reducable_Path;
        path_Length = path_length - 1) do
        for (i + 1 to Num _Of_Sequential_Blocks) do
            for (p=1 to Num _Of_Input_Pins (S_i) do
                pin = Pin (S_i, p);
                net = Net (pin);
                Reduce_Path_Lengths_In_Cone (net,
                    path_length);
            end for
        end for
    end for
    end.
    Reduce_Path_Lengths_In_Cone (net, cur_path_length)
    begin
        /*The details for this algorithm, please
        refer to the prototype, TCP module. */
        path_length = Path_Length=
    Path_Length_From_Source (net) +Path_Length_To_Dest(net);
        for (every path that path_length>=cur_path_length
            &&No_Reducable_Path) do
            Identify clusters in the path, Cluster1,
            Cluster 2, . . ., Cluster n/{
            Cluster_Merging(Cluster1, Cluster2, . . .
            Cluster n, Candidate_1, Candidate_2);}
    end.
    Cluster_Merging(Cluster1,Cluster2, . . ., Cluster n,
    Candidate_1, Candidate_2) begin
        merged_flag = FALSE:
        pin_count = Max_Cluster_Pin_Count;
        gate_count = max_Lcuster_gate_count;
        while (imerged_flag &&
        (pin_count<=Max_Usable_LCA_Pin_Count)
        && (gate_count<=Max_Usable_LCA_Gate_Count))do
            for (i=1 to (n-1))do
                gain (i) = Cluster _Merge_Gain (Cluster (i),
        Cluster (i+1), pin_count, gate_-count);
            end for
        gain_index = i such that gain (i) =
    max (gain (j) |j=1, . . .,n);
        if (gain (i)>0) then    /* there are mergable
            Candidate_1 = Cluster (gain_index);
            Candidate_2=Cluster (gain_index+1);
            Boundary_Nets (merged_cluster) =
    Uniq_Boundary_Nets (Candidate_1, Candidate_2);
            Blocks_In_Cluster(merged_cluster) =
    Union_Blocks (Candidate_1, Candidate_2);
            Add_Cluster (merged_cluster);
            Remove_Cluster(Candidate_1, Candidate_2);
```

```
    merged_flag = TRUE;
else
/*gradually increase pin counts and gate counts
for clustering until reached maximum.*/
    pin_count = pin_count +
Cluster_Gate_Count_Incremental;
    gate_count = gate_count + Cluster _ Gate _ Count
Incremental;
    end if;
    end while;
    if (!merged_flag) {
        Candidate_1 = NULL;
        Candidate_2 = NULL;
        Not_Reducable_Path + TRUE;
    end if
end;
int Cluster _Merge_Gain (Cluster1, Cluster2,
max_gate_count, max_pin_count)
begin
    if (merged_gate_count (Cluster1,
Cluster2)>max_pin_count)then
        return 0;/*)means not mergable*/
    end if
    gain = Gain_Function (Cluster1, Cluster2);
    return gain;
end;
```

2.2.5.3.2.5 Outputs From The First Level Clustering

The first level of clustering generates a set of clusters ready for the next level of clustering. The clusters are defined by partition maps which are part of the QBIC block records.

2.2.6 System Router (System Mux Router SMR)

2.2.6.1 Full Routing

The basic mux routing algorithm consists of ordering system nets by routing difficulty and, for each net, iterating through mux chips trying to match up wire capacity with net chip connectivity. One of the routing objectives is to use no more than one mux chip per connected emulation board and no more than one backplane mux for each emulation board or external net.

For board nets (nets confined to a single emulation board), this means finding a board mux with free wires to the connected logic chips.

For system nets (nets partitioned across emulation boards, and some probed nets), this means finding/assigning a backplane mux that has free wires to the connected boards, and then routing each of the board-sub-nets as board level nets.

For floating pin external nets (nets connected to emulation board connectors), this means finding a backplane mux connected to the assigned socket, and then routing the net as an emulation board level net.

For fixed pin external nets (nets connected to system connectors and assigned to specific system connector pins), this means routing the net as a system level net from the backplane mux connected to the assigned socket pin.

Program Flow

1. Based on the global wire list, wire budget arrays for each chip and emulation board socket are created.

2. Create system netlist. The system level netlist is created by traversing the optimized netlist and filtering out nets internal to chips. System nets are grouped into three major classes: external nets (sorted by pin swapability), system nets and board nets.

3. Sort nets. System nets are sorted by clock, class, data sync, weight (descending order), and by size (number of pins).

4. Assign connectors to sockets. Do rough analysis of connector to emulation module connectivity. Avoid exceeding mux board pair connectivity to single emulation module by spreading connectors across mux board pairs.

5. Route clocks.

6. Route external nets (oneview direct, oneview IM, umbilical, hard card, probe, GWB); assign connector pins to socket pins on the fly if floatable; maintain mux congestion figures and try to evenly distribute mux congestion when assigning connector pins.

7. Route system nets.

8. Route board nets.

9. If routing fails return to qbc_system_pr.

2.2.6.2 Incremental Routing

The objective of incremental routing is to handle netlist changes and incremental repartitioning while leaving as much existing routing undisturbed as possible. This is based on the assumption that logic chip reconfiguration (APR/PPR) will be more cpu intensive than the system route and mux chip configuration combined.

2.2.6.2.1 SMR Failure Recovery

If the system router 110 fails during incremental configuration because of design rule violations caused by incremental changes or as a result of mux congestion, it returns to qbc_system_pr. Qbc_system_pr calls the partitioner. The partitioner repartitions incrementally, i.e. leaves as many chips undisturbed as possible. Qbc_system_pr calls the router. The router attempts to reroute the repartitioned chips along with the incremental netlist changes.

2.2.6.2.2 APR Failure Recovery

In the case of chip place and route failures (both during full or incremental configuration), the partitioner will incrementally repartition the design, the system router 110 will initially only delete routing to the repartitioned chips and attempt to complete routing (including incremental net or pin additions) without any other changes. If unsuccessful, it will reassign pins on chips connected to the repartioned ones. Depending on the location and number of chips affected and the design size, it may unroute one or more entire emulation board(s). If ultimately unsuccessful, it will return to qbc_system_pr.

2.2.6.2.3 Netlist Changes

The incremental change list created by the optimizer is processed in the following way:

1. Process all deletions first and return freed up wires to routing resource pool;

2. Link added nets and pins into the netlist;

3. Add probes to their timebase lists;

4. Erase existing channel assignment for added probes;

5. Assign probe chip pins;

6. Add blocks to chips' block list;

7. Unroute source of nets with new driving probes;

8. Reroute source of nets with new driving probes;

9. Route added nets;

10. Route added pins; and

11. Route added probes.

2.2.6.2.4 Hardware Chip Failure

If a LCA becomes unusable, it is added to a file containing a list of unusable LCAs (ASCII file). The partitioner reads this file and adjusts the appropriate board chip capacities. The system router 110 then reads this file as well and avoids mapping any partitions to the unusable chips.

2.2.6.3 System Router Failure Avoidance

Most of the routing strategies in this section will be at the expense of emulation speed, and will only be used if the number and nature of disconnects and the overall gate and pin utilization make them an attractive alternative to incremental or full repartitioning.

2.2.6.3.1 Connector and Connector Pin Moving/Swapping

Since connector and connector pin relocation carries no penalties other than cpu usage, it is one of the preferred methods of avoiding routing failure in the cases where external io appears to be linked to routing problems. It will be used both during the constructive phase of routing external nets and as a means of resolving failure during board level routing.

2.2.6.3.2 Mux Reassignment

Assigning routes to different muxes similarly carries no penalties and is used to resolve mux congestion problems.

2.2.6.3.3 Source Splitting

Source splitting is a method for using otherwise inaccessible routing resources.

2.2.6.3.3.1 Board nets

If a board net has more than two pins, but no single mux chip has wires to all connected chips, the net source is routed to multiple mux chips in an attempt to route subnets on separate mux chips. Skew should only be affected by the routes of the source pin to multiple IOB's on the source LCA. Each additional mux chip used would use up one additional board wire.

2.2.6.3.3.2 System Nets and External Nets

The net source may be split to get access to a free external board wire. The same wire penalties apply.

2.2.6.3.4 Using LCA's for System Routing

This is a method for using LCAs as an additional hierarchical board mux level.

Subnets of a net with three or more pins are routed on different mux chips, and the mux chips are connected through an unconnected LCA or one of the LCA's containing one of the net's load pins.

2.2.6.3.5 Using Pods for System Routing

Pods can be used as an additional backplane mux level to gain access to otherwise unreachable connector pins or to route otherwise unroutable system nets. Penalties are the same as the ones for Using LCA's for System Routing.

2.2.6.3.6 Moving Logic

This is an attempt to solve LCA pin design rule violations created by incremental changes without involving the partitioner. The router moves blocks from chips with excessive pin count in order to satisfy LCA external pin design rules.

2.2.6.4 Clocks

As set forth above, six global low skew lines are utilized in the present system.

A clock can be sourced from the instrumentation board, from a component adaptor, from a pod, from an IM, from another system or from an internal LCA.

Clock sources are routed to those backplane muxes with access to the global clock buffers and are assigned to the pins connected to those buffers. The buffers are prewired to dedicated clock pins on each LCA and do not have to be route.

2.2.6.5 Multi Source Nets

Sources and loads of multi-source nets are treated as separate nets that must be routed to a common highest level multiplexed chip.

2.2.6.5.1 Wired Ands/Ors

2.2.6.6 External Nets

Connector and connector pin swapping rules:
All connectors are swappable;
Pod connector pins are fully swappable;
Component adaptor pins are fully swappable;
Probes are swappable within their timebase;
System to IM connector pins have limited swapability; and
System to system connector pins are fixed on one system and fully swappable on the other.

2.2.6.6.1 Pods

2.2.6.6.1.1 Pods as Placement and Routing Resources

In the current system, pods can be used as a placement resource. If the pod contains a multiplexed chip rather than an LCA, this is obviously no longer possible.

Pods can also be used as additional routing resource to connect otherwise unroutable system or external nets. Because of the associated delay penalty, this falls into the category of last-ditch-efforts before failure.

2.2.6.6.1.2 Bidirectional Signals and Common Enables

Treatment of bidirects and common enables are treated as they are by conventional systems such as the RPM emulation system manufactured by Quickturn Systems of Mountain View, Calif.

2.2.7 Chip Place and Route Module

The function of the chip place and route module is illustrated in FIGS. 86–92. The chip place and route software is presently distributed by Quickturn Systems of Mountain View, Calif. under the trademark CONFIGURATION ACCELERATOR.

The QBIC creates netlists that are sized and optimized for the vendor field programmable array (FPGA) chips that are targeted. The QBIC creates these netlists in either a vendor specific or system specific format. A subsystem, referred to as "Splatter" is employed to communicate the netlists to the chip place and route server. In a typical user's computing environment, a network of computers will have the chip place and route servers installed on many nodes. This allows a single user of the configuration software of the present invention to employ many computers working in parallel to complete the chip configuration phase. Each chip place and route server resides on a different computer platform in a network of computers. When the splatter subsystem is invoked it broadcasts on the network the QBS process request for chip configuration servers. All free servers respond to the broadcast through remote procedure calls. Remote procedure calls are the basis for network and file system independent communications between computers.

When a chip place and route server answers a request for service, it requests a netlist, associated constraints (such as fixed placement, placement prohibitions, pin options, net weights, etc.), and parameter control from the QBS process. These are sent as data structures to the servers computing the individual chip placements and routings. The parameter information tells the servers how to place and route and what strategies to use (e.g., what to do if the first place and route attempt fails). Upon execution, the post-chip configuration database is returned to the QBS process. Along with the chip database, a file, called the "programming" or "bitstream" or "bit" file, is returned which contains the actual programming bits that can be read by the vendor chip. This bitstream file causes the chip to be configured into the actual gates and storage elements called for in the original netlist. Once programmed the chip will perform the function that is desired of it. These bitstream files are saved for the download phase of emulation when the actual hardware will be required.

Figure 86:
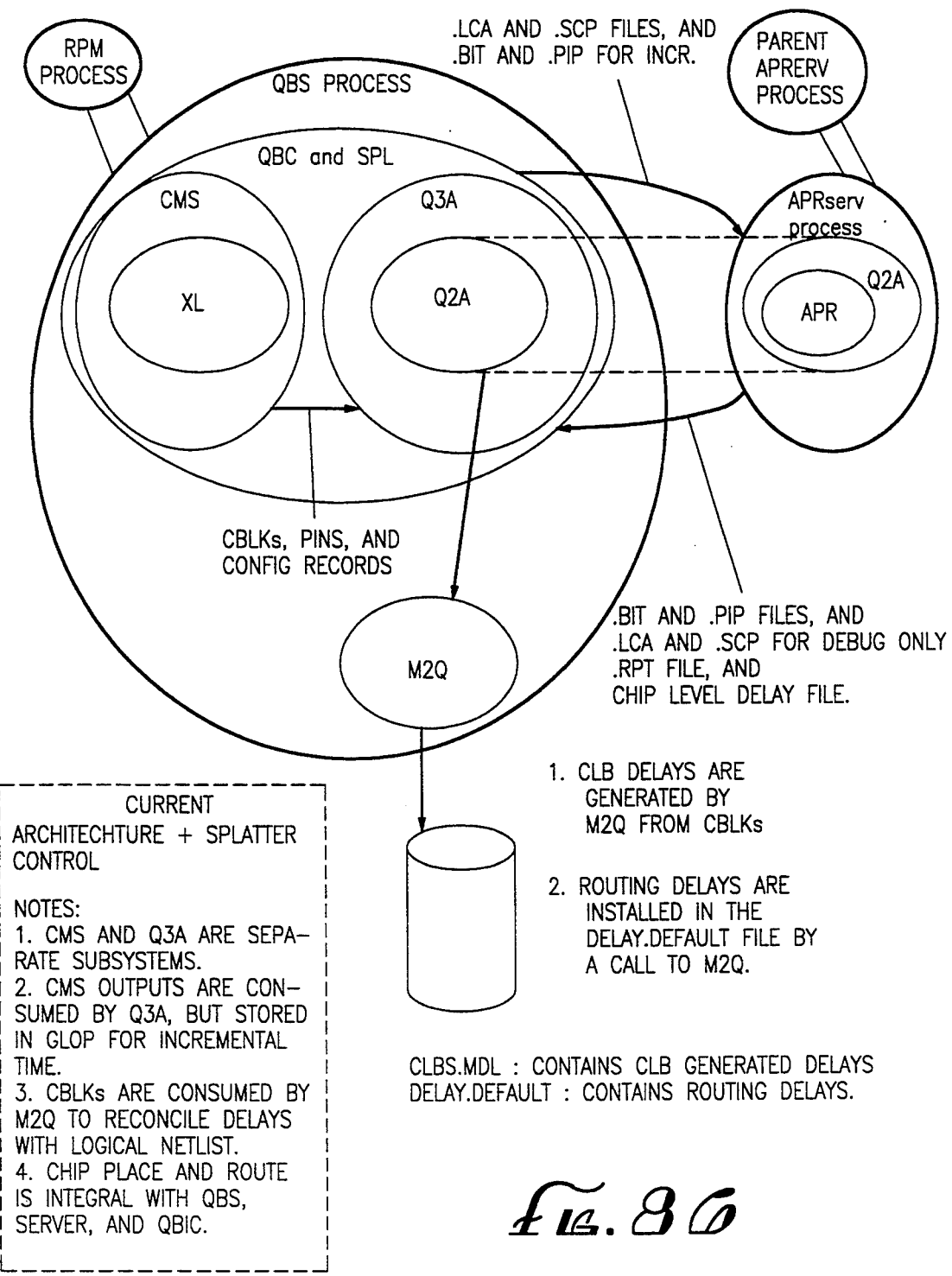
FIG. 86 illustrates a first embodiment of the chip place and route module.

FIG. 86 illustrates a first implementation of this architecture. In this implementation, the vendors' tools to perform technology mapping (called XL) and the vendor procedures to perform netlisting (in this case called APR) are embedded within the QBS process. More APR procedures are embedded in the APRserv process. XL and APR are trade names of Xilinx Corporation, and are included here as a specific examples of implementation. In FIG. 86, CMS, Q3A and Q2A represent system code that helps form chip level netlists, enforces proper handling of connections into/out of the chip, connections to the logic analyzer, and connections to the PODs and component adapter interphase. There is also special handling for clock nets, net weighting and important nets.

The parent process at the chip place and router server receives requests for serve, process them and hands-off control to the monitor process.

Figure 87:
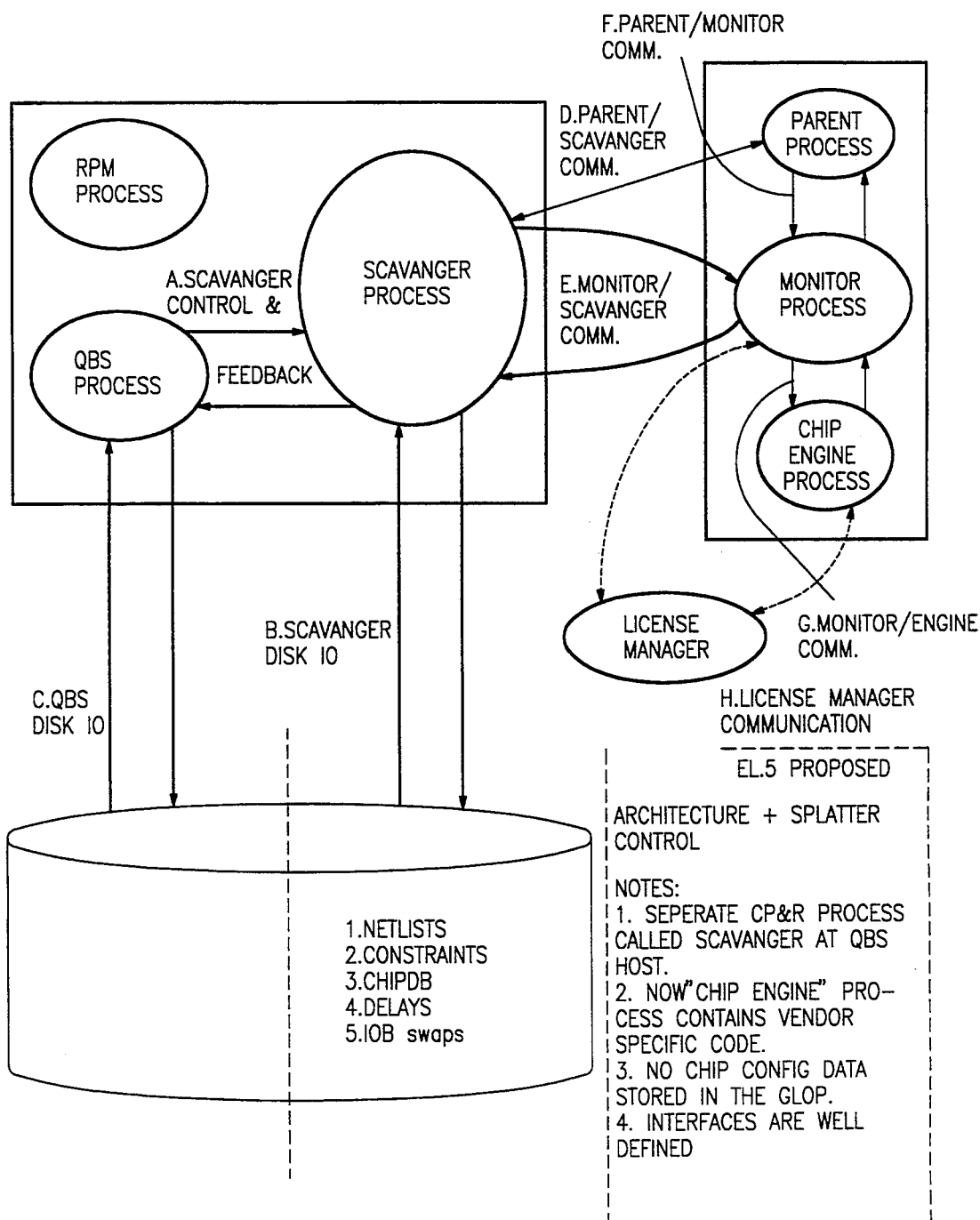
FIG. 87 illustrates a second embodiment of the chip place and route module.

FIG. 87 illustrates an alternative embodiment of this architecture in which the vendor tools are called as distinct, separate processes. The same steps as described above are performed. The main difference is that the technology mapper may be either in the QBS process or out at the chip place and route server. Here a new process is introduced, mainly for convenience, called the engine process. This new process contains all the instrumenta-tion of the vendor tools that are germane to that FPGA vendor's chip and not others.

Figure 89:
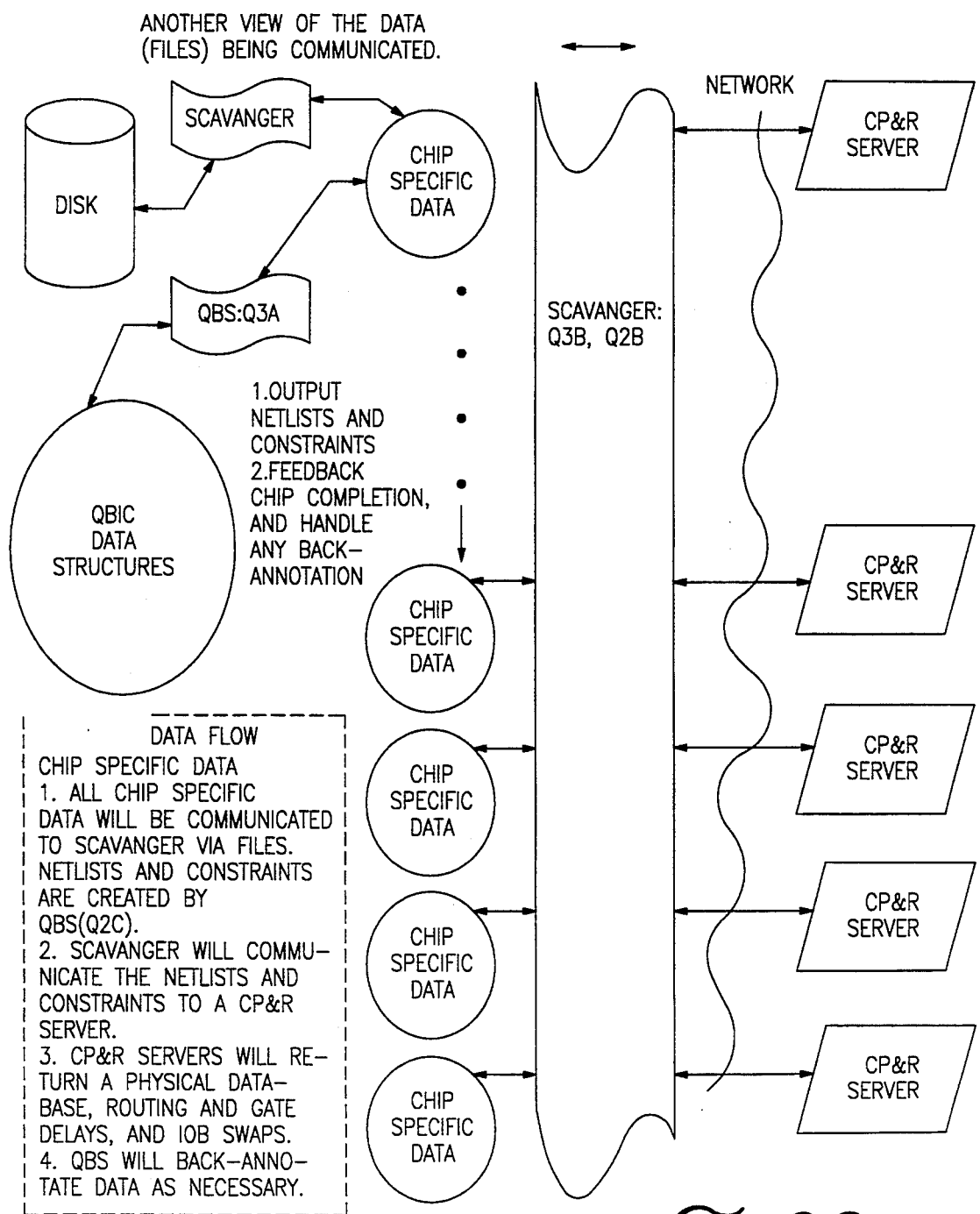
FIG. 89 illustrates data flow in the chip place and route module.
Figure 91:
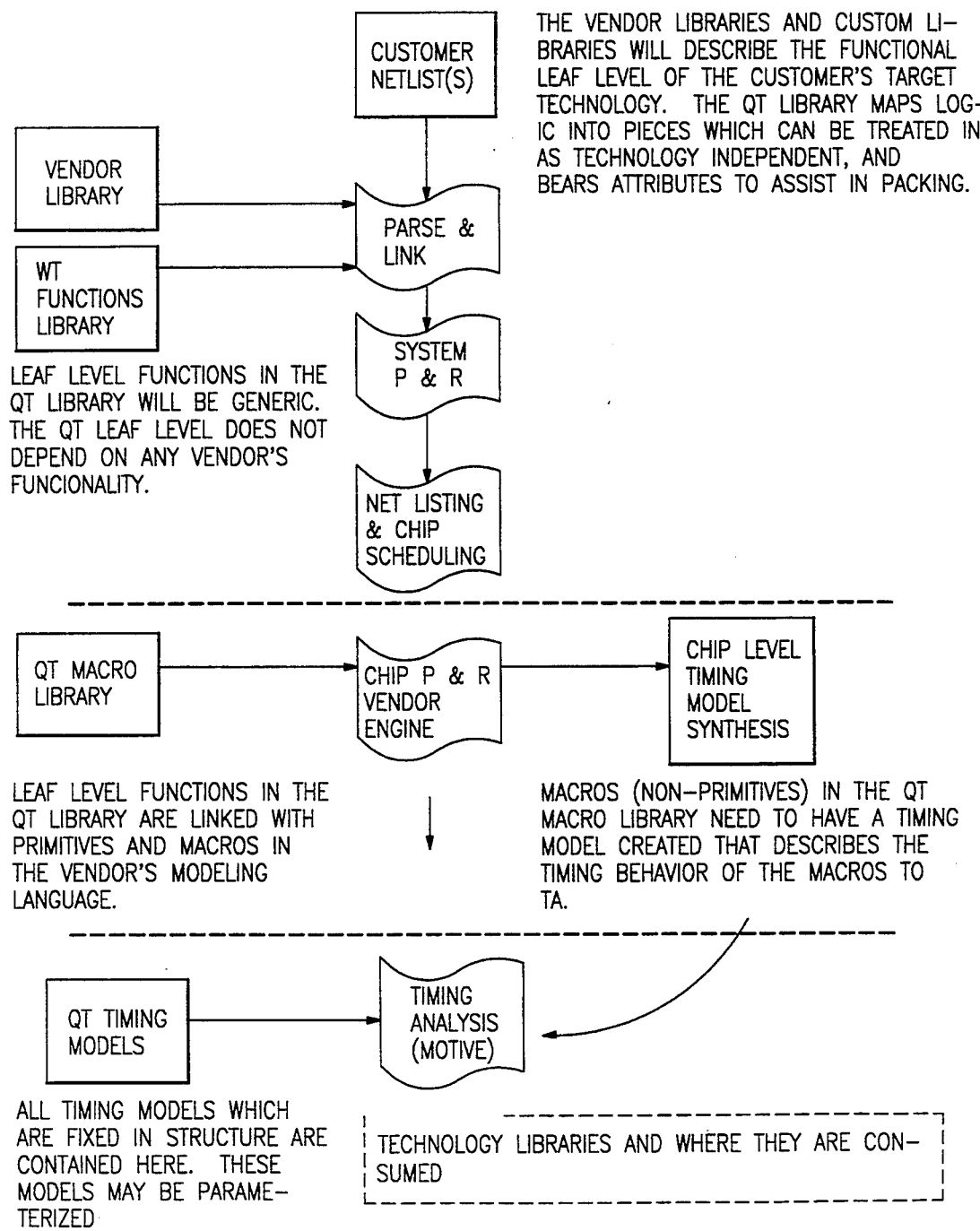
FIG. 91 illustrates technology libraries and their consumption.
Figure 92:
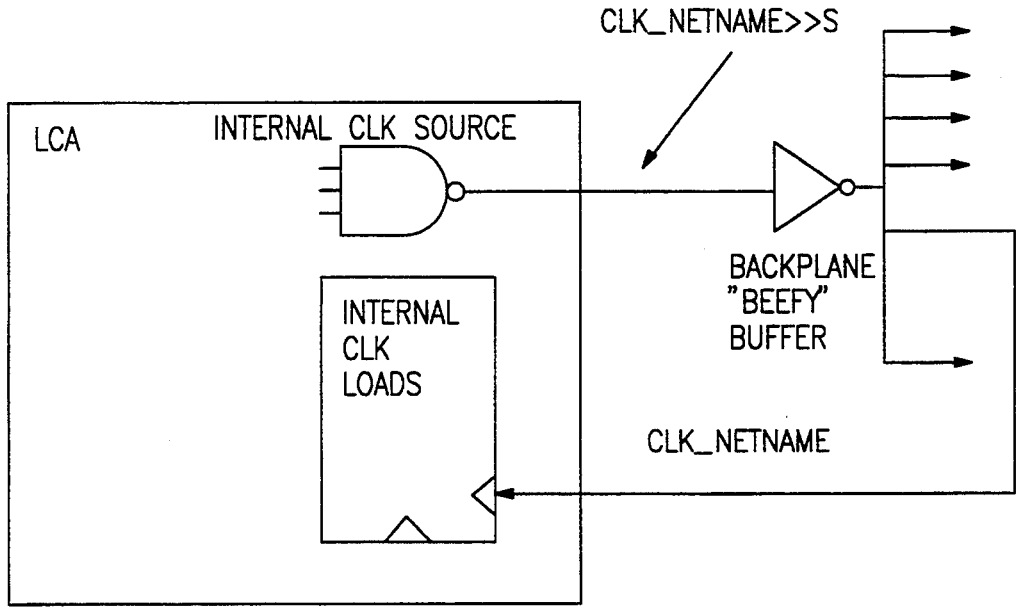
FIG. 92 illustrates beefy buffer insertion.

FIGS. 88–92 provide additional details about these architectures. FIG. 89 defines the types of data being sent. FIG. 89 also illustrates the multiprocessing environment. FIG. 90 shows a data flow inside such an engine process. FIG. 90 illustrates library linking at a high level across all subsystems of a system. FIG. 92 is a detail on low skew clock net splitting.

2.2.8 Timing Analysis Module

The goals of timing analysis are to:
Determine the emulation speed;
Calculate the Data syn pulse width;
Path delay Query (PDQ);
Identify critical paths in the emulation model;
Locate hold violations in the emulation model; and
Help the configuration process.

To reach these goals the system of the present invention employs a number of new technologies, including:
Hierarchical/Modular Timing Analysis Method. The hierarchical timing analysis method is introduced to take the modular approach to the timing analysis for handling large designs, for parallel timing analysis, and for efficient incremental timing analysis.

This method partitions a design into a number of subpartitions. The timing analysis is performed on each of the subpartitions in parallel. For the incremental timing analysis, only effected partitions need to be re-analyzed.

Design Topology Analysis

The purpose of developing a design topology analyzer is to:
1. Significantly reduce the manual work required to run timing analysis (identifying and defining the net exclusions and groupings).
2. Perform much thorough net exclusion and net grouping (feedback loops and buses) to bring the timing analysis speed into the expected range.

This functionality should be included as part of the Motive timing analyzer.

The following assumptions are made in accordance with the timing analysis method of the present invention:
Motive is the chosen core timing analyzer. However, other timing analyzers are available commercially.
Motive provides the necessary capabilities to support hierarchical/Modular timing analysis.
Improve the FALSE path detections in Motive with the FALSE paths due both to the design topology and to the non-sensitizable transitions.

4.5 Timing Analysis in The Configuration Process

Hardware Under Timing Analysis

The hardware under timing analysis is shown in FIG. 38. It consists of:
the design under emulation;
the logic modelled by the component adapter;
the pod logic;
the input data arrival timing from target system; and
the output setup and hold requirement.

The details of how the timing is modelled are discussed in the next section.

Figure 39B:
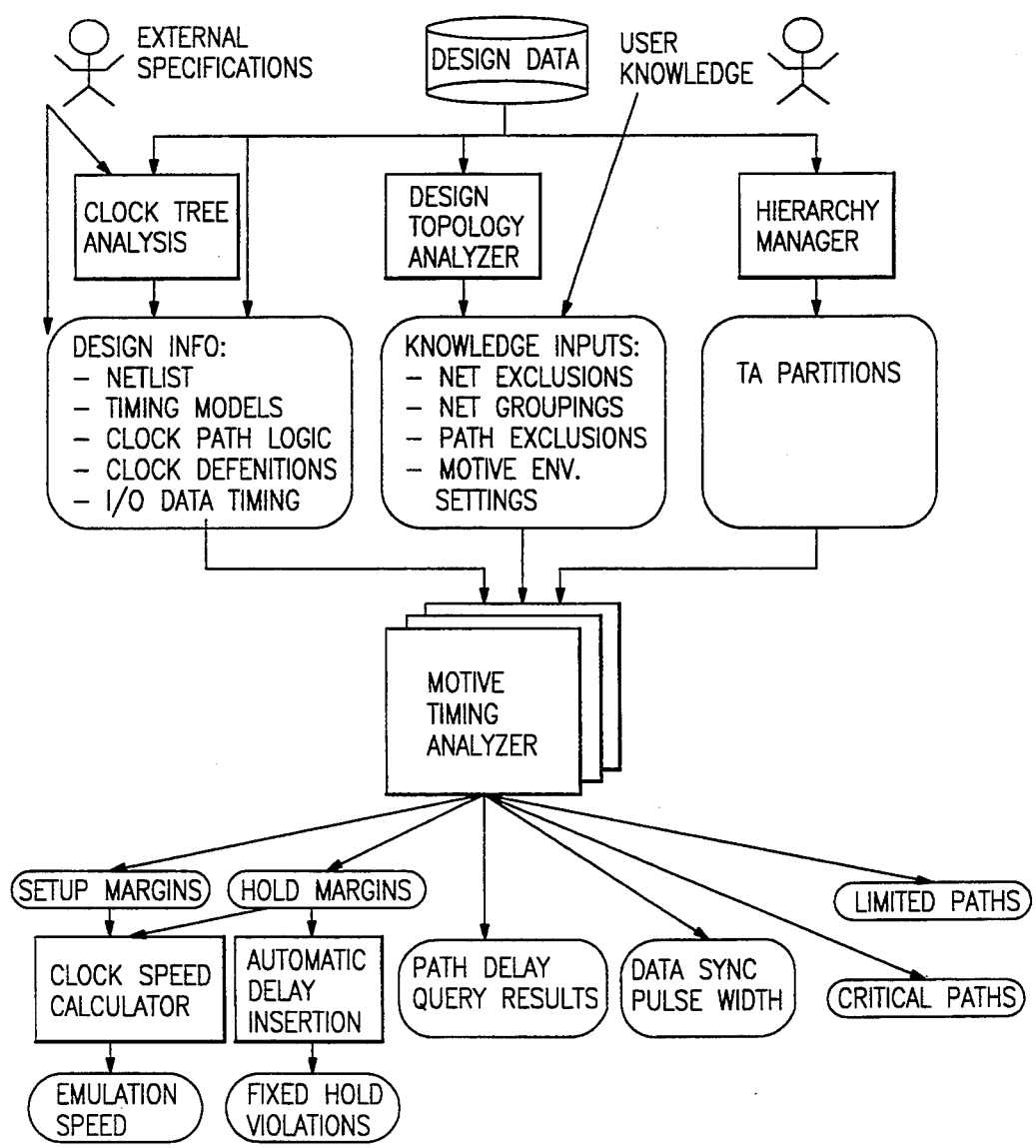
FIG. 39(b) illustrates timing analysis data flow.

Timing analysis data flow is illustrated in FIG. 38. Further as shown in FIG. 39, the netlist input to the timing analysis subsystem 114 is the optimized physical netlist. It is derived from users logic netlist by applying logic optimization and by back annotating the delays as shown in FIG. 39(a). As discussed above, the logic optimization module 104 transforms the netlist by applying a set of logic optimization rules to improve the timing characteristics of the configuration and to increase the emulation capacity. The system interconnect delays, on chip routing delays and gate delays are back annotated to the physical netlist.

The timing netlist for Motive is generated from the system design database. Procedural accessing methods are assumed for accessing the database. The database is accessed in two ways for accomplishing the timing analysis tasks: flat connectivity traversing and hierarchical connectivity traversing. The basic requirements for accessing flat connectivity are:

1. Given a block, provide the access to the ports on the block;
2. Given a net, provide the access to the leaf level ports that connect to the net and their directionalities;
3. Given a port, provide the access to the net that connects to the port;
4. Given a port, provide the access to the block that the port belongs to;
5. Given a block, provide a method of looping through all the ports on the block;
6. Provide a method of looping through all leaf level nets;
7. Provide a method of looping through all the leaf level blocks;
8. Given a block name, provide the access to the block;
9. Given a net name, provide the access to the net;
10. Give a port name, provide the access to the port;
11. Given a block, a net, or a port, provide the access to its full name;
12. Given a block, net, or a port, provide the access to its type and other book keeping information; and
13. Given a full path net name, provide the access to the names of the equivalent nets.

The basic requirements for accessing the hierarchical connectivity are:

1. Given a non-leaf level block, provide a method of traversing its child blocks;
2. Given a non-leaf level net, provide a method of accessing the hierarchical ports visible at that level;
3. Given a non-leaf level port, provide a method of accessing all the equivalent ports in the hierarchy;
4. Given a logic chip ID, provide the access to the circuitry on that chip;
5. Given a emulation board ID, provide the access to all the logic chips and mux chips on that board;
6. Given a emulation module ID, provide the access to all the emulation boards in that module; and
7. Provide a method of accessing all the emulation modules for a given emulation system.

Logic Chip Timing Modelling

The netlist passed to the timing analysis subsystem 110 consists of primitives (i.e. AND, OR) and special blocks (i.e. pre-configured CLBS).

The timing of a logic chip consists of routing delays and gate delays. In order to correctly analyze a design and accurately report path delays, it is important that the routing delays and the gate delays be kept separately. The gate and routing delays are back annotated to an input or an output port of a component.

For the primitives, the gate delays are back annotated to the netlist so that timing models can be generated for timing analysis. For the special blocks, timing models are supplied in the library. The special blocks are marked in the netlist.

System Interconnect Timing Modelling

System interconnect timing includes the delays between the logic chips on the same emulation module (board), across different emulation modules, and across different emulation systems. The delays consist of the wire/cable delays and the delays going through mux chips. The following description assumes the same delay for the chip-to-chip wires on a board, the same delay for the board-to-board cable in a module, and the same delay for the module-to-module cables in a system. The timing models of the wires and cables assume the worst case timing.

Figure 40:
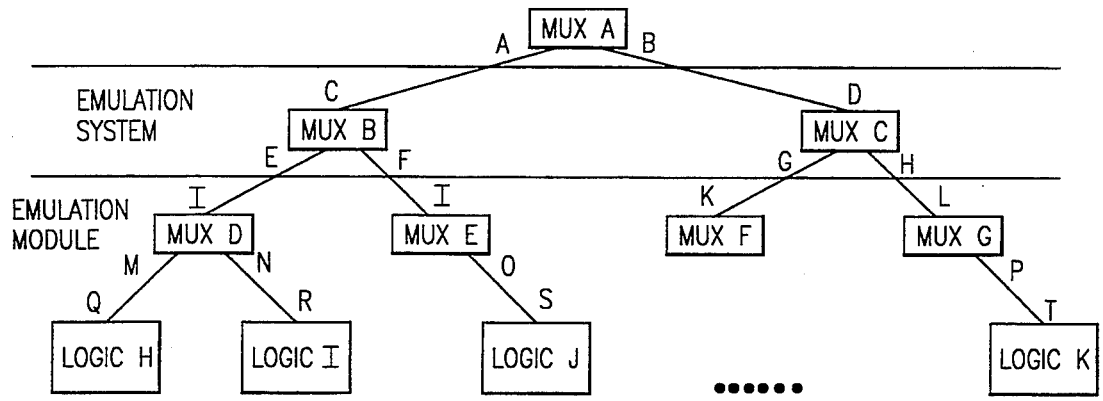
FIG. 40 illustrates system interconnect and timing modelling.

Turning now to FIG. 40, for the chip-to-chip interconnect delays, let:

$Delay_{mux\_chip(i,j)}$ be the pin i to pin j delay of the mux chip;

$Delay_{wire(i,j)}$ be the wire delay between chips (a logic chip to a mux chip) on the same module;

$Delay_{M\_cable(i,j)}$ be the module-to-module cable delay; and $Delay_{S\_cable(i,j)}$ be the system-to-system cable delay;

The following delay equations are based on FIG. 40.

Chip-to-chip (from logic chip H to logic chip I) timing modelling is calculated as follows:

$$Delay(q\!-\!.r) = Delay_{wire(q,m)} + Delay_{mux\_chip(m,n)} + Delay_{wire(n,r)}*$$

Across emulation module chip-to-chip (from chip H to logic chip J) timing modelling is calculated as follows:

$$Delay\,(q\!-\!>\!s) = Delay_{wire(q,m)} + Delay_{mux\_chip(m,i)} + \quad (EQ.\ 2)$$
$$Delay_{M\_cable(i,e)} + Delay_{mux\_chip(e,f)} + Delay_{M\_cable(f,j)} +$$
$$Delay_{mux\_chip(j,0)} + Delay_{wire(o)}$$

Across emulation system chip-to-chip (from logic chip H to logic chip K) timing modelling is calculated as follows:

$$Delay\,(q\!-\!>\!t) = Delay_{wire(q,m)} + Delay_{mux\_chip(m,i)} + \quad (EQ\ 3)$$
$$Delay_{M\_cable(i,e)} + Delay_{mux\_chip(e,c)} + Delay_{S\_cable(c,a)} +$$
$$Delay_{mux\_chip(a,b)} + Delay_{S\_cable(b,d)} + Delay_{mux\_chip(d,h)} +$$
$$Delay_{M\_cable(h,l)} + Delay_{mux\_chip(l,p)} + Delay_{wire(p,t)}.$$

(EQ 4)

Instrumentation Timing Modelling

The timing of the instruments under consideration are probes, pods, and component adapters. Again, the timing model for each type of cable is based on the worst case time.

For the instrumentation delay modelling, let:

$Delay_{probe\_cable}$ be the cable delay from emulation board to the logic analyzer;

$Delay_{pod\_A\_cable}$ be the pod cable delay from emulation system to the pod device;

$Delay_{pod\_B\_cable}$ be the pod cable delay from pod device to the target system;

$Delay_{CA\_cable}$ be the cable delay from emulation system to the component adapter; and $Delay_{logic\_chip}$ be the delay through a logic chip. The details of the logic chip delay modelling is discussed above.

Pod Delay Modelling

Figure 41:
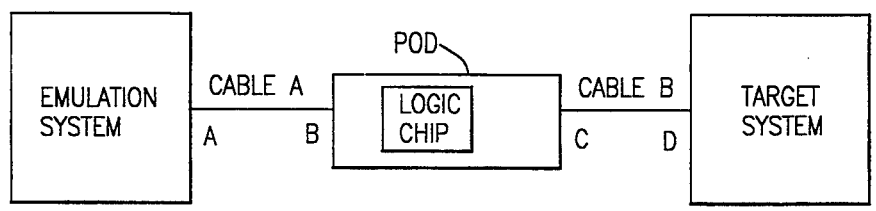
FIG. 41 illustrates pod timing modelling.

As shown in FIG. 41, delay $(a\!-\!>\!d) = Delay_{pod\_A\_cable(a,b)} + Delay_{logic\_chip(b,c)} + Delay_{pod\_B\_cable(c,d)}$ The logic chip in the pod could include a small portion of circuitry. In that case, the circuitry is fully analyzed as are other logic chips the system with in interconnect delays from emulation system to pod device being modelled by Delay$_{pod\_cable\_A}$ and Delay$_{pod\_cable\_B}$.

Probe Timing Modelling

The timing of the probes are modeled in a similar way as the pod timing is modelled. It includes all the cable delays to the logic analyzer.

Figure 42:
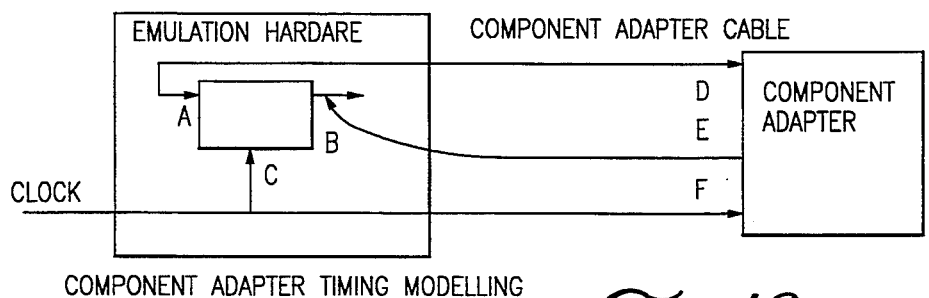
FIG. 42 illustrates component adaptor timing modelling.

Component adapter timing modelling is shown in FIG. 42. Where part of the design resides in the component adapter, the timing on both sides needs to be verified. Where the signal traverses from the emulation hardware to the component adapter and is latched into a flip-flop in the component adapter, the setup and hold time of that flip-flop should be checked. In the analysis, the component adapter cable timing model is used to model the interconnect delays.

In order to analyze all the cases, a user specifies a timing model for the component adapter. In that timing model, the user specifies the setup and hold requirements of the first rank flip-flops from the input signals that need to be analyzed. In addition, the user provides pin-to-pin delays from inputs to outputs for the paths that the user wants the timing analyzer to consider. The more detailed timing model provided, the more detail analysis is conducted.

Figure 43:
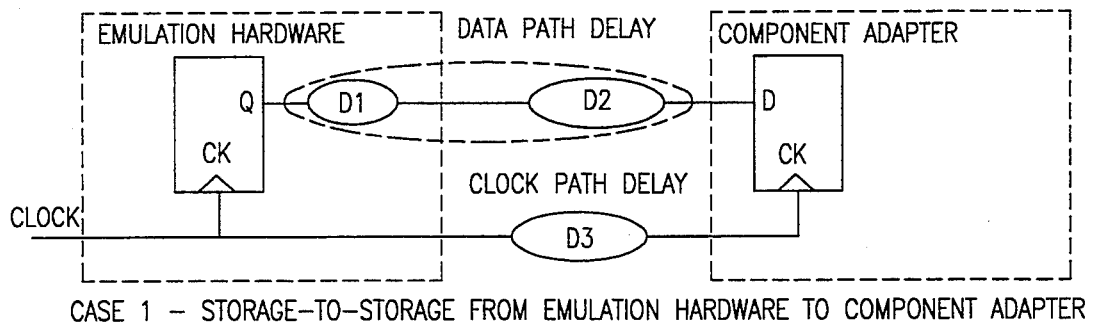
FIG. 43 illustrates storage-to-storage datapath delay from emulation hardware to component adaptors.

FIG. 43 provides an illustration of the storage-to-storage modelling. The signal is from a storage element in the emulation hardware through the component adapter cable to a storage element in the component adapter. In this case, the Delay$_{CA-cable}$ delays (D2, and D3) are taken into consideration in the datapath and the clock path delay calculations. Then the setup and hold requirements for the flip-flop in the component adapter is verified against the setup and hold specifications in the corresponding component adapter timing model. Similar timing modelling is performed where the signal goes from the component adapter to the emulation hardware.

Figure 44:
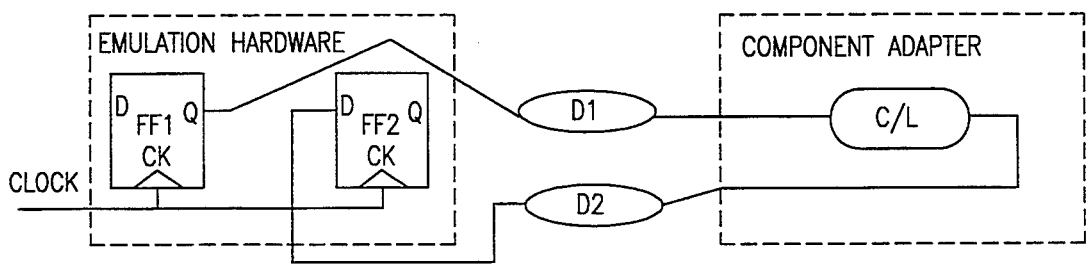
FIG. 44 illustrates datapath delay and component adaptors.

As shown in FIG. 44, where a signal goes into a component adapter and is fed back to the emulation hardware through combination logic in the component adapter, the setup and hold time check is performed on the D pin for the destination flip-flop (FF2) in the emulation hardware. The delay in the datapath includes the Delay$_{CA\_cable}$ delays from and to the emulation hardware and the path delay going through the combinational logic in the component adapter.

The external timing specification consists of:
  The clock definitions;
  The timing of the input signals arriving at the design's external inputs; and
  The time that output signal are required to hold stable.

Figure 45:
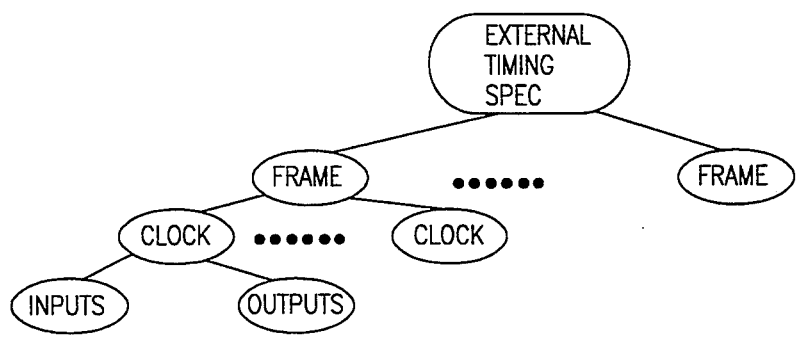
FIG. 45 illustrates the hierarchy of external timing information.

Referring to FIG. 45, a clock is specified by the following properties:
  The period;
  The polarity—whether the rising or falling edge comes first;
  The phase offset—the delay to the first edge;
  The duty cycle—the ratio between the up time and down time;
  The jitter—the cycle to cycle variance in period; and
  The frame of reference.

Figure 46:
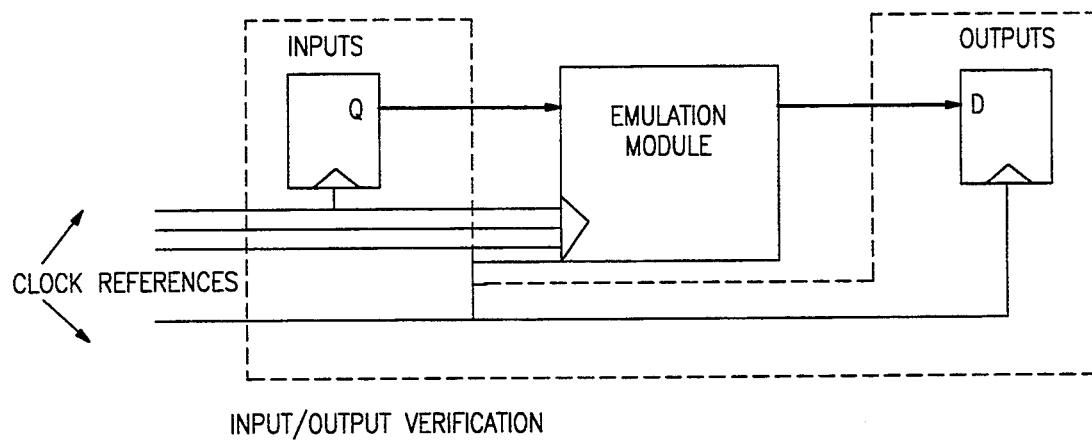
FIG. 46 illustrates verification of inputs and outputs.

FIG. 46 shows a conceptual view of how the external timing of an emulated design is modelled. The input data arrival time is represented by describing the earliest and latest times that an event can occur. An event is either a rising edge or a falling edge. Therefore, the description required to fully specify an arrival time is:
  The minimum rising time;
  The maximum rising time;
  The minimum falling time;
  The maximum falling time;
  The edge(s) of the parent clock which relate to the arrival times;
  The period of the arrival time. Period is inherited from the trigger signal which generates this functional signal; and
  The frame of reference.

The only timing considered here is the earliest and the latest transitions in case there are multiple transitions occurring.

Figure 47:
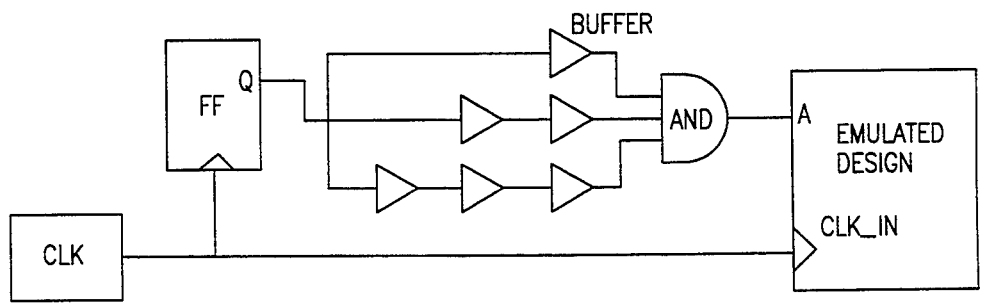
FIG. 47 provides an example of external input signals.

In the example shown in FIG. 47, signal A is generated before entering the emulation hardware. For the signal A, a similar descriptor is required:
  minlh = 10 ns;
  maxlh = 30 ns;
  minlh = 10 ns;
  maxlh = 30 ns;
  Trigger edge = rising;
  Period = 50 ns; and
  Frame of reference = default.

The min times result from the shortest path from CLK being the register to the one buffer branch to and gate. The sum of the min times along that path is 10 ns. The max path is the register, the 3 buffer branch, and the AND gate.

Figure 48:
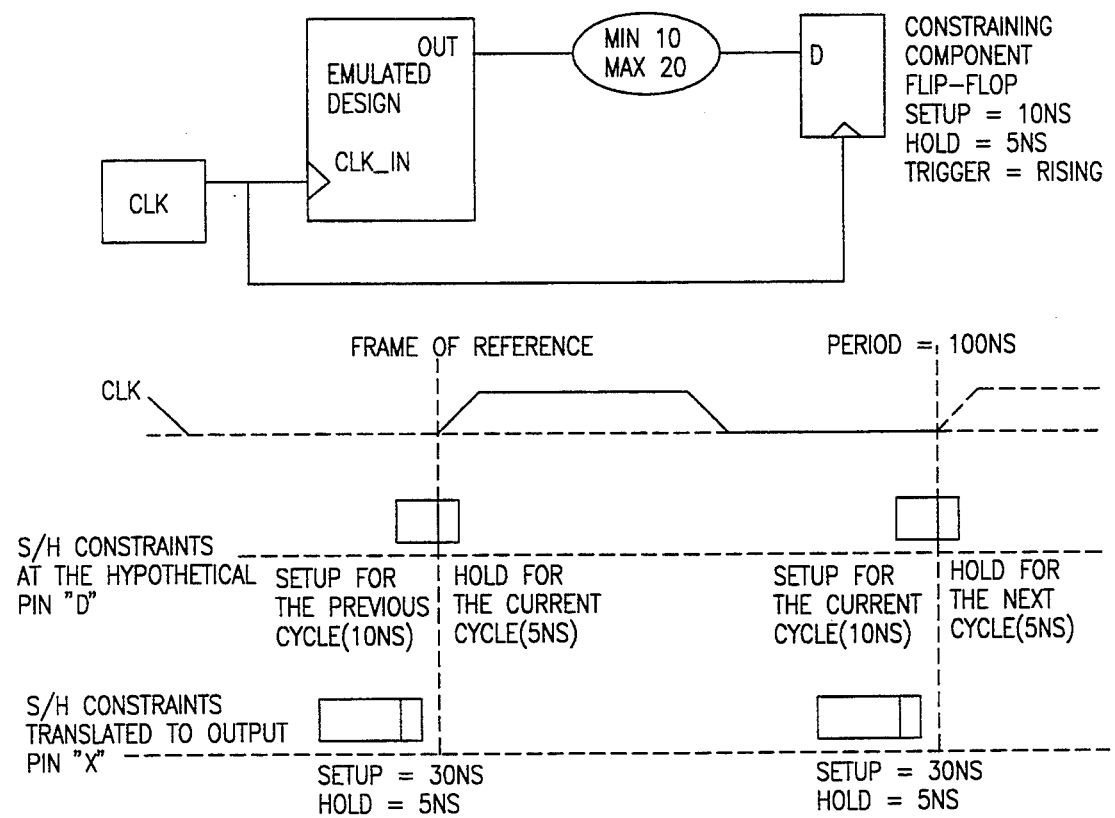
FIG. 48 provides an example of external setup and hold time calculations.

The time requirement for an output signal is to specify a window of time that the signal is expected to be stable to satisfy the setup/hold requirements of the destination flip-flops outside the emulated design as shown in FIG. 48. That timing requirement is represented by the setup and hold constraints relative to the corresponding clock signal.
  The setup time for rising edges;
  The setup time for falling edges;
  The hold time for rising edges;
  The hold time for falling edges;
  The edge(s) of the clock signal which relate to the constraint times;
  The period of the above constraint times. Period is inherited from the trigger signal which triggers the register(s) downstream from this signal; and
  The frame of reference.

These times are relative to a specific clock signal. The relationship to a clock signal provides information about the period of the setup and hold constraints.

More specifically, the setup time is the amount of time before the next active clock edge that an output signal must become stable. The hold time is the amount of time past the initial clock edge that the signal must remain stable. Combined, the setup and hold times define a range of real times for which the output signal must remain stable. This window of required stability holds for every cycle as defined by the clock period.

FIG. 48 shows an example of how the external setup and hold time can be derived.

The specific parameters needed to describe this output constraint are:

setup$_{rising}$ (OUT) = Delay$_{max}$ + Setup$_{rising}$ (D) = 20 + 10 + 30 ns

Setup$_{falling}$ (OUT) = Delay$_{max}$ + Setup$_{falling}$ (D) = 20 + 10 + 30 ns Hold$_{rising}$ (OUT) = −Delay$_{min}$ + Hold$_{rising}$ (D) = −10 + 50 = −5 ns Hold$_{falling}$ (OUT) = $-$Delay$_{min}$ + Hold$_{rising}$ (D) = $-10 + 50 = -5$ ns
Edge = rising
Period = 100 ns
Frame of reference = default In the above example, both rising delay and falling delay for the datapath are the same.

Note, the delays in the datapath between the OUT pin of the emulated design and D pin flip-flop increase the setup requirement and decreases the hold requirement when transferring the setup and hold requirements from D pin to Out pin.

Net exclusion is a mechanism to inform Motive to ignore the excluded nets in analysis. It is used to break feedback loops and to eliminate the paths need not to be analyzed. A set of net exclusion methodologies is fully described in the timing analysis chapter of the user's manual which Quickturn Systems of Mountain View, Calif. generally provides with its RPM system. That manual is hereby incorporated by reference.

Figure 49:
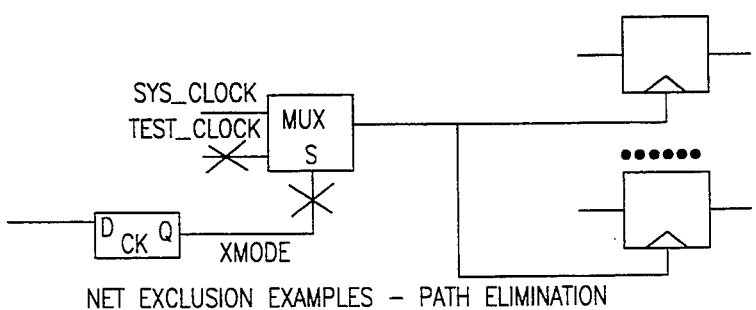
FIG. 49 provides an example of path elimination.

FIG. 49 illustrates the use of net exclusion to eliminate the analysis of unnecessary paths. The xmode is a mode selection signal which is set during chip power on to determine the mode of the chip operation: normal operation mode or test mode. If the only concern for the timing analysis is the normal operation mode, then one could exclude the test-clock signal (input to the mux) and the xmode signal (the mux select signal).

Figure 50:
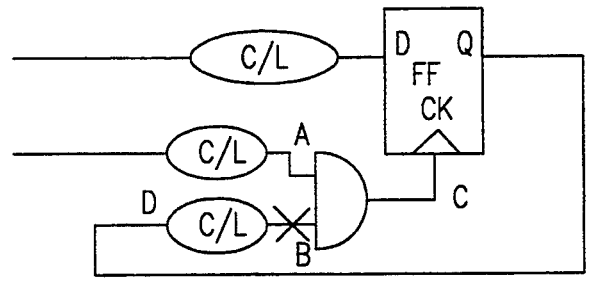
FIG. 50 provides an example of feedback loop breaking.

A similar mechanism is used to break a feedback loops. In the example shown in FIG. 50, signal b is excluded to break the feedback loop d-b-c-d.

Net grouping is one way to specify path exclusions. The nets defined in a group can never be in the same path. The net group concept is introduced to correctly analyze buses. The paths that the timing analyzer finds going through the bits of the same bus more than once usually are not intended circuit operations. By grouping the bits in the bus, FALSE paths are eliminated. Again, the net grouping methodology is described in the RPM user's manual.

Figure 51:
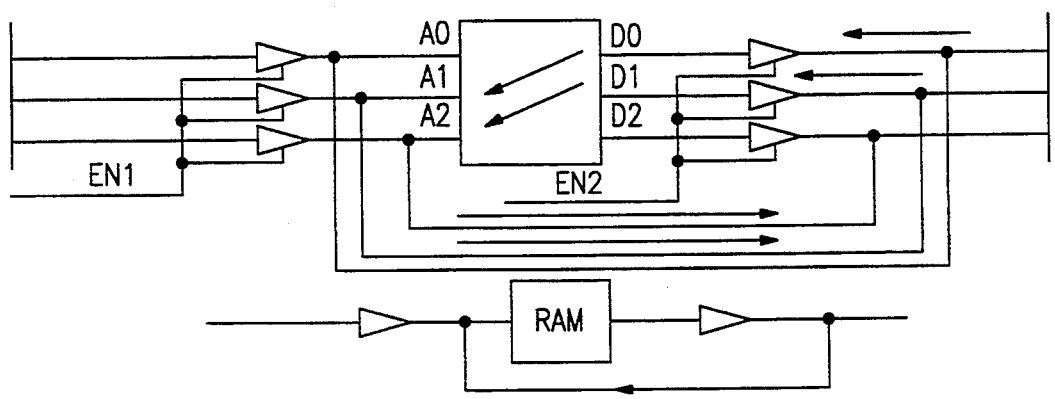
FIG. 51 provides an example of net grouping.

In FIG. 51, the bus A and bus D are candidates for the net grouping. Without the group, the timing analyzer will traverse the path from D0-A1-D1-A2-D2 which is a FALSE path.

4.7.3.3 Zero-Cycle Path

The zero- and multi-cycle path declaration is a way to inform Motive that certain paths have special properties based on a user's knowledge about the design. The circuit in FIG. 52 consists of two registers (Reg__A and Reg__B), datapath logic and a clock path logic. Both registers are clocked by the same clock with delays in the clock path of Reg__B.

Usually, the data on the Q pin of reg__A is setup for the D pin of Reg__B for the next clock cycle. To model that, Motive is defaulted to check the setup time at pin D of Reg__B against the edge E4.

Figure 52:
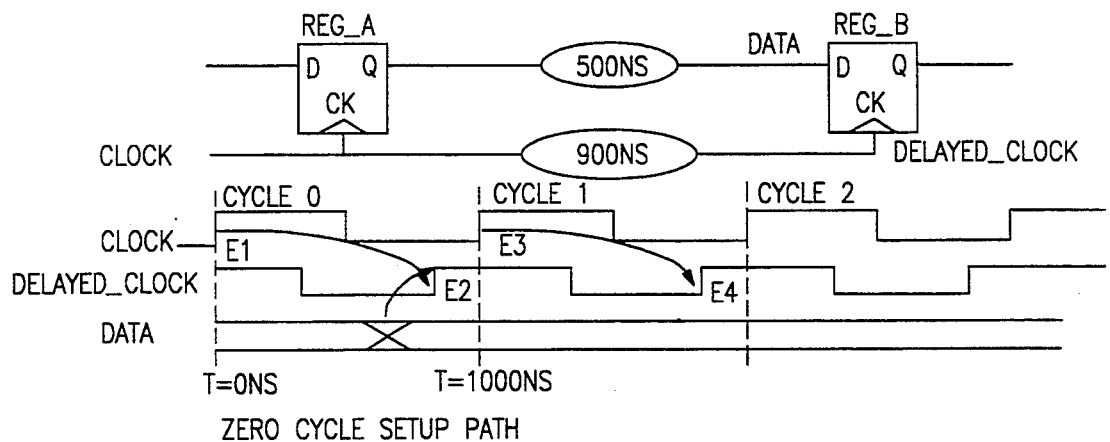
FIG. 52 provides an example of zero cycle setup path.

For certain operations, it is required to setup the data on Q pin of Reg__A to be latched into the D pin of Reg__B by the same clock edge. The circuit is usually constructed by including a larger delay in the clock path than the delay in the datapath from Reg__A to Reg__B, as shown in FIG. 52. In that case, the setup check on the datasignal should be checked against the rising edge E2 based on the intended circuit operation.

This intention is communicated to Motive via the zero cycle path declaration.

4.7.3.4 Multi-cycle Path

Figure 53:
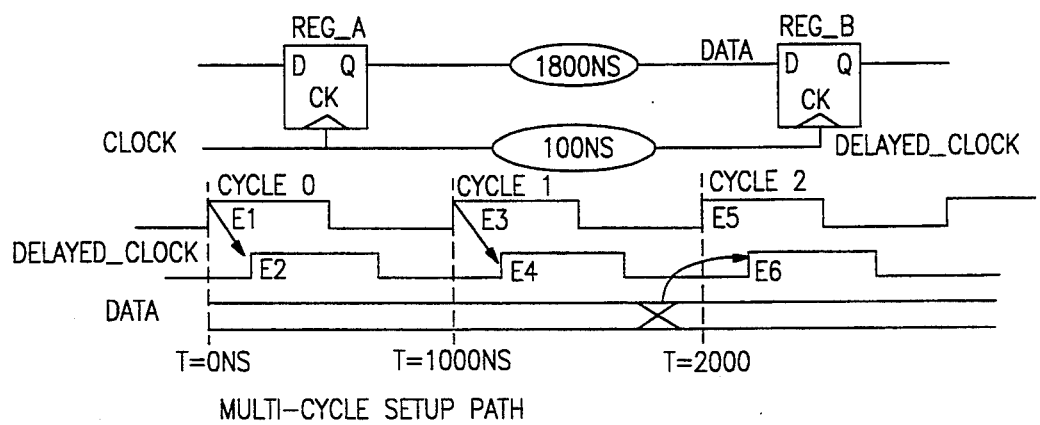
FIG. 53 illustrates a multicycle setup path.

FIG. 53 illustrates a multi-cycle Setup Path.

Similarly, explicit declarations of multi-cycle paths are required for such paths in the design. In the example shown in FIG. 53, the data at pin Q of Reg__A is intended to setup of the D pin of Reg__B two clock cycles later.

4.7.4. Outputs From The Timing Analysis Sub-System

Emulation speed;
Hold violation fixing advises and hold margins;
Circuital paths and setup margins;
Path delays (in Path Delay Query);
Data Sync pulse width (in Data Sync);
Asynchronous loop paths; and
Limited paths;
  1) Constraint evaluation time limited paths;
  2) Logic component depth limited paths; and
  3) Asynchronous set/clear limits paths.

4.8 Incremental Timing Analysis

Under the hierarchical timing analysis approach, full timing analysis in incremental configuration is unnecessary. Incremental timing analysis method could be used when a small portion of the design is modified.

In incremental timing analysis, partitioner start from the bottom level, and only the partitions that have changed are reanalyzed. As a result, a parent partition is reanalyzed if the modifications change the parent's external timing. This bottom up process continues until either it has reached an intermediate partition than the modifications in its child partition do not affect the external timing of that partition or the top level is reached. Only a few branches in the hierarchy tree are reanalyzed.

4.9 Worst Case Path Trace

Tracing worst case paths provides detailed information as to why a particular path may have violated timing. The worst case component and interconnect delay for both the clock and datapaths is reported. Worst case trace is very useful in isolating the timing violations.

A user may select the type of the constraint (setup, hold or both).

Setup—find the maximum (slowest) delay path that results in the least setup margin at the constrain input; or
Hold—find the minimum (fastest) delay path that results in the least hold margin at the constraint input.
The trace includes both the rising and falling edges.
Rising—find the delay path for a rising signal at the constrain input; and
Falling—find the delay path for a falling signal at the constraint input.

4.10 Path Delay Query

Path delay query (PDQ) lets you determine the delay between two pins. This capability is needed to diagnose designs with timing problems, to determine internal clock skews and to understand the setup and hold violations reported by the timing analyzer.

Given a pin pair (source and destination), PDQ performs a path delay calculation and produces four delay values that represent the path delay from the source pin to the destination pin. They are minimum low-to-high, maximum low-to-high, minimum high-to-low and maximum high-to-low delays. It also produces a path trace that includes intermediate instance and pin names and their corresponding delay.

This capability allows the user to query delay from any pin to any other pin. The query calculates the delay value as long as there is a path in the timing model from the source pin to the destination pin. The pins may be either on a sequential device or on a combinational device. There may be zero or one or more flip-flops between the source pin and the destination pin. For a flip-flop, as far as the timing model is concerned, there are paths from the clock pin to the output pins and from the set/reset pins to the output pins. Notice, there is no path found from the source pin to the destination pin, an error message is written to the timing analysis report.

In the case that the specified source pin has multiple sources and/or the specified destination pin has multiple destinations, path delay query conducts a path delay query of an arbitrary combination and reports the single result.

The input to the path delay query process is a list of pin pairs, each pair being a source pin and the designation pin. The pin paris could be specified through the enterprise User Interface.

2.2.8.1 Timing Analysis Subsystem Process Architecture

The complete timing analysis task is accomplished by the system UI process, the QBIC server process, the TA Compute server process, and the Motive process. In modular and parallel timing analysis scenario, there are multiple Compute servers an Motive processes running on the workstations across the network.

The system UI process invokes the QBIC server which controls and manages the Compute servers. The system UI process and the QBIC process are running on the same workstation. The QBIC server invokes Compute servers on the networked workstations using the utilities provided by the Splatter program (a network task dispatching program). Each server forks a Motive process (as its child process) on the same workstation that the Compute server is running.

The inter-process communication methods between the system UI process and the QBIC process are via remote procedure calls and files. The control and data communications between the QBIC process and the TA Compute servers are managed by the splatter program. The control is implemented based on the remote procedure call across workstations. The data communication relies on the low level TCP/IP network protocols. Approximately 3 Mbytes of temporary disk spaces are required for the data communications between a Compute server process and its Motive process. The exact amount of disk space required will be dependent on the size of each TA partition and the disk space requirement of Motive.

2.2.8.1.1 System UI Process

As the name suggested, the UI process provides the function of user interface. The three main functions it serves are: 1) specifying inputs, 2) controlling the execution, and 3) presenting the results.

The inputs specified through the UI process for timing analysis are:
Timing analysis parameters;
External timing specifications (clock specifications, I/O timing specification); and
Internal timing specifications (net exclusion, net grouping, path exclusion, boolean constants).

The controls provided by the UI for timing analysis are:
Initiate timing analysis;
Interrupt/halt timing analysis;
Initiate path delay query; and
Initiate worst case trace.

The results of timing analysis are stored in the timing analysis report. The UI process provides filtering and viewing mechanisms for reading the report.

2.2.8.1.2 QBIC Server (TA part) Process

This process manages the overall timing analysis task. The tasks performed in this process included:
Perform clock tree analysis;
Perform design topology analysis;
Initiate TA compute server;
Prepare the inputs for TA compute servers;
Initiate TA compute servers through splatter;
Monitor the timing analysis progress; and
Process the timing analysis results.

2.2.8.1.3 TA Compute Server Process

The functionality of the TA Compute server is to:
Format the timing analysis input specifications in Motive formats;
Invoke Motive process;
Issue the sequence of Motive commands to accomplish a specific task (i.e., timing analysis or path delay query);
Perform Motive error handling; and
Process the Motive output results.

2.2.8.1.4 Motive Timing Analysis Process

Motive timing analysis process performs the actual timing analysis on a partition. It analyzes:
Setup margins;
Hold margins;
Pulse width;
Critical paths; and
Path delays All the inputs to the Motive process are passed from its parent process via files. The outputs from Motive are all stored in files. The commands to Motive are issued to the pipe connecting the two processes. The command return code is sent to the parent process after executing the command.

2.2.8.2 Algorithms

2.2.8.2.1 Timing Analysis Methods

Four methods of timing analyses have been investigated ranging from flat to hierarchical. The two middle road approaches are modular and hybrid methods. The investigation concluded that the modular timing analysis method will best meet the timing analysis requirements for the system of the present invention Since the choice of timing analysis method is a major decision, some of the thinking processes that tend to the decision are documented in this section.

2.2.8.2.1.1 Flat Timing Analysis

The flat timing analysis approach analyzes the complete design at flat. The netlist is provided to a timing analyzer. This is the simplest approach if there are enough system resources (memory, computation cycles) on the workstation for the timing analysis to be performed.

2.2.8.2.1.2 Modular Timing Analysis

The basic idea of this approach is to analyze the design flat but divided into several partitions.

TA partition is constructed by extending the boundary of a given module to include the circuitry in its (direct or indirect) neighbors that are necessary to analyze the timing constraints in the module. Direct neighbors are defined to be the modules with which the given module has direct connections. The indirect neighbors are the modules where there is at least one delay path to the given module through one or more modules. This method may be recursively applied to multiple levels.

The entire design is analyzed by analyzing each TA partition. In that method, the design is first partitioned into N TA partitions and then each partition is analyzed in parallel.

In the present system, the timing analysis partitioning is based on emulation module partitioning.

The considerations in selecting the emulation module to be the basis for TA partitions are:

1. The largest size of design practical for Motive to analyze on a workstation with 60-120 Mbytes physical memory. To construct in core network data structure, Motive requires approximately 100 bytes per instance pin and 100 bytes per instance. During the actual analysis, it is observed that roughly additional 10-20% of the virtual memory is required.

Given that memory requirement, for a 60K gate design, assume that each gate have 4 input and 1 output pin, the virtual memory requirement is:

((5*100 bytes=100 bytes)* 60K gates)* 20%=43.2 Mbytes

This is a reasonable size process to be sent to other workstations on the network for parallel processing.

2. The timing analysis execution time. With some basic net exclusion, grouping, and perhaps applying boolean values to the testing logic, timing analysis on a 60K gate design should be able to finish in a couple of hours. By "basic", it is meant that these knowledge inputs to Motive could be automatically generated based on the topology of the design, not necessarily require intimate knowledge of the design.

3. The effectiveness of parallel timing analysis. The considerations here are: the overhead of shipping the data vs. the execution time and the amount of duplicated circuitry. The more partitions there are, the more circuitry is needed to be duplicated.

Examining the case where the TA partition is based on two emulation boards, the size of the TA partition will be around the 120K gates and the memory requirements will increase to around 86 Mbytes. At the same time, the analysis time will also increase. Let us also consider having TA partition based on logic chip partitions. This partitioning is too fine grain from both the overhead (execution time/data preparing time) and the amount of duplicated logics.

2.2.8.3 Modular Timing Analysis Partition Algorithm

This algorithm is constructed based on the assumption that the database is modular and it is impractical to bring in the database for the entire design into memory at once.

This algorithm does not require multiple emulation module databases to be brought into memory at the same time. In this algorithm, the database for each module is brought into memory once and the circuitry in the module which must be duplicated in other modules is extracted and distributed to the appropriate modules.

2.2.8.3.1 Terminologies

Figure 22:
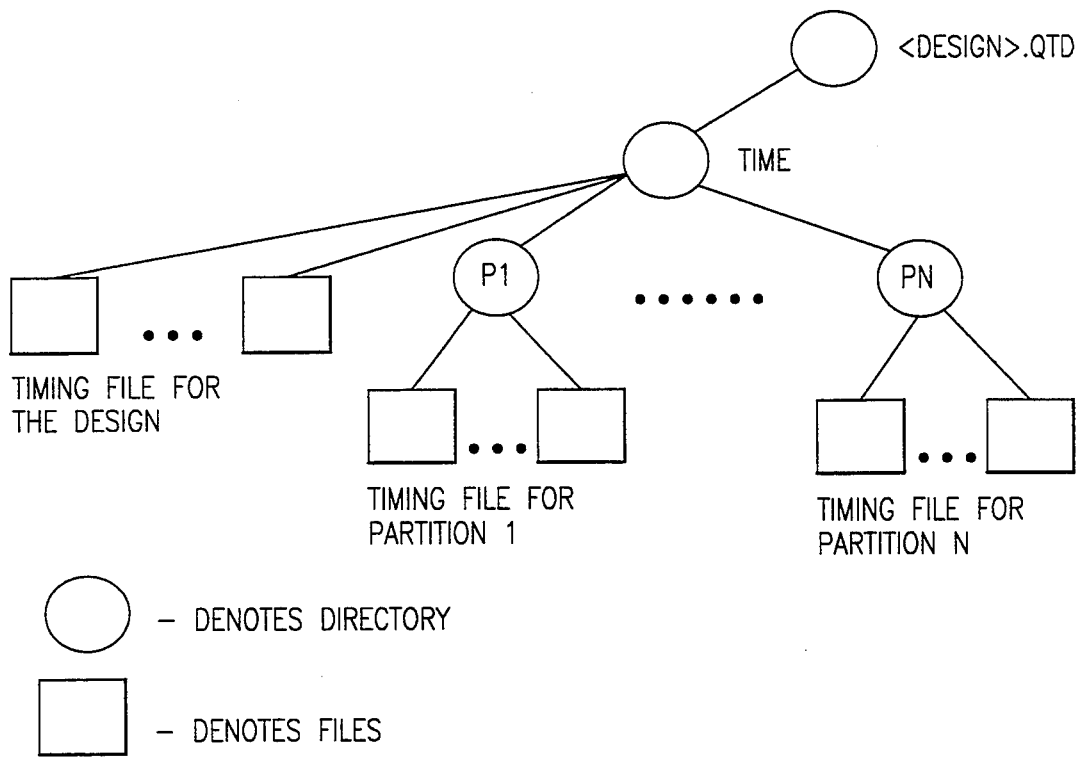
FIG. 22 illustrates the file directory structure for the timing subsystem.

Referring to FIG. 22, the following definitions are applicable to a discussion of the modular algorithm.

Module: A portion or the entire design. A module could be an emulation board, an system system, or a LEGO system.

Child_module: Child module of a module. A child module of a system is the emulation board.

Leaf_module: The leaf module is defined to be at the emulation board level (emulation module).

External circuitry: The circuit in a partition that would need to be duplicated in other partitions to satisfy the TA partition requirements.

2.2.8.3.2 Information Associated with Each Module (leaf or intermediate)

External circuitry of the module;
Added circuitry to the module; and
Input pin to output pin paths.

2.2.8.3.3 Main Data Structures

The data structures used and created in TA partition algorithm are:

QBIC data structure for each leaf level module (emulation module).

The QBIC data structure in TA partition process is mostly read only data structure. It contains the logic and physical connectivity information for the emulation module.

TA_Extracted_Ckt[I.M, I.N]

where:

M is number of modules (leaf and non-leaf),

N is the number of IO/output pins in the given module

Each entry in the array points to the external circuitry associated with the out/IO pin. For the leaf level modules, the list contains the blocks and net in the timing path. For the non-leaf level modules, the list contains the leaf level module ID and the pin ID which drives that pin. Given a leaf level module ID and a pin ID, the external circuitry associated with that pin could be retrieved by following external_ckt-[leaf_level_module_id_, pin_id].

TA-Added_Ckt[1.M, 1.N]

where:

M is number of modules (leaf or non-leaf)

N is the number of IO/input pins in the given module

Each entry in the array points to the circuitry needed to be included to construct TA partition. Again, for the leaf level TA modules, it contains the blocks and nets in the timing path. For the non-leaf level TA modules, it contains the leaf level module ID and pin ID that drives the pin.

TA_Partition_Netlist[1.M]

This structure holds the circuit information for TA partition 1 to M.

The simplicity of describing the TA partition algorithm, it is assumed TA_Extracted_Ckt[]and TA_Added_Ckt[] are M by N arrays and TA_Partition_Netlist[] is an 1 by M array. In implementation, they will be a combination of in memory data structures and disk files.

TA_Net_Stack[1.MAXSIZE]

A stack used in extracting external circuitry.

2.2.8.3.4 The Outline of the Algorithm

/*Name: TA_Create_Partition  
Function: create TA partitions for the emulation modules under module specified in the input parameter and extracts the external circuits for the module. The TA partitions are saved on disk to be used for timing analysis. The external circuitry are saved for performing TA partition on its parent modules if needed.

```
*/TA_Create_Partition (module)
    input module;
    output TA_Extracted_Ckt(1.M, 1.M};
    begin
        TA_Partition (module, TA_Extracted_Ckt[module, 1.N]);
        for each (leaf level module(i)) do
            for each (pin(j) on module (i)) do
                Merge_List(TA_Partition_Netlist[i],
                    A_Added_Ckt[i,j]);
                TA_Save_Partition_Netlist(TA_Partition_
                    Netlist[i]);
            end for
        end for
        TA_Save_External_Ckt(TA_Extracted_Ckt[module, 1.N]);
end. /*TA_Create_Partition*/
```

/*Name: TA_Partition  
Function: constructs the TA partitions for the modules under the module and extracts the external circuits for that module. The results are stored in TA_Extracted_Ckt[] and TA_ADDED_Ckt[]. This routine is called recursively to process the complete hierarchy under the module.

```
TA_Partition (module, TA_Extracted_Ckt[module, 1.N])
    input module;
    output TA_Extracted_Ckt[1.M, 1.N]);
    begin
        if (module is TA leaf module) then
            Load_Connectivity_Data(module);
            TA_Extract_External_Ckt(module,
                TA_Extracted_Ckt
                [module, 1.N]);
            Unload_Connectivity_Data(module);
        else
            foreach (child moduled(i)) do
                if (child moduled(i) is not partitioned) then
                    TA_Partition(module(i), TA_Extracted_Ckt
                        [i, 1.N])1
                else
                    TA_Retrieve_External_Ckt(TA-
                        Extracted_Ckt[i. 1.,N])1
                end if
                foreach (output pin (j) of module (i)) do
                    foreach (child module (k), pin (1) that
                        sources pin (j)) do
                        TA_Add_External_Ckt(k,1,
                            TA_Extracted_Ckt[i,j]);
                    end for
                    if(pin(j) connects to module's output pin(1))
                    then
                        TA_Add_External_Ckt(module, 1.
                            TA_Extracted_Ckt(i,j]);
                    end if
                end for
            end for
        end if
end. /*TA_Partition*/
```

/*Name: TA_Extracted_External_Ckt  
Function: extracts the external circuitry in a given module. The actual circuit extracting is performed on the leaf level modules.

```
TA_Extract_External_Ckt[i, 1.,N]];
    input module (i,j);
    output TA_Xtracted_Ckt[i, 1.,N]];
    begin
        foreach (output or IOput pin (j) of module (i)) do
            net = NET(pin)j));
            TA_Push_Net_Stack(net_stack,
                TA_Extracted_Ckt[i,j]);
        end for
end. /*TA_Extract_External_Ckt*/
```

/*Name: TA_Process_Net_Stack  
Functions: not handled in this algorithm:  
1. Async set/reset depth limiting; and  
2. Latch depth limiting.  
With simple modification, this algorithm could handle the async set-reset.  
Depth and the latch depth limit. The changes need to be made are to keep track the current set/reset depth and latch depth in the net stack for the net.

```
TA_Process_Net_Stack(net_stack,TA_Extracted_Ckt[i,j])
ioput net_stack[1.MAX_SIZE];
ioput TA_Extracted_Ckt[i,j];
begin
    while (net_stack !=EMPTY) do
        TA_Pop_Net_Stack(net_stack,net);
        foreach (pin)i in FANIN(net)) do
            block = BLOCK(pin(i));
            if (block is not visited in traversing (module
                (i) pin (j))) then
                Add block to TA_Extracted_Ckt[i,j];
                Mark the block;
                case block is:
                    Combinatorial block:
                        foreach (input_pin=INPUT_PIN
                            (block)) do
                            src_net=NET(input_pin);
                            if (src_net is not
                                visited in traversing
                                (module(i), pin(j))) then
                                Mark the net:
                                TA_Push_Net_Stack
                                    (net_stack,
                                    src_net);
                            end if
                        end for
                    Sequential block;
```

```
                    foreach (input_pin=INPUT_PIN
                    (block)) do
                            if (input_pin is not the
                            data pin) then
                                    src_net=NET(input_
                                    pin);
                                            if (src_net is
                                            not visited in
                                            traversing
                                            (module(i),
                                            pin(j))) then
                                            Mark the net;
                                            TA_Push_Net_Stack
                                            (net_stack, src_net);
                                            end if
                                    end if
                            end for
                        end if
                    end for
                end while
        end. /* TA_Process_Net_Stack */
/*Name: TA_Add_External_Ckt
Function:
*/
TA_Add_External_Ckt (module(i), pin(j), TA_Extracted_Ckt[m,n])
ioput module(i);
input pin(j);
input TA_Extracted_Ckt[1.,M,1.,N];
begin
    if (module (i) is TA leaf module) then
        if (module (m) is TA leaf module) then
            TA_Receiving_External_Ckt[i,j] =
            Add_List (TA_Added_Ckt[i,j], (module_m,pin_n);
        else
            foreach ( (Module(x), pin(y) in TA _Added_Ckt[m.n]) do
                Add_List (TA_Receiving_External_Ckt[module_i,
                pinj], (module(x),pin(y)));
            end for
        end if
    else
    if (module (m) is TA leaf module) then
            TA_Added_Ckt[i,j]   =   Add_Entry   (TA_Added_Ckt[i,j]
            (module_m,pin_n));
    else
            TA_Added_Ckt[i,j]   =   Add_list   (TA_Added_Ckt[i,j]
            (module_m,pin_n));
    end if
    foreach (child_module(k) that sources the input pin(1)) do
        TA_Add_External_Ckt(module(k),pin(1), TA_Added_Ckt [m.n];
    end for
end if
end: /*TA_Add_External_Ckt*/
```

The TA partition algorithms described above does not include the latch depth limit and set/reset depth limit in the extracting the external circuit. The algorithm could be enhanced to include this capability by keep tracking the latch depth and set/reset depth in the TA_Net_Stack.

The external circuits added to module resulting from the indirected path (indirect neighbor) is handled by adding a data structure TA_Delay_Path[1.M, 1.N] to keep track the delay paths (from input to output) for each of the TA partition.

2.2.8.3.5 TA Partition Usage

This algorithm accommodates both top-down (fully automatic) or bottom-up approach (semi-automatic).

For example, assuming a situation with four system machines. In the top-down scenario, a user runs TA_Create_Partition0 on the top level design. The result is that the design is partitioned into 32 (4*8) TA partitions and all 32 partitions are ready to be analyzed independently given the external timing information for the design.

Another approach is bottom-up. One may want to run TA_Create_Partition0 on each of the system machine and then run TA_Create_Partition0 on the entire design. As a result of running TA_Create_Partition0 on the partial design mapped onto an system machine, the partial design is partitioned into eight TA partitions. The eight TA partitions are ready to be timing analyzed provided with the external timing information of the partial design. After that, a user could run TA_Create_Partition0 on the entire design which will eliminate the needs of supplying external timing information for the signals which are internal to the design and across the systems. When TA_Create_Partition0 runs on the top level, it will not redo the partition work within each of the systems. It simply leverages the work that has been done during the bottom up process.

2.2.8.3.5.1 An Implementation Alternative

A similar modular timing analysis approach could be implemented internal to Motive. In that approach, the entire netlist, hierarchically organized, is presented to Motive and Motive will only construct the full data structures for the components which effect the portion of the design it is analyzing. In fact, the external circuitry extraction process is within the Motive. For instance, there are multiple Motive processes and each of which is analyzing one emulation module. For a Motive session which analyzes a given module, it will build data structures only necessary for analyzing that emulation module. This approach archives the objectives of handling large design and parallel timing analysis.

2.2.8.4 Timing Analysis Netlist Generation Algorithm

The design data input to Motive consists of two parts: a netlist described the connectivity of the design and timing models describe the timing of each component type.

This section discusses how to generate timing netlist for Motive timing analyzer and potentially for other foreign timing analyzer given a TA_Partition_Netlist. The timing model generation is described in the next section.

/*Name: TA_Generate_Timing_Netlist

Function: This function generates timing netlist for Motive timing analyzer given a TA_Partition_Netlist. The TA_Partition_Netlist contains all the blocks and nets in the TA partition. For each block, it includes all the pins and the nets they connected to.

```
*/
TA_Generate_Timing_Netlist (TA_Partition_Netlist[i])
input TA_Partition_Netlist[i];
begin
    open Motive netlist file for write;
    foreach (block in the partition) do /*generating logical
    portion of the netlist*/
        write (netlist_file, block header, block name, block
        type);
        foreach (pin on the block) do
            write (netlist_file, pin header, net, pin, pin
            type);
        end for
        write (netlist_file, block tail);
    end for
    foreach (net in the partition) do     /*    generate
    physical portion of the netlist*/
        foreach (wire on the net) do
            write (netlist_file, block header, wire name,
            wire type);
            write (netlist_file, pin header, source_net,
            pin, pin type);
            write (netlist_file,    pin_header,
            destination_net, pin, pin type);
            write (netlist_file, block tail);
        end for
    end for
    close Motive netlist file;
end. /*TA_Generate_Timing_Netlist */
```

2.2.8.5 Timing Model Generation Algorithm

The timing models input to Motive include timing model libraries and control files. The timing model libraries contain timing models. The control file lists those timing models in the libraries that are reference in the design under timing analysis. If there is any parameterized timing models, the parameters could be defined in the control file. This control file is used by Motive to pull relevant timing models out of the timing model libraries and to bind parameters if they are defined.

In order to achieve accurate timing analysis, what is needed to model is as follows:
Logic chip primitive timing;
Logic chip routing timing;
Mux chip timing;
System interconnect timing; and
Instrumentation timing.

2.2.8.5.1 Logic Chip Primitive Timing

The netlist that timing analysis performs on is the optimized physical netlist. The optimized physical netlist is generated based on the optimized netlist with back annotating component and interconnect delays. The optimized netlist is transformed from the Quickturn's implementation (Quickturn library mapping) of the user's netlist by applying logic optimizations.

For a given TA partition, timing analysis is performed on the flat netlist. In the optimized physical netlist, the leaf level components are considered to be primitives. A primitive is defined to be: Xilinx combinatorial primitives (i.e. NAND), Xilinx sequential primitive (i.e. DFF), system primitives (i.e. preconfigured CLB), or component adapter primitives.

The methods of generating timing models are different for each primitive type. The methods include statically defined timing model, parameterized timing models, and dynamically generated timing models.

2.2.8.5.1.1 Generating Timing Models for Xilinx Combinatorial Primitives

Because the timing analysis is performed on the flat optimized netlist, each instance of the Xilinx combinatorial primitive may have different input to output delay values. During logic to physical technology mapping, a cluster of logic gates could be mapped into one function generator. The back annotation method by APR will annotate the path delay, from an input to the output, to the input pin of the component that coincide with the input of the function generator.

Figure 23A:
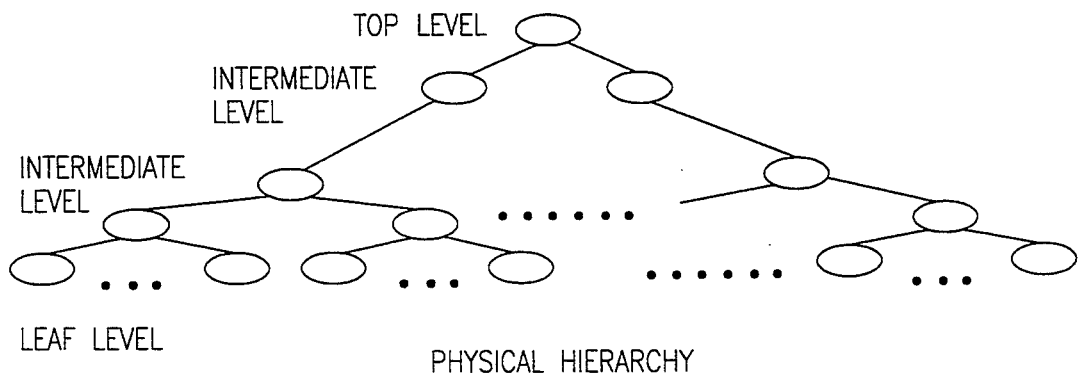
FIG. 23(a) illustrates physical hierarchy in timing analysis.

For example, as shown in the FIG. 23(b), the path delay from signal A to D is back annotated to pin a of instance I1. Similarly, the delay from signal B to D are back annotated to pin b of instance I1 and the delay from signal C to D are back annotated to pin c of instance I2.

Because of the structure of the timing models (pin-to-pin delay paths) and the types of the delays (i.e. inverted or uninverted) are predefined, the timing model for this type of primitives could be generated via parameterized timing models mechanism supported in Motive.

In a parameterized timing model, a timing model for each type of primitive is predefined and perhaps compiled into a timing library. In the timing models, the delay values of the timing models are defined in terms of the parameters passed into the timing model during the actual instanciation. Using the parameter capability in Motive, the actual delay values are specified in the timing model control file when the model is instantiated. A default parameter value may supplied in case the parameter is not supplied in instantiating timing models.

Assuming every primitive gate only has one output, we could name the delay parameter from input to output after the input pin name with the suffixes of minlh, typlh, maxlh, minhl, typhl, and maxhl to denote the type of delay. The default value for all the delay are set to 0, so that for the instances with no delays, the generic timing model could be applied. Following this parameterization and naming convention, the timing model generation process is quite simple. For each input pin, it assigns the actual delays to the parameters which is named after that pin with preselected suffixes.

For example, for a design consists of three instances of 2-input AND gate in a design and each of which has different delay value from the inputs to the output. The 2 inputs pins are A and B and the output pin is O.

The delay values for each of the gate:

and__1: delay(A—>O)=(3,4,6)ns, delay(B—>O)=(2,3,4)ns and__2: delay(A—>O)=(,0,0)ns, delay(B—>O)=(0,0,0)ns and__3: delay(A—>O)=(3,0,4)ns, delay(B—>O)=(3,4)ns The delay model in the timing model library:
MODEL:QTX3090AND
DESCRIPTION: AND GATE
SOURCE: Xilinx external netlist spec VI.01
$ denotes the parameterized variable.
PARAM:
$A__minlh=0.0; $A__typlh=0.0; $A__maxlh=0.0;
$A__minlh=0.0; $A__typlh=0.0; $A__maxlh=0.0
$B__minlh=0.0; $B__typlh=0.0; $B__maxlh=0.0;
$B__minhl=0.0; $B__typlh=0.0; $B__maxlh=0.0;
PINDEF GATE 3 PINS
INPUTS: A,B;
OUTPUT: O;
END__PINDEF
DELAY NAN A TO 0 $A-minlh $A-typlh $A-maxlh $A-minhl $A__typhl $A-maxhl
DELAY NAN B TO 0 $B__minlh $B-typlh $B__maxlh $B__minhl $B__typhl $B__maxhl
END__MODEL For each exact syntax of the timing models, please consult Motive system reference manual.

The actual instanciation of the timing model in the control file:

```
. . . . . .
QTX3090AND
QTX3090AND (OCC=and__1, $A__minhl=3, $A__typlh=4,
            $A__maxlh=6, $B__minhl=2, $B__typhl=3,
            $B__maxhl=4)
QTX3090AND (OCC=and__3, $A__minlh=3, $A__typlh=0,
            $A__maxlh=4, $B__minhl=3, $B__typhl=4,
            $B__maxhl=5)
. . . . . .
```

For Xilinx 3090, the combinatorial primitive set includes: QTX3090AND, QTX3090OR, QTX3090NAND, QTX3090NOR, QTX3090XNOR, QTX3090XOR, QTX3090INV, QTX3090BUF, QTX3090OBUF, and QTX3090TBUF.

2.2.8.5.1.2 Generating Timing Models For Xilinx Sequential Primitives

The timing models for the Xilinx sequential primitives, DFF and DFFN, are predefined. The setup/hold constraints and delay values are the same for every instantiating.

Therefore, for the DFF and DFFN primitives, the timing model could be precompiled into the timing library and all the instance of the DFF and DFFN will instantlate the predefined timing models.

2.2.8.5.1.3 Generating Timing Models for Quickturn Primitives

Similar to the Xilinx sequential primitives, the timing models for the Quickturn primitives are predefined. The predefined timing models are compiled into the timing model library. During the timing model generation process, the name of the timing model is listed in the control file once for each type of the primitive since all the instances of this type are instantiating the same timing model.

2.2.8.5.1.4 Generating Timing Models for Component Adapter Primitives

The timing model for the component adapter are specified by a user via system user interface.

A user is able to specify pin-to-pin delays, setup and hold requirements. The information is then translated to Motive timing model dynamically.

2.2.8.5.2 Logic Chip Routing Timing

The on-chip routing delay is again back annotated to the optimized netlist. For a connected pin pair, the source and the destination pin, the routing delay is annotated to the destination pin. The destination pin is an input pin and the source pin is an output pin.

Both the gate delays for the Xilinx combinatorial primitives and the routine delays are back annotated to the input pins, but they are kept separately. The gate delays are input to Motive via parameterized timing models for the gate and the routine delay are input to Motive via back annotate interconnect delay mechanism. One major reason that the gate and routing delays are kept separate is to be able to accurately query the path delay. Consider the following example shown in FIG. 24.

Assuming the gate delay for the inverter/Inst__2, is delay__g and the routing delay between pin/Instr__1/Q and Inst__2/I is delay__i. In the method described above, the delay__g is specified in the timing model for the inverter through timing model parameterization. The delay__i is back annotated to the pin-to-pin delay from/Inst__1/.Q and/Inst__2/I.

In this case, path delay query for the pin pairs from-/Instr__1/Q to/Inst__2/I will report delay__i, from/Inst__2/I to/Inst__2/Z will report delay__g, and from/Inst__1/Q to/Inst__2/Z will report (delay__i+delay__g).

If the routing delay (delay__i) and the gate delay (delay__g) are not kept separate, and the delay (delay__i+delay__g) is back annotated as the interconnect delay. Then, path delay query will report wrong results. The path delay query for the pin pairs from/Inst__I/Q to/Inst__2/I would report (delay__i+delay__g), from-/Inst__2/I to/Inst__2/Z will report 0.

Using the above method of back annotating routing delay to the logic netlist, the routing delay back annotated for the circuit shown in FIG. 25: from pin/Inst__1/Q to pin/Inst__2/I is (d1+d@) and from pin/Inst__1/Q to Inst__3/I is (d1+d3). The fact that there is a reconvergence point (X) in the physical netlist is lost.

In order to accurately model the physically reality, a construct need to be introduced in the logic netlist to reflect the physical reconvergence point. Some designing work will required to enhancing the delay back annotation and timing model generation algorithm to properly handle this.

2.2.8.5.3 Mux Chip Timing

The timing model generation for the mux chip will closely follow the method used in logic chip.

2.2.8.5.4 System Interconnect Timing

At the system level, the timing models provided to Motive is based on the physical netlist. Each type of wires in the system (i.e., chip-to-chip interconnect, board-to-board interconnect, pod connector) are modelled as a real component. There will be a delay model for each type of wire and the timing of these components are predefined based on the actual measurements.

2.2.8.5.5 Timing Model Generation Outline

```
/*Name:    TA_Generate_Timing_Models
Function:
*/
TA_Generate_Timing_Models (TA_Partition_netlist[i])
input TA_Partition_netlist[i];
begin
    /*Generate timing models for the primitives*/
    foreach (block in TA_Partition_Netlist[i]) do
        case block of:
            Xilinx_combinatorial_primitive:
                output parameterized primitive instanciation
                statement in the control file (primitive_name,
                instance_name, delay parameters);;
            Xilinx_sequential_primitive:
                output the primitive type name if it is not already
                listed in the control file;
            Quickturn_primitive:
                output the primitive type name if it is not already
                listed in the control file;
            Component_adapter_primitive:
                generate the timing model for the component based
                on user's specification;
                output the timing model name in the control file;
        end case;
    end for
    /*Generate timing models for routine/interconnect wires*/
    foreach (net in TA_Partition_Netlist[i]) do
        foreach (input_pin in FANIN)
        end for
end. /*TA_Generate_Timing_Models */
```

2.2.8.6 Performing Full Timing Analysis

Figure 26:
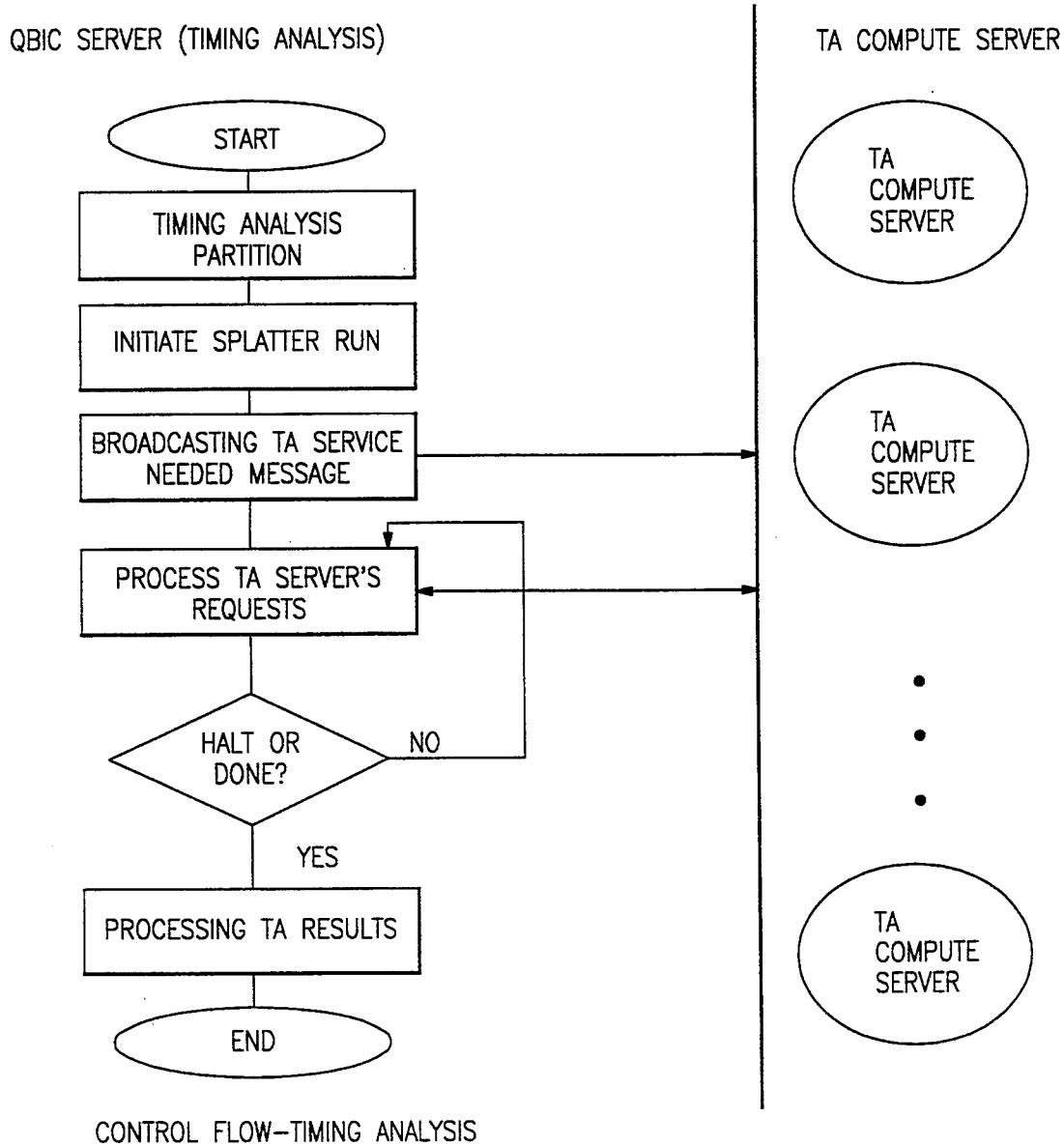
FIG. 26 is an illustration of control flow during timing analysis.

FIG. 26 shows an overall control flow of the timing analysis module 114. The task dispatching and message communications are managed by the Splatter program. The number of Compute servers invoked depends on the availability of workstations on the network and the number of the partitions that need timing analysis. The QBIC servers provides the design data and input specifications to the TA Compute servers.

During timing analysis, the QBIC server monitors the progress of the Compute servers to detect any failure or staying in infinite loops. The actual analysis on the partitions is performed by the compute server process and Motive processes. The analysis results are sent back to the QBIC server for generating timing analysis report.

The two main requests processed by the QBIC server are: dispatching timing analysis task request and processing the timing analysis results request.

2.2.8.6.1 Processing Dispatching Timing Analysis Task Request

Figure 27:
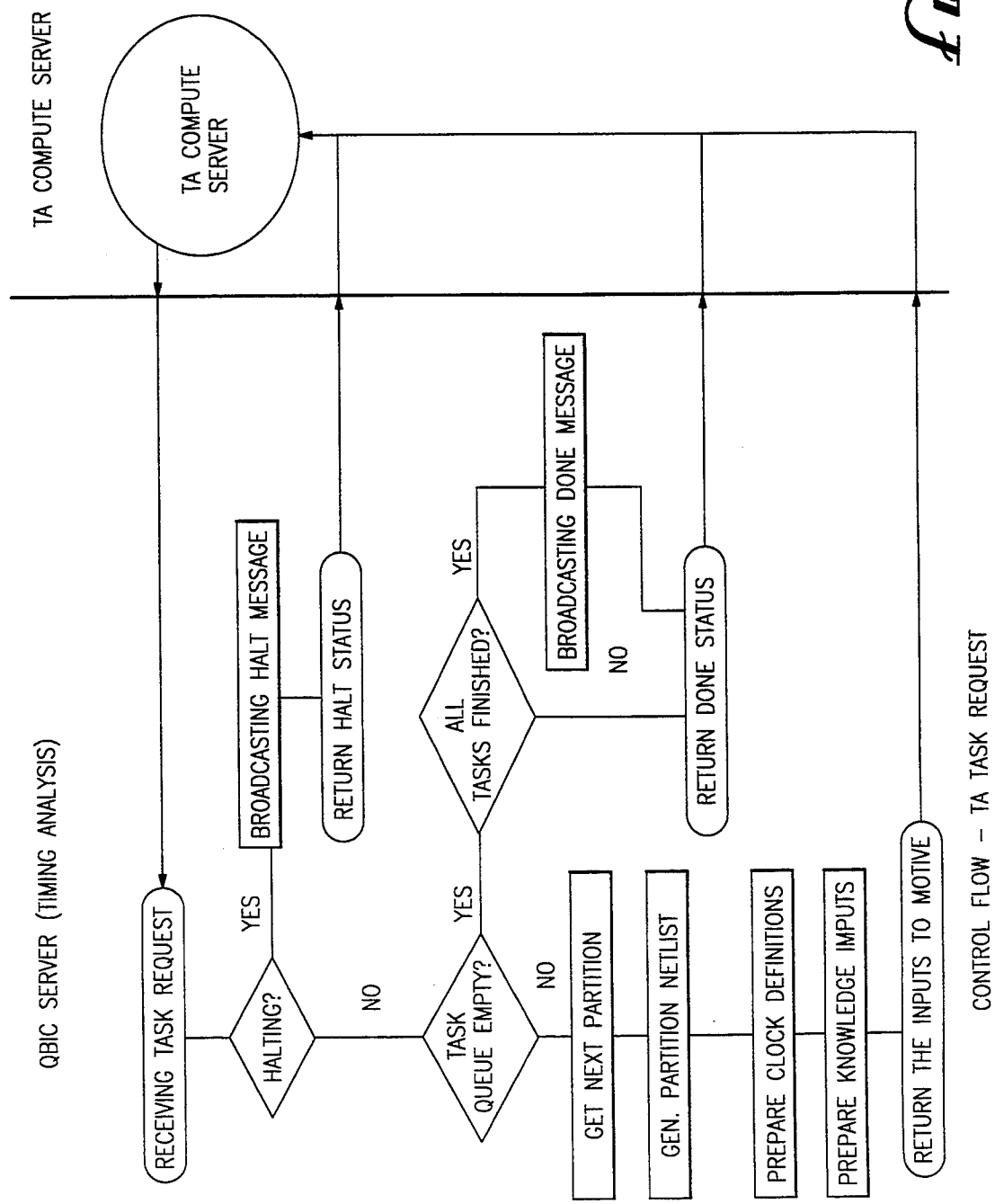
FIG. 27 is an illustration of the control flow employed during a timing analysis task request.

As shown in FIG. 27, upon receiving the TA task request from a Compute server, the QBIC server first checks to see if the termination or waiting conditions exist. If so, the appropriate message is broadcaster to all the Compute servers.

Otherwise, it gets the next ready partition for timing analysis, generates the netlist for the corresponding partition and merges it with the clock path netlist. In addition, it prepares the clock definition, the net grouping, net exclusion, and the path exclusion files for that partition. The information is sent to the requesting Compute server.

2.2.8.6.1.1 Get Next Partition

This step is simply fetches a partition from the need_to_be_timing_analyzed queue.

2.2.8.6.1.2 Generate Partition Netlist

The netlist is generated on the fly in Motive's pin file format. The netlist is generated based on the TA partitions created in the TA partition process.

2.2.8.6.1.3 Preparing Clock Definitions

Since the complete clock path logic is presented with the partition netlist to Motive for every partition timing analysis, the clock specifications to Motive are the external clock specifications. The clock specifications are the same for every partition through the hierarchy.

The only specific information for an individual partition is the input data arrival time and output date setup/hold constraints. Only relevant I/O data specifications are passed to the partition timing analysis. The others are filtered out.

2.2.8.6.1.4 Preparing Knowledge Inputs for the Partition

The knowledge inputs to Motive considered here are net based (i.e. in net exclusion and grouping), and part/pin based (i.e. in path exclusion, zero and multiple path cycles).

In modular timing analysis, only a portion of the input specifications are relevant to a particular partition analysis. At this time, when irrelevant specification is applied, Motive returns an error and stops the processing.

2.2.8.6.2 Timing Analysis on a Partition

Figure 28:
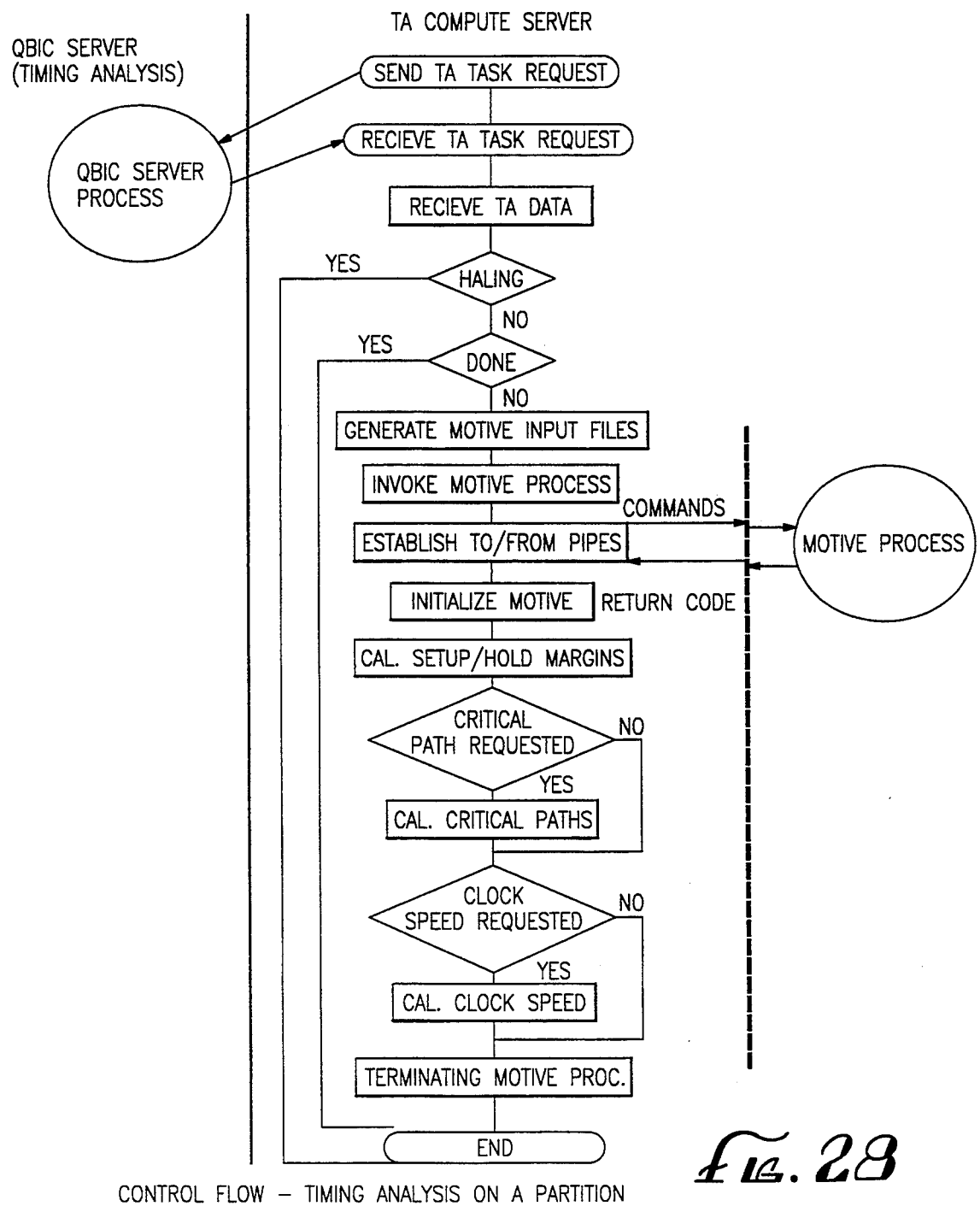
FIG. 28 is an illustration of the control flow during timing analysis on a partition.

FIG. 28 shows the control follow timing analysis of a partition. Upon receiving the TA task, the TA server first checks to see if the termination or waiting conditions exist. If so, the appropriate message is broadcasted to all the TA servers.

2.2.8.6.2.1 Generating Motive Input/Control Files

The input files to Motive are generated by unpacking the data sent from the QBIC server. The data is put in the appropriate files in the <design>.qtd/time directory for Motive to consume.

2.2.8.6.2.2 Invoking/Terminating Motive Process

Motive process is initiated as a child process via UNIX system routines (fork() and exec()) after the input data is generated. The process is terminated (by issuing the BYE command to Motive) when the timing analysis on the partition finishes. In normal situation, Motive process is invoked every time for a new timing analysis task and is terminated when the task is accomplished.

In case timing analysis is halted by the user or the system encounter non-recoverable error conditions, Motive process is interrupted and exited (by kill()).

2.2.8.6.2.3 Establishing To/From Motive IPC Pipes

After starting Motive process, two pipes, input and output, are established between the TA server and the Motive process. The input pipe is used to send commands to Motive and output pipe is to receive the return code.

2.2.8.6.2.4 Initializing Motive

Initializing motive includes setting Motive parameters, compiling netlists, loading timing models, and input the timing specifications, such as clock definitions.

2.2.8.6.2.5 Calculating Setup/Hold Margins

The setup and hold margins are calculated and results are used to determine the emulation speed and to fix the hold violations.

2.2.8.6.2.6 Critical Path Calculation

The number of the critical paths calculated are specified by the user through the system parameter interface. The TA Compute served selects the worst N (specified in the parameter form) setup margins in the design under analysis and generates the critical path traces.

2.2.8.7 Performing Incremental Timing Analysis

In modular approach, incremental timing analysis is performed by rerunning the TA partition algorithm on the entire design with the design modifications. Then, rerun timing analysis for the changed partitions.

```
Algorithm outline:
TA_Incremental_Analysis (design)
input design;
begin
    TA_Create_Partition (design);
    foreach (TA_Partition_Netlist[i]) do
        if (new TA_Partition_Netlist[i]    !=original
        TA_Partition_Netlist[i]) then
            Perform TA on new TA_Partition_Netlist[i];
        endif
    endfor
end.
```

2.2.8.8 Performing DataSync

For the datasync designs, the timing analysis subsystem provides two services: sync clock pulse calculations and emulation speed calculation.

Similar to the full timing analysis, the design is first partitioned into N TA partitions and each TA partition is analyzed by a TA compute server. For the sync clock pulse calculations, a WCP command is issued to Motive for every flip-flop.

The emulation speed calculation is the same as the calculations in a non-datasynced design.

2.2.8.9 Translating Inputs to Motive

The inputs to Motive are specified through a system user interface. The inputs for the entire design is then saved in system ASCII formal on disk.

Two tasks in translating inputs to Motive. First, we need to map the signal names and block names specified in the inputs to the names in the optimized physical netlist in which timing analysis is operated on. Second, we need to select an appropriate subset of inputs for each of the partition. The subset includes the inputs that relates to the signals and blocks in the partition. Note, due to the circuitry duplications in multiple timing analysis partitions, the inputs to the partitions may overlap.

The name translations are handled by the access routines provided by the logic optimization module.

To create the inputs for each of the partition, we need two access routines which maps a signal or a block to the TA partitions that contain it.

/*Name: TA_Get_Partition_From_Signal()

Function: returns a TA partition ID which contains that signal. Since a signal could be in multiple partitions, to get all the partitions that include the signal, this function should called until the output parameter (*partition_id_ptr) contains NULL. The initial call should initialize partition_id to NULL. For example:

```
partition_id = NULL;
do{
    status = TA_Get_Partition_From_Signal (signal_id. and
    partition_id) ;
    processing the data;
}   while (partition_id ! = NULL);
```

Input Parameter: an integer number identifies a signal.

Output Parameter: a pointer to an integer identifies a TA partition

Return Code: upon success completion, this function returns QT_SUCCESS. Otherwise, it returns the appropriate error code defined in system.

```
*/
qt_status_type TA_Get_Partition_From_Signal (signal_id,
partition_id_ptr)
int signal_id;
int *partition_id_ptr;
{
}/*TA_Get_Partition_From_Block( )
```

Function: returns a TA partition ID which contains that block. Since a block could be in multiple partitions, to get all the partitions that include the block, this function should called until the output parameter (*partition_id_ptr) contains NULL. The initial call should initialize partition_id to NULL. For example:

```
partition_id = NULL;
do {
    status = TA_Get_Partition_From_Block (signal_id, and
    partition_id);
    processing the data;
}   while (partition_id ! = NULL);
```

Input Parameter: an integer number identifies a signal

Output Parameter: a pointer to an integer identifies a TA partition

Return Code: upon success completion, this function returns QT_SUCCESS. Otherwise, it returns the appropriate error code defined in system.

```
*?
qt_status_type TA_Get_Partition_From_Block (block_id,
partition_id_ptr)
{
}/* TA_Get_Partition_From_Block*/
```

The translation for user input to Motive consists of clock definitions, input data arrival time, output setup/hold requirements, net/pin exclusions, net groupings, boolean constants, and multi/zero cycle definitions. For most of the inputs, if the signal or block contains in a partition, then the input is applied to that partition. The multi-cycle specifications only applied to the partitions which includes both the source block/pin names and the destination block/pin names.

2.2.8.10 Clock Speed Calculations

Figure 29:
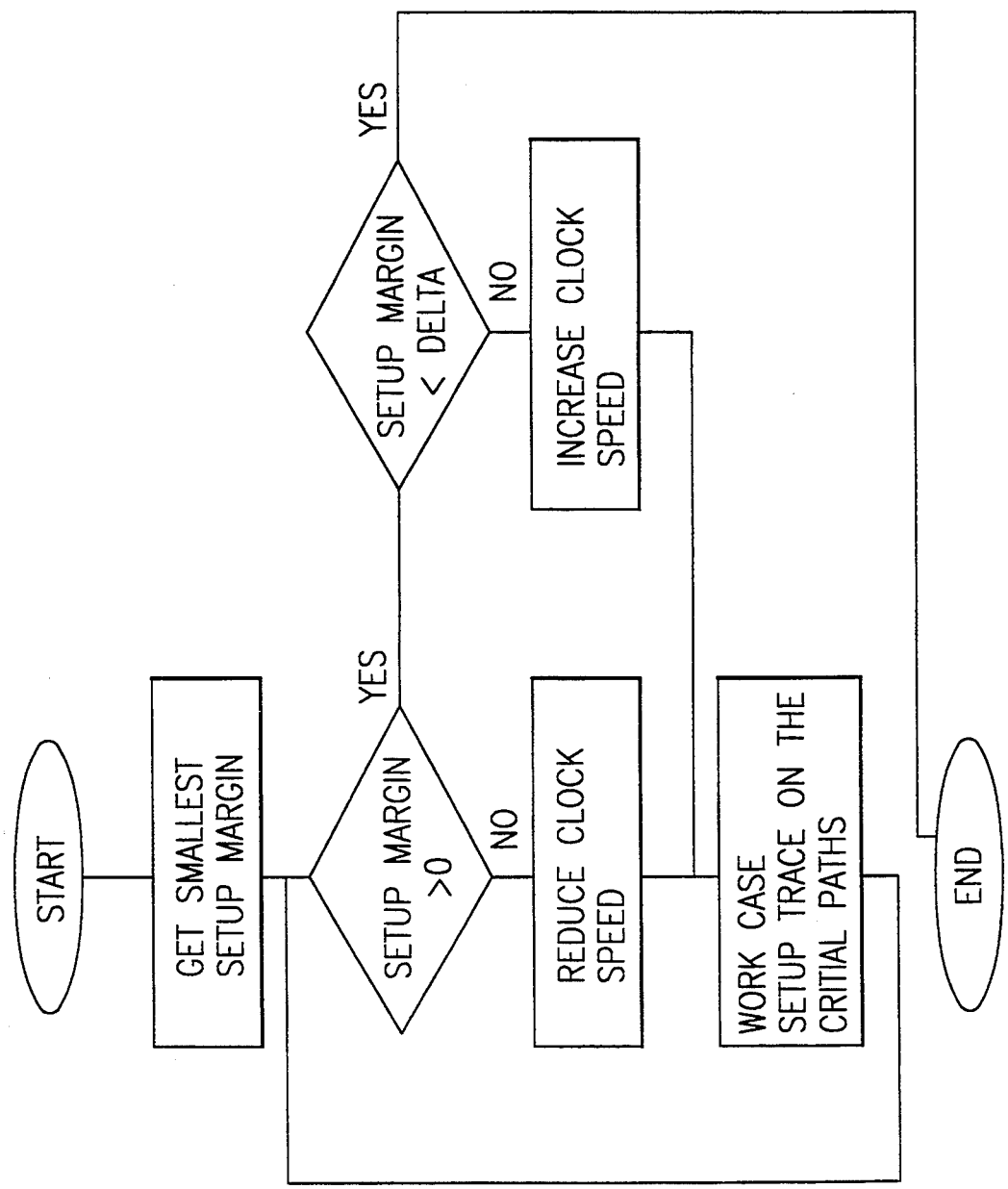
FIG. 29 illustrates setup margins dependent only on clock speed calculations.

Turning now to FIG. 29, if the clock speed calculation is requested (through the parameter forms), the TA Compute server follows the clock calculation algorithm and determines the emulation speed.

For most of the designs (non-latch based), the clock speed is only a function of the setup margins. In other words, as the clock speed slows down, the setup margins increase. The operational clock speed is the speed at which no setup violations exist in the design.

For this type of circuit, the clock speed calculation is based on repeated performing setup worst case trace analysis on the critical paths with adjusting the clock speed until finding an operational clock speed which is close to the optimal speed.

For the latch based designs under the two phase non-overlapping clock scheme, the operational clock speed is not only a function of the setup margins, but also a function of the hold margins. The operational clock speed is at the speed in which there is no setup and hold violations.

For this class of circuit, the clock speed is calculated by perform both setup and hold worst case analysis on the paths with smallest margins. The process repeats and the with adjusting the clock cycles until finding a speed such that there are no setup and hold violations.

2.2.8.11 Halting Timing Analysis

The timing analysis process may be halted by a user through the system user interface. In the event that a user halt the timing analysis, the halting message is broadcasted to all the TA Compute servers. Upon receiving the halting message, the TA Compute server terminates the Motive process, collects the information from Motive indicating the state of the timing analyzer when it is terminated, and try to return partition results back to the QBIC server before it exits.

2.2.8.12 Generating Timing Analysis Report

2.2.8.12.1 Processing Timing Analysis Results Request

In processing this request, the QBIC process registers the fact that the timing analysis for the partition is completed. It merges the results with the results from other partition timing analysis and reports in the final timing analysis report. All the internally used files for preparing the timing analysis report are reside in the <design>.qtd/time directory.

2.2.8.12.1.1 Receiving Setup/Hold Margins

The QBIC server creates two files in the time directory to store the setup and hold violations reported from the partition timing analysis, <design>.setup and <design>.hold. The <design>.setup file is used to generate the TA report. The <design>.hold file is used both for the TA report and for generating the automatic delay insertion file.

The QBIC server maintains N worst setup margins, where N is a user controllable parameter in the <design>.setup file. In order to be able to automatically fix all the hold violations, the QBIC server records all the hold violations in the <design>.-hold file.

2.2.8.12.1.2 Receiving Critical Paths

For each of the N worst setup violations, the corresponding critical paths are reported in the <design>.- critical file in the time directory. The path information of the critical paths are reported in the TA output.

2.2.8.12.1.3 Receiving Maximum Emulation Speed

Each of the partitioned TA returns an emulation speed. It is calculated based on the circuits analyzed in that partition. The QBIC server maintains the worst emulation speed. After the timing analysis completes, the worst emulation speed is reported in the TA report.

2.2.8.12.1.4 Receiving Limited Path Information

The limited path information can be categorized into four types: asynchronous loops, constraint evaluation limited paths, component depth limited path, and set/clear depth limited paths. The constraints time limit, component depth limit and the set/clear depth limit are all user controllable parameters.

The path information is directly concatenated into <design>.loop, <design>.timelim, <design>.pathlim, and <design>.sclim files in the time directory respectively. The information in these files are later included in the TA report.

2.2.8.12.1.5 Receiving Error/Warning Messages

The error and warning messages from individual partition are all recorded in the <design>.err file in the time directory. The messages are included in the TA report.

2.2.8.12.2 Merging TA Results for the Design

The TA result for each partition is returned to the QBIC server when a particular partition timing analysis completes. The signal names and the part name used in netlist are all in terms of the full name (names in the flat netlist).

The setup and hold margins are merged from all the partition timing analyses. The largest S setup violations and H hold violations are reported in the TA report. The S and H are the user controllable parameters. In addition, it generates a delay insertion file to automatically fix the hold violations if the automatic delay insertion is requested. The setup or hold violations reported for the leaf level partition are in terms of the D pin of storage elements (i.e. flip-flop, latch) with respect to the corresponding clock.

The top N number of critical paths are selected among the critical paths reported in the partition timing analysis. N is a user's controllable parameter. The other path information (component depth limited paths, evaluation time limited path, asynchronous loop paths, and set/clear depth limited paths) are concatenated in the TA report.

Among the emulation speeds calculated for each of the partitions, the worst case is reported as the emulation clock speed in the TA report.

2.2.8.13 Error Handling

Splatter program handles the error conditions as a splattered process aborts and it stays in case it encountered some nonrecoverable errors.

2.2.8.13.1 The QBIC Server Halts

The user may halt the timing analysis process via the menu provided in the system UI process. The request is then sent to the QBIC server for halting the entire timing analysis.

The QBIC server may decide to halt the timing analysis process when there fatal errors in analyzing one of the partitions, such as the design data is corrupted or the input specification is not complete.

Failures due to the network that could be resolved by resending the task is not considered to be fatal. A limited number of retries will issue if the network related failures are detected.

To half the timing analysis, the QBIC server first to broadcasts the halting message to all its TA Compute servers to inform them to stop the current timing analysis related to this design. The QBIC process waits for a specific time period to receive and process the partial TA results from the TA Compute servers.

Upon receiving the halting signal, a TA server halts the activities related to the QBIC server (i.e., interrupt the Motive child process), returns the partial TA results back to the QBIC server, and deletes the QBIC server from its service list.

After the timing analysis terminates, the reason of halting the timing analysis along with the partial TA results in the timing analysis report.

2.2.8.13.2 The QBIC Server Aborts

In the event of the QBIC server aborts (i.e. core dump), it catches the core dumping signal and does the following:
1. Inform the system UI process that it is exiting.
2. Broadcasting the halting message to all the TA Compute servers.

2.2.8.13.3 TA Compute Server Aborts

A TA Compute server catches the exiting signal in the event of core dumping. Before exiting, it informs the QBIC server that it is exiting and halts its Motive child process.

Upon receiving the abort message from a TA Compute server, the QBIC server halts the timing analysis process.

The QBIC server also periodically checks to see if all the enlisted TA Compute servers are alive. In case it detected the TA Compute server disappeared, it may resent the task that was assigned to that server to another one. After a number of tries, it may decide to half the timing analysis process.

2.2.8.13.4 TA Compute Server Stays in Infinite Loop

It is a real possibility that a TA compute server will stay in an infinite loop in analyzing a partition. This is detected by keeping track of the running time of TA compute server.

To reduce the possibility that Motive takes an excessively long time, a time limit is imposed upon Motive for the entire verification or for each constraint evaluation.

2.2.8.14 Internal Interfaces

2.2.8.14.1 Internal Data Transfers

2.2.8.14.1.1 Design Topology Analyzer to Motive Timing Analyzer

In addition to the user specified net exclusion and net grouping, the design topology analyzer is intended to automatically generate net exclusions and groupings for Motive.

2.2.8.14.1.2 Motive Timing Analyzer to Clock Speed Calculator

The information from Motive to the clock speed calculator is the setup and hold margins for a given speed. For most of the designs, the clock speed only depends on the setup margins. But, for latch based design, the clock speed is also a function of the hold margins.

2.2.8.14.1.3 Motive Timing Analyzer to Automatic Delay Insertion Module

Automatically delay insertion is used to address the hold violations in the configured design. The input to the automatic delay insertion module 116 from Motive is the hold margins and the corresponding pins.

2.2.8.14.2 Interface to Motive

2.2.8.14.2.1 Inputs to Motive

The input files to Motive are not directly visible to a user. The files are dynamically generated by the TA compute server in the temporary disk on the remote workstation. The files are generated based on users' input translations. For an example, the .ref input file is generated from the users' clock specifications. Please note, in normal usage, a user never needs to directly create any input file for Motive.

Most of the input files to Motive are named after the partition under analysis with the suffix indicating the file types.

A brief description of the inputs and the formats is presented here. The detail description and the exact syntax of the input files can be found in Motive user's and system manual.

2.2.8.14.2.1.1 The Motive Config File

The parameters to Motive are specified in the <partition>.stm file. This file is provided to Motive before issuing any Motive commands. The file is generated based on the default settings. A user may alter some of the relevant parameters through system UI parameter form. Once Motive reads this file, no changes may be made to the parameters for the invocation of Motive.

2.2.8.14.2.1.2 Net List

The <partition>.pin file contains the connectivity of the design/partition under analysis. The .pin file is generated from the TA partition netlist database. The netlist file format is defined as the following:

Each symbol data record represents a circuit instance. The symbol data record includes the part ID (the instance name) and the part type (the block name). It also lists every pin in the block, its signal connection, and its directionality. The umbilical pins as assigned pin type of 24–26. The internal pins are assigned pin type 20–23. The node field for us is always 1 and the signal type field is always 5.

2.2.8.14.2.1.3 Timing Models

The timing model for a component consists of four parts:
1. The Pin declaration.

The pin declaration declares the external ports of a component and their directionalities (input, output, bidirectional).

2. The DELAY statement.

The delay statement specifies the path delay from an input pin to an output pin. The syntax of the DELAY statement:

The *TO specifies the delay paths from every pin in the input pin group to every pin in the output group. The =TO specified the delay paths from every pin in the input pin group to the corresponding pin in the output pin group. The correspondence is defined by the pin position in the group (i.e. the first pin in the input group corresponds to the first pin in the output pin group).

An example: DELAY R %clk *TO%out5.0 * 15.0 6.0 * 20.0

2.2.8.14.2.1.4 The SETHOLD Statement

```
         *TO R
SETHLD dgroup =TO F clkgrp setlh sethl holdlh holdhl
         |           |      |
         |           |      |—Number  4.0
         |           |      |—Expression (A+B)
      data pin group  clock pin group  |—Don't care X
```

An example: SETHLD %in *TO R %clk 5.0 5.0 1.0 1.0

3. The PULSEWIDTH Statement

The pulsewidth statement syntax:
PULSEWIDTH pin_group HIGH|LOW pulsewidth

Also, for the parameterized timing models, the parameter values are specified in the component list.

```
AND ($A_Delay=5, $B_Delay=8)
OR
 . . . . . .
component_name
 . . . . . .
```

2.2.8.14.2.1.5 Clock Definitions

Where:
Period—the largest cycle time among all the clocks in the group.
Group_name—the name of the group.
Clock_name—the name of the clock.
There may be one or more clock declarations in one clock group. The skew_file defines how the clock should be interpreted (skewgen or clockgen) and the skews between them. The bus_file and the exc_file define the net grouping and the net exclusions.

2.2.8.14.2.1.6 Input Data Arrival Time

```
Input_signal Clock Edge minLH maxLH minHL maxHl
 . . . . .
```

Where:
Input_signal—the name of the input signal.
Clock—the name of the clock signal.
Edge—the transition edge.
minLH—minimum delay for the low-to-high transition.
maxLH—maximum delay for the low-to-high transition.
minHL—minimum delay for the high-to-low transition.
maxHL—minimum delay for the high-to-low transition.
There is a .tin file per clock frame. The name conversion for the .tin file is <clock frame>.tin.

2.2.8.14.2.1.7 Output Data Setup/Hold Requirements

```
Input_signal Clock Edge SetupLH HoldHL HoldHL
```

Where:
Input_signal—the name of the input signal.
Clock—the name of the clock signal.
Edge—the transition edge.
SetupLH—the low-to-high setup requirement.
SetupHL—the high-to-low setup requirement.
HoldLH—the low-to-high hold requirement.
HoldHL—the high-to-low hold requirement.
Similar to the .tin, there is .tsh file per clock frame. The name conversion for the .tin file is <clock frame>.tsh. The user interface of specifying input data arrival time is described in section 5.3.4 of Timing Analysis ERS, Specifying Output Setup/Hold requirements.

2.2.8.14.2.1.8 Net Exclusions

```
CONST.signal_name
 . . . . .
```

The net exclusion file consists of a number of CONST signal declarations. The name conversion for the net exclusion file is: <partition>.exc.

2.2.8.14.2.1.9 Net Grouping

```
BUS group_name
ELT signal_name
 . . . .
BUS group_name
 . . . .
BUS group_name
 . . . .
```

The net grouping file (<partition>.bus) consists of a number of BUS declarations. A BUS declaration defines a signal group. One or more bus elements are specified in a BUS declaration.

2.2.8.14.2.1.10 Zero/Multi/Consy Path Definitions

FROMpart pinTOpart pin cyc_numCYCLES-cyc_numHOLD
FROMpart pinTOpart pinCONSTANT
For example:
FROM/CPU/REG1 Q TO/CPU/DAT D 2 CYCLES 1 HOLD
FROM/CPU/JTAG2 Q TO ** CONSTANT The zero-, multi- and the constant cycle path definitions are specified in the <partition>.mcp file. The paths defined to be the constant cycle are the paths excluded from the timing analysis. This is one of the ways to exclude a specific path in the design.

The .mcp files includes a number of path specifications. A path specification consists of the source part-/pin(s) and the destination part/pin(s) identification (part, pin), the number of cycles for setup checks (cyc_numCYCLE) and for hold checks (cyc_numHOLD). The key work CONSTANT defines the constant cycle paths. The special character "*" denotes any part(s) or any pin(s) depends on its position.

2.2.8.14.2.2 Invoking Motive Process

A Motive process is associated with every TA Compute server. It is invoked when the Compute server is granted a timing analysis task. The process is invoked by the execO UNIX operating system call.

2.2.8.14.2.3 Interrupting Motive Process

The Motive process could be interrupted by its parent process, the TA server using the UNIX signal handling mechanism (kill(SIGINT)l). To abort Motive process, a temporary file, mtv_int.tmp, needed to be present in the directory where Motive is invoked. The file should include one line abort action specification. The exact syntax is:

* ABORTl: stop this constant and/or verification.

2.2.8.14.2.4 Terminating Motive Process

The Motive process could be terminated in two ways. In the case of normal termination, a termination command (BYE) is sent to Motive and Motive process exits upon receiving the command.

In the case that the timing analysis operation is halted in the middle of analysis, an interrupt signal is sent to Motive process along with the action of aborting specified in the mtv_int.tmp file. Before exiting, Motive process writes the current traversing path into a log file.

2.2.8.14.2.5 Outputs from Motive

Motive write the output files in the timing subdirectory under the design directory.

2.2.8.14.2.5.1 Setup/Hold Margins

The <partition>.verify file contains the calculated setup, hold and pulse width margins. The related information in this file is extracted for clock speed calculation, for fixing hold violations and for generating the timing analysis report.

2.2.8.14.2.5.2 Critical Paths

The critical paths are reported in <clock_frame>.cpr file as the result of the CPR command. The critical paths are with respect to a particular clock frame. For each critical path, it lists the instance names and pin names along the critical path.

2.2.8.14.2.5.2 Asynchronous Loops in the Design

The asynchronous loops broken by Motive is logged in <partition>.blk and <partition>.brk files. The .blk file lists the path of the loops that Motive found during timing analysis and the .brk file lists the nets where the loops were broken.

2.2.8.14.2.5.3 The Path Log File

The path log file <partition>.plf contains the aborted paths due to constrain evaluation time limit or asynchronous set/clear depth limit. The information in this file is translated into the timing analysis report to assist the user in identifying the possible FALSE paths.

2.2.8.14.2.5.4 Logic Component Depth Limited Paths

The logic component depth limited paths are logged into the <partition>.lim file. The component depth limit is set by the user. The contents of the .lim file are processed and reported in the timing analysis report. For each path reported, it lists the instance names and pin names before reaching the limit. high-to-low setup requirement.

2.2.9 Delay Insertion Module

2.2.9.1 Delay Insertion in Configuration Process

Figure 30:
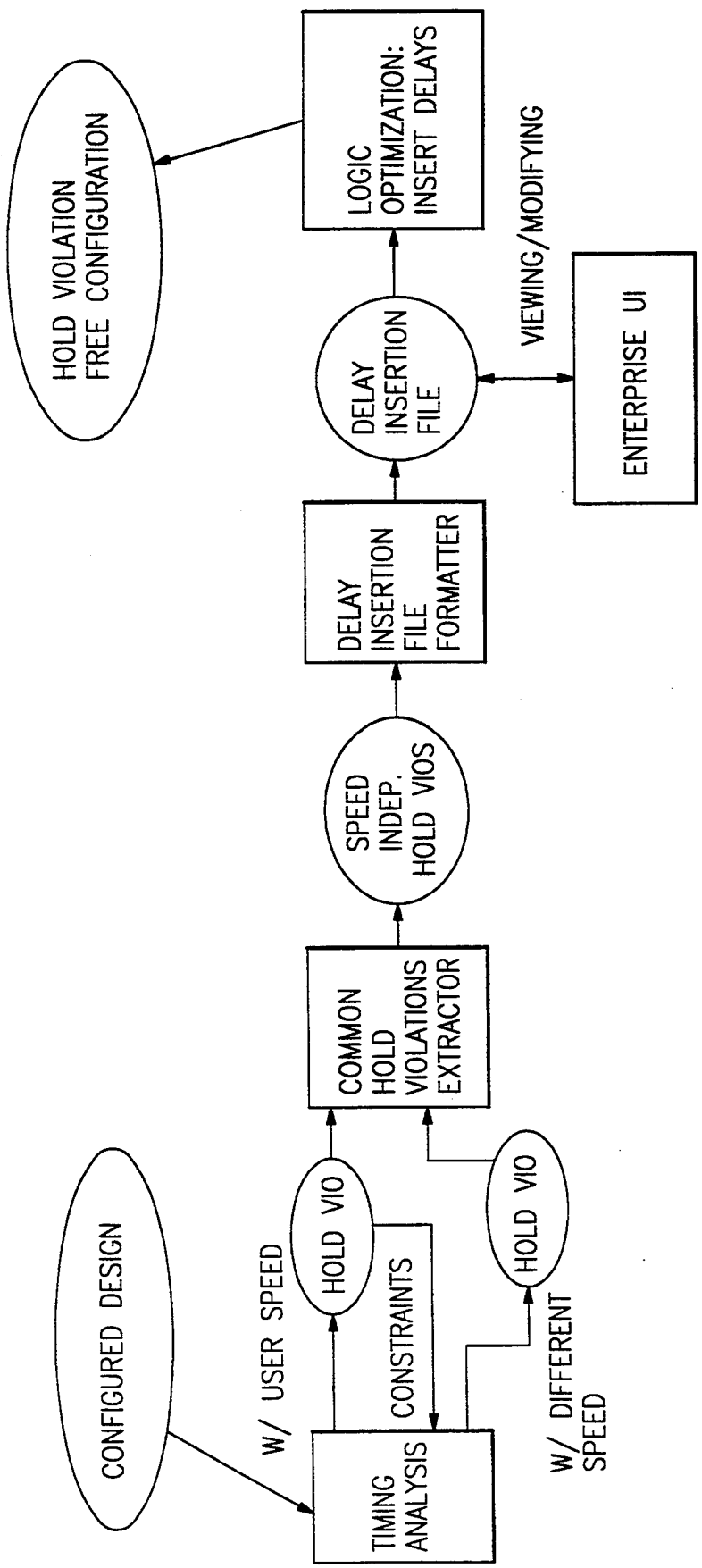
FIG. 30 illustrates the flow of the delay insertion module in accordance with the present invention.

Turning now to FIG. 30, the delay insertion process can be invoked after the TA step and before and incremental configuration process.

2.2.9.2 Delay Insertion Module Functionality

The delay insertion module 116 provides a semi-automatic path from the timing analysis to hold violation free configuration. The objective of this module is to automate the mechanics of the process (i.e., filter out speed dependent hold violations). However, due to the fact that a static timing analyzer will report false hold violations, user interventions are somewhat necessary.

The delay inserted is instance based to fix a specific hold violation. The actual delay insertion is performed by the logic optimization subsystem.

2.2.9.2.1 Hold Violations From Timing Analysis

As the result of running timing analysis on a configured design, a list of potential hold violations are generated by the timing analyzer. The hold violations reported by the timing analyzer include the violation locations and the margins.

2.2.9.2.2 Speed Independent Hold Violations

Some of the hold violations reported may be speed dependent. Therefore, they may be eliminated by adjusting the emulation speed One operation of the delay insertion module is to identify the speed dependent hold violations and Filter them out from the delay insertion list.

To identify the speed dependent hold violations, the hold margins for all the constraints that have hold violations are re-checked with a different clock frequency, for example, ½ of the user specified speed. Note, to recheck a certain number of hold constraints, even the order of a couple hundred, is a much faster process than performing timing analysis on the complete design.

With the hold violation lists from the original timing analysis and the hold constraints recheck, the set of the speed independent hold violations are determined. This set of the speed independent hold violation is then used to generate the initial delay insertion file.

2.2.9.2.3 Delay Insertion File Format

The delay insertion file contains the instructions to the logic optimization sub-systems for where to add delays and their magnitudes. For each delay insertion, the basic components are: the name of the instance, the name of the pin to insert delay, the magnitude of the delay inserted and a status flag indicating whether or not this request is active.

The delay insertion file contains a list of delay insertion requests. Each request consists of four items: the user instance/pin name, the internal (optimized) instance/pin name, the delay value in nano-seconds, and the ACTIVE/INACTIVE status. The internal instance/pin names may be the same as the user instance/pin names. They are used for internal operations only and are not displayed in the delay insertion form.

For example:
/Q1/D/Q1/D 28 ACTIVE
/Q4/D/Q4/D 66 ACTIVE
/Q5/D/Q5/D 54 INACTIVE
/Q8/D/Q8/D 64 ACTIVE The above delay insertion file has four delay insertion requests and three of them are active. Only the active delay insertion requests will be processed in delay insertion.

This file is intended to be viewed and modified by the users either via the system user interface or via a text editor. User SHOULD NOT attempt to modify the internal instance/pin names in the delay insertion file. The editing capabilities are provided for ease of manipulating the delay values. To add delay insertion requests via text editor, the user should repeat the instance/pin names in the second field in the place of internal instance/pin names.

2.2.9.2.4 The User Interactions

The delay insertion capability is intended to be used in the following way:
Configure the design;
Run TA by selecting TIMING/Timing Analysis menu;
Generate delay insertion file by selecting TIMING-/Delay File Gen menu;
Manipulate the generated delay insertion file either using the system UI capability or using text editor in UNIX; and
Incrementally configure the design. The active delay requests in the delay insertion file will automatically be inserted.

If not all the delays recommended by the TA are inserted, it's necessary to run TA again to verified that there is no hold violations.

The delay insertion file is not taking into consideration during the full configuration. It is only used during the incremental configuration.

Due to the inherit limitations of static timing analyzers, overly conservative or false violations may be generated. At this time, user interventions are necessary in certain situations. The delay insertion file could be examined or modified via the system user interface or via an text editor.

2.2.9.2.5 The Delay Insertions In Logic Optimization Subsystem

After an user has viewed the delay insertion file generated based on TA results, the user may decide to insert the delays. The actual delay insertion is performed by the logic optimization system as a step prior to the incremental configuration process. The delays are inserted on instances based Again, the delay insertion file has no effect in the full configuration process.

2.2.10 Modular Configuration

2.2.10.1 Overview

The increasing total number of transistors within one chip makes it harder and harder for EDA tools to process a complete design at one time. To take advantage of top-down design process and to make fully use of design hierarchy are becoming the essential parts of the state-of-the-art tools.

The main focus of modular configuration is to reduce configuration processing time by an order of magnitude so that configuration does not become a bottleneck. Moreover, module configuration allows the user to share pre-configured modules among different designs, e.g., multi-chip projects, which is a further improvement in the concept of concurrent engineering. The modular approach also reduces computer resources required by the configuration process during the run time. The speed of incremental configuration can also be increased significantly if the change is internal to a module.

In order to turn the configuration system from one-design oriented to module oriented, we adopt the concept of distributed processing and design multiple configuration pipelines to replace single pipeline. In other words, a design, which is composed of several user-definable modules, is fed into multiple pipelines for configuration instead of just one pipe in the current environment. The input to each pipeline is a module. The entire configuration process can be executed either in sequential or parallel.

2.2.10.2 Architecture

Figure 31:
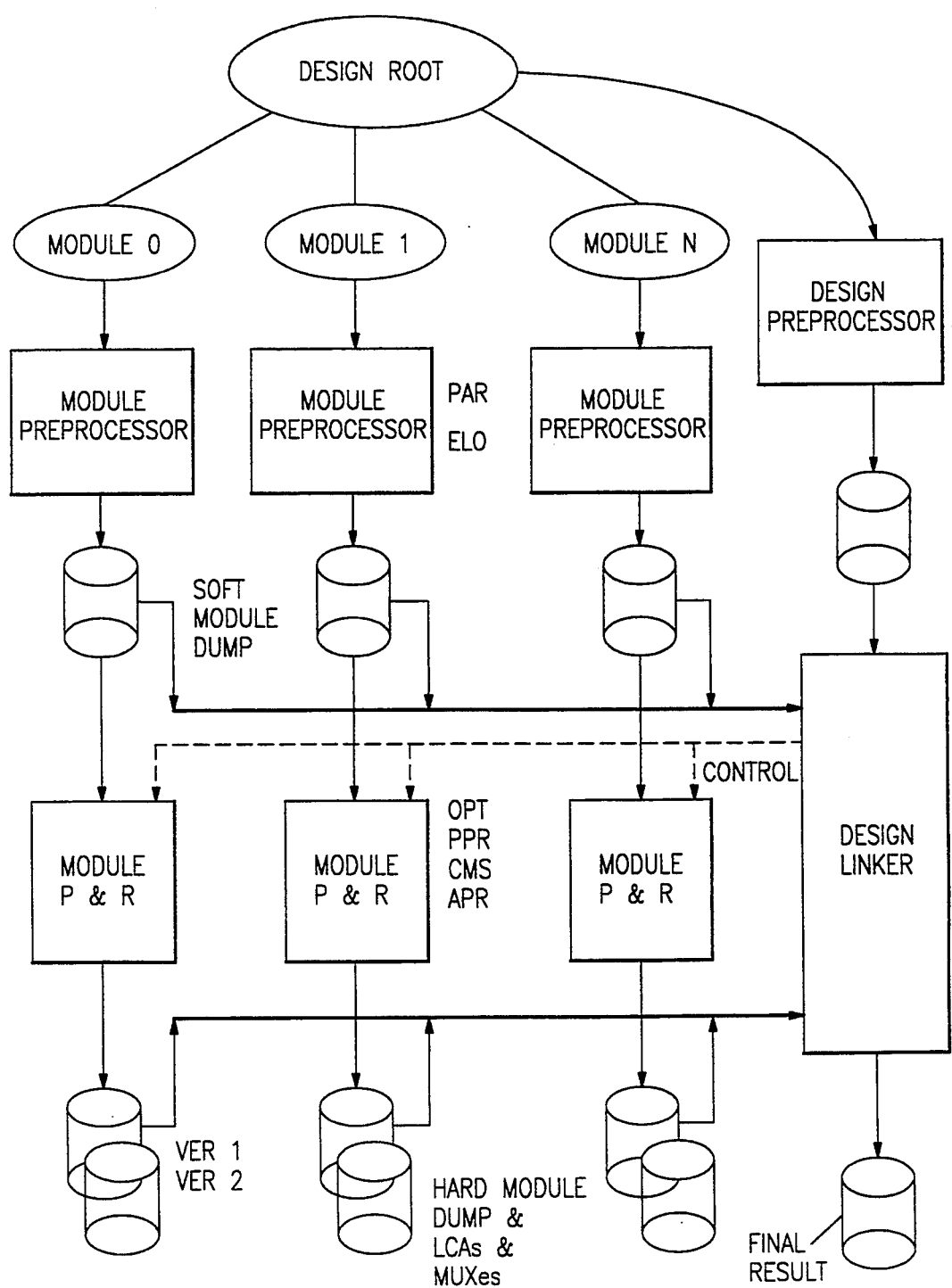
FIG. 31 illustrates the top level architecture of modular configuration.

FIG. 31 depicts the top-level architecture of module configuration. The fundamental concept is making everything modular and introducing a control mechanism to conduct the module "orchestra". Note that the definition of a module is based on the user's hierarchical design, which is defined inside the design, not an emulation board module. For example, a module can be a complete chip in a multi-chip design or a functional unit, like a floating point unit in a RISC chip. In general, the modules are the first-level hierarchy of a design. Thus, the architecture has the assumption that a module is largely self-contained in turns of timing and functionality. Modulizing a flattened netlist is not a concern in this architecture. A flattened netlist must be partitioned into modules before the module configuration can take place.

The basic view of this architecture starts from a design which contains several modules and the top-level netlist which connects the modules together. Each module is fed into a configuration pipe. The top-level netlist which treats the modules as primitives is fed to a configuration pipe as well. After configuration, the results is generated from each pipe and the design linker stitches them together. Should the linking fail, the design linker redefines new I/O constraints and have one or more module P&Rs run, so the new results can satisfy the new constraints. The entire configuration is done as long as the constraints are satisfied completely.

Each configuration pipeline does much the same thing was explained above in section 2.2, i.e., parsing (PAR), flattening (ELO), optimization (OPT), partitioning, placement, and routing, except module level placement and routing. As in the case of chip level P&R, the module level P&R allows for recalculation and replacement if the previous results could not meet the constraints. After the configuration, the results from a module pipe can fit into, say one thirds, one, or two emulation boards. There is no architecture restrictions to pre-define the physical size of a module.

The recalculation point for a failed module-level P&R is set to the point right after the module flattening is finished and before the optimization is started. Thus, the tasks before the recalculation point are called module preprocessing and the tasks performed after the recalculation point are called Module Place & Route (P&R). The module preprocessing writes the "cooked" module netlist into the disk in an organized way. The output from the preprocessing is called soft module dump since it does not contain any information about the physical P&R. Soft module dump is the input to the lower half pipe, which is module P&R. It reads the module netlist and constraints and has module P&R executed to meet the constraints. Since the modular configuration might use up more emulation resources, to minimize the usage is also considered seriously. There will be a heuristic algorithm embedded in the design linker to deal with module-level P&R. The architecture does not define such algorithm. However, the architecture does define the environment to allow us heuristically to develop such algorithm based on the experience we will gain from the new system.

The configuration pipes are identical to each other, except for the pipe for configuring the design root. The root pipe assumes each module as primitive element and knows the real physical emulation resources. The pre-processing of the top-level netlist is pretty much the same as the module pre-processing. The only difference is that the root pre-processing requires the handling of physical pins in to and out from the target emulator. The knowledge of physical emulation resources is to apply the constraints to the module P&Rs, if the previous results can not satisfy with the limitations. This introduces the necessity of version control within a module. A shared module may require different constraints to satisfy different designs. The previous result which is good for a design to be destroyed when the configuration for another design can not use the result.

The linker generates the final answers by collecting the modular results and, then, placing and routing the modules on the target emulator. Specifically, the design linker requires the followings as inputs:

1. The top-level netlist;
2. The statistic information of the modules;
3. Previous module results if any;
4. I/O constraints and physical resources of the emulator; and
5. Information and data needed to execute the module P&R processes.

With the above data, the design linker generates the final LCAs and MUXes for the given design. The action is much like generating the executable from several .o files. Using the same analogy, the soft module dump is much like preprocessed .c files and the original module netlist is the original .c source file. Thus, it becomes clear that modulization should work on this project as it works on the software systems.

During a configuration, a lot of files will be generated. Although the size of files are much smaller, the total number of files are more than that of the current configuration. To facilitate the data access, an intelligent file management mechanism is embedded in the architecture. The mechanism is called file organizer which provides the access to the data of a module by simply giving the name of the module. The file organizer also makes shared modules among different designs easy to implement.

2.2.10.3 Run-Time Process Structure and Functionality

While the last section describes the architecture from the data-flow point of view, this section describes the module configuration from the control-flow point of view. We can have a much clear picture by combining the data-flow and control-flow together.

Figure 32:
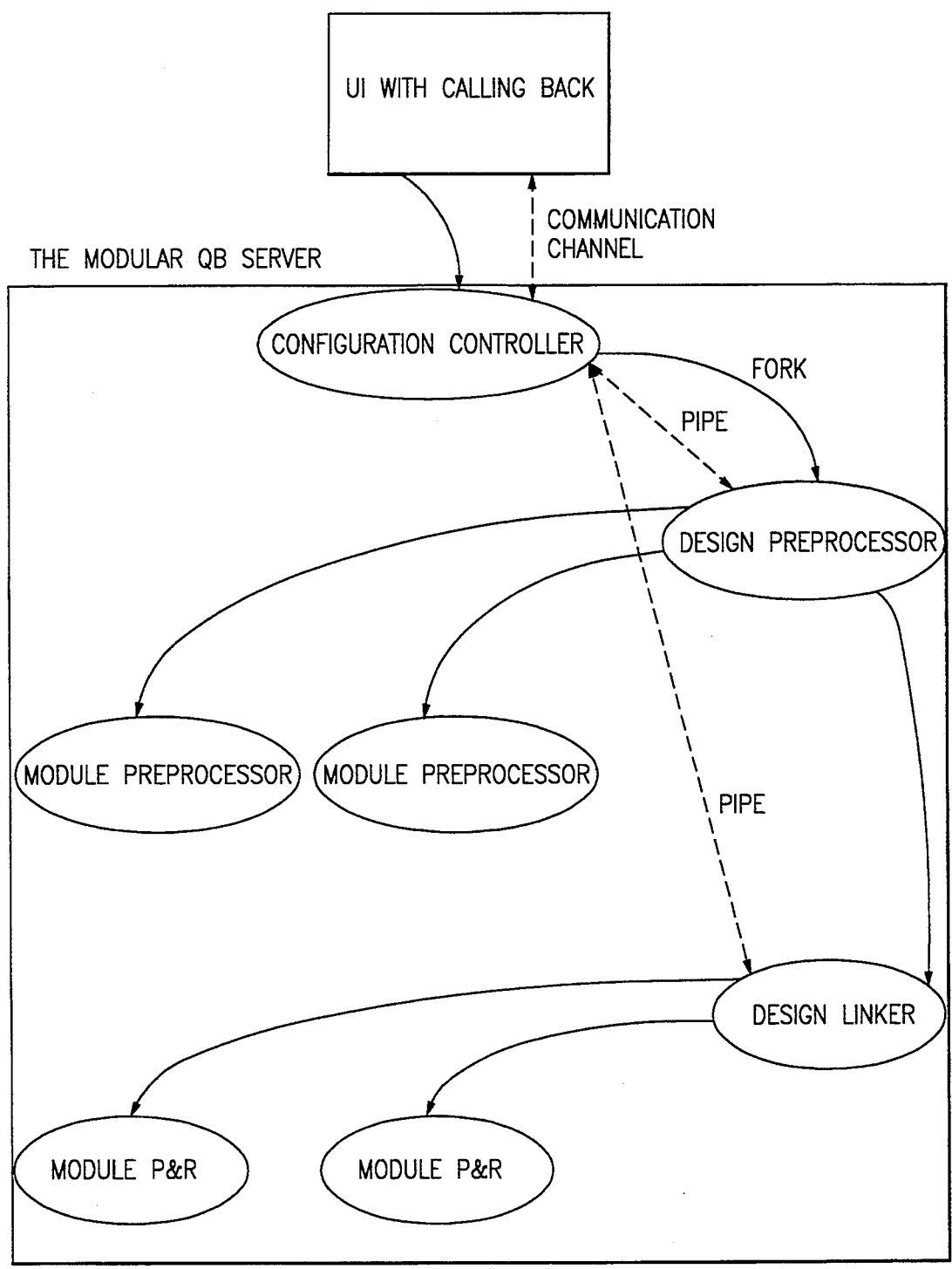
FIG. 32 illustrates the process structure of modular configuration.
Figure 33:
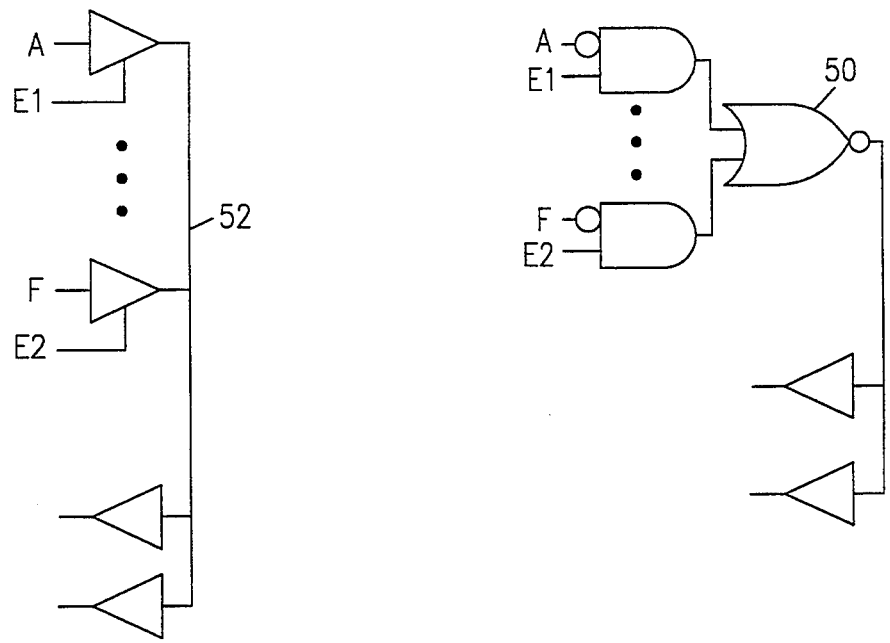
FIG. 33 is an example of a first user's tristate net and a functionally equivalent system implementation.

FIG. 32 illustrates the process structure and dependencies among the processes. The creation of the configuration controller is the beginning of a configuration. The configuration server is responsible to communicate to the outside world. The controller takes the design name and module names from the user interface and creates the design pre-processor. By reading the design name and module names, the design pre-processor then creates one or more module pre-processors. The pre-processing phase is the first phase of module configuration. At the end of the first phase, the design pre-processor wakes up the design linker to take care of the tasks in the second phase, which are module placement and routing. The design linker does final system-level placement and routing after all module P&Rs has finished.

The design pre-processor is the same executable as the module pre-processors. When the executable is executed, it realizes its responsibility from the difference of inputs, e.g., command line arguments. Basically, the design pre-processor not only pre-processes the top-level netlist but also handles the creation of module pre-processors, makes sure the soft module dumps are ready, then wakes up the design linker. In other words, the design pre-processor controls the first phase work completely.

The module pre-processor is responsible for pre-processing the module netlist. The time stamps between all the input and output files are checked before doing any real work. A module pre-processor will exit immediately if the output is younger than the input, i.e., the previous result can be re-used. The distributed checking mechanism not only provides the modular configuration capability we need but also preserves the power to extend for the future system automatically. Such checking mechanism is also used in the module P&R. Moreover, since the environment is module-oriented and shared modules among different designs are possible to happen, the data-locking is also necessary. We intend to leave it as one of the future tasks.

The second phase begins when the design linker is awakened by the design pre-processor. The design linker reads the soft module dump which stores the pre-processed top-level netlist and creates the processes for doing module P&R. Like the design pre-processor, the design linker is the same executable as the module P&R. However, the design liner takes the result from the module P&Rs and does basically what SMR (system-level mux router) is doing today to generate the final results.

The module P&R, which is created by the design linker, reads its own soft dump and generates the hard module dump, LCAs, and MUXes. Unlike today's configuration, which stores the soft and hard dump together, the module P&R saves the result into a different disk file. The reason for this is to allow the design liner to re-try when the previous I/O constraints failed. The compress/uncompress scheme should compensate for the increase of used disk space. Moreover, the file organizer allows the data stored across the network. This implies that more disk space is available because we are not put everything into one directory. Therefore, the disadvantage is minimized.

There is a communicating channel between the configuration controller and the design pre-processor during the first phase. The channel is reused in the design linker in the second phase. The channel not only sends the control messages from the controller but also provides the feedback of various configuration status to the controller.

2.2.10.4 File Organizer

To move the system from one design environment to module-oriented environment, a simple, yet efficient mechanism is designed to manage the huge amount of disk files in an organized way. We call the mechanism file organizer.

The file organizer is designed to achieve the following goals:
1. Managing the disk files for module configuration;
2. Sharing modules, which are emulation-ready, among different designs; and
3. Introducing emulation hierarchy for future system growth.

The basic and the most important function that the file organizer provides is searching the location of a module by giving the module name. In other words, a module can be found anywhere with the help of the file organizer. To facilitate the work, module database is introduced. A module database is a directory which stores one or more modules and a path file called "elsewhere".

It is clear that the structure of a module database represents one level of tree hierarchy and the path file is the link to other possible hierarchies (either at the same level or lower level) which are just other module databases. The paths provided by the path file are searched in order, if a module can not be found locally. Note that a design is also treated as a module. From the file organizer's point of view, a design is exactly the same as a module. Both of them are modeled as nodes in a complex hierarchical tree with multiple roots.

2.2.10.5 How Module Configuration Fits into the Entire System

The relationship between the configuration and the rest of the system processes is designed to be the same. As shown in FIG. 32, the big rectangle which encapsulates all the configuration processes represents the boundary of the configuration service. The interface across the boundary is kept the same as what we have today. However, the passing messages or commands will be enhanced to support the modular processes. The user interface will be enhanced to provide information about modules.

The other issue is the name mapping. The current user interface program also needs to know the name mapping, but does not know modules. There will be more than one mapping file after module configuration takes place. The user interface program needs to link with the file organizer and recognize module names from the first level of net names, then pick the proper mapping file (similar to the current qtn,dss) from the module directory to perform the mapping. For all the executables which needs to know the name mapping should link with the file organizer as well.

2.2.10.6 The Relationships to Timing and Clock-Tree Analysis

The timing analysis and clock-tree analysis needs to know how many modules are used to compose a design. Modular approach is useful only when timing problems do not run across the module boundaries and the clocks are not modified by some module and used by other modules.

As a result, the timing and clock-tree analysis need to be modified so that they can process one complete design at a time. The analysis program needs to construct the complete design from several modules. With the help of the file organizer, the programs can find the modules easily and glue them together to form a complete design before doing the analysis. This implies that the execution flow of design-reading needs to be changed. Instead of reading just one design, the programs needs to read several modules and construct them together. Other than this, the programs are not aware of the changes of configuration.

2.2.10.6.1 Configuration in Parallel

Since every module pre-processor and module P&R run independently, they can certainly run in parallel on different machines. If the disk environment is shared and common to all connected workstation, distributed computing can easily to be achieved. It is clear that such distributed computing can speed the configuration up to many folds.

2.2.10.6.2 Localization of Low-Skew Lines within a Board

Since module configuration confines a module into one piece which is recognized and controllable by the user, the low-skew lines do not need to be shared among different emulation boards. The more low-skew lines to use implies the higher emulation speed and less hold violations.

2.2.10.6.3 Automated Module Definition

Currently, we assume that the modules are ready before the configuration service occurs. If we link ADP and the file organizer together, the module preparation process can be automated.

2.2.10.6.4 Configuration Expanded to Multiple Emulators

Although the current module configuration only use the first level of a design, the framework of our approach allows a design with more than one level to be configured. By knowing the connections among multiple emulators, automatic configuration on multiple emulators should be possible with the modular approach.

2.2.10.6.5 Making Use of Heterogeneous Emulation Boards Possible

As the future FPGA becomes denser and bigger, new emulation boards will be made based on the new FPGAs. With module configuration, the user does not necessarily throw away old boards. Previous designs which map into the old boards may become modules and used as library components for a new bigger design.

2.2.10.7 User Scenario

From users' point of view, module configuration adds the concept of modules to the system. The user is required to define the modules within a design. There are two ways to define the modules, either implicitly or explicitly. If the modules are defined only by the names, we call the definition implicit. If the modules are defined by the names and their own associated netlist files, the definition is explicit.

In the implicit mode, all the given netlist files are associated with the design. The modules are defined by their names only. The preprocessor will read the design and create the modules according to the module name. In other words, the modules are embedded in the design tree. If we compare to the current system, the user only needs to add the names of the modules for a given design in implicit mode in order to do modular configuration. This mode is convenient for small designs, but not for large designs, such as multi-chip designs.

A large design, where each functional unit or chip has a different owner, normally does not share netlist files. Some functional units may even be pre-configured. The explicit mode works much better in this scenario. In this mode, a module is defined by its name and associated netlist files. There is a clear module boundary. A netlist file which contains more than one module is not allowed in this mode.

Two more forms are needed to add to the current user interface. They are module list and search path list for module libraries. The module list allows the user to define the modules by their names and/or their associated netlist files. Each module definition may also associated with a host for possible distributed processing. The form of module list should be combined with or opened from the current open menu, since it contains a table for all the netlist files of a design.

The second form needed is search path list for module libraries. The form simply defines the locations of the libraries to be searched for finding a module.

2.2.10.8 Modular Configuration System Place and Route

2.2.10.8.1 Architecture

System place and route performs the logical-to-hardware mapping for the modular configuration system. Given a netlist (in the form of QBIC) and a set of partitioning constraints system place and route will partition and route the design onto the emulation target. In the modular configuration system system place and route will proceed on two levels: as the design linker, it will read files link.ctrl and constraints.loc generated by the design control (these files contain partitioning parameters from the user form, and a list of all the modules in the design). The design linker will then write a module.cntrol file into every module directory, and then call a function to execute a system place and route process in each directory. Each of those system place and route processes will read the respective module.control file, and write a module.results file when done. After all of these system place and route processes are completed, the design system place and route reads the module.results files. The design system place and route may against write module.control files into each module directory and call the function to execute those system place and route processes again, etc. Any system place and route process can also call a function to perform an apr splatter. Most of the apr is performed by the module system place and route since only the module system place and route have the detail necessary. The APR dones by the design linker system place and route involves glue logic and small blocks at the top level.

2.2.10.8.2 Algorithms

2.2.10.8.2.1 Terminology

Board—Emulation module (hardware package)

Global partitioner—The partitioner working at the top level. This partitioner deals with modules and top-level "glue" logic as blocks, re-using LCA chip sets when possible.

LCA chip set—Derived from the relocatable chip set by fixing the chip numbers and generating the LCA files. Any number of LCA chip sets can be derived from each relocatable chip set.

Local partitioner—The partitioner working at the module level. This partitioner deals with the module without referencing other modules or the top level.

Module—Logical subcircuit which is independently compiled, may span boards.

Relocatable chip set—Set of chips of a module to be placed on a single board. A module which spans three boards will need at least three relocatable chip sets.

2.2.10.8.2.2 System Place and Route Control Flow

The following describes the control flow of module configuration system place and route. First the initial configuration is described, then the initial configuration with APR failure recovery. Then the modular configure is described.

Initial Configuration

1. Partition top level primitives. The design system place and route reads the (empty) module status file. The top level primitives are partitioned into a relocatable chip set. The design system place and route writes module status files for each file, specifying the partitioning parameters.

2. Partition modules. The module system place and routes read the module status files. Since a partitioning has been specified but has not been executed, each module system place and route partitions its module, creating a relocatable chip set.

3. Partition relocatable chip sets. The design system place and route reads the module status files, which now contain relocatable chip set descriptions. In the QBUC given to the design system place and route, each module is a block; those blocks are expanded such that each relocatable chip set is a block (a module may be made up of a number of relocatable chip sets). Those blocks are then partitioned across the emulation modules. In the initial implementation, the relocatable chip sets will each be simply assigned to an emulation module; later the partitioner will combine relocatable chip sets.

4. Route relocatable chip sets. After this partitioning is done, the blocks representing relocatable chip sets are expanded further into their constituent chips. This QBIC is then routed, creating a mapping of chip pin to net. This mapping is written to the module status files.

5. Create LCA chip sets from relocatable chip sets. The module system place and routes read the module status file, which has the routing described. The routing is applied to the module QBIC and APR is run, creating the LCA files.

6. Create LCA bitstream files. The design system place and route collects the LCA files into a design LCA file directory which will be used to load.

Initial Configuration with SMR Failures

1. Partition top level primitives. The design system place and route reads the (empty) module status file. The top level primitives are partitioned into a relocatable chip set. The design system place and route writes module status files for each file, specifying the partitioning parameters.

2. Partition modules. The module system place and routes read the module status files. Since a partitioning has been specified but has not been executed, each module system place and route partitions its module, creating a relocatable chip set.

3. Partition relocatable chip sets. The design system place and route reads the module status files, which now contain relocatable chip set descriptions. In the QBUC given to the design system place and route, each module is a block; those blocks are expanded such that each relocatable chip set is a block (a module may be made up of a number of relocatable chip sets). Those blocks are then partitioned across the emulation modules. In the initial implementation, the relocatable chip sets will each be simply assigned to an emulation module; later the partitioner will combine relocatable chip sets.

4. Route relocatable chip sets. After this partitioning is done, the blocks representing relocatable chip sets are expanded further into their constituent chips. This QBIC is then routed, creating a mapping of chip pin to net. This mapping is written to the module status files.

5. Create LCA chip sets from relocatable chip sets. The module system place and routes read the module status file, which has the routing described. The routing is applied to the module QBIC and APR is run, creating the LCA files.

6. Re-partition and re-route failed LCA chip sets. The design system place and route reading the module status files detects failures on some LCA chip sets. Those LCA chip sets are incrementally repartitioned to offload the chips that failed. The routing for LCA chip sets which have no failures is restored, and the (now relocatable) chip sets are routed. This route map is written to the module status files.

7. Create LCA chip sets from relocatable chip sets. The module system place and routes erad the module status file, which has the routing described. The routing is applied to the module QBIC and APR is run, creating the LCA files.

8. Create LCA bitstream files. The design system place and route collects the LCA files into a design LCA file directory which will be used to load.

(Incremental Configuration) Module Re-Configuration

1. Partition top level primitives. A set of modules is identified by the front end as having changed. The design system place and route destroys the relocatable and LCA chip sets for these modules, and rewrites the module status files. The top level primitives are partitioned into a relocatable chip set.

2. Partition modules. The module system place and routes read the module status files. If a partitioning has been specified but has not been executed, the module system place and route partitions its module, creating a relocatable chip set. If a partitioning has been executed, nothing need be done and the module system place and route exits.

3. Partition relocatable chip sets. The design system place and route reads the module status files, which now contain relocatable chip set descriptions and LCA chip set descriptions. In the QBIC given to the design system place and route, each module is a block; those blocks are expanded such that each relocatable or LCA chip set is a block (a module may be made up of a number of relocatable or LCA chip sets). Those blocks are then partitioned across the emulation modules. If this partitioning fails, an LCA chp set is converted to a relocatable chip set, and partitioning is tried again.

4. Route relocatable chip sets. After this partitioning is done, the blocks representing relocatable chip sets are expanded further into their constituent chips. The routing for the LCA chip sets is restored, and the relocatable chip sets are routed, creating a mapping of chip pin to net. This mapping is written to the module status files. The router may reroute LCA chip sets as necessary (converting them to relocatable chip sets).

5. Create LCA chip sets. The module system place and routes read the module status file, which has the routing described. If there are relocatable chip sets to convert to LCA chip sets, the routing is applied to the module QBIC and APR is run, creating the LCA files.

6. Create LCA bitstream files. The design system place and route collects the LCA files into a design LCA file directory which will be used to load.

Modular Configuration with APR Failure

1. Partition top level primitives. A set of modules is identified by the front end as having changed. The design system place and route destroys the relocatable and LCA chip sets for these modules, and rewrites the module status files. The top level primitives are partitioned into a relocatable chip set.

2. Partition modules. The module system place and routes read the module status files. If a partitioning has been specified but has not been executed, the module system place and route partitions its module, creating a relocatable chip set. If a partitioning has been executed, nothing need be done and the module system place and route exits.

3. Partition relocatable chip sets. The design system place and route reads the module status files, which now contain relocatable chip set descriptions and LCA chip set descriptions. In the QBIC given to the design system place and route, each module is a block; those blocks are expanded such that each relocatable or LCA chip set is a block (a module may be made up of a number of relocatable or LCA chip sets). Those blocks are then partitioned across the emulation modules. If this partitioning fails, an LCA chp set is converted to a relocatable chip set, and partitioning is tried again.

4. Route relocatable chip sets. After this partitioning is done, the blocks representing relocatable chip sets are expanded further into their constituent chips. The routing for the LCA chip sets is restored, and the relocatable chip sets are routed, creating a mapping of chip pin to net. This mapping is written to the module status files. The router may reroute LCA chip sets as necessary (converting them to relocatable chip sets).

5. Create LCA chip sets. The module system place and routes read the module status file, which has the routing described. If there are relocatable chip sets to convert to LCA chip sets, the routing is applied to the module QBIC and APR is run, creating the LCA files.

6. Re-partition and reroute failed LCA chip sets. The design system place and route reading the module status files detects failures on some LCA chip sets. Those LCA chip sets are incrementally repartitioned to offload the chips that failed. The routing for LCA chip sets which have no failures is restored, and the (now relocatable) chip sets are routed. This route map is written to the module status files.

7. Create LCA chip sets from relocatable chip sets. The module system place and routes read the module status file, which has the routing described. The routing is applied to the module QBIC and APR is run, creating the LCA files.

8. Create LCA bitstream files. The design system place and route collects the LCA files into a design LCA file directory which will be used to load.

While the invention is susceptible to various modifications and alternative forms, specific examples thereof have been shown by way of example in the drawings and are herein described in detail. It should be understood, however, that the invention is not to be limited to the particular forms or methods disclosed but, to the contrary, the invention is to cover all modifications, equivalents, and alternatives falling within the spirit and scope of the appended claims.

What is claimed is:

1. In a hardware emulation system, a method of removing gated clocks from clock nets in a circuit design comprising the steps of:

(a) identifying the clock nets in the netlist;
   (b) identifying clock sources, said clock sources being unique clock signals in the clock nets;
   (c) identifying sites where logic in the clock net is connected to a clock pin on a flip-flop;
   (d) determining whether pre-existing logic is connected to a clock enable pin on said flip-flop;
   (e) determining whether said logic in the clock net is clock-gating logic or clock generation logic;
   (f) transforming said logic in the clock net into functional equivalent logic if said clock net logic is clock-gating logic;
   (g) connecting said functional equivalent logic to said clock enable pin on said flip-flop if there is no pre-existing logic connected to said clock enable pin;
   (h) creating an AND gate having an output and a first input and a second input and connecting said output of said AND gate to said clock enable pin of said flip-flop, connecting said functional equivalent logic to said first input on said AND gate and transferring said pre-existing logic to said second input on said AND gate, if pre-existing logic is connected to said clock enable;
   (i) connecting said clock sources to said clock pin on said flip-flop, thereby creating a modified netlist; and
   (j) mapping said modified netlist into said hardware emulation system.

2. The method of claim 1 further comprising the steps of:

(a) determining if any of said clock nets that were transformed have logic emanating from a branch point in said clock path leading to clock source and said branch leads to a data path;
   (b) determining if any of said clock nets that could not be transformed have logic emanating from a branch point; and
   (c) duplicating said logic in said clock path from said branch point to said source clock if either of the conditions to be determined in steps (a) or (b) exist.

* * * * *